US012307066B2

(12) United States Patent
Sorrentino, III et al.

(10) Patent No.: US 12,307,066 B2
(45) Date of Patent: May 20, 2025

(54) DEVICES, METHODS, AND GRAPHICAL USER INTERFACES FOR PROVIDING COMPUTER-GENERATED EXPERIENCES

(71) Applicant: Apple Inc., Cupertino, CA (US)

(72) Inventors: William A. Sorrentino, III, Mill Valley, CA (US); Jonathan Ive, San Francisco, CA (US); Alfred B. Huergo Wagner, Redwood City, CA (US); Felipe Bacim De Araujo E Silva, San Jose, CA (US); Alan C. Dye, San Francisco, CA (US); Stephen O. Lemay, Palo Alto, CA (US); Gregg S. Suzuki, Daly City, CA (US); Peter D. Anton, San Francisco, CA (US); Richard D. Lyons, San Francisco, CA (US); Wan Si Wan, Sunnyvale, CA (US); Pavel Pivonka, San Francisco, CA (US); Sueng Wook Kim, San Jose, CA (US); Kristi E. S. Bauerly, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/200,676

(22) Filed: Mar. 12, 2021

(65) Prior Publication Data

US 2021/0286502 A1    Sep. 16, 2021

Related U.S. Application Data

(60) Provisional application No. 62/990,408, filed on Mar. 16, 2020.

(51) Int. Cl.
*G06F 3/04815*    (2022.01)
*G02B 27/01*    (2006.01)
(Continued)

(52) U.S. Cl.
CPC .......... *G06F 3/04815* (2013.01); *G06F 3/013* (2013.01); *G06F 3/04845* (2013.01); *H04N 13/368* (2018.05); *G02B 2027/0141* (2013.01)

(58) Field of Classification Search
None
See application file for complete search history.

(56) References Cited

U.S. PATENT DOCUMENTS

| 6,842,175 B1 | 1/2005 | Schmalstieg et al. |
| 7,072,810 B2 | 7/2006 | Ramanathan et al. |

(Continued)

FOREIGN PATENT DOCUMENTS

| AU | 2019100486 A4 | 6/2019 |
| CN | 1629888 A | 6/2005 |

(Continued)

OTHER PUBLICATIONS

Chan, L., & Minamizawa, K. (Sep. 2017). FrontFace: facilitating communication between HMD users and outsiders using front-facing-screen HMDs. In Proceedings of the 19th International Conference on Human-Computer Interaction with Mobile Devices and Services (pp. 1-5). (Year: 2017).*

(Continued)

*Primary Examiner* — Linda Huynh
(74) *Attorney, Agent, or Firm* — Morgan, Lewis & Bockius LLP

(57) ABSTRACT

A computing system displays, via a first display generation component, a first computer-generated environment and concurrently displays, via a second display generation component: a visual representation of a portion of a user of the computing system who is in a position to view the first computer-generated environment via the first display generation component, and one or more graphical elements that provide a visual indication of content in the first computer- (Continued)

generated environment. The computing system changes the visual representation of the portion of the user to represent changes in an appearance of the user over a respective period of time and changes the one or more graphical elements to represent changes in the first computer-generated environment over the respective period of time.

45 Claims, 30 Drawing Sheets

(51) Int. Cl.
    *G06F 3/01*            (2006.01)
    *G06F 3/04845*     (2022.01)
    *H04N 13/368*      (2018.01)

(56) References Cited

U.S. PATENT DOCUMENTS

| | | |
|---|---|---|
| 8,244,462 B1 | 8/2012 | Zhu |
| 8,675,067 B2 | 3/2014 | Chou et al. |
| 8,896,655 B2 | 11/2014 | Mauchly et al. |
| 8,982,156 B2 | 3/2015 | Maggiore |
| 9,152,209 B2 | 10/2015 | Jeong et al. |
| 9,256,072 B2 | 2/2016 | Lyren |
| 9,325,943 B2 | 4/2016 | Wilson et al. |
| 9,495,794 B2 | 11/2016 | Masumoto |
| 9,615,081 B2 | 4/2017 | Torma |
| 9,641,805 B2 | 5/2017 | Wilson et al. |
| 9,661,308 B1 | 5/2017 | Wang et al. |
| 9,696,897 B2 | 7/2017 | Garcia |
| 9,846,027 B2 | 12/2017 | Kimura et al. |
| 9,883,138 B2 | 1/2018 | Chen et al. |
| 10,044,982 B2 | 8/2018 | Wilson et al. |
| 10,049,504 B2 | 8/2018 | Chen et al. |
| 10,074,179 B2 | 9/2018 | Arita et al. |
| 10,168,778 B2 | 1/2019 | Kazansky et al. |
| 10,268,266 B2 | 4/2019 | Mathey-Owens et al. |
| 10,296,869 B2 | 5/2019 | Hulth |
| 10,347,033 B2 | 7/2019 | Masumoto |
| 10,430,985 B2 | 10/2019 | Harrises et al. |
| 10,445,867 B2 | 10/2019 | Glatfelter et al. |
| 10,492,981 B1 | 12/2019 | Kumar |
| 10,606,075 B2 | 3/2020 | Choi et al. |
| 10,606,609 B2 | 3/2020 | Energin et al. |
| 10,692,290 B2 | 6/2020 | Estable |
| 10,762,716 B1 | 9/2020 | Paul et al. |
| 10,838,210 B2 | 11/2020 | Robaina et al. |
| 10,861,241 B2 | 12/2020 | Ghaleb |
| 10,957,083 B2 | 3/2021 | Du |
| 11,244,485 B2 | 2/2022 | Harrises et al. |
| 11,257,467 B2 | 2/2022 | Kim et al. |
| 11,520,456 B2 | 12/2022 | Kawashima et al. |
| 11,562,528 B2 | 1/2023 | Rockel et al. |
| 11,733,769 B2 | 8/2023 | Butcher et al. |
| 11,861,255 B1* | 1/2024 | Ive ............................ G06F 3/147 |
| 11,995,285 B2 | 5/2024 | Henderson et al. |
| 2008/0222233 A1 | 9/2008 | Shi et al. |
| 2009/0002719 A1 | 1/2009 | Chang et al. |
| 2009/0174658 A1 | 7/2009 | Blatchley et al. |
| 2010/0235726 A1 | 9/2010 | Ording et al. |
| 2011/0022942 A1 | 1/2011 | Flemings et al. |
| 2011/0185057 A1* | 7/2011 | Waugaman ............ A63F 13/795<br>709/224 |
| 2011/0249117 A1 | 10/2011 | Yoshihama et al. |
| 2011/0252405 A1 | 10/2011 | Meirman et al. |
| 2011/0279381 A1 | 11/2011 | Tong et al. |
| 2011/0317399 A1 | 12/2011 | Hsu |
| 2012/0050458 A1 | 3/2012 | Mauchly et al. |
| 2012/0281059 A1 | 11/2012 | Chou et al. |
| 2013/0154906 A1 | 6/2013 | Braun et al. |
| 2013/0332892 A1 | 12/2013 | Matsuki |
| 2014/0098191 A1 | 4/2014 | Rime et al. |
| 2014/0232816 A1* | 8/2014 | Wilson .................... G06F 3/011<br>348/14.08 |
| 2015/0062123 A1 | 3/2015 | Yuen |
| 2015/0067588 A1 | 3/2015 | Shim et al. |
| 2015/0091780 A1 | 4/2015 | Lyren |
| 2015/0116463 A1 | 4/2015 | Torma |
| 2015/0187119 A1 | 7/2015 | Masumoto |
| 2015/0219897 A1* | 8/2015 | Mukawa .................. G02B 5/30<br>345/8 |
| 2015/0227645 A1 | 8/2015 | Childs et al. |
| 2015/0244976 A1 | 8/2015 | Chen et al. |
| 2015/0253573 A1 | 9/2015 | Sako et al. |
| 2016/0018655 A1* | 1/2016 | Imoto ..................... G06F 3/147<br>345/8 |
| 2016/0040981 A1 | 2/2016 | Kang et al. |
| 2016/0049011 A1 | 2/2016 | Kasahara et al. |
| 2016/0054565 A1* | 2/2016 | Izumihara ................ G09G 5/00<br>345/8 |
| 2016/0086322 A1 | 3/2016 | Arita et al. |
| 2016/0147408 A1 | 5/2016 | Bevis et al. |
| 2016/0170624 A1 | 6/2016 | Zambetti et al. |
| 2016/0329006 A1 | 6/2016 | Weber et al. |
| 2016/0202758 A1 | 7/2016 | Peana et al. |
| 2016/0205353 A1 | 7/2016 | Wilson et al. |
| 2016/0210602 A1 | 7/2016 | Siddique et al. |
| 2016/0240011 A1 | 8/2016 | Metaio et al. |
| 2016/0313790 A1 | 10/2016 | Clement et al. |
| 2016/0363990 A1 | 12/2016 | Key |
| 2017/0031434 A1 | 2/2017 | Files et al. |
| 2017/0053456 A1 | 2/2017 | Cho et al. |
| 2017/0061696 A1 | 3/2017 | Li et al. |
| 2017/0115488 A1 | 4/2017 | Ambrus et al. |
| 2017/0201722 A1 | 7/2017 | Wilson et al. |
| 2017/0206691 A1* | 7/2017 | Harrises ............ G02B 27/0172 |
| 2017/0212585 A1 | 7/2017 | Kim et al. |
| 2017/0220887 A1 | 8/2017 | Fathi et al. |
| 2017/0230641 A1 | 8/2017 | Scavezz et al. |
| 2017/0264851 A1 | 9/2017 | Kuplevakhsky |
| 2017/0277670 A1 | 9/2017 | Smith et al. |
| 2017/0289221 A1 | 10/2017 | Khalid et al. |
| 2017/0326457 A1* | 11/2017 | Tilton .................... H04L 65/403 |
| 2017/0329399 A1 | 11/2017 | Azam et al. |
| 2017/0339372 A1* | 11/2017 | Valli ...................... G06T 15/005 |
| 2017/0358142 A1 | 12/2017 | Lee et al. |
| 2018/0004283 A1 | 1/2018 | Mathey-Owens et al. |
| 2018/0004478 A1* | 1/2018 | Chen ....................... A63F 13/26 |
| 2018/0005429 A1* | 1/2018 | Osman ................... A63F 13/56 |
| 2018/0075659 A1* | 3/2018 | Browy ................... G06V 40/28 |
| 2018/0088323 A1* | 3/2018 | Bao ....................... G02B 27/017 |
| 2018/0088794 A1 | 3/2018 | Graham et al. |
| 2018/0095636 A1* | 4/2018 | Valdivia ................... G06F 3/011 |
| 2018/0114372 A1 | 4/2018 | Nagy et al. |
| 2018/0157333 A1* | 6/2018 | Ross ....................... G06F 3/013 |
| 2018/0165854 A1 | 6/2018 | Du |
| 2018/0165888 A1 | 6/2018 | Duan et al. |
| 2018/0203561 A1 | 7/2018 | Chang et al. |
| 2018/0203581 A1 | 7/2018 | Takeda |
| 2018/0300952 A1 | 10/2018 | Evans et al. |
| 2018/0335929 A1* | 11/2018 | Scapel ................. G06V 40/175 |
| 2018/0336732 A1 | 11/2018 | Schuster |
| 2018/0336737 A1 | 11/2018 | Varady et al. |
| 2019/0011703 A1 | 1/2019 | Robaina et al. |
| 2019/0033058 A1 | 1/2019 | Tsurumi |
| 2019/0066381 A1 | 2/2019 | Estable |
| 2019/0172261 A1 | 6/2019 | Alt et al. |
| 2019/0180506 A1 | 6/2019 | Gebbie et al. |
| 2019/0188895 A1* | 6/2019 | Miller, IV ............. G06T 19/006 |
| 2019/0213389 A1 | 7/2019 | Peruch et al. |
| 2019/0279407 A1* | 9/2019 | McHugh ................. G06F 3/012 |
| 2019/0310757 A1 | 10/2019 | Lee et al. |
| 2019/0311512 A1 | 10/2019 | VanBlon et al. |
| 2019/0313059 A1* | 10/2019 | Agarawala ............ G06T 19/006 |
| 2019/0339058 A1 | 11/2019 | Dryer et al. |
| 2019/0339839 A1 | 11/2019 | Paul, Sr. et al. |
| 2019/0340799 A1 | 11/2019 | Dryer et al. |
| 2019/0355121 A1 | 11/2019 | Nelson et al. |
| 2019/0369404 A1 | 12/2019 | Joshi et al. |
| 2019/0371028 A1* | 12/2019 | Harrises ................. G06T 11/60 |
| 2019/0385368 A1* | 12/2019 | Cartwright ........... H04N 13/156 |
| 2019/0385372 A1* | 12/2019 | Cartwright ............ G06T 19/003 |
| 2020/0020164 A1 | 1/2020 | Coffman et al. |

(56) References Cited

U.S. PATENT DOCUMENTS

| | | | |
|---|---|---|---|
| 2020/0026922 A1* | 1/2020 | Pekelny | G06V 20/20 |
| 2020/0117336 A1 | 4/2020 | Mani et al. | |
| 2020/0143593 A1 | 5/2020 | Rudman et al. | |
| 2020/0200794 A1 | 6/2020 | Niles et al. | |
| 2020/0209609 A1 | 7/2020 | Clarke et al. | |
| 2020/0225734 A1* | 7/2020 | Magnusson | G06F 3/011 |
| 2020/0232783 A1 | 7/2020 | Dryer et al. | |
| 2020/0261799 A1 | 8/2020 | Cahill et al. | |
| 2020/0312029 A1 | 10/2020 | Heinen et al. | |
| 2020/0372878 A1 | 11/2020 | Kim et al. | |
| 2021/0004996 A1 | 1/2021 | Murillo et al. | |
| 2021/0034222 A1* | 2/2021 | Brems | G06F 3/167 |
| 2021/0241483 A1 | 8/2021 | Dryer et al. | |
| 2021/0241505 A1 | 8/2021 | Dryer et al. | |
| 2021/0254962 A1 | 8/2021 | Dryer et al. | |
| 2021/0286502 A1 | 9/2021 | Lemay et al. | |
| 2021/0304465 A1 | 9/2021 | Dryer et al. | |
| 2021/0382544 A1 | 12/2021 | Butcher et al. | |
| 2022/0092861 A1 | 3/2022 | Sharma et al. | |
| 2022/0101593 A1 | 3/2022 | Rockel et al. | |
| 2022/0155909 A1 | 5/2022 | Kawashima et al. | |
| 2022/0201273 A1 | 6/2022 | Matsuda et al. | |
| 2023/0008537 A1 | 1/2023 | Henderson et al. | |
| 2024/0103608 A1 | 3/2024 | Wagner et al. | |
| 2024/0103615 A1 | 3/2024 | Wagner et al. | |
| 2024/0153205 A1 | 5/2024 | Huergo Wagner et al. | |

FOREIGN PATENT DOCUMENTS

| | | |
|---|---|---|
| CN | 102607423 A | 7/2012 |
| CN | 103218854 A | 7/2013 |
| CN | 105554247 A | 5/2016 |
| CN | 105608746 A | 5/2016 |
| CN | 106251185 A | 12/2016 |
| EP | 1563370 A2 | 8/2005 |
| EP | 2896986 A1 | 7/2015 |
| EP | 3017591 A1 | 5/2016 |
| JP | 2008-287691 A | 11/2008 |
| JP | 2017-536618 A | 12/2017 |
| KR | 20100003252 A | 1/2010 |
| KR | 20160141688 A | 12/2016 |
| KR | 20170087501 A | 7/2017 |
| KR | 20190053278 A | 5/2019 |
| WO | WO 2013/096052 A2 | 6/2013 |
| WO | WO 2014/157340 A1 | 10/2014 |
| WO | WO 2014/197631 A1 | 12/2014 |
| WO | WO 2016/017254 A1 | 2/2016 |
| WO | WO 2019/032736 A1 | 2/2019 |
| WO | WO 2019/217148 A1 | 11/2019 |

OTHER PUBLICATIONS

Notice of Acceptance, dated Aug. 9, 2021, received in Australian Patent Application No. 2019267352 (7554AU), which corresponds with U.S. Appl. No. 16/138,779, 3 pages.

Certificate of Grant, dated Aug. 13, 2021, received in European Patent Application No. 19159743.4 (7555EP), which corresponds with U.S. Appl. No. 16/145,025, 3 pages.

Office Action, dated Aug. 13, 2021, received in Australian Patent Application No. 2020239688 (7659AU), which corresponds with U.S. Appl. No. 17/018,958, 4 pages.

Office Action, dated Aug. 20, 2021, received in Australian Patent Application No. 2020239675 (7738AU), which corresponds with U.S. Appl. No. 17/018,980, 4 pages.

Office Action, dated Aug. 10, 2021, received in Indian Patent Application No. 202014040937 (7738IN), which corresponds with U.S. Appl. No. 17/018,980, 7 pages.

Office Action, dated Aug. 13, 2021, received in Australian Patent Application No. 2020239691 (7739AU), U.S. Appl. No. 17/018,994 (7739AU), 5 pages.

International Search Report and Written Opinion, dated Aug. 13, 2021, received in International Patent Application No. PCT/US2021/022378 (7657AU), which corresponds with U.S. Appl. No. 17/200,676, 19 pages.

International Search Report and Written Opinion, dated Jul. 8, 2021, received in International Patent Application No. PCT/US2021/015556 (7659WO), which corresponds with U.S. Appl. No. 17/018,958, 26 pages.

Aakash G Technical, "App Review #1 / Measure—Tango AR / How to Use", https://www.youtube.com/watch?v=fj2iiOg36KE, May 13, 2017, 2 pages.

Apple, "MeasureKit—AR ruler app for iOS 11", https://measurekit.com, Sep. 15, 2017, 10 pages.

Berthiaume, "Augmented Reality Scanning Enables Retail Innovation (Video)", https://www.scandit.com/GB/augmented-reality-scanning-enables-retail-innovation-video, Oct. 3, 2017, 5 pages.

Bhalwankar, "Triple Tap to Zoom Feature in Android Phones", https://www.youtube.com/watch?v=KlnbLhA2jg8, Jan. 25, 2014, 2 pages.

Burns, "Google Measure it Demo with Tango", https://www.youtube.com/watch?v=b74VtGGJPBg, May 20, 2016, 2 pages.

Jain et al., "OverLay: Practical Mobile Augmented Reality", Proceedings of the 13th Annual International conference on Mobile Systems, Applications, and Services. May 18, 2015, 14 pages.

LaanLabs, "AirMeasure- AR Tape & Ruler", https://itunes.apple.com/us/app/airmeasure-ar-tape-ruler/id1251282152, Jun. 4, 2018, 3 pages.

Laanlabs, "AirMeasure—The Augmented Reality Toolkit" https://www.youtube.com/watch?v=9ycpvj6hbdE, Sep. 12, 2017, 2 pages.

Lenovo, Lenovo Tech World 2016—Keynote Livestream from San Francisco, https://www.youtube.com/watch?v=MBgQLraVGJQ, Jun. 9, 2016, 2 pages.

Lenovo, "Lenovo_PHAB2_Pro_User_Guide V1.0", https://pcsupport.lenovo.com/do/en/products/tablets/phab-series/phab2-pro-documentation/doc_userguide, Aug. 29, 2017, 10 pages.

Lynch, "How to Zoom in On iPhone: The Quick Tutorial!", https://www.payetteforward.com/how-to-zoom-in-on-iphone-quck-tutorial, Feb. 26, 2018, 4 pages.

Mapletree Apps, "Apple ARKit iPhone Demo—Measure 3D Pro—Ruler on iOS (1)", https://www.youtube.com/watch?v=fzn3RsveJss, Oct. 1, 2017, 2 pages.

Mapletree Apps, "Apple ARKit iPhone Demo—Measure 3D Pro—Ruler on iOS (2)", https://www.youtube.com/watch?v=fzn3RsveJss, Oct. 1, 2017, 2 pages.

Mapletree Apps, "Measure 3D Tutorial series #1—How to Measure a Room", https://www.youtube.com/watch?v=HGV18HXXZqw, Apr. 19, 2018, 2 pages.

Mapletree Apps, Measure 3D Tutorial series #4—How to Measure Length in Horizonal and Vertical Planes, https://www.youtube.com/watch?V-2PjcbrgS50Q, Apr. 19, 2018, 2 pages.

Mapletree Appls, "Measure 3D Tutorial #5—How to Measure Rectangle Shapes", https://www.youtube.com/watch?v=8Gg0SMwkvQU, Apr. 19, 2018, 2 pages.

Miller, "Apple Shares Detailed Human Interface Guidelines for Developers Building ARKit Apps", https://9to5mac.com/2017/08/29/arkit-human-interface-guidelines/, Aug. 29, 2017, 5 pages.

Nuernberger et al., "SnapToReality: Aligning Augmented Reality to the Real World", http://eyalofek.org/Papers/CHI2016_Snap2Reality.pdf., May 7-12, 2016, 12 pages.

Occipital HQ, "TapMeasure Spatial Utility to Capture and Measure Your Space", https://www.youtube.com/watch?v=Hy1Ex2MAXM, Sep. 19, 2017, 2 pages.

Smartpicture, "PLNAR—Your AR Measurement Tool", https://www.youtube.com/watch?v=H_cqZqKLjws, Sep. 28, 2017, 2 pages.

SmarPicture Tech, "Mobile App Design for Bay Area—Rely on the Reinvently Agency", https://appadvice.com/app/plnar/1282049921, Sep. 21, 2018, 5 pages.

Youtube, A1 Corner & Edge Detection (beta), https://www.youtube.com/watch?v=YSNklighUtxA, Nov. 21, 2020, 2 pages.

Youtube, AR Measure—Automatic Measure in Augmented Reality, https://www.youtube.com/watch?v=70CQfH76vg4, Mar. 16, 2019, 2 pages.

Youtube, Huawei P30 Pro AR Measure / Measure length, depth, area and volume https://www.outube.com/watch?v=0QX5QaK7YY, 2 pages.

(56) References Cited

OTHER PUBLICATIONS

Office Action, dated Feb. 21, 2019, received in U.S. Appl. No. 16/145,015 (7532), 34 pages.
Notice of Allowance, dated Jun. 5, 2019, received in U.S. Appl. No. 16/145,015 (7532), 12 pages.
Office Action, dated Aug. 31, 2018, received in Danish Patent Application No. 201870350 (7532DK), which corresponds with U.S. Appl. No. 16/145,015, 11 pages.
Office Action, dated May 28, 2019, received in Danish Patent Application No. 201870350 (7532DK), which corresponds with U.S. Appl. No. 16/145,015, 6 pages.
Office Action, dated Feb. 21, 2020, received in Danish Patent Application No. 201870350 (7532DK), which corresponds with U.S. Appl. No. 16/145,015, 8 pages.
Notice of Allowance, dated Nov. 22, 2019, received in U.S. Appl. No. 16/138,779 (7554), 17 pages.
Office Action, dated Aug. 31, 2018, received in Danish Patent Application No. 201870351 (7554DK), which corresponds with U.S. Appl. No. 16/138,779, 11 pages.
Office Action, dated Feb. 13, 2020, received in Danish Patent Application No. 201870351 (7554DK), which corresponds with U.S. Appl. No. 16/138,779, 10 pages.
Office Action, dated Mar. 21, 2019, received in U.S. Appl. No. 16/145,025 (7555), 14 pages.
Final Office Action, dated Sep. 19, 2019, received in U.S. Appl. No. 16/145,025 (7555), 15 pages.
Office Action, dated Jun. 12, 2020, received in U.S. Appl. No. 16/145,025 (7555), 7 pages.
Final Office Action, dated Dec. 18, 2020, received in U.S. Appl. No. 16/145,025 (7555), 17 pages.
Notice of Allowance, dated Mar. 17, 2021, received in U.S. Appl. No. 16/145,025 (7555), 5 pages.
Innovation Patent, dated May 22, 2019, received in Australian Patent Application No. (7555AU), which corresponds with U.S. Appl. No. 16/138,779, 3 pages.
Certificate of Examination, dated Jul. 19, 2019, received in Australian Patent Application No. (7555AU), which corresponds with U.S. Appl. No. 16/138,779, 5 pages.
Office Action, dated Aug. 3, 2020, received in Chinese Patent Application No. 201910261469.3 (7555CN), which corresponds with U.S. Appl. No. 16/138,779, 5 pages.
Office Action, dated Jan. 20, 2021, received in Chinese Patent Application No. 201910261469.3 (7555CN), which corresponds with U.S. Appl. No. 16/138,779, 11 pages.
Notice of Allowance, dated Apr. 20, 2021, received in Chinese Patent Application No. 201910261469.3 (7555CN), which corresponds with U.S. Appl. No. 16/138,779, 6 pages.
Office Action, dated Sep. 28, 2018, received in Danish Patent Application No. 201870352 (7555DK), which corresponds with U.S. Appl. No. 16/145,025, 7 pages.
Office Action, dated Jan. 31, 2019, received in Danish Patent Application No. 201870352 (7555DK), which corresponds with U.S. Appl. No. 16/145,025, 4 pages.
Office Action, dated Sep. 16, 2019, received in Danish Patent Application No. 201870352 (7555DK), which corresponds with U.S. Appl. No. 16/145,025, 3 pages.
Office Action, dated Aug. 27, 2020, received in Danish Patent Application No. 201870352 (7555DK), which corresponds with U.S. Appl. No. 16/145,025, 2 pages.
Intention to Grant, dated Mar. 10, 2021, received in Danish Patent Application No. 201870352 (7555DK), which corresponds with U.S. Appl. No. 16/145,025, 2 pages.
Office Action, dated Jul. 17, 2019, received in European Patent Application No. 19159743.4 (7555EP), which corresponds with U.S. Appl. No. 16/145,025, 8 pages.
Office Action, dated Oct. 5, 2020, received in European Patent Application No. 19159743.4 (7555EP), which corresponds with U.S. Appl. No. 16/145,025, 6 pages.
Office Action, dated Jan. 8, 2021, received in U.S. Appl. No. 17/018,958 (7659), 27 pages.
Notice of Allowance, dated Apr. 20, 2021, received in U.S. Appl. No. 17/018,958 (7659), 12 pages.
Office Action, dated Dec. 18, 2020, received in Danish Patent Application No. 202070602 (7659DK), which corresponds with U.S. Appl. No. 17/018,958, 10 pages.
Office Action, dated Feb. 21, 2021, received in U.S. Appl. No. 16/841,550 (7685), 8 pages.
Notice of Allowance, dated May 4, 2021, received in U.S. Appl. No. 16/841,550 (7685), 12 pages.
Office Action, dated Jan. 22, 2021, received in U.S. Appl. No. 17/018,980 (7738), 17 pages.
Office Action, dated May 14, 2021, received in U.S. Appl. No. 17/018,980 (7738), 4 pages.
Office Action, dated Dec. 18, 2020, received in Danish Patent Application No. 202070603 (7738DK), which corresponds with U.S. Appl. No. 17/018,980, 9 pages.
Office Action, dated Jan. 7, 2021, received in U.S. Appl. No. 17/018,994 (7739), 7 pages.
Notice of Allowance, dated Feb. 23, 2021, received in U.S. Appl. No. 17/018,994 (7739), 8 pages.
Office Action, dated Jan. 12, 2021, received in Danish Patent Application No. 2020-70604 (7739DK), which corresponds with U.S. Appl. No. 17/018,994, 8 pages.
Invitation to Pay Additional Fees, dated Jul. 15, 2019, received in International Patent Application No. PCT/US2019/029904 (7532WO), which corresponds with U.S. Appl. No. 16/145,015, 29 pages.
International Search Report and Written Opinion, dated Sep. 9, 2019, received in International Patent Application No. PCT/US2019/029904 (7532WO), which corresponds with U.S. Appl. No. 16/145,015, 31 pages.
European Search Report, dated Jul. 4, 2019, received in European Patent Application No. (7555EP), which corresponds with U.S. Appl. No. 16/145,025, 4 pages.
Office Action, dated Jul. 7, 2021, received in Australian Patent Application No. 2019267352 (7554AU), which corresponds with U.S. Appl. No. 16/138,779, 5 pages.
Patent, dated Jul. 13, 2021, received in Chinese Patent Application No. 201910261469.3 (7555CN), which corresponds with U.S. Appl. No. 16/138,779, 6 pages.
Decision to Grant, dated Jul. 2, 2021, received in Danish Patent Application No. 201870352 (7555DK), which corresponds with U.S. Appl. No. 16/145,025, 2 pages.
Decision to Grant, dated Jun. 24, 2021, received in European Patent Application No. 19159743.4 (7555EP), which corresponds with U.S. Appl. No. 16/145,025, 2 pages.
Invitation to Pay Additional Fees, dated Jun. 23, 2021, received in International Patent Application No. PCT/US2021/022378 (7657WO), which corresponds with U.S. Appl. No. 17/200,676, 15 pages.
Office Action, dated Feb. 22, 2022, received in Australian Patent Application No. 2020239688 (7659AU), which corresponds with U.S. Appl. No. 17/018,958, 3 pages.
Office Action, dated Mar. 14, 2022, received in Danish Patent Application No. 202070602 (7659DK), which corresponds with U.S. Appl. No. 17/018,958, 5 pages.
Notice of Allowance, dated Feb. 18, 2022, received in Japanese Patent Application No. 2022-005327 (7659JP01), which corresponds with U.S. Appl. No. 17/018,958, 2 pages.
Patent, dated Mar. 14, 2022, received in Japanese Patent Application No. 2022-005327 (7659JP01), which corresponds with U.S. Appl. No. 17/018,958, 3 pages.
Notice of Allowance, dated Jan. 21, 2022, received in Australian Patent Application No. 2020239675 (7738AU), which corresponds with U.S. Appl. No. 17/018,980, 3 pages.
Office Action, dated Feb. 25, 2022, received in Danish Patent Application No. 202070603 (7738DK), which corresponds with U.S. Appl. No. 17/018,980, 2 pages.
Notice of Allowance, dated Feb. 18, 2022, received in Japanese Patent Application No. 2022-005328 (7738JP01), which corresponds with U.S. Appl. No. 17/018,980, 2 pages.
Patent, dated Mar. 14, 2022, received in Japanese Patent Application No. 2022-005328 (7738JP01), which corresponds with U.S. Appl. No. 17/018,980, 3 pages.

(56) References Cited

OTHER PUBLICATIONS

Notice of Allowance, dated Mar. 2, 2022, received in Australian Patent Application No. 2020239691 (7739AU), U.S. Appl. No. 17/018,994, 3 pages.
Office Action, dated Feb. 4, 2022, received in Danish Patent Application No. 2020-70604 (7739DK), which corresponds with U.S. Appl. No. 17/018,994, 3 pages.
Office Action, dated Jan. 7, 2022, received in Japanese Patent Application No. 2020-159789 (7739JP), which corresponds with U.S. Appl. No. 17/018,994, 5 pages.
Office Action, dated Apr. 5, 2022, received in U.S. Appl. No. 17/307,957 (7794), 10 pages.
Notice of Allowance, dated May 4, 2022, received in U.S. Appl. No. 17/307,957 (7794), 12 pages.
International Search Report and Written Opinion, dated Jan. 7, 2022, received in International Patent Application No. PCT/US2021/051501 (7726WO), which corresponds with U.S. Appl. No. 17/481,193, 13 pages.
Notice of Allowance, dated May 28, 2021, received in U.S. Appl. No. 17/018,980 (7738), 5 pages.
Invitation to Pay Additional Fees, dated May 17, 2021, received in International Patent Application No. PCT/US2021/015556 (7659WO), which corresponds with U.S. Appl. No. 17/018,958 19 pages.
Office Action, dated Oct. 6, 2021, received in European Patent Application No. 21178349.3 (7532EP), which corresponds with U.S. Appl. No. 16/145,015, 8 pages.
Patent, dated December2, 2021, received in Australian Patent Application No. 2019267352 (7554AU), which corresponds with U.S. Appl. No. 16/138,779, 3 pages.
Office Action, dated Nov. 5, 2021, received in Australian Patent Application No. 2020239688 (7659AU), which corresponds with U.S. Appl. No. 17/018,958, 4 pages.
Office action, dated Dec. 3, 2021, received in Indian Patent Application No. (7659IN), which corresponds with U.S. Appl. No. 17/018,958, 10 pages.
Notice of Allowance, dated Dec. 20, 2021, received in Japanese Patent Application No. 2020-159787 (7659JP), which corresponds with U.S. Appl. No. 17/018,958, 2 pages.
Office Action, dated Nov. 8, 2021, received in Korean Patent Application No. 2020-0124085 (7659KR), which corresponds with U.S. Appl. No. 17/018,958, 9 pages.
Office Action, dated Dec. 16, 2021, received in Australian Patent Application No. 2020239675 (7738AU), which corresponds with U.S. Appl. No. 17/018,980, 2 pages.
Office Action, dated Nov. 15, 2021, received in Australian Patent Application No. (7739AU), U.S. Appl. No. 17/018,994, 4 pages.
Office Action, dated Dec. 2, 2021, received in Indian Patent Application No. (7739IN), which corresponds with U.S. Appl. No. 17/018,994, 7 pages.
European Search Report, dated Sep. 23, 2021, received in European Patent Application No. 21178349.3 (7532EP), which corresponds with U.S. Appl. No. 16/145,015, 4 pages.
Notice of Allowance, dated May 30, 2022, received in Japanese Patent Application No. 2020-562126 (7555JP), which corresponds with U.S. Appl. No. 16/145,025, 2 pages.
Certificate of Grant, dated May 26, 2022, received in Australian Patent Application No. 2020239675 (7738AU), which corresponds with U.S. Appl. No. 17/018,980, 3 pages.
Patent, dated Nov. 9, 2021, received in Danish Patent Application No. 201870352 (7555DK), which corresponds with U.S. Appl. No. 16/145,025, 3 pages.
Office Action, dated Dec. 13, 2021, received in Japanese Patent Application No. 2020-562126 (7555JP), which corresponds with U.S. Appl. No. 16/145,025, 2 pages.
Office Action, dated Dec. 20, 2021, received in Japanese Patent Application No. 2020-159788 (7738JP), which corresponds with U.S. Appl. No. 17/018,980, 2 pages.
Android Developer, "Determine and Monitor the Docking State and Type", https://developer.android.com/training/monitoring-device-state/docking-monitoring, Oct. 27, 2021, 2 pages.

Jabre Elite 85h, How does on-ear detection work with my Jabra headphones, https://www.jabra.com/supportpages/jabra-elite-85h/100-99030001-02/faq/how-does-on-ear-detection-work-with-my-jabra-headphones, Jul. 15, 2022, 6 pages.
Lang, "Microsoft is Adding Pass-through Video to Windows VR Headsets", https://www.roadtovr.com/microsoft-is-adding-pass-through-video-to-windows-vr-headsets/, Jul. 27, 2018, 2 pages.
Li et al., "Interactive Two-Sided Transparent Displays: Designing for Collaboration", https://www.researchgate.net/publication/266658112, Jun. 2014, 10 pages.
Lindlbauer, "Combing Shape-Changing Interfaces and Spatial Augmented Reality Enables Extended Object Appearance", https//www.youtube.com/watch?v=uyvBJgv3s, May 7, 2016, 12 pages.
Meta Research, "Ray-Ban Stories / Round", https://store.facebook.com/glasses/products/ray-ban-stories/round/, Aug. 1, 2022, 11 pages.
Meta Research, "Display Systems Research: Reverse Passthrough", https://research.facebook.com/blog/2021/08/display-systems research reverse-vr/, Aug. 2, 2021, 11 pages.
Microsoft, "Use Microsoft Modern Wireless Headset in Microsoft Teams", https://support.microsoft.com/en-us/topic/use-microsoft-wireless-headset-in- microwave-teams-5E2ffae3-d2ad-409a-bc81-56d1da8999e, Jul. 15, 2022, 7 pages.
Spectacles by Snap Inc. Products, "Next Generation Spectacles", https://www.spectacles.com/shop, Jul. 15, 2022, 5 pages.
U.S. Appl. No. 17/030,200, "Devices, Methods, and_Graphical_User_Interfaces_for_Interacting_with_Three-Dimensional_Environments", Sep. 23, 2020, 170 pages.
U.S. Appl. No. 17/483,722, "Devices, Methods, and Graphical User Interfaces for Interacting with Three-Dimensional Environments" dated Sep. 23, 2021, 213 pages.
YouTube, "Augmented Reality for Children's Coloring Books", https://www.youtube.com/watch?v=0E8E1vsTa-E, Jun. 13, 2017, 3 pages.
YouTube, "Drum Pants at Augmented World Expo 2013", https://www.youtube.com/watch?v-Y6d_HObOj3w, Jun. 8, 2013, 2 pages.
YouTube, "How to use on-ear detection features with your Jabra Elite 85h", https://www.youtube.com/watch?v=JSX0zynYpyl, Oct. 25, 2019, 3 pages.
Youtube, "HP Reveal Augmented Reality Example", https://www.youtube.com/watch?v=MVluQ0g6jFw, Dec. 28, 2017, 3 pages.
YouTube, "Snapchat Spectacles 3 Review", httpos://www.youtube.com/watch?v=9P8PmQ4AgXI, Nov. 30, 2019, 5 pages.
Youtube, "TripicAR: Mobile App Demo", https://youtu.be/pQOND-NXOsU, Aug. 9, 2018, 3 pages.
YouTube, "Transparent Dual-Touch Display Android Smartphone Prototype #DigInfo", https://www.youtube.com/watch?v=Xbyoool5ZwY, May 30, 2012, 2 pages.
Microsoft, "Holoportation: Virtual 3D Teleportation in Real-Time", https://wwwyoutube.com/watch?v=7d5906cfaM0, Mar. 25, 2016, 14 pages.
Invitation to Pay Additional Fees, dated Jan. 3, 2024, received in International Patent Application No. PCT/US2023/033529 (7883WO), which corresponds with U.S. Appl. No. 18/370,849, 16 pages.
International Search Report and Written Opinion, dated Feb. 26, 2024, received in International Patent Application No. PCT/US2023/033529 (7883WO), which corresponds with U.S. Appl. No. 18/370,849, 25 pages.
Office Action, dated May 31, 2024, received in European Patent Application No. 2171929.1 (7657EP), which corresponds with U.S. Appl. No. 17/200,676, 7 pages.
Patent, dated Oct. 2, 2024, received in Japanese Patent Application No. 2022-554242, which corresponds with U.S. Appl. No. 17/200,676, 3 pages.
Office Action, dated Aug. 21, 2024, received in Korean Patent Application No. 2022-7030543, which corresponds with U.S. Appl. No. 17/200,676, 6 pages.
Office Action, dated Sep. 11, 2024, received in U.S. Appl. No. 18/370,851 (7993), 43 pages.
Final Office Action, dated Mar. 3, 2025, received in U.S. Appl. No. 18/370,851 (7993), 41 pages.

(56) References Cited

OTHER PUBLICATIONS

Office Action, dated Aug. 23, 2024, received in U.S. Appl. No. 18/370,853 (7994), 25 pages.

* cited by examiner

DEVICES, METHODS, AND GRAPHICAL USER INTERFACES FOR PROVIDING COMPUTER-GENERATED EXPERIENCES

RELATED APPLICATIONS

This application claims priority to U.S. Provisional Application Ser. No. 62/990,408, filed Mar. 16, 2020, which is incorporated herein in its entirety.

TECHNICAL FIELD

This disclosure relates generally to a computing system with one or more display generation components and one or more input devices that provide computer-generated experiences, including but not limited to electronic devices that provide virtual reality and mixed reality experiences via one or more displays.

BACKGROUND

The development of computing systems for augmented reality has increased significantly in recent years. Example augmented reality environments include at least some virtual elements that replace or augment representations of the physical world. Input devices, such as cameras, controllers, joysticks, touch-sensitive surfaces, and touch-screen displays for computing systems and other electronic computing devices are used to interact with virtual/augmented reality environments. Example virtual elements include virtual three-dimensional objects, digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices. In addition, many systems that provide virtual reality and/or mixed reality experiences use head-mounted display devices that physically shield the users' faces from their surroundings, and hinder social interaction and information exchange with the outside world when the users are engaged in the virtual reality and mixed reality experiences.

SUMMARY

Accordingly, there is a need for computing systems with improved methods and interfaces for providing computer-generated experiences to users that make interaction with the computing systems more efficient and intuitive for a user. There is also a need for computing systems with improved methods and interfaces for providing computer-generated experiences to users that facilitate better social interaction, etiquette, and information exchange with the surrounding environment while users are engaged in various virtual reality and mixed reality experiences. Such methods and interfaces optionally complement or replace conventional methods for providing computer-generated reality experiences to users. Such methods and interfaces reduce the number, extent, and/or nature of the inputs from a user by helping the user to understand the connection between provided inputs and device responses to the inputs, thereby creating a more efficient human-machine interface. Such methods and interfaces also improve the user's experience, e.g., by reducing mistakes, interruptions, and time delays, due to lack of social cues and visual information on the part of the user and others present in the same physical environment, when the user is engaged in the virtual reality experience and/or the mixed reality experience provided by the computing systems.

The above deficiencies and other problems associated with user interfaces for a computing system with a display generation component and one or more input devices are reduced or eliminated by the disclosed systems. In some embodiments, the computing system is a desktop computer with one or more associated displays. In some embodiments, the computing system is portable device (e.g., a notebook computer, tablet computer, or handheld device). In some embodiments, the computing system is a personal electronic device (e.g., a wearable electronic device, such as a watch, or a head-mounted device). In some embodiments, the computing system has a touchpad. In some embodiments, the computing system has one or more cameras. In some embodiments, the computing system has a touch-sensitive display (also known as a "touch screen" or "touch-screen display"). In some embodiments, the computing system has one or more eye-tracking components. In some embodiments, the computing system has one or more hand-tracking components. In some embodiments, the computing system has one or more output devices in addition to one or more display generation components, the output devices including one or more tactile output generators and one or more audio output devices. In some embodiments, the computing system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

As disclosed herein, a computing system includes at least two display generation components, with a first display generation component facing the user and providing the three-dimensional computer-generated experiences to the user, and a second display generation component facing away from the user and providing status information related to the user (e.g., the movement of the user's eyes) and/or the computer-generated experience currently being viewed by the user (e.g., the metadata related to the content viewed by the user and the level of immersion associated with the content). The first display generation component and the second display generation component are optionally two displays enclosed in the same housing of a head-mounted display device (HMID) and respectively facing inwardly toward the user wearing the HMD and outwardly toward a physical environment surrounding the user. The second display generation component optionally provides real-time status information including visual representation of the portion of the user that is shielded behind the first display generation component and including metadata related to the content and/or level of immersion associated thereof currently shown to the user via the first display generation component, such that another person or persons in the surrounding physical environment of the user can see the visual information and the metadata provided by the second display generation component and act accordingly, e.g., engaging the user when appropriate, as opposed unnecessarily avoiding interaction with the user or inappropriately interrupting the user, while the user is viewing computer-generated content via the first display generation component. In some embodiments, the user of the computing system optionally activates different modes of the computing system to suit his/her intended engagement level and privacy needs when engaged in the computer-generated environment provided via the first display generation component, and the computing system provides status information related to the various modes to alert people in the surrounding physical environment of such intentions and needs of the user, so that unintended, undesirable, and/or unnecessary interruptions and avoidance of interactions by the people in the surrounding physical environment are reduced.

As disclosed herein, when a computing system includes at least two display generation components in the same housing, the second (e.g., outward facing) display generation component optionally displays contextual information indicating availability of computer-generated experiences based on the current context. In response to detecting that the first (e.g., inward facing) display generation component has been placed in front of the user's eyes (e.g., the user is wearing the HMD with the inward facing display facing toward his eyes, or the user is holding the HMD with the inward facing display in front of his eyes), the computing system provides the computer-generated experience to the user via the first display generation component. Automatically alerting the user of available computer-generated experience via an outward facing display based on the current context (e.g., while the user is in a position to view the outward facing display (while the user is not wearing the HMD on his/her head, while the HMD is placed on a table, etc.)), and/or automatically displaying the computer-generated experience corresponding to the current context when the inward facing display is placed in front of the user's eyes (e.g., when the user puts the HMD on his/her head, or holding the HMD with the inner display facing the user's face or eyes) reduces the number, complexity, and extent of the inputs needed for the user to find out what computer-generated experience is available in various context and to selectively view the desired computer-generated experiences (e.g., no need to wear the HMD all the time, and/or no need to browse through selectable options to locate a desired CGR content item, and/or activating displayed controls while wearing the HMD to start the desired CGR experience). In some embodiments, depending on whether the first display generation component is actually worn by the user (e.g., being strapped on the user's head or body, as opposed to being held in front of the user's eyes with the user's hand(s)), the computing system optionally provides different computer-generated experiences corresponding to the wearing state of the first display generation component (e.g., displaying a preview (e.g., shortened, two-dimensional or three-dimensional, interactive, etc.) of an available computer-generated experience when the first display generation component is not actually worn by the user, and displaying the complete version of the available computer-generated experience when the first display generation component is worn by the user). Selectively displaying different versions of a computer-generated experience or different computer-generated experiences depending on not only the position of the display generation component relative to the user (e.g., based on whether the position enables the user to see the CGR experience), but also whether the display generation component is securely worn by the user (e.g., based on whether the user's hands are free or are required to hold the display generation component in the current position), reduces the number of inputs needed to trigger an intended outcome and avoiding unnecessarily activating a full-on computer-generated experience, thereby saving user's time when the user just want to briefly preview the computer-generated experience and saving battery power of the display generation component and the computing system when they are powered by batteries.

As disclosed herein, in some embodiments, the computing system includes a first display generation component and the second display generation component in the same housing or attached to the same physical support structure. The first display generation component and the second display generation component are optionally non-transparent and have their respective display sides facing opposite directions. The display generation components together with the housing or the support structure can be rather bulky and can be cumbersome to put on and taken off the user's head/body. The display generation components together also form a significant physical barrier between the user and others in the surrounding physical environment. By utilizing the external display (e.g., the second display generation component) to show status information related to the metadata of displayed CGR content (e.g., title, progress, type, etc.) on the inner display (e.g., the first display generation component), the level of immersion associated with the displayed CGR content (e.g., complete pass-through, mixed reality, virtual reality, etc.), and/or the visual characteristics of displayed CGR content (e.g., changing colors, brightness, etc.), the current display mode of the computing system (e.g., privacy mode, parental control mode, Do-Not-Disturb mode, etc.), and/or characteristics of the user (e.g., appearance of the user's eyes, the user's identifier, etc.), the impact of the presence of the physical barrier between the user and others in the surrounding environment is reduced, and unnecessary hindrance to desired social interactions and unnecessary interruptions to user's engagement with the computer-generated experiences are reduced without requiring the user to physical take off the display generation components. Furthermore, by utilizing the external display to show contextual information and indications of contextually-relevant computer-generated experiences, the user is not required to constantly picking up the HMD and putting the inner display in front of the user's eyes to find out what CGR content is available. The user is also not required to fully strap on the HMD to preview an available CGR experience. The user is only required to fully wear the HMD when he/she wishes to fully engage a CGR experience (e.g., interacting with the CGR environment with in-air gestures and micro-gestures). This way, the number of times that the user is required to put the inner display of the HMD in front of his eyes and/or fully strapping the HMD on his/her head is reduced without compromising the user's need to know what CGR experiences are available and/or without hindering the user's ability to enjoy a desired CGR experience.

As disclosed herein, a computer-generated experience is provided via a display generation component of a computing system (e.g., a single display generation component of a device, an inner display of an HMD, etc.) in response to a user's physical interaction with a physical object in the real world. In particular, the computing system displays a visual indication that a computer-generated experience is available at a position in a three-dimensional environment displayed via the display generation component, the position of the visual indication corresponding to a position of a representation of the physical object in the three-dimensional environment. In response to detecting physical interaction with the physical object in a first manner that meets preset criteria associated with the physical object, the computing system displays the computer-generated experience associated with the physical object and optionally the physical interaction of the first manner. For example, the computing system displays a pass-through view of the user's hands and the physical object before the preset criteria are met by the user's manipulation of the physical object, and the computing system displays a computer-augmented representation of the user's hand(s) manipulating the physical object after the preset criteria are met. Automatically initiating a computer-generated experience in response to detecting a preset physical interaction with a physical object in the real world enhances the user's experience interacting with the physical object, makes the interaction more intuitive and reduces user mistakes when interacting with the physical object.

As disclosed herein, a computing system includes a display generation component (e.g., a single display generation component of a device, an inner display of an HMD, etc.) in a housing and provides a user interface (e.g., buttons, touch-sensitive surfaces, etc.) on the housing of the display generation component. The computing system determines whether to perform an operation associated with an input detected via the user interface on the housing of the display generation component or forgoing performance of the operation depending on whether a preset configuration of the user's hands (e.g., two hands both) touching the housing) were detected on the housing of the display generation component at the time when the input was detected via the user interface. Choosing to perform or not perform an operation in response to detecting an input in conjunction with a hand configuration on the housing of a display generation component automatically distinguishes user's intentional inputs and other touches with the housing of the display generation component for purposes other than providing inputs to trigger certain operations, helps to avoid unintended outcomes, reduces user confusion, and makes it faster and easier for a user to operate the display generation component.

In accordance with some embodiments, a method is performed at a computing system including a first display generation component, a second display generation component and one or more input devices, including: displaying, via the first display generation component, a first computer-generated environment; while displaying the first computer-generated environment via the first display generation component, concurrently displaying, via the second display generation component: a visual representation of a portion of a user of the computing system who is in a position to view the first computer-generated environment via the first display generation component, and one or more graphical elements that provide a visual indication of content in the first computer-generated environment, wherein concurrently displaying the visual representation of the portion of the user and the one or more graphical elements includes: changing the visual representation of the portion of the user to represent changes in an appearance of the user over a respective period of time; and changing the one or more graphical elements that provide the visual indication of content in the first computer-generated environment to represent changes in the first computer-generated environment over the respective period of time.

In accordance with some embodiments, a method is performed at a computing system including a first display generation component, a second display generation component and one or more input devices, including: displaying, via the first display generation component, a computer-generated environment; while displaying the computer-generated environment via the first display generation component, displaying status information corresponding to the computing system via the second display generation component, including concurrently displaying: a visual representation of a portion of a user of the computing system who is in a position to view the computer-generated environment via the first display generation component, and one or more graphical elements that provide a visual indication of content in the computer-generated environment; detecting a respective event; and in response to detecting the respective event: changing a level of immersion of the computer-generated environment displayed via the first display generation component; and changing the status information that is displayed via the second display generation component, including changing an appearance of the visual representation of the portion of the user of the computing system.

In accordance with some embodiments, a method is performed at a computing system including a first display generation component, a second display generation component and one or more input devices, including: displaying one or more user interface elements via the second display generation component; while displaying the one or more user interface elements via the second display generation component, detecting that the first display generation component has been moved to a predetermined orientation relative to a respective portion of a user; and in response to detecting that the first display generation component has been moved to the predetermined orientation relative to the respective portion of the user: in accordance with a determination that, when the first display generation component was moved to the predetermined orientation relative to the respective portion of the user, the computing system was in a first state, wherein the first state corresponds to displaying a first user interface element via the second display generation component, displaying a first user interface via the first display generation component while the first display generation component is in the predetermined orientation relative to the respective portion of the user; and in accordance with a determination that, when the first display generation component was moved to the predetermined orientation relative to the respective portion of the user, the computing system was in a second state, wherein the second state corresponds to displaying a second user interface element via the second display generation component instead of displaying the first user interface element via the second display generation component, displaying a second user interface via the first display generation component while the first display generation component is in the predetermined orientation relative to the respective portion of the user, wherein the second user interface is different from the first user interface.

In accordance with some embodiments, a method is performed at a computing system including a first display generation component and one or more input devices, including: detecting a first trigger event that corresponds to the first display generation component being placed in a first predefined configuration relative to a user; and in response to detecting the first trigger event: in accordance with a determination that the computing system including the first display generation component is being worn by the user while being in the first predefined configuration relative to the user, providing, via the first display generation component, a first computer-generated experience; and in accordance with a determination that the computing system including the first display generation component is not being worn by the user while being in the first predefined configuration relative to the user, providing, via the first display generation component, a second computer-generated experience that is distinct from the first computer-generated experience.

In accordance with some embodiments, a method is performed at a computing system including a first display generation component and one or more input devices, including: while displaying a representation of a physical object at a position in a three-dimensional environment that corresponds to a location of the physical object in a physical environment, displaying a visual indication that a computer-generated experience corresponding to the physical object is available for display via the first display generation component; while displaying the visual indication that a computer-generated experience is available for display via the first display generation component, detecting an interaction with the physical object in the physical environment; and in response to detecting the interaction with the physical object in the physical environment: in accordance with a determination that the interaction with the physical object in the physical environment meets first criteria corresponding to the physical object, displaying, via the first display generation component, the computer-generated experience corresponding to the physical object; and in accordance with a determination that the interaction with the physical object in the physical environment does not meet the first criteria, forgoing displaying the computer-generated experience corresponding to the physical object.

In accordance with some embodiments, a method is performed at a computing system including a housing, a first display generation component contained in the housing, and one or more input devices, including: detecting a first hand on the housing that contains the first display generation component; and in response to detecting the first hand on the housing that contains the first display generation component: in accordance with a determination that the first hand is detected in conjunction with a second hand being detected on the housing, forgoing performance of an operation associated with the first hand; and in accordance with a determination that the first hand is detected on the housing without detecting another hand on the housing, performing an operation associated with the first hand.

In accordance with some embodiments, a computing system includes one or more display generation components (e.g., one or more displays, projectors, head-mounted displays, etc. enclosed in the same housing or different housings), one or more input devices (e.g., one or more cameras, a touch-sensitive surface, optionally one or more sensors to detect intensities of contacts with the touch-sensitive surface), optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computing system with one or more display generation components, one or more input devices (e.g., one or more cameras, a touch-sensitive surface, optionally one or more sensors to detect intensities of contacts with the touch-sensitive surface), and optionally one or more tactile output generators, cause the device to perform or cause performance of the operations of any of the methods described herein. In accordance with some embodiments, a graphical user interface on a computing system with one or more display generation components, one or more input devices (e.g., one or more cameras, a touch-sensitive surface, optionally one or more sensors to detect intensities of contacts with the touch-sensitive surface), optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computing system includes: one or more display generation components, one or more input devices (e.g., one or more cameras, a touch-sensitive surface, optionally one or more sensors to detect intensities of contacts with the touch-sensitive surface), and optionally one or more tactile output generators; and means for performing or causing performance of the operations of any of the methods described herein. In accordance with some embodiments, an information processing apparatus, for use in a computing system with one or more display generation components, one or more input devices (e.g., one or more cameras, a touch-sensitive surface, optionally one or more sensors to detect intensities of contacts with the touch-sensitive surface), and optionally one or more tactile output generators, includes means for performing or causing performance of the operations of any of the methods described herein.

Thus, computing systems with one or more display generation components are provided with improved methods and interfaces for providing computer-generated experiences to users that make interaction with the computing systems more efficient and intuitive for a user. The computing systems are also provide with improved methods and interfaces for providing computer-generated experiences to users that facilitate better social interaction, etiquette, and information exchange with the surrounding environment while users are engaged in various virtual reality and mixed reality experiences. Such methods and interfaces optionally complement or replace conventional methods for providing computer-generated reality experiences to users. Such methods and interfaces reduce the number, extent, and/or nature of the inputs from a user by helping the user to understand the connection between provided inputs and device responses to the inputs, thereby creating a more efficient human-machine interface. Such methods and interfaces also improve the user's experience, e.g., by reducing mistakes, interruptions, and time delays, due to lack of social cues and visual information on the part of the user and others present in the same physical environment, when the user is engaged in the virtual reality experience and/or the mixed reality experience provided by the computing systems.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
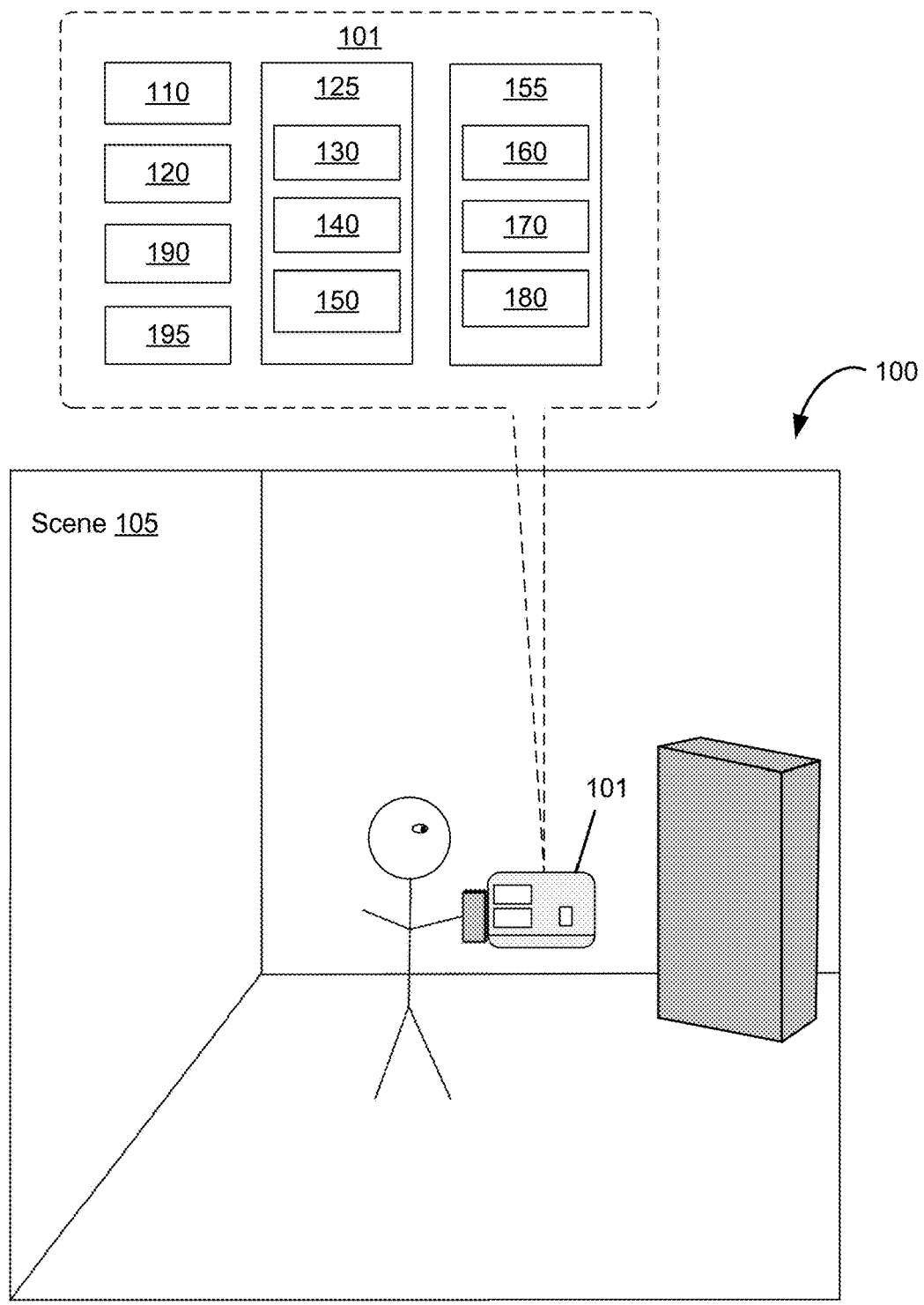
FIG. 1 is a block diagram illustrating an operating environment of a computing system for providing CGR experiences in accordance with some embodiments.

The present disclosure relates to user interfaces for providing a computer-generated reality (CGR) experience to a user, in accordance with some embodiments.

The systems, methods, and GUIs described herein improve user interface interactions with virtual/augmented reality environments in multiple ways.

In some embodiments, a computing system includes a first display generation component and a second display generation component (e.g., separate displays, displays enclosed in the same housing but facing different directions (e.g., back to back facing opposite directions, facing different angles such that they cannot be viewed by the same user at the same time, etc.)). The first display generation component displays a computer-generated environment that provides computer-generated experiences to a user that is in a position to view the content presented via the first display generation component (e.g., the user is facing toward a display side of the display generation component (e.g., the side of the physical environment that is illuminated by a projector, the side of the display that emits light that forms an image on the user's retina, etc.)). The first display generation component optionally provides the computer-generated experience with different levels of immersion corresponding to different amounts of visual and audio information from the surrounding physical environment that are still perceivable via the first display generation component when the computer-generated experience is provided by the first display generation component. During normal operation (e.g., when the user wears the HMD that includes the first display generation component, and/or is facing the display side of the first display generation component), the first display generation component blocks the user's direct view of the surrounding physical environment, and at the same time, blocks others' view of the user's face or eyes when the user is in the position of viewing the content shown via the first display generation component. In some embodiments, the first display generation component is an inner display of an HMD facing the user's eyes when the HMD is placed on the user's head. Conventionally, when the user is in a position to view the content shown via a display generation component, the user has the option to see the physical environment or not see the physical environment by switching between displaying the computer-generated environment with different levels of emersions (e.g., switching between complete pass-through mode, mixed reality mode, or virtual reality mode). However, others in the surrounding environment facing the back side of the display generation component have little or no visual clues as to the attention state of the user, what content is showing on the display generation component, and/or whether the user is able to see the surrounding environment and the people in it. This imbalance of visual information (and optionally, audio information) on the two sides of the display generation component makes social interaction unnatural and inefficient between the user and others in the surrounding environment. Many considerations may benefit from the computing system using a second display generation component to display an appropriate amount of visual information conveying the status information related to the user and/or the content that is displayed to the user via the first display generation component to the people in the surrounding environment. The display of status information by the second display generation component is optionally displayed as long as the first display generation component is in use, or optionally triggered in response to detecting presence of other people in the same physical environment and/or in response to detecting indications that others may want to engage the user in social discourse (e.g., by entering the same room, looking in the user's direction, waving at the user, etc.). In some embodiments, showing the status information on the second display generation component includes displaying a representation of a portion of the user (e.g., the portion of the user that is blocked by the first display generation component when the user is in the position to view the content displayed via the first display generation component) that is dynamically updated in accordance with changes in the appearance of the user (e.g., changes in the portion of the user that is blocked by the first display generation component). In some embodiments, showing the status information also includes displaying graphical elements that provide a visual indication of the content that is currently shown via the first display generation component (e.g., concurrently with showing the representation of the portion of the user). This method and system of using a second display generation component to display updated status information related to the user viewing content shown via a first display generation component and the metadata associated with the state of the content (e.g., title, progress, level of immersion, display mode, etc.) allow others in the surrounding environment of the user to gain helpful insight into the current state of the user while the user is engaged in a computer-generated experience, but without fully revealing the computer-generated experience to the surrounding environment. In some embodiments, the representation of the portion of the user (e.g., the user's eyes or face) blocked by the first display generation component and the graphical elements showing the state of the content displayed via the first display generation component are respectively displayed on different display layers of the second display generation component and updated independently of each other. In some embodiments, the updates to the representation of the portion of the user and the graphical elements showing state of the content on different display layers of the second display generation component provide a more realistic view of the user's state behind a head-mounted display device that houses both the first display generation component and the second display generation component. The status information shown on the second display generation component enables the user to remain socially connected to the people in the surrounding environment when engaging in a computer-generated experience through the first display generation component. The dynamically updated status information on the second display generation component showing the state of the user's eyes and the state of the content shown to the user improves the user's engagement with the computer-generated experience when the user is in a public or semi-public environment, e.g., by encouraging appropriate social interaction when such interactions are desired by the user, reducing unnecessary avoidance of social interactions by others in the surrounding environment due to lack of visual cues for the user's permission to be socially engaged, informing others of a suitable time to interrupt the user's engagement with the computer-generated experience, reducing unwelcome interruptions to the user's engagement experiences due to lack of visual cues for the user's desire to remain undisturbed, etc.

As described above, many considerations may benefit from the computing system using a second display generation component to display an appropriate amount of visual information conveying the status information related to the user and the content that is displayed to the user via the first display generation component to other people in the surrounding environment. In some embodiments, the status information is displayed on the second display generation component as long as the first display generation component is in use. In some embodiments, the status information is only displayed in response to detecting presence of other people in the same physical environment and/or in response to detecting some indication that others in the same physical environment may want to engage the user in social discourse (e.g., by entering the same room, looking in the user's direction, waving at the user, etc.). Showing the status information on the second display generation component optionally includes displaying a representation of a portion of the user (e.g., the portion of the user that is blocked by the first display generation component when the user is in the position to view the content displayed via the first display generation component) and displaying graphical elements that provide a visual indication of the content that is currently shown via the first display generation component. Furthermore, in some embodiments, the representation of the portion of the user is updated in conjunction with a change in the level of immersion of the computer-generated experience displayed via the first display generation component. This method and system of using a second display generation component to display status information related to the user viewing content shown via a first display generation component and related to the content viewed by the user and updating the status information, including updating the appearance of the representation of the portion of the user in accordance with a change in the level of immersion associated with provision of the content, allow others in the surrounding environment of the user to gain helpful insight into the current state of the user while the user is engaged in a computer-generated experience without fully revealing the computer-generated experience to the surrounding environment. In some embodiments, the updates to the representation of the portion of the user (e.g., the user's eyes or face) blocked by the first display generation component and the updates to graphical elements showing the state of the content displayed by the first display generation component are shown on different display layers and are update independently of each other. Displaying the representation of the portion of the user and the graphical elements showing the state of the content on different display layers provide a more realistic view of the user's state behind a head-mounted display device that houses both the first display generation component and the second display generation component. In some embodiments, the status information (e.g., including representation of the user and graphical elements showing the state of the content) shown via the second display generation component optionally provides visual indications of many different usage modes of the computing system that correspond to different needs of the user and others in the same physical environment as the user. This enables the user to remain socially connected to the people in the surrounding environment when engaging in a computer-generated experience. The dynamically updated status information on the second display generation component showing the state of the user's eyes and the state of the content shown to the user improves the user's engagement with the computer-generated experience when the user is in a public or semi-public environment, e.g., by encouraging appropriate social interaction when such interactions are desired by the user, reducing unnecessary avoidance of social interactions by others in the surrounding environment due to lack of visual cues for the user's permission to be socially engaged, informing others of a suitable time to interrupt the user's engagement with the computer-generated experience, reducing unwelcome interruptions to the user's engagement experiences due to lack of visual cues for the user's desire to remain undisturbed, etc.

In some embodiments, a computing system includes a first display generation component and a second display generation component facing two different directions (e.g., separate displays, displays enclosed in the same housing but facing different directions (e.g., back to back facing opposite directions, facing different angles such that they cannot be viewed by the same user at the same time, etc.)). The first display generation component displays a computer-generated environment that provides computer-generated experiences to a user when the user comes into a position to view the content presented via the first display generation component (e.g., facing a side of the physical environment that is illuminated by a projector, facing a side of a display that emits light that forms an image on the user's retina, etc.). Before the user places the first display generation component into the position and orientation relative to the user to view the content displayed thereon (e.g., by moving the display generation component, or the user himself, or both), the user may be in a position to see the content presented on the second display generation component. In an example scenario, the first display generation component is an inner display of an HMD facing the user's eyes when the HMD is placed on the user's head, and the second display generation component is an outer display of the HMD that the user can look at when the HMD is on a table or in a user's hand extended away from the user's face, and not placed on the user's head or held close to the user's eyes. As disclosed herein, the computing system utilizes the second display generation component to display an indication of availability of different computer-generated experiences based on contextual information (e.g., location, time, user identity, authorization level of the user, etc.), and triggering display of a selected computer-generated experience in response to detecting the first display generation component being moved into the predetermined position and orientation relative to the user that enable the user to view the content shown via the first display generation component (e.g., the first display generation component faces the user's eyes as a result of the movement). The displayed computer-generated experience is optionally selected based on the state of the second display generation component at a time corresponding to the first display generation component being moved into the predetermined position and orientation relative to the user. Indicating availability of computer-generated experiences on the second display generation component based on contextual information and automatic triggering display of selected computer-generated experiences on the first display generation component based on state of the second display generation component (and of the contextual information) and the change in orientation of the first display generation component relative to the user reduces the time and the number of inputs needed to accomplished a desired outcome (e.g., getting information related to available experiences relevant to the current context and starting a desired computer-generated experience) and reduces user mistakes and time spent on browsing through and starting available computer-generated experiences using a conventional user interface.

In some embodiments, a user may place a first display generation component into the position and orientation relative to the user to view the content displayed thereon in different manners, e.g., an impromptu or temporary manner (e.g., held in front of the user's eyes at a distance or held close to the user's eyes by a hand) or a more formal and established manner (e.g., strapped or otherwise worn on the user's head or face without being supported by the user's hand). The computing system selectively displays different computer-generated experiences (e.g., different versions of a computer-generated experience, different computer-generated experiences corresponding to different characteristics of the user or contextual properties, preview of an experience vs. the actual experience, etc.) depending on the manner by which the first display generation component is placed into the position and orientation relative to the user that enables the user to view the content displayed on the first display generation component. Selectively displaying different computer-generated experiences in response to a trigger event that corresponds to the first display generation component being placed into a predefined configuration relative to the user (e.g., automatically starting the display of the computer-generated experience via the first display generation component without additional user inputs in a user interface provided by the first display generation component) and in accordance with the manner by which the first display generation component is held in that position and orientation (e.g., with or without the support of the user's hands, with or without the support of another mechanism other than the user's hands, etc.) reduces the time and the number of inputs needed to accomplished a desired outcome (e.g., starting a desired computer-generated experience) and reduces user mistakes and time spent on browsing through and starting available computer-generated experiences using a conventional user interface.

In some embodiments, displaying information on the second display generation component (e.g., status information related to the user's eyes, the state of the content being displayed via the first display generation component, the display mode of the computing system, indication of available computer-generated experiences, etc.) helps to reduce the number of times that the user has to put on and take off the HMD that includes both the first display generation component and the second display generation component and/or activating or stopping a computer-generated experience, e.g., to deal with others in the surrounding physical environment and/or finding a desirable computer-generated experience. This helps to save user's time, reduce power usage, and reduce user mistakes and improves user experience when the user uses the display generation components.

In some embodiments, preset manners of physical manipulation of a physical object in the real world are detected and used as triggers for launching computer-generated experiences related to the physical object. In some embodiments, prior to launching the computer-generated experiences related to the physical object, visual indication(s) of available computer-generated experiences, and optionally, visual guide (e.g., previews and animations) about how to launch the computer-generated experiences, are displayed at positions in a mixed reality environment that correspond to the position of the representation the physical object in the mixed reality environment. Using preset physical manipulations of a physical object to trigger display of a computer-generated experience associated with the physical object, in addition to displaying visual indication regarding the availability of the computer-generated experience and/or visual guide regarding the physical manipulations needed to trigger the computer-generated experience, allows the user to achieve a desired outcome (e.g., entering a desired computer-generated experience) more intuitively, more quickly, and with fewer inputs. This user interaction heuristic also helps to reduce user mistakes when the user interacts with the physical object, thereby making the human-machine interface more efficient, which saves power on battery-operated computing systems.

In some embodiments, a display generation component is contained in a housing that includes sensors (or otherwise has associated external sensors) for detecting touch or hover inputs near or on various parts of the housing. Touch inputs and/or hover inputs of different types (e.g., based on movement pattern (e.g., tap, swipe, etc.), duration (e.g., long, short, etc.), intensity (e.g., light, deep, etc.), etc.) and at different locations on or near the exterior of the housing are used to trigger different operations associated with the display generation component or the computer-generated environment displayed by the display generation component. An interaction heuristic is used to determine whether the operation should be performed depending on whether a single hand or two hands are detected on the housing at the time that the input is detected. Using the number of hands detected on the housing as an indicator of whether the user intends to provide an input or is simply adjusting the position of the display generation component with his hands helps to reduce inadvertent or unintentional operation of the display generation component and thereby making the human-machine interface more efficient, which saves power on battery-operated computing systems.

Figure 7A:
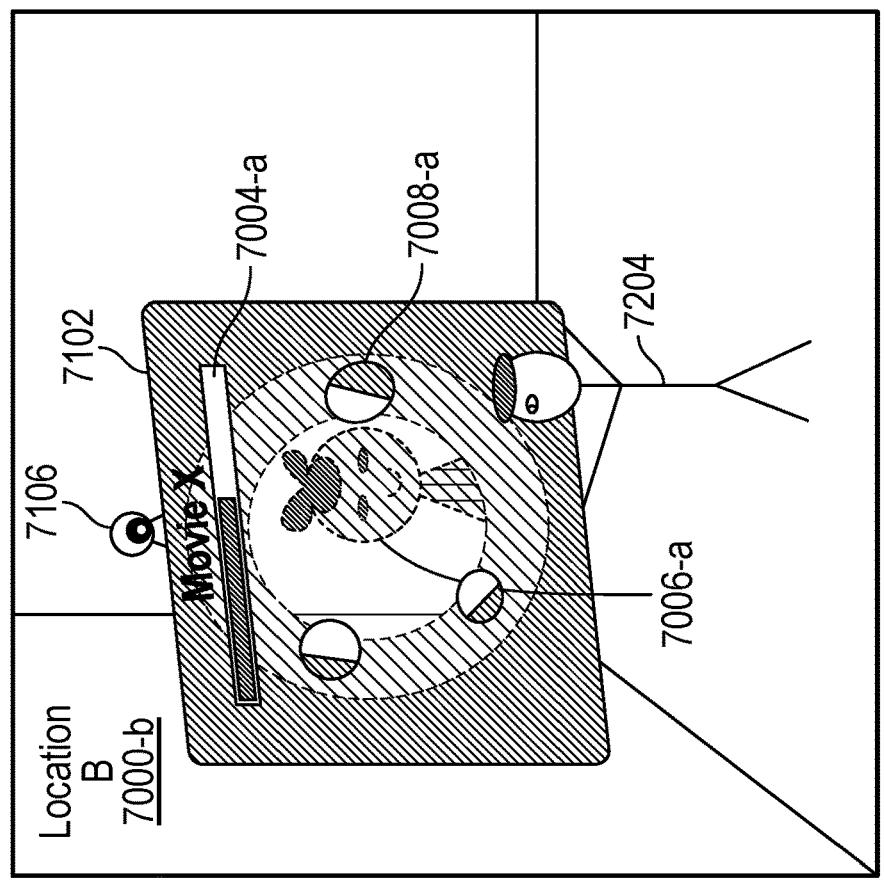
FIGS. 7A-7E illustrate a computing system that includes a first display generation component and a second display generation component (e.g., separate displays facing different directions, displays enclosed in the same housing but facing different directions (e.g., back to back facing opposite directions, facing different angles such that they cannot be viewed by the same user at the same time, etc.)). In some embodiments, the computing system displays content to a user via the first display generation component while displaying dynamically updated status information associated with the user and/or the content (e.g., representations corresponding to changes in the appearance of the user behind the first display generation component, metadata of the content, changes in the level of immersion associated the content playback, etc.) via the second display generation component, in accordance with some embodiments.
Figure 7A:
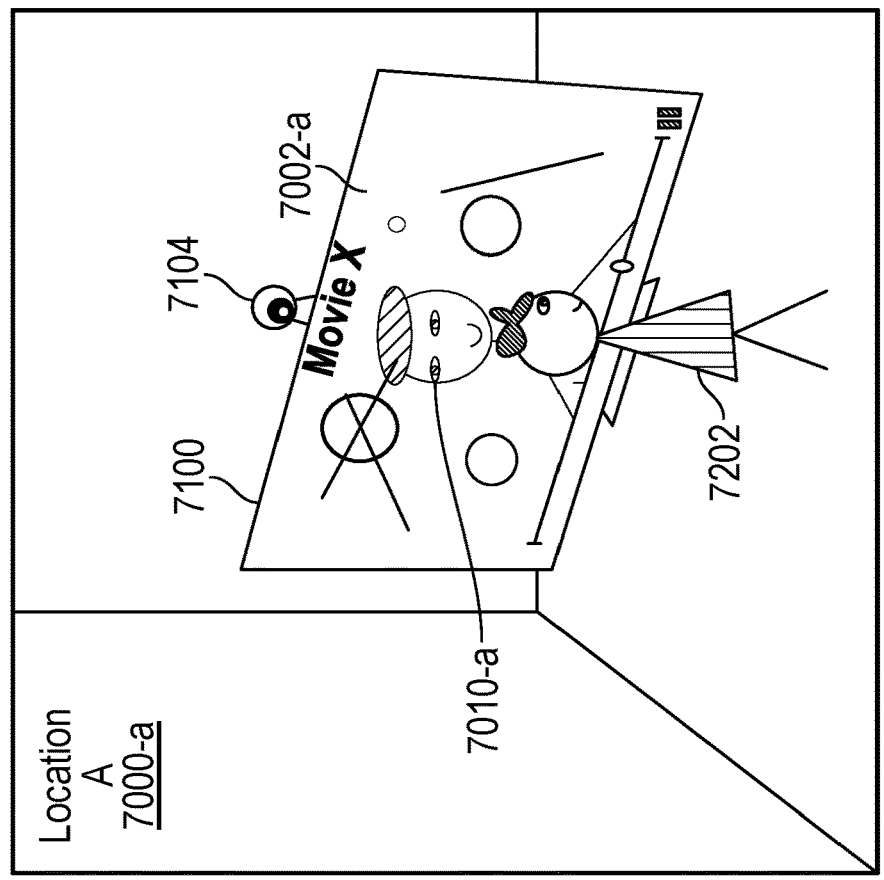
Figures 1, 7A:
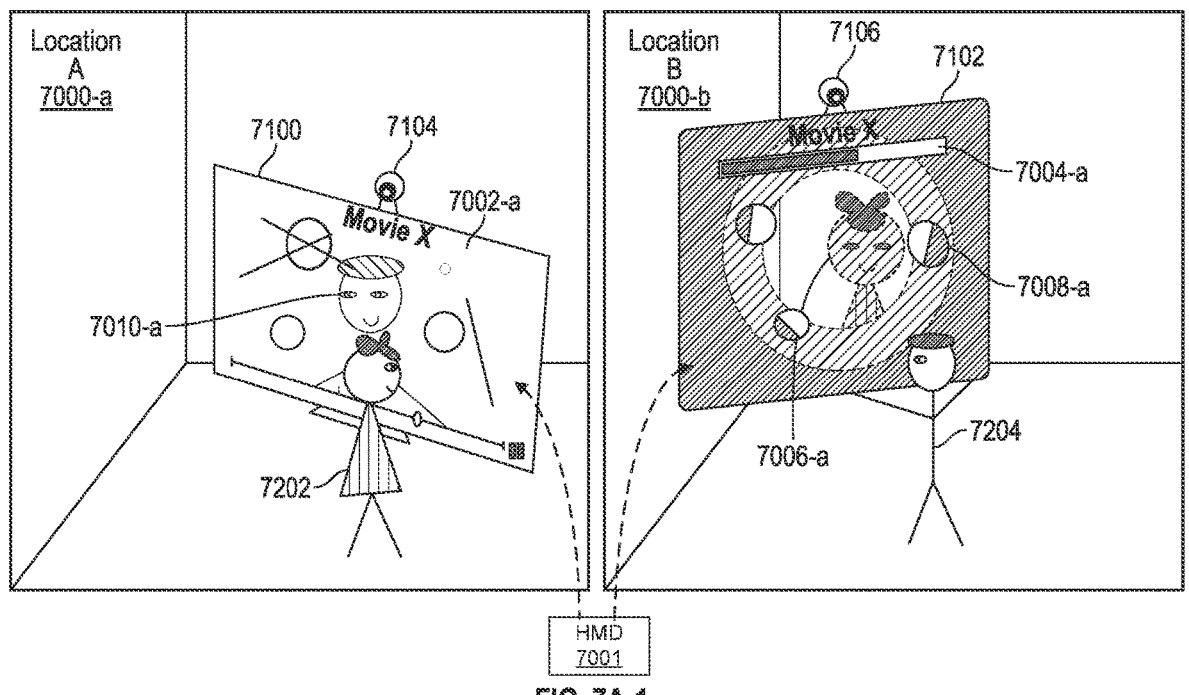
Figure 8:
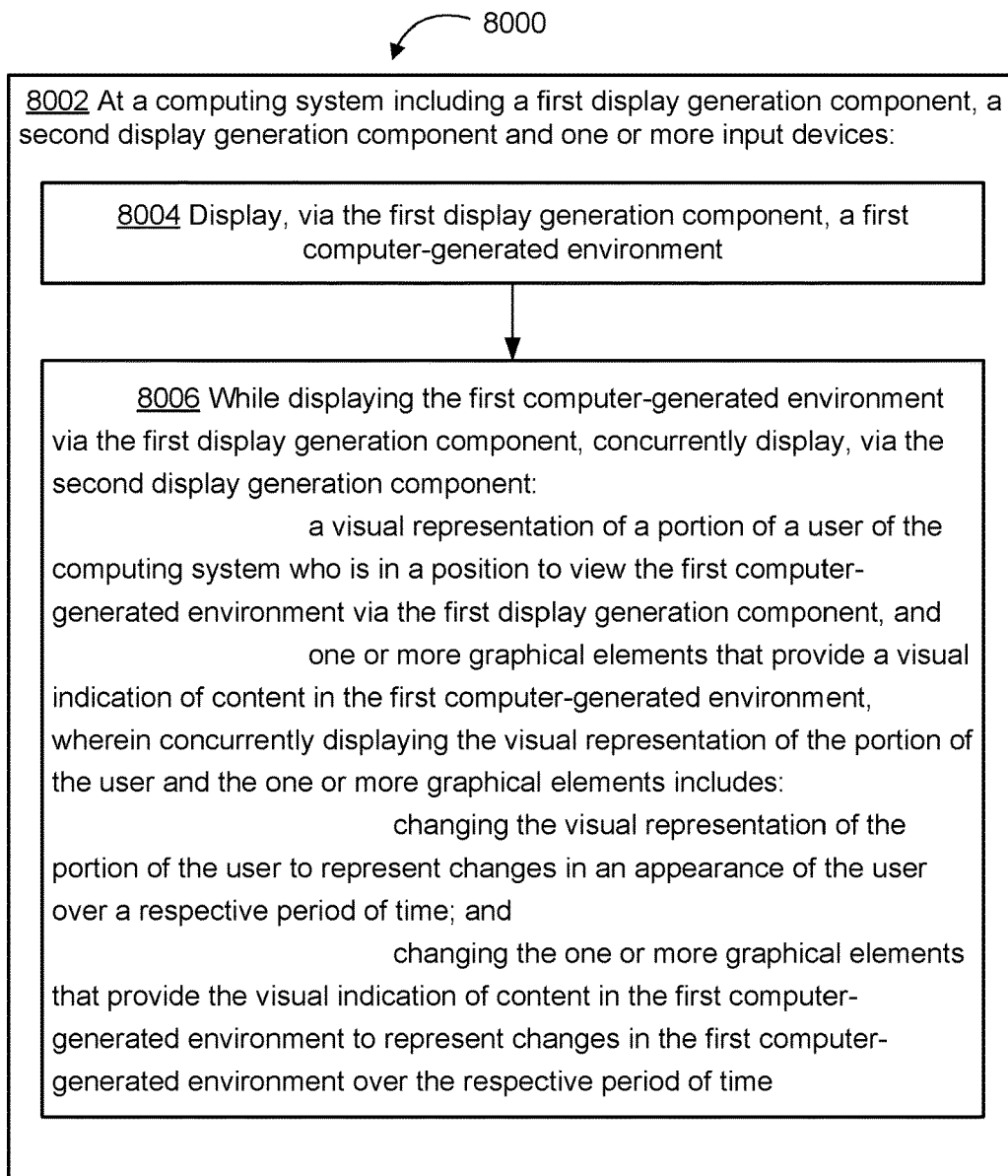
FIG. 8 is a flowchart of a method of displaying a computer-generated environment and status information associated with the computer-generated environment and status information associated with a user in a position to view the computer-generated environment, in accordance with some embodiments.
Figure 9:
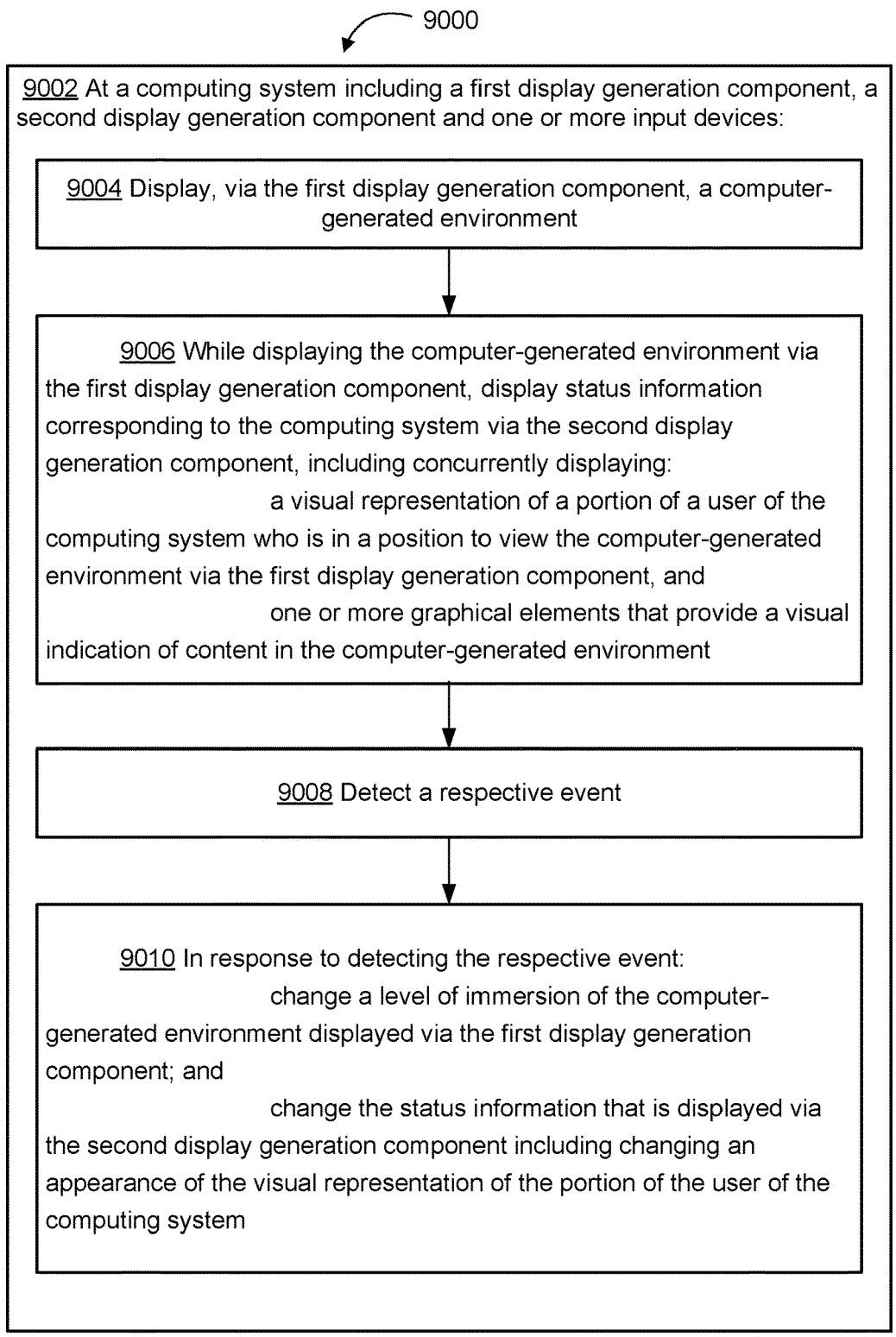
FIG. 9 is a flowchart of a method of displaying a computer-generated environment and status information associated with the computer-generated environment and status information associated with a user in a position to view the computer-generated environment, in accordance with some embodiments.
Figure 10:
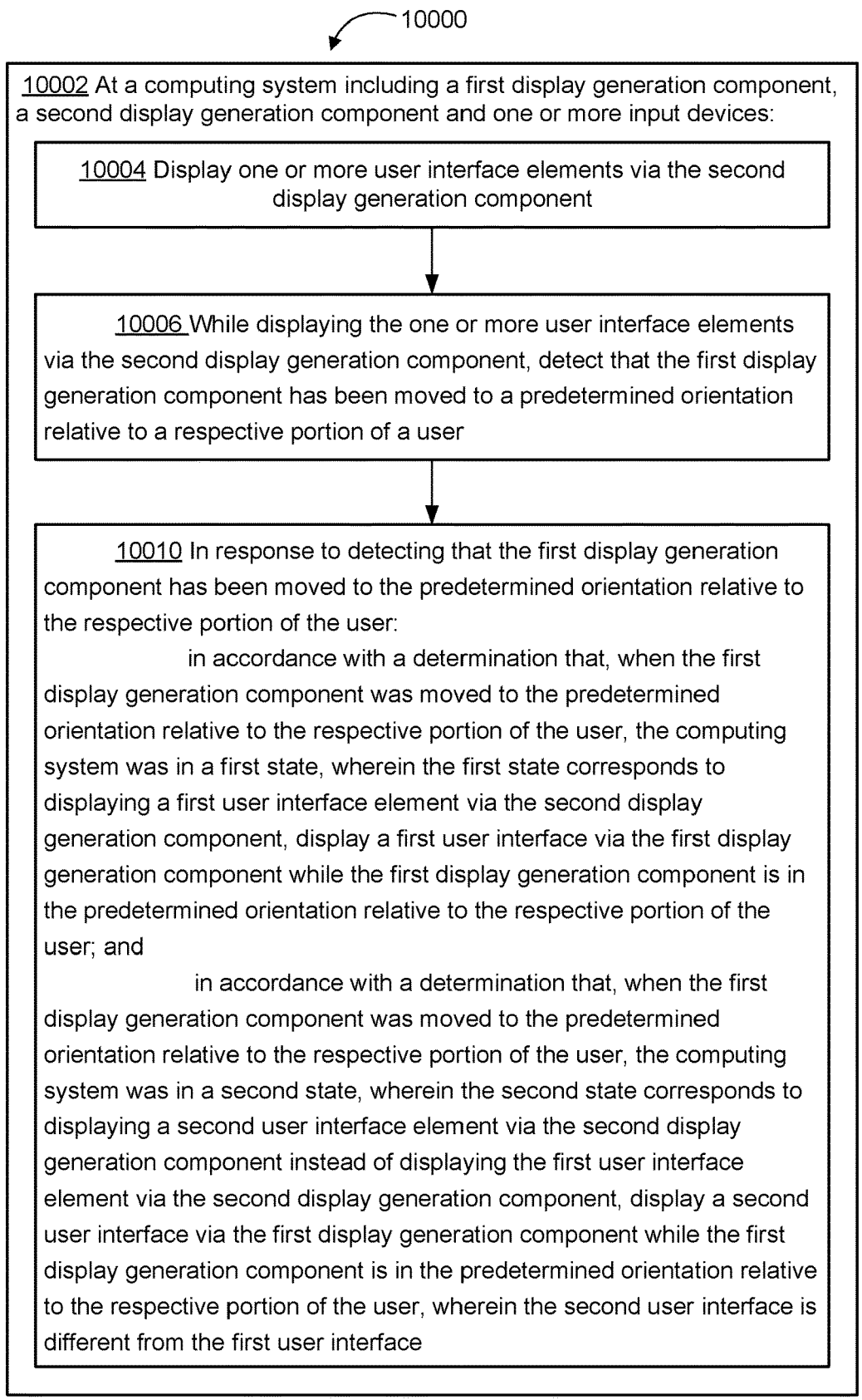
FIG. 10 is a flowchart of a method of providing a computer-generated experience based on contextual information, in accordance with some embodiments.
Figure 11:
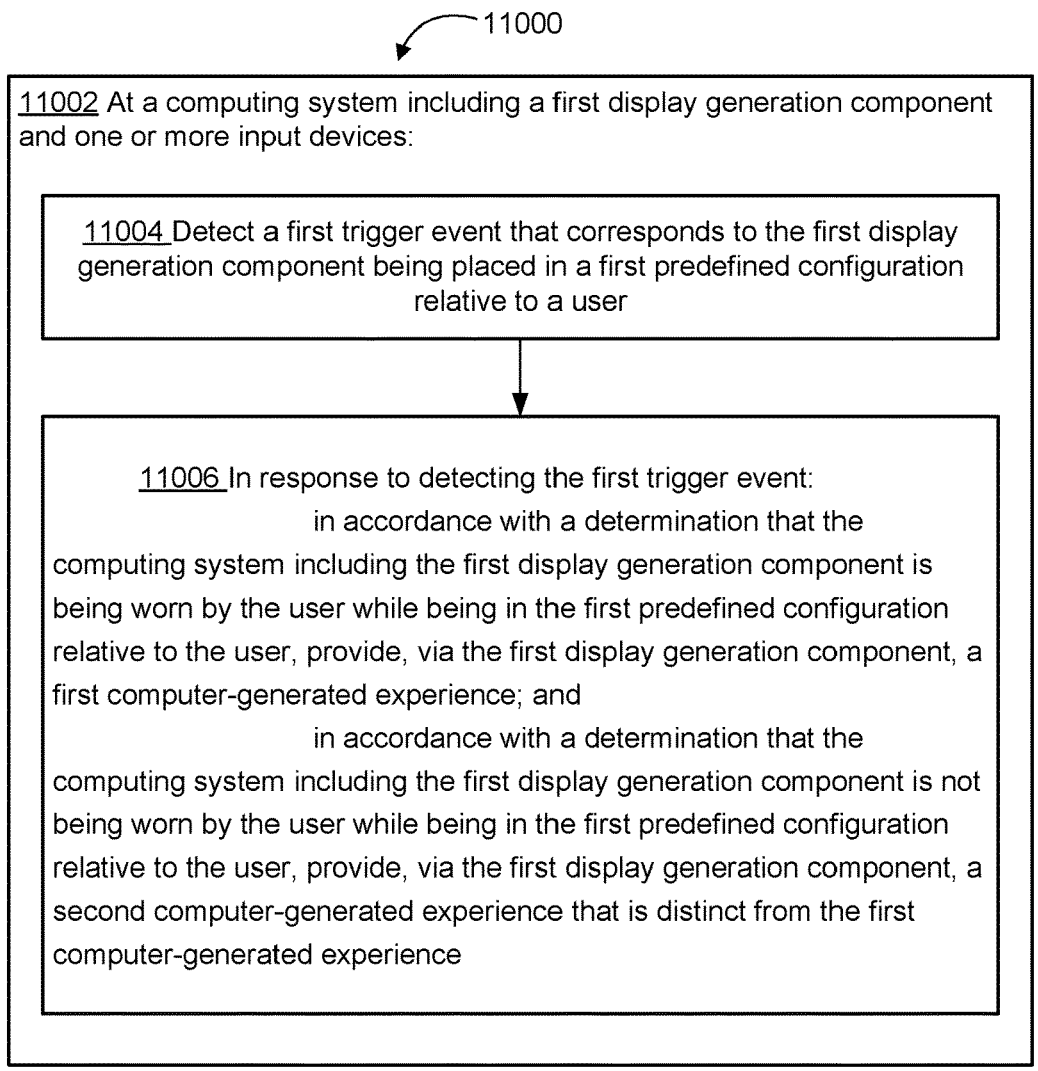
FIG. 11 is a flowchart of a method of providing a computer-generated experience based on a wearing state of a display generation component, in accordance with some embodiments.
Figure 12:
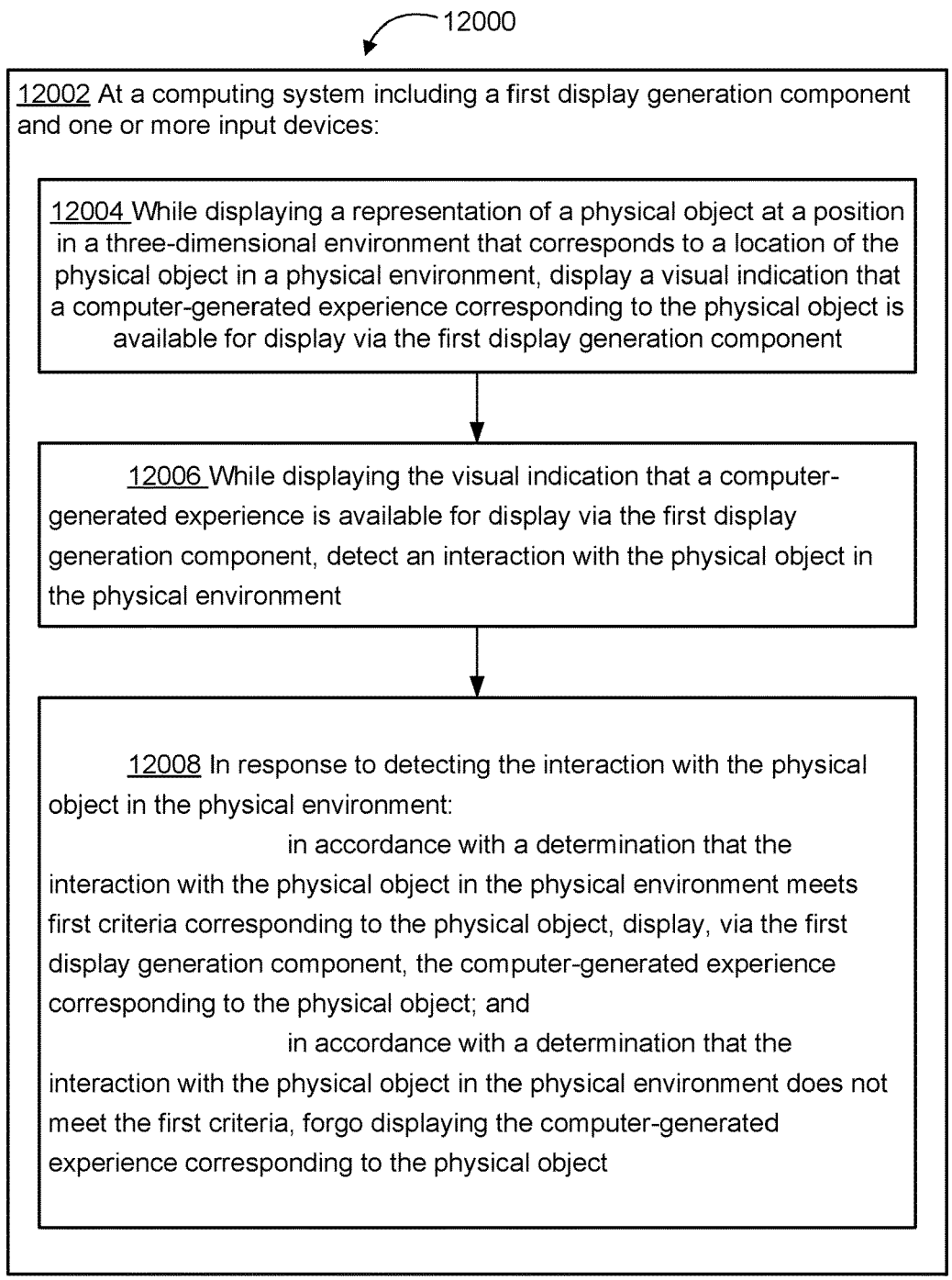
FIG. 12 is a flowchart of a method of triggering display of a computer-generated experience based on detecting preset physical interaction with a physical object in the real world, in accordance with some embodiments.
Figure 13:
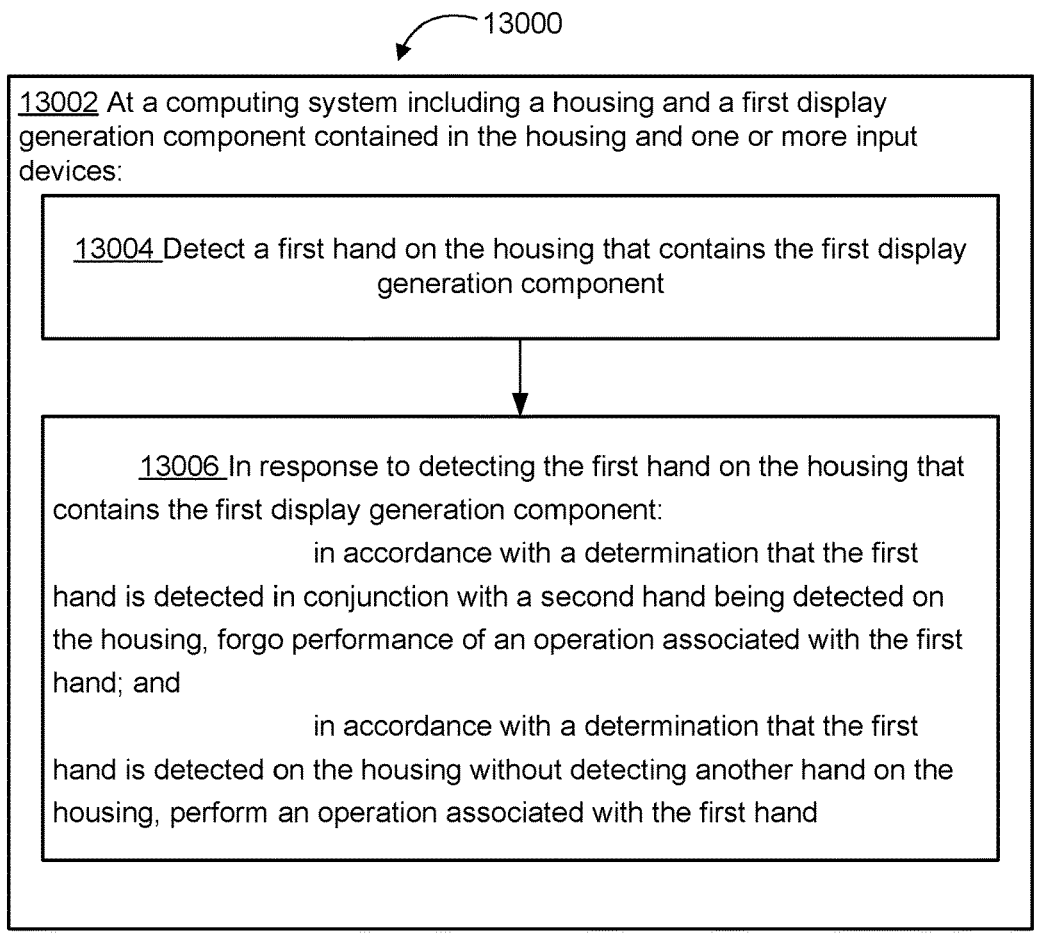
FIG. 13 is a flowchart of a method of performing an operation in response to an input on a housing of a display generation component, in accordance with some embodiments.

FIGS. 1-6 provide a description of example computing systems for providing CGR experiences to users. FIGS. 7A-7E illustrate a computing system displaying content to a user via a first display generation component while displaying dynamically updated status information associated with the user and/or the content via a second display generation component, in accordance with some embodiments. FIGS. 7F-7J illustrate the computing system displaying indications of different computer-generated experiences via the second display generation component based on contextual information, and triggering display of different computer-generated experiences corresponding to the contextual information via the first display generation component in response to detecting a change in spatial relationship relative to the user, and optionally, in accordance with a wearing state of the first display generation component relative to a user, in accordance with some embodiments. FIGS. 7K-7M illustrate displaying an indication of availability of a computer-generated experience associated with a physical object in an augmented reality environment, and triggering display of the computer-generated experience corresponding to the physical object in response to detecting preset physical interaction with the physical object, in accordance with some embodiments. FIGS. 7N-7Q illustrate choosing to perform or not perform an operation associated with an input detected on the housing of a display generation component in accordance with a determination of whether one or two hands were detected on the housing at the time the input was detected on the housing, in accordance with some embodiments. FIG. 8 is a flowchart of a method of displaying a computer-generated environment and status information, in accordance with some embodiments. FIG. 9 is a flowchart of a method of displaying a computer-generated environment and status information, in accordance with some embodiments. FIG. 10 is a flowchart of a method of providing a computer-generated experience based on contextual information, in accordance with some embodiments. FIG. 11 is a flowchart of a method of providing a computer-generated experience based on a wearing state of a display generation component, in accordance with some embodiments. FIG. 12 is a flowchart of a method of triggering display of a computer-generated experience based on physical interaction with a physical object, in accordance with some embodiments. FIG. 13 is a flowchart of a method of performing an operation in response to an input detected on a housing of a display generation component, in accordance with some embodiments. The user interfaces in FIGS. 7A-7Q are used to illustrate the processes in FIGS. 8-13, respectively.

In some embodiments, as shown in FIG. 1, the CGR experience is provided to the user via an operating environment 100 that includes a computing system 101. The computing system 101 includes a controller 110 (e.g., processors of a portable electronic device or a remote server), one or more display generation components 120 (e.g., one or more head-mounted devices (HMD), an HMD with an inner display and an outer display, one or more displays, one or more projectors, one or more touch-screens, etc., enclosed in the same housing and facing different directions, or enclosed in separate housings), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device (e.g., on the housing of the HMD or an outward facing display of the HMD) or a handheld device).

When describing a CGR experience, various terms are used to differentially refer to several related but distinct environments that the user may sense and/or with which a user may interact (e.g., with inputs detected by a computing system 101 generating the CGR experience that cause the computing system generating the CGR experience to generate audio, visual, and/or tactile feedback corresponding to various inputs provided to the computing system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing passthrough video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation components 120 (e.g., one or more HMDs, displays, projectors, touchscreens, etc., enclosed in the same housing or in different housings) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component(s) 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, at least one of the display generation component(s) 120 is configured to provide the CGR experience (e.g., at least a visual component of the CGR experience) to the user. In some embodiments, the display generation component(s) 120 include a suitable combination of software, firmware, and/or hardware. An example of the display generation component 120 is described in greater detail below with respect to FIG. 3. In some embodiments, the functionalities of the controller 110 are provided by and/or combined with the display generation component(s) 120.

According to some embodiments, at least one of the display generation components 120 provides a CGR experience to the user while the user is virtually and/or physically present within the scene 105.

In some embodiments, the display generation component(s) are worn on a part of the user's body (e.g., on his/her head, on his/her hand, etc.). As such, at least one of the display generation component(s) 120 includes one or more CGR displays provided to display the CGR content. For example, in various embodiments, at least one of the display generation component(s) 120 encloses the field-of-view of the user. In some embodiments, at least one of the display generation component(s) 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, at least one of the display generation component(s) 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CGR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
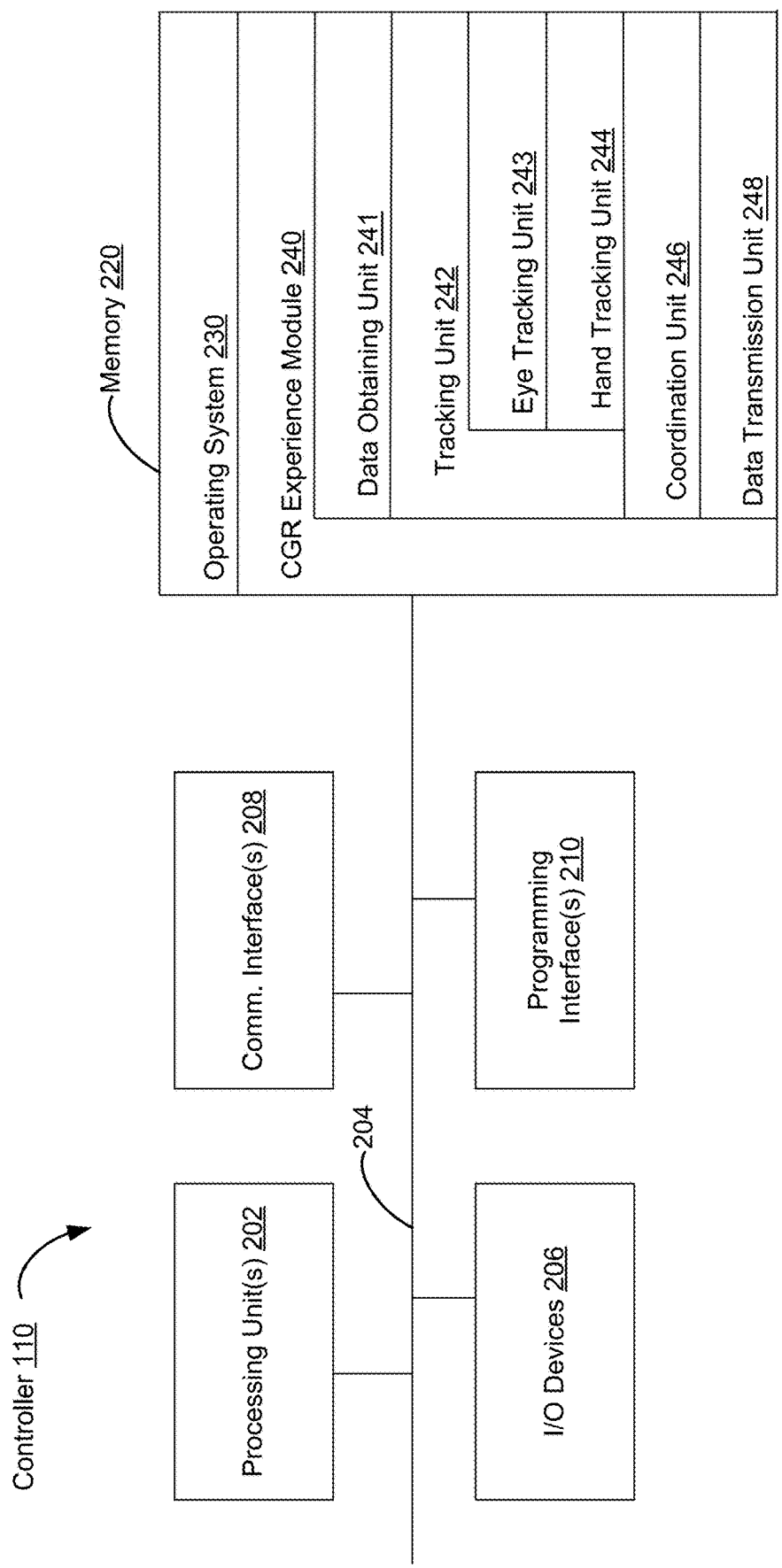
FIG. 2 is a block diagram illustrating a controller of a computing system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least one or more of the display generation component(s) 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least one or more of the display generation component(s) 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to at least one of the display generation component(s) 120, and/or relative to a coordinate system defined relative to the user's hand. The hand tracking unit 243 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via at least one of the display generation component(s) 120. The eye tracking unit 243 is described in greater detail below with respect to FIG. 5.

In some embodiments, the coordination unit 246 is configured to manage and coordinate the CGR experience presented to the user by at least one of the display generation component(s) 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least one or more of the display generation component(s) 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
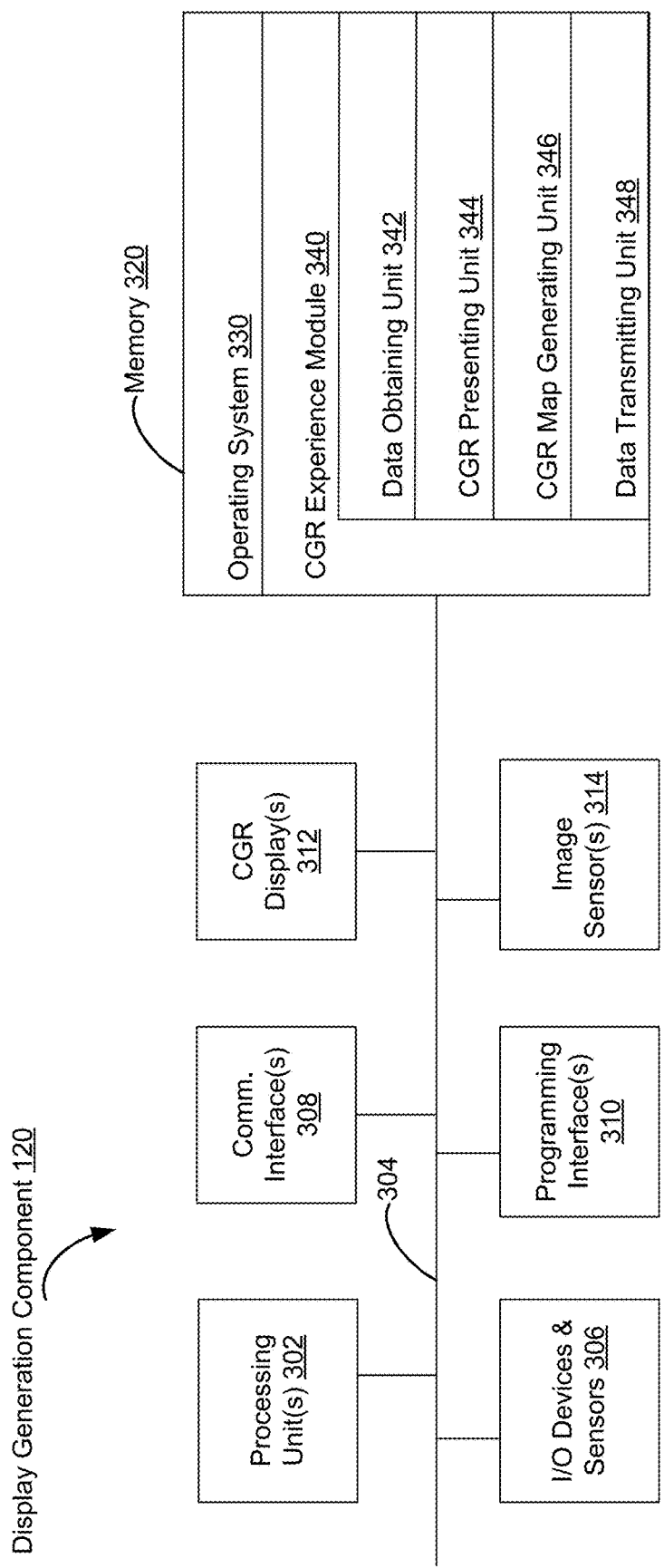
FIG. 3 is a block diagram illustrating a display generation component of a computing system that is configured to provide a visual component of the CGR experience to the user in accordance with some embodiments.

FIG. 3 is a block diagram of an example of at least one of the display generation component(s) 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the computing system (e.g., an TIMID) including the display generation component(s) 120 also includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIRE-WIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components, in the same housing.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user and optionally status information related to the CGR experience. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD includes a single CGR display. In another example, the HMD includes a CGR display for each eye of the user. In some embodiments, the one or more CGR displays 312 are capable of presenting MR and VR content. In some embodiments, the one or more CGR displays 312 are capable of presenting MR or VR content. In some embodiments, the HMD includes one or more CGR displays facing the user's eyes, and one or more CGR displays facing away from the user's eyes (e.g., toward the external environment) when the HMD is placed on the user's head. In some embodiments, the computing system is a CGR room or CGR enclosure, and the CGR room or CGR enclosure includes CGR displays on the inside that provide CGR content to users within the CGR room or enclosure, and optionally includes one or more peripheral displays on the outside that displays status information related to the CGR content and the state of the users inside.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component(s) 120 were not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, a data transmitting unit 348, and optionally other operation units for displaying status information related to the user and the CGR content.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content and associated status information via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer-generated objects can be placed to generate the computer-generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
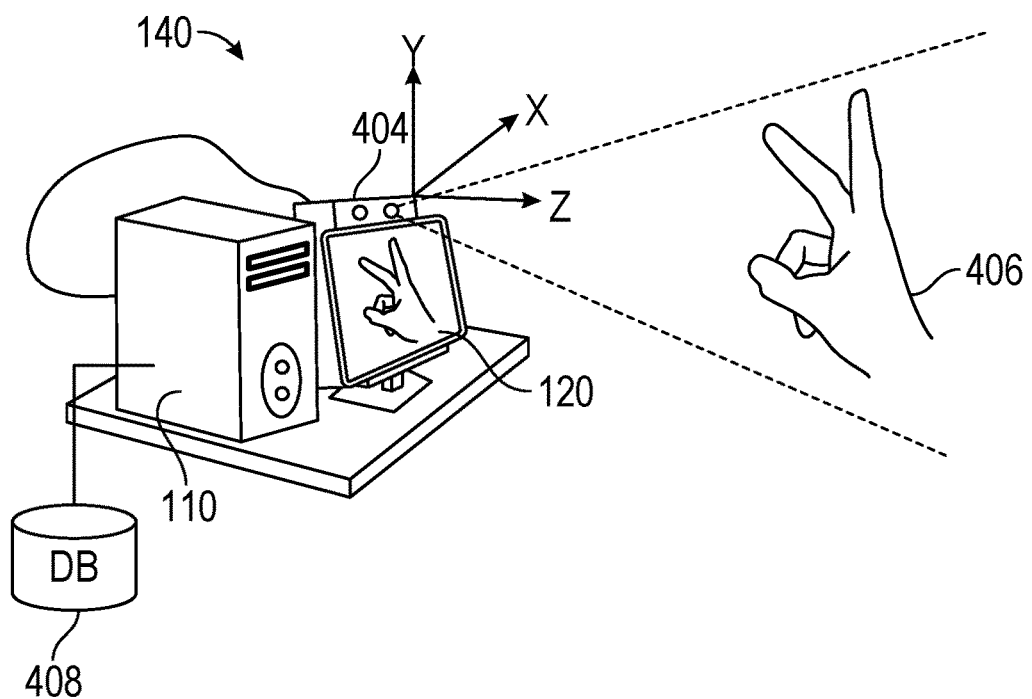
FIG. 4 is a block diagram illustrating a hand tracking unit of a computing system that is configured to capture gesture inputs of the user in accordance with some embodiments.
Figure 4:
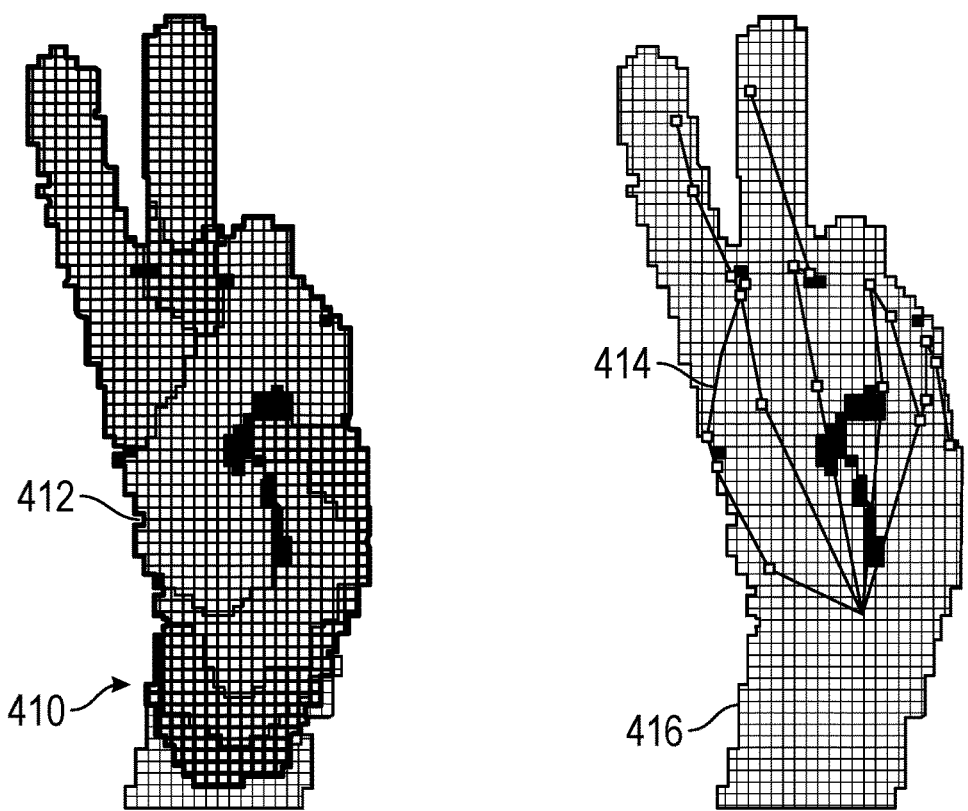

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to at least one of the display generation component(s) 120, or with respect to a portion of the user (e.g., the user's face, eyes, or head), and/or relative to a coordinate system defined relative to the user's hand. In some embodiments, the hand tracking device 140 is part of at least one of the display generation component(s) 120 (e.g., embedded in or attached to the same housing as the display generation component(s) (e.g., in a head-mounted device)). In some embodiments, the hand tracking device 140 is separate from the display generation component(s) 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component(s) 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component(s) 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
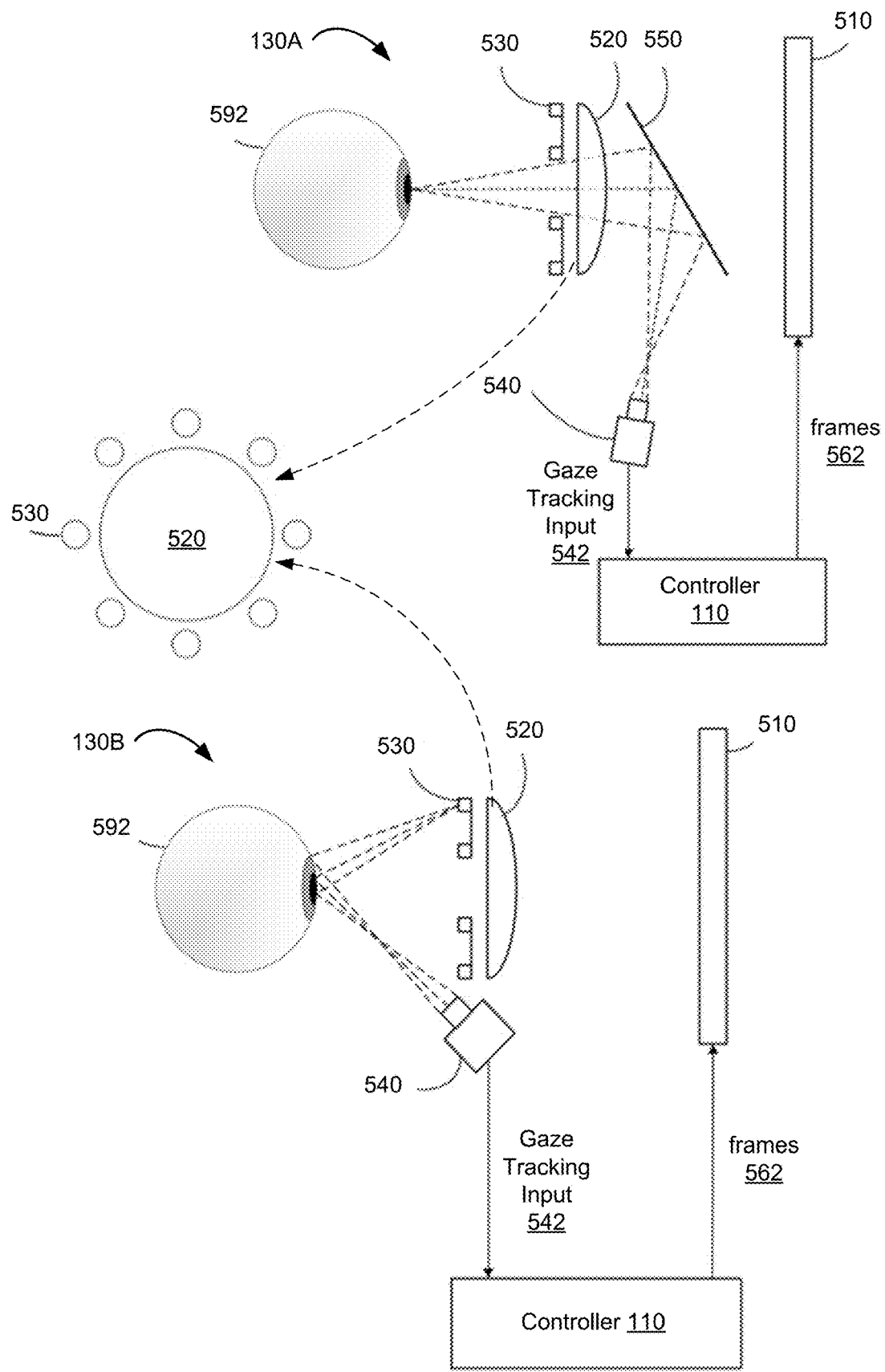
FIG. 5 is a block diagram illustrating an eye tracking unit of a computing system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the CGR content displayed via at least one of the display generation component(s) 120. In some embodiments, the eye tracking device 130 is integrated with at least one of the display generation component(s) 120. For example, in some embodiments, when the display generation component(s) 120 are part of a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component(s) 120. For example, when display generation component(s) are provided by a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with at least one of the display generation component(s) that is also head-mounted, or at least one of the display generation component(s) that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, at least one of the display generation component(s) 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, at least one of the display generation component(s) 120 may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, at least one of the display generation component(s) 120 projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, an inner display of a head-mounted device, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lense(s) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality (e.g., including virtual reality, and/or mixed reality) applications to provide computer-generated reality (e.g., including virtual reality, augmented reality, and/or augmented virtuality) experiences to the user.

Figure 6:
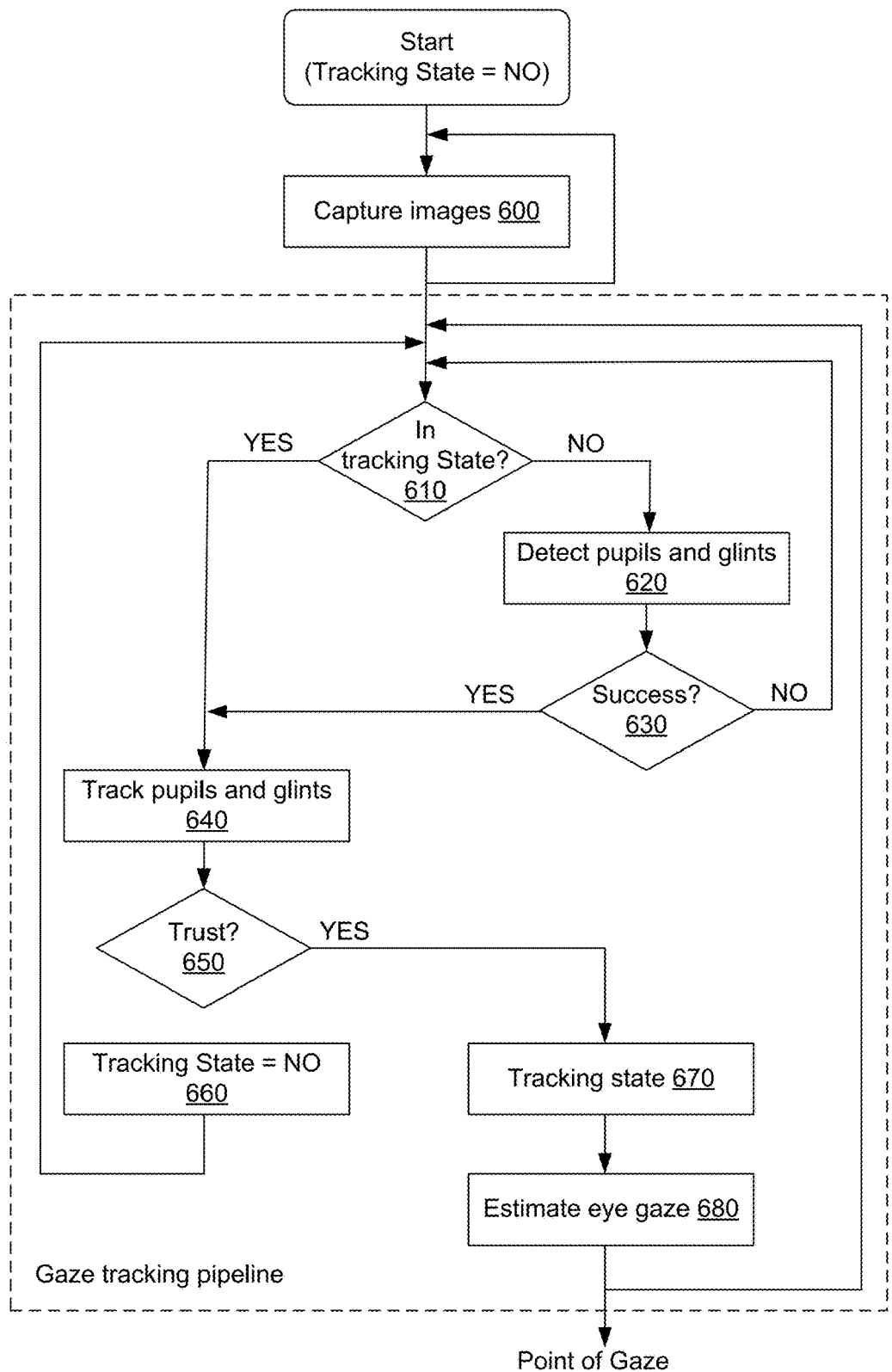
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computing system 101 for providing CGR experiences to users, in accordance with various embodiments.

In the present disclosure, various input methods are described with respect to interactions with a computing system. When an example is provided using one input device or input method and another example is provided using another input device or input method, it is to be understood that each example may be compatible with and optionally utilizes the input device or input method described with respect to another example. Similarly, various output methods are described with respect to interactions with a computing system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computing system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computing system, such as portable multifunction device or a head-mounted device, with one or more display generation components, one or more input devices, and (optionally) one or cameras.

FIGS. 7A-7E illustrate a computing system (e.g., computing system 101 in FIG. 1 or computing system 140 in FIG. 4, etc.) that includes at least a first display generation component (e.g., display 7100) and a second display generation component (e.g., display 7102), where the computing system displays computer-generated content to a user via the first display generation component (e.g., display 7100) while displaying dynamically updated status information associated with the user and/or the content via the second display generation component (e.g., display 7102), in accordance with some embodiments. FIGS. 7A-7E are used to illustrate the processes described below, including the processes in FIGS. 8-13.

As show in the left portion of FIG. 7A, a first display generation component (e.g., display 7100) is present at location A 7000-*a* and displaying CGR content (e.g., a three-dimensional movie, a virtual reality game, a video, a three-dimensional environment that includes user interface objects, etc.). A first user 7202 is also present at location A 7000-*a*.

As shown in the right portion of FIG. 7A, the second display generation component (e.g., display 7102) is present at location B 7000-*b* and displaying status information corresponding to the first user 7202 and/or to the CGR content presented via the first display generation component (e.g., display 7100). In the example scenario illustrated in FIG. 7A, the second user 7204 is also present at location B 7000-*b*.

As shown in FIG. 7A, the spatial relationship between the first display generation component (e.g., display 7100) and the first user 7202 is such that the first user 7202 is in a position to view the CGR content presented via the first display generation component. For example, the first user 7202 is facing toward a display side of the first display generation component. In some embodiments, the first display generation component is an inner display of an HMD, and the spatial relationship represented by the co-presence of the display 7100 and the first user 7202 in the same location A 7000-*a* corresponds to the first user wearing or holding the HMD with the inner display of the HMD facing the user's eyes. In some embodiments, the first user is in a position to view the CGR content presented via the first display generation component when the first user is facing a portion of the physical environment that is illuminated by a projection system of the first display generation component. For example, virtual content is projected onto a portion of the physical environment and the virtual content and the portion of the physical environment are seen by the user through a camera view of the portion of the physical environment, or through a transparent portion of the first display generation component when the user is facing the display side of the first display generation component. In some embodiments, the first display generation component emits light that form images on the user's retina when the user facing the display side of the first display generation component. For example, the virtual content is displayed by an LCD or LED display overlaid or replacing a portion of the view of the physical environment displayed by the LCD or LED display, and the user facing the display side of the LCD or LED display can see the virtual content together with a view of the portion of the physical environment. In some embodiments, the first display generation component displays a camera view of the physical environment in front of the first user or includes a transparent or semi-transparent portion through which a portion of the physical environment in front of the first user is visible to the first user. In some embodiments, the portion of physical environment that is made visible to the first user through the first display generation component is the portion of the physical environment corresponds to the display side of the second display generation component 7102 (e.g., the location B 7000-b that includes the display side of the second display generation component and optionally the second user 7204). In some embodiments, the display side of the second display generation component is a side of the second display generation component that faces away from the first user when the first user is in a position to view the content shown by the first display generation component (e.g., when the first user is facing the display side of the first display generation component), and the side that emits light that forms images viewable by others facing a preset portion of the first user (e.g., the second user 7204 or others that are facing toward the first user's face or eyes in the physical environment).

As shown in FIG. 7A, the spatial relationship between the second display generation component (e.g., display 7102) and the second user 7204 is such that the second user 7204 is in a position to view the status information presented by the second display generation component. For example, the second user 7204 is in front of and/or facing toward the display side of the second display generation component. In some embodiments, the second display generation component is the outer display of the HMD that also includes the inner display (e.g., represented by display 7100) that is presenting the CGR content to the first user 7202. In such an embodiment, the spatial relationship represented by the co-presence of the display 7102 and the second user 7204 in the same location B 7000-b corresponds to the second user being in a portion of a physical environment toward which the outer display of the HMD is facing (e.g., the physical environment is also hosting the first display generation component and the first user 7202). In some embodiments, the first display generation component displays a camera view of the physical environment in front of the first user or includes a transparent or semi-transparent pass-through portion through which a portion of the physical environment in front of the first user is visible to the first user, and the portion of the physical environment included in the camera view or the pass-through portion is also the portion of the physical environment that is in front of the display side of the second display generation component. In some embodiments, the second display generation component is positioned back to back with the first display generation component, such that the portion of the physical environment that is in front of the display side of the second display generation component 7102 (e.g., the location B 7000-b that includes the display side of the second display generation component and optionally the second user 7204) is also in front of the first user, and within the field of view of the first user if the first and the second display generation components were not blocking the first user's face.

As set forth above, and will be reiterated here, although FIG. 7A (and FIGS. 7B-7J) shows the first display generation component (e.g., display 7100) and the second display generation component (e.g., display 7102) as being located in two separate and disjoint portions of a physical environment, it is to be understood that the first display generation component and the second display generation component are optionally two display generation components that are contained in the same housing (e.g., a housing of a single HMD 7001, shown in FIG. 7A-1) or attached to the same support structure (e.g., attached back to back with each other or on two sides of a single wall or surface), and facing different (e.g., substantially opposite) directions. As such, location A 7000-a represents a first portion of a physical environment from which content presented via the first display generation component (e.g., CGR content) can be seen by a first user (e.g., the first user 7202) facing toward a display side of the first display generation component and from which content presented via the second display generation component (e.g., status information) cannot be seen by the first user (e.g., the first user 7202); and location B 7000-b represents a second portion of the same physical environment from which the content presented via the first display generation component (e.g., CGR content) cannot be seen by another user facing a display side of the second display generation component (e.g., the second user 7204) and from which the content presented via the second display generation component (e.g., status information) can be seen by said other user (e.g., the second user 7204). In the disclosure presented herein, the first display generation component and the second display generation component are controlled by the same computing system (e.g., the HMD, a portable electronic device that is separately housed from the display generation components, a portable electronic device that has two displays facing different directions, a remote server computer, etc.), and a user of the computing system, unless otherwise specified, generally refers to a person that has control of at least the first display generation component to place it or himself/herself in a position that enables him/her to see the CGR content shown via the first display generation component.

As shown in FIG. 7A, the computing system that controls the first display generation component and the second display generation component are in communication with a first image sensor (e.g., camera 7104) and a second image sensor (e.g., camera 7106). The first image sensor is configured to capture images of a portion of the physical environment (e.g., location A 7000-a) that includes at least a portion of the first user (e.g., the first user 7202's face and/or eyes) that faces the display side of the first display generation component (e.g., display 7100) and that does not include the second user 7204 (or any other user, in the case where the first display generation component is an inner display of an HMD worn by the first user). The second image sensor is configured to capture images of a portion of the physical environment (e.g., location B 7000-b) that does not include the portion of the first user (e.g., the first user 7202's face or eyes) but includes at least a portion of the second user (e.g., the portion of the second user 7204 that is in the field of view of the first user 7202 provided by the first display generation component). As discussed earlier, in some embodiments, the portion of the physical environment that is captured by the second image sensor 7106 includes the portion of the physical environment that is in the field of view of the first user if the first user's eyes were not physically blocked by the presence of the second display generation component (and optionally, the presence of the first display generation component). Similarly, in some embodiments, the portion of the physical environment that is captured by the first image sensor 7104 includes the portion of the user (e.g., the user's face or eyes) that is physically blocked by the presence of the first display generation component (and optionally, the presence of the second display generation component). In some embodiments, the computing system is also in communication with the first image sensor, the second image sensor, and/or other image sensors to receive images of the hands and wrists of the first user and/or the second user for identifying gesture inputs provided by the first user and/or the second user. In some embodiments, the first image sensor 7104 is also used to capture gaze inputs provided by the first user. In some embodiments, the first image sensor and the second image sensor optionally serve as the image sensors for capturing the gesture inputs of the first user and/or the second user.

In some embodiments, the computing system optionally controls one or more audio output devices that respectively provide audio outputs (e.g., sounds of the CGR content) to the first user present at location A 7000-*a*, and optionally, audio outputs (e.g., status indication sounds or alerts, sounds of the CGR content, etc.) to the second user present at location B 7000-*b*. In some embodiments, the computing system optionally partially or completely shields (e.g., through one or more active or passive noise suppression or cancellation components) location A and the first user from the sounds propagated from location B, and optionally partially or completely shields location B and the second user from the sounds propagated from location A. In some embodiments, the amount of active sound shielding or sound pass-through is determined by the computing system based on the current level of immersion associated with the CGR content shown via the first display generation component (e.g., no sound shielding when in pass-through mode, or partial sound shielding when in mixed reality mode, full sound shielding when in virtual reality mode, etc.), and optionally, based on whether there is another user present at location B (e.g., no sound shielding when no one is present at location B, sound shielding when people are present or noise level exceeds a threshold level at location B, etc.).

In some embodiments, as shown in FIG. 7A, the computing system displays CGR content 7002 (e.g., shown as 7002-*a* in FIG. 7A) via the first display generation component (e.g., display 7100, or an inner display of an HMD) while the first user 7202 is in a position to view the CGR content (e.g., first user 7202 is collocated in location A with and at least partially facing toward the display side of the first display generation component, the first user is wearing the HMD on her head, holding the HMD with the inner display in front of her eyes, etc.). In the moment illustrated in FIG. 7A, the computing system is displaying a movie X (e.g., a three-dimensional movie, a two-dimensional movie, an interactive computer-generated experience, etc.). The movie is displayed in a mixed reality mode in which content of the movie is concurrently visible with representations of a physical environment (e.g., representation of the location B (e.g., the portion of the physical environment that is in front of the first user that is blocked by the presence of the first display generation component)) through the first display generation component. In some embodiments, this mixed realty mode corresponds to an intermediate level of immersion associated with the CGR content presented via the first display generation component. In some embodiments, the intermediate level of immersion also corresponds to partial shielding or partial pass-through of the sounds propagated from the physical environment (e.g., the location B (e.g., the portion of the physical environment that surrounds the first user)). In this example, the representation of the physical environment includes a representation 7010 (e.g., shown as 7010-*a* in FIG. 7A) of the second user 7204 that is located in location B 7000-*b*, in front of the second display generation component 7102 (e.g., also in front of the back side of the first display generation component 7100). In some embodiments, the representation of the physical environment includes a camera view of the portion of the physical environment that would be within the first user's field of view if the user's eyes were not blocked by the presence of the first display generation component and the second display generation component (e.g., if the first user were not wearing the HMD or holding the HMD in front of his/her eyes). In the mixed reality mode, the CGR content 7002 (e.g., the movie X, a three-dimensional augmented reality environment, user interfaces, virtual objects, etc.) is displayed to overlay or replace at least a portion of, but not all of, the representation of the physical environment. In some embodiments, the first display generation component includes a transparent portion through which a portion of the physical environment is visible to the first user. In some embodiments, in the mixed reality mode, the CGR content 7002 (e.g., the movie X, a three-dimensional augmented reality environment, user interfaces, virtual objects, etc.) is projected onto the physical surfaces or empty space in the physical environment and are visible through the transparent portion with the physical environment and viewable through the transparent portion of the first display generation component or viewable through a camera view of the physical environment provided by the first display generation component. In some embodiments, the CGR content 7002 is displayed to overlay a portion of the display and blocks the view of at least a portion of, but not all of, the physical environment visible through the transparent or semi-transparent portion of the first display generation component. In some embodiments, the first display generation component 7100 does not provide a view of a physical environment, and provides a completely virtual environment (e.g., no camera view or transparent pass-through portion) that is augmented with real-time visual representation(s) (e.g., a stylized representation or segmented camera images) of the physical environment as presently captured by one or more sensors (e.g., cameras, motion sensors, other posture sensors, etc.). In the mixed-reality mode (e.g., augmented reality based on camera view or transparent display, or augmented virtuality based on virtualized representation of the physical environment), the first user is not fully immersed in the computer-generated environment, and is still receiving sensory information (e.g., visual and audio) that directly corresponds to the physical environment surrounding the first user and the first display generation component.

As shown in FIG. 7A, at the same time that the computing system displays the CGR content 7002-*a* (e.g., the movie X, a three-dimensional augmented reality environment, user interfaces, virtual objects, etc.) in the mixed reality mode via the first display generation component 7100, the computing system displays status information related to the first user and the CGR content via the second display generation component (e.g., display 7102, or the outer display of an HMD). As shown in the right portion of FIG. 7A, the second display generation component (e.g., display 7102, or an outer display of an HMD) displays one or more graphical elements that represent the status of the CGR content 7002 that is being displayed via the first display generation component (e.g., display 7100 or the inner display of the HMD), as well as a representation 7006 (e.g., shown as 7006-a in FIG. 7A) of at least a portion of the first user 7202 that is in front of the display side of the first display generation component (e.g., display 7100, or the inner display of the HMD). In this example, the one or more graphical elements that represent the status of the CGR content that is being displayed via the first display generation component optionally includes an identifier of the CGR content (e.g., the title of the movie X), a progress bar 7004 (e.g., shown as 7004-a in FIG. 7A) showing the current progress of the CGR content, and visual representation 7008 (e.g., shown as 7008-a in FIG. 7A) of the CGR content. In some embodiments, the visual representation 7008 of the CGR content obfuscates some of the CGR content (e.g., through blurring, distortion, etc.) and merely conveys a sense of change and colors or tones of the CGR content. As shown in the right portion of FIG. 7A, the representation 7006 of the portion of the first user 7202 optionally includes a camera view of the face of the first user, or a graphical representation that is generated based on a camera view of the face of the first user. In some embodiments, the representation of the portion of the first user 7202 optionally includes a camera view of the eyes of the first user, or a graphical representation that is generated based on a camera view of the eyes of the first user that is in front of the display side of the first display generation component. In some embodiments, the representation of the portion of the first user 7202 is displayed in a different display layer from the display layer(s) of the one or more graphical elements that represent the status of the CGR content that is being displayed via the first display generation component. In some embodiments, the concurrent display of the representation of the status of the CGR content and the representation of the portion of the first user by the second display generation component provides an indication that the CGR content is being displayed via the first display generation component in a mixed reality mode and that the first user is provided with a view of the physical environment along with the CGR content. By displaying, on the second display generation component, the visual representation of the first user's face and/or eyes and the representation of the status of the CGR content being viewed by the first user while the face and/or eyes of the first user is shielded by the presence of the first display generation component (and optionally the presence of the second display generation component) (e.g., by the presence of the HMD including the inner display and the outer display), other users in the surrounding physical environment of the first user are provided with more information to initiate or refrain from interaction with the first user, or conduct himself/herself in an appropriate manner in the presence of the first user.

Figure 7B:
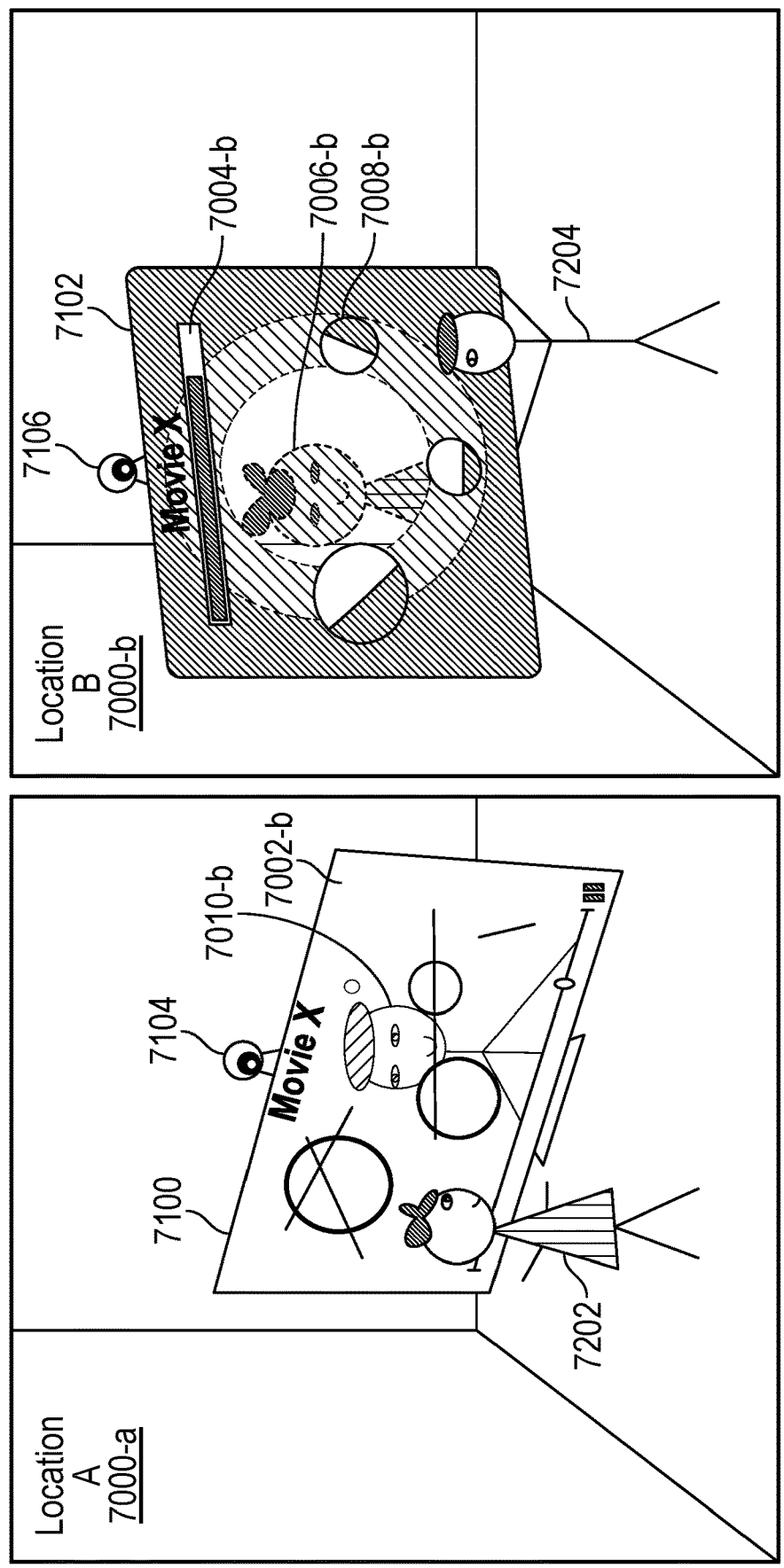

FIG. 7B follows FIG. 7A and illustrates that at a later time, the CGR content has progressed further on the first display generation component (e.g., display 7100 or the inner display of the HMD), and the appearance of the first user has changed. For example, the change in appearance of the first user is due to movement of at least a portion of the first user 7202 (e.g., the eyes or face of the first user) relative to the first display generation component (e.g., the movement includes sideway movements of the first user's eye balls, blinking of the user's eyes, closing or opening of the user's eyes, up and down movement of the user's eye balls, etc.; and/or the movement includes the movement of the user's face or head relative to the display side of the first display generation component (e.g., moving away or toward from the first display generation component, etc.)) within location A 7000-a (e.g., while the first user is still wearing the HMD and/or facing the inner display of the HMD). At this time, the CGR content 7002 is still displayed in the mixed reality mode and the representation 7010 (e.g., shown as 7010-b) of the physical environment (e.g., location B including the second user 7204) remains concurrently displayed with the CGR content 7002 via the first display generation component. In some embodiments, any changes in the appearance of the physical environment (e.g., movement of the second user 7204 relative to the first display generation component, the second display generation component, and/or the first user, etc.) is reflected by the representation 7010 of the physical environment shown by the first display generation component, as well. In some embodiments, in accordance with the movement of the portion of the first user relative to the first display generation component (e.g., the movement of the first user's eyes or face), the computing system updates the representation 7006 (e.g., shown as 7006-b in FIG. 7B) displayed via the second display generation component 7102. For example, when the first user 7202 or a portion thereof (e.g., the user's face or eyes) moved to in a direction toward a first edge of the first display generation component 7100 (e.g., the left edge of the display side of the first display generation component, the top edge of the display side of the first display generation component, etc.), the representation 7006 of the portion of the first user shown on the display side of the second display generation component also moves toward a corresponding second edge of the second display generation component (e.g., the right edge of the display side of the second display generation component (e.g., corresponding to the left edge of the display side of the first display generation component), the top edge of the display side of the second display generation component (e.g., corresponding to the top edge of the display side of the first display generation component), etc.). In addition to updating the representation 7006 of the portion of the first user, the computing system also updates the representation of the status of the CGR content on the second display generation component. For example, the progress bar 7004 (e.g., shown as 7004-b in FIG. 7B) is updated to show that the playback of the CGR content has advanced by a first amount since the time shown in FIG. 7A. In some embodiments, the representation 7008 (e.g., shown as 7008-b in FIG. 7B) of the CGR content, as shown on the second display generation component (e.g., display 7102, the outer display of the HMD, etc.), is also updated in accordance with the current appearance of the CGR content 7002 shown on the first display generation component (e.g., display 7100, the inner display of the HMD, etc.). In some embodiments, showing the real-time update of the appearance of the portion of the first user (e.g., showing the changes and movements of the first user's face and eyes behind the first display generation component) and showing real-time or periodic update of the status of the CGR content shown by the first display generation component allow others in the physical environment around the first user (e.g., at location B) to gain information about the attention state of the first user and whether it is appropriate to engage or interrupt the first user at the present time. In some embodiments, while changes to the appearance of the first user and the CGR content are reflected by updates to the status information shown by the second display generation component, any changes in the appearance of the physical environment (e.g., movement of the second user 7204 relative to the first display generation component, the second display generation component, and/or the first user, etc.) is reflected by the representation 7010 of the physical environment shown by the first display generation component, as well.

Figure 7C:
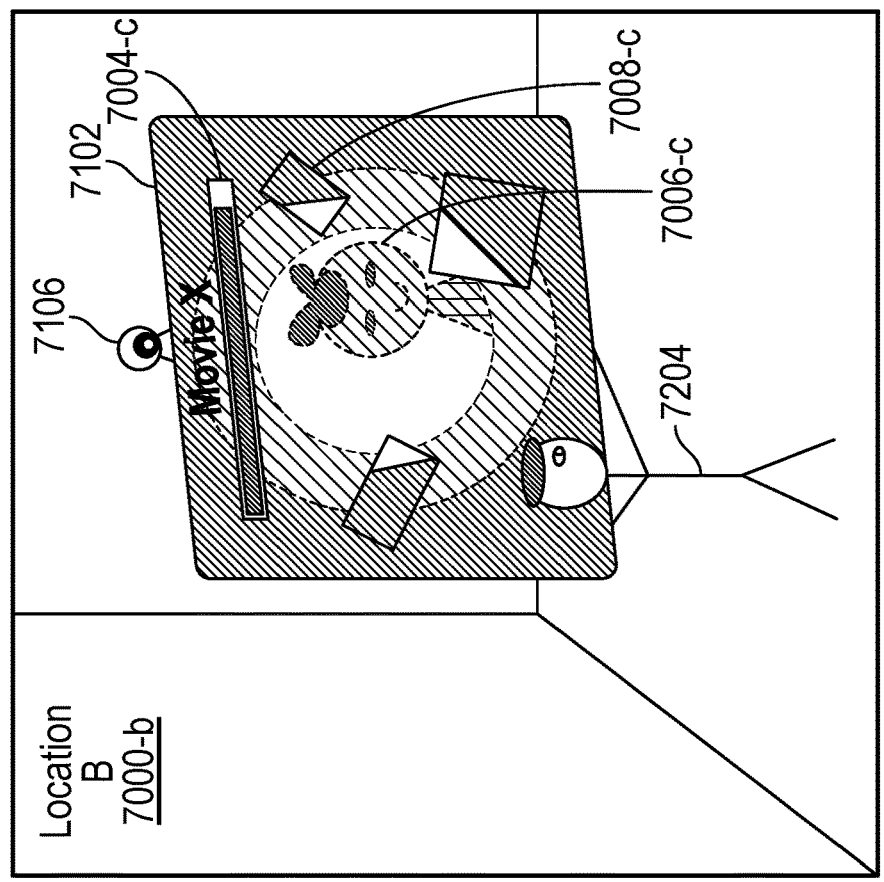
Figure 7C:
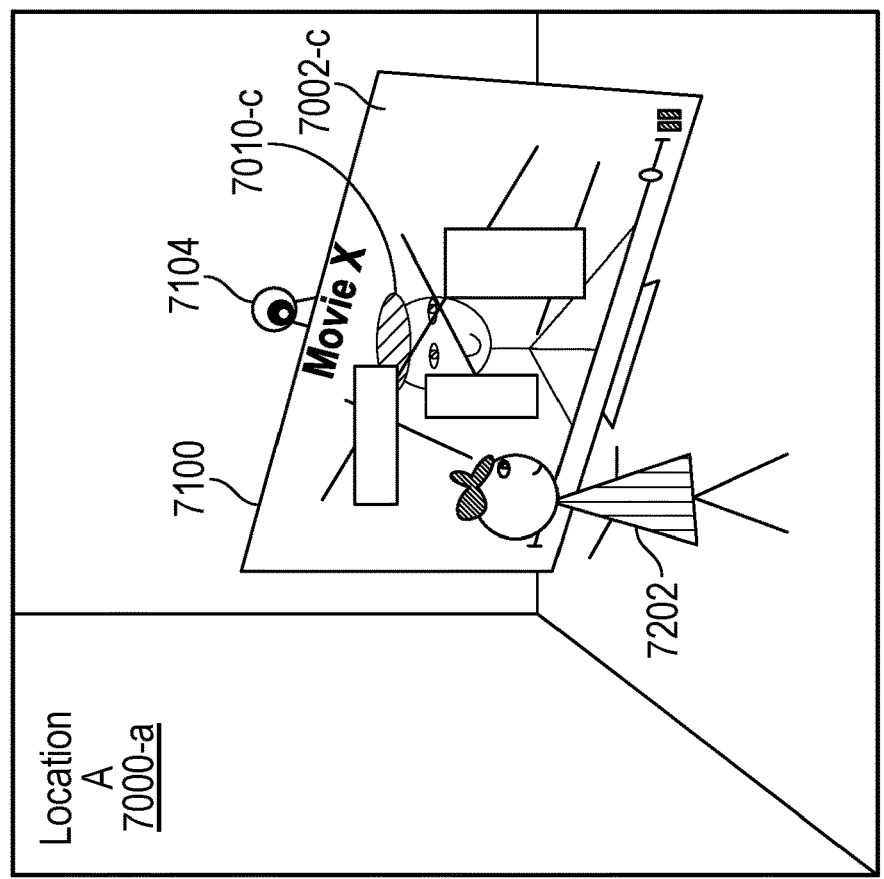

FIG. 7C follows FIG. 7A and illustrates that at a later time, the CGR content has progressed further on the first display generation component 7100, and the second user 7204 has moved relative to the second display generation component 7102 and is viewing the second display generation component from a different angle as compared to the scenario shown in FIG. 7A. At this time, the CGR content 7002 is still displayed in the mixed reality mode and the representation 7010 (e.g., shown as 7010-c) of the physical environment (e.g., location B including the second user 7204) remains concurrently displayed via the first display generation component 7100. In accordance with the movement of the second user 7204 relative to the second display generation component (and relative to the first display generation component when the first and second display generation components have a fixed spatial relationship relative to each other (e.g., fixed back to back in the same housing of an HMD)), the computing system updates the representation 7010 (e.g., shown as 7010-c in FIG. 7C) displayed via the first display generation component (e.g., display 7100 or the inner display of the HMD). For example, when the second user 7204 or a portion thereof moved in a direction toward a third edge (e.g., the right edge, the top edge, etc.) of the display side of the second display generation component 7102, the representation 7010 of the portion of the second user shown on the display side of the first display generation component 7100 also moves toward a corresponding fourth edge of the first display generation component (e.g., the left edge of the display side of the first display generation component (e.g., corresponding to the right edge of the display side of the second display generation component), the top edge of the display side of the first display generation component (e.g., corresponding to the top edge of the display side of the second display generation component)). In accordance with the changes in the CGR content shown on the first display generation component (e.g., display 7100, the inner display of the HMD, etc.), the computing system also updates the representation of the status of the CGR content shown on the second display generation component (e.g., display 7102, the outer display of the HMD, etc.). For example, the progress bar 7004 (e.g., shown as 7004-c in FIG. 7C) is updated to show that the playback of the CGR content has advanced by a second amount since the time shown in FIG. 7A, and by a third amount since the time shown in FIG. 7B. In some embodiments, the representation 7008 (e.g., shown as 7008-c in FIG. 7C) of the CGR content 7002, as shown on the second display generation component (e.g., display 7102, the outer display of the HMD, etc.), is also updated in accordance with the current appearance of the CGR content 7002 shown on the first display generation component (e.g., display 7100, the inner display of the HMD, etc.). The contrast of the appearance of the status information (e.g., including the representation 7006, the representation 7008, progress bar 7004, etc.) shown in FIGS. 7A and 7B illustrates that, for the same relative spatial location between the first display generation component and the portion of the first user 7202 represented in the status information shown by the second display generation component, the representation 7006 of the portion of the first user 7202 is displayed at a different depth from that of the representation 7008 of the CGR content, and optionally, at a different depth from that of other status information (e.g., the progress bar 7004). The difference in display depths from the display side of the second display generation component 7102 or from the position of the second user 7204 results in a visual parallax effect. For example, as the second user 7204 moves relative to the second display generation component (e.g., display 7102, the outer display of the HMD, etc.), the representation 7006 of the portion of the first user 7202 and the representation 7008 of the CGR content appears to move by different amounts on the display side of the second display generation component (and appear to move relative to each other). In some embodiments, the representation 7008 of the CGR content is displayed as a diffused layer between the representation 7006 of the portion of the first user and the representations of other status information (e.g., the title of the CGR content, the progress bar 7004, etc.). In some embodiments, the representation of the portion of the first user is displayed in a display layer that is farthest away from the display side of the second display generation component as compared to the display layers for the representation of the CGR content and the representations of other status information shown by the second display generation component.

In some embodiments, the first display generation component and the second display generation component are positioned back to back (e.g., with their respective display sides facing different directions (e.g., substantially opposite directions)) in an HMD that is worn on the first user's head or placed in front of the user's face. In some embodiments, the second display generation component shows a visual representation of the first user's eyes that is generated based real images of the first user's eyes using one or more image processing filters. For example, the visual representation of the first user's eyes is optionally generated by reducing an opacity, increasing a transparency, reducing a color saturation level, reducing a luminance level, reducing a pixel resolution, reducing a color resolution, etc. of a camera image of the first user's eyes. In some embodiments, the amount of modification applied to the various display properties of a respective camera image of the first user's eyes is optionally specified relative to values of various display properties of the representation 7008 of the CGR content that is concurrently shown by the second display generation component 7102. For example, when the representation of the CGR content is relatively dark (e.g., with a first range of luminance values), the representation of the eyes is also made darker, more translucent, and/or less color saturated (e.g., with a second range of luminance values, a second range of transparency values, a second range of color saturation values, that are selected based on the first range of luminance values); and when the representation of the CGR content is brighter (e.g., with a second range of luminance values that are greater than the first range of luminance values), the representation of the eyes is made brighter, less translucent, and/or more color saturated (e.g., with a third range of luminance values, a third range of transparency values, a third range of color saturation values, that are selected based on the second range of luminance values). In some embodiments, other display properties (e.g., color saturation, pixel resolution, color resolution, tone, etc.) are used as the basis for selecting the value ranges for the display properties of the representation of the portion of the user (e.g., the user's face or eyes). In some embodiments, the representation of the first user's eyes is generated by applying one or more preset image filters, such as a blur filter, a color filter, a luminance filter, etc. that changes the original appearance of the first user's eyes when the representation is displayed by the second display generation component.

In some embodiments, the representation of the CGR content (e.g., representation 7008) shown by the second display generation component is generated by applying a diffusion filter on the CGR content (e.g., all visible content, media content only, or, optionally, visible content excluding the pass-through view of the physical environment) displayed by the first display generation component. For example, the color and tones of a scene is preserved by the representation 7008 of the CGR content, but the outlines of the objects in the CGR content are blurred and not clearly defined in the representation 7008 of the CGR content. In some embodiments, the representation of the CGR content is translucent, and through which the representation 7006 of the portion of the first user is visible. In some embodiments, graphical user interface elements that represent metadata associated with the CGR content (e.g., progress bar 7004, the title of the CGR content, etc.) are displayed (e.g., in the same display layer as or in a different display layer from the representation 7008 of the CGR content, and/or in the same display layer of or in a different display layer from the representation 7006 of the portion of the first user) by the second display generation component. In some embodiments, the graphical user interface elements that represent metadata associated with the CGR content is displayed with a higher pixel resolution, higher color resolution, higher color saturation, greater opacity, greater luminance, and/or better defined outlines, as compared to the representation 7008 of the CGR content and/or the representation 7006 of the portion of the first user.

In some embodiments, the portion of the first user (e.g., the first user's face or eyes) moves relative to the first display generation component (e.g., display 7100, the inner display of the HMD) while the CGR content 7002 presented by the first display generation component does not change. In such a case, the representation 7006 of the portion of the user is, optionally, updated on the second display generation component 7102 without the representation 7006 and the progress bar 7004 of the CGR content being updated. In some embodiments, the CGR content is not displayed or is paused and the first user is viewing a pass-through view of the physical environment via the first display generation component without concurrent display of the CGR content, and the second display generation component optionally updates the representation of the portion of the first user in accordance with the change in appearance of the portion of the first user (e.g., due to movement of the portion of the user or other changes), without displaying any representation of the CGR content, or showing the representation of the CGR content in a static or paused state.

In some embodiments, the CGR content changes on the first display generation component while the portion of the first user does not change its appearance (e.g., does not move or change due to other reasons). Accordingly, the representation 7006 of the portion of the first user remains unchanged, and the second display generation component only updates the representation 7008 of the CGR content and the other indicators of the status of the CGR content (e.g., progress bar 7004) in accordance with the changes in the CGR content shown by the first display generation component.

In some embodiments, when changes in both the CGR content and the appearance of the portion of the first user are detected during the same period of time (e.g., simultaneously and/or during a preset time window of each other, etc.), the second display generation component updates both the visual representation of the portion of the user and the one or more graphical elements that show the status of the CGR content (e.g., the representation 7008 of the CGR content and the progress bar 7004) in accordance with the changes that are detected.

FIGS. 7A-7C illustrate updating, via the second display generation component 7102, an appearance of a visual representation (e.g., representation 7006) of the first user 7202 (e.g., the first user's eyes or face) in accordance with changes in the appearance of the first user (e.g., due to movement of the first user's eyes or changing expressions, changing in lighting, etc.) and updating, via the second display generation component 7102, one or more graphical elements (e.g., progress bar 7004, representation 7008 of CGR content 7002, etc.) that provide a visual indication of the content within the CGR environment shown via the first display generation component 7100 in accordance with changes in the CGR environment. In the example scenario shown in FIGS. 7A-7C, the level of immersion associated with the CGR content and the attention state of the first user 7202 does not change and corresponds to an intermediate level of immersion associated with the presentation of the CGR content. In some embodiments, the level of immersion associated with the presentation of the CGR content and corresponding attention state of the first user are optionally altered over a period of time, e.g., increased to a more immersive level and a more engaged user attention state, or decreased to a less immersive level and a less engaged user attention state. In some embodiments, the status information shown by the second display generation component is updated based on the changes in the level of immersion by which the CGR content is presented by the first display generation component. In some embodiments, the update to the status information includes an update to the representation of the portion of the first user (e.g., updating the visibility of the representation of the portion of the first user, updating the appearance of the representation of the portion of the first user, etc.).

Figure 7D:
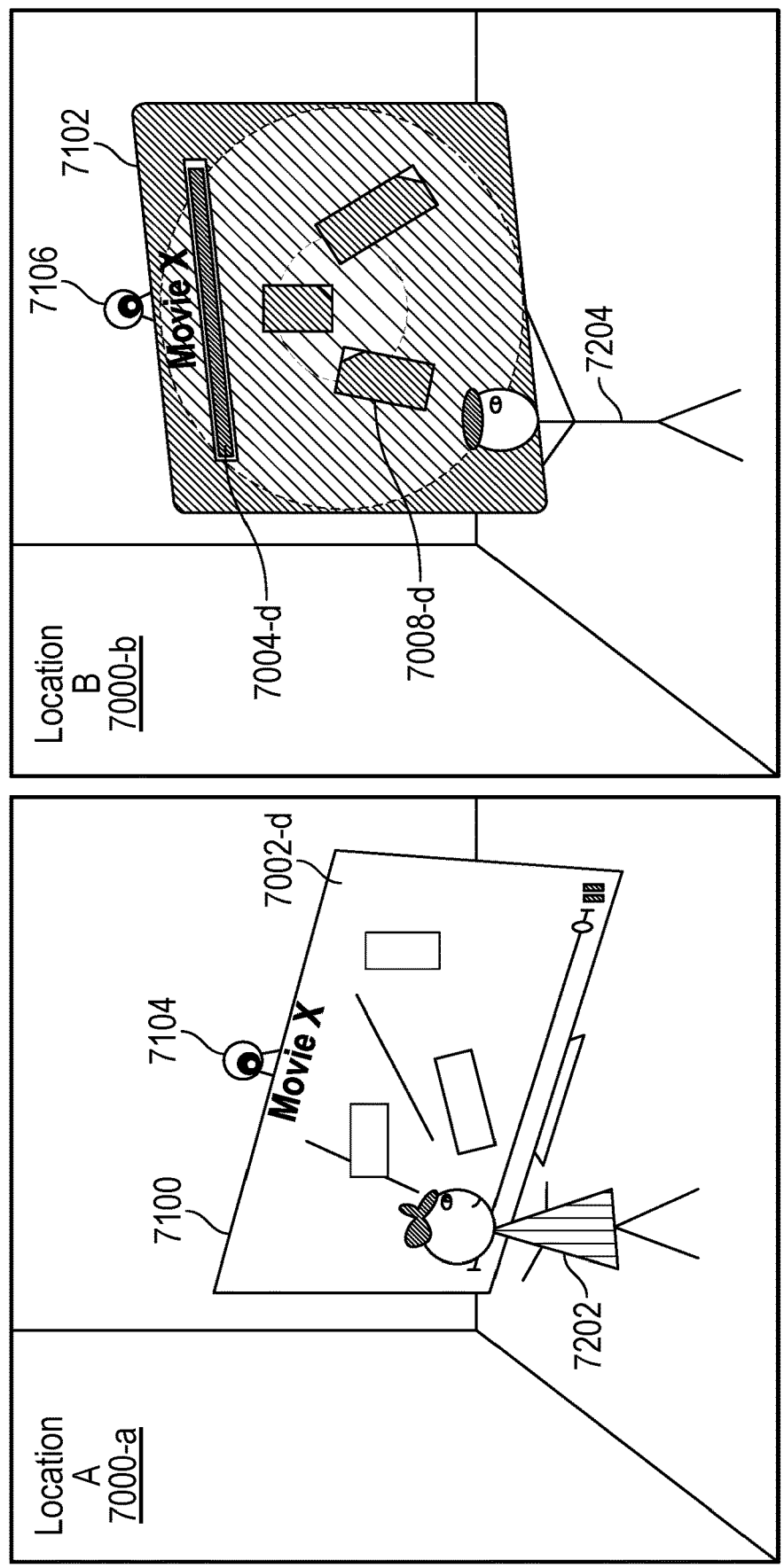
Figure 7E:
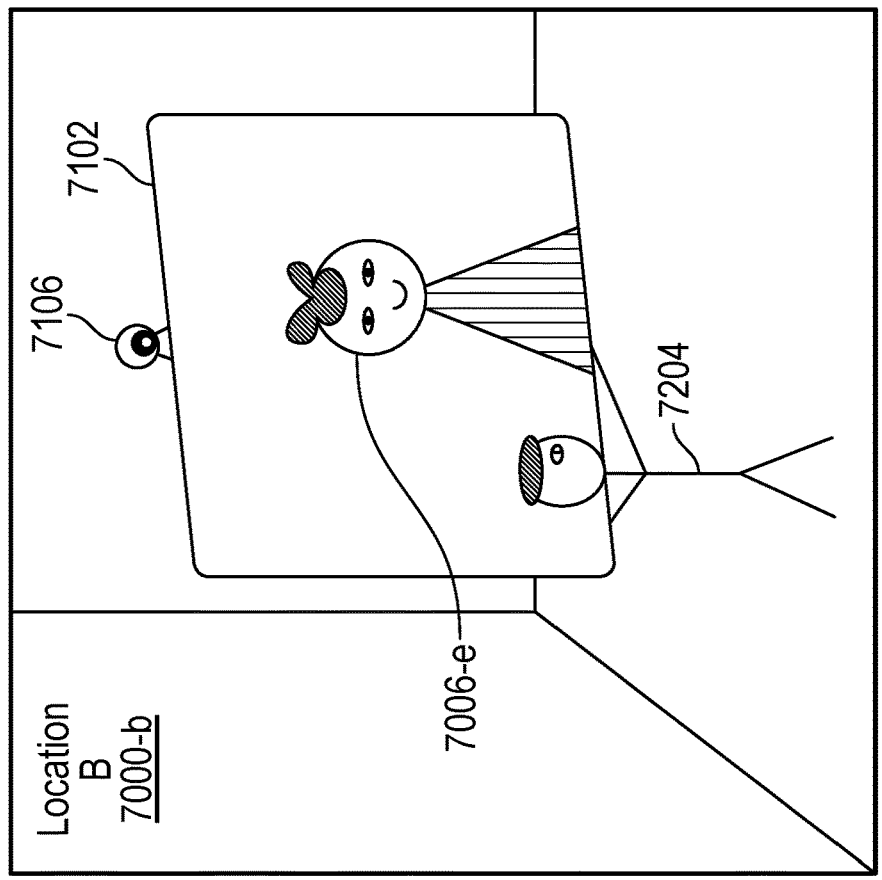
Figure 7E:
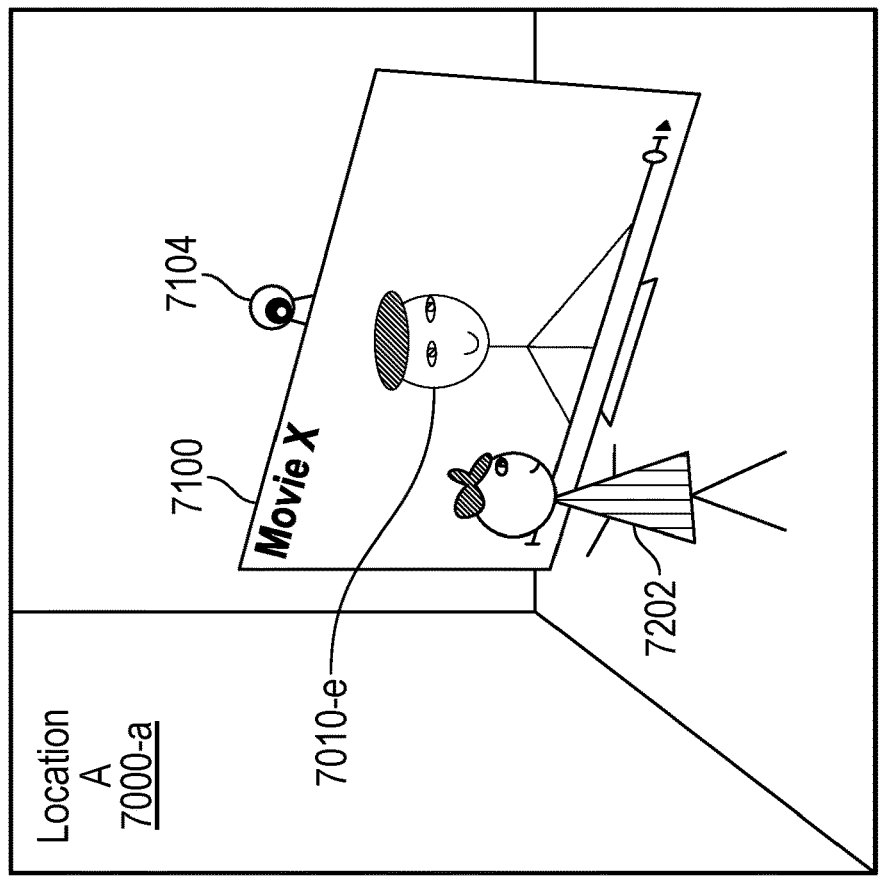

In some embodiments, the computing system is configured to display the CGR content 7002 with at least a first level of immersion, a second level of immersion, and a third level of immersion. In some embodiments, the computing system causes the CGR content displayed via the first display generation component to transition between the different levels of immersion in response to a sequence of one or more events (e.g., natural termination or progression of an application or experience; the start, stop, and/or pausing of an experience in response to a user input; changing the levels of immersion of an experience in response to a user input, a change in the state of the computing device, a change in external environment, etc.)). In some embodiments, the first, second, and third levels of immersion correspond to increasing amount of virtual content that is present in the CGR environment and/or decreasing amount of representations of the surrounding physical environment (e.g., representation of the location B or the portion of the physical environment in front of the display side of the second display generation component 7102) present in the CGR environment. In some embodiments, first, second, and third levels of immersion correspond to different modes of content display that have increasing image fidelity (e.g., increasing pixel resolution, increasing color resolution, increasing color saturation, increasing luminance, increasing opacity, increasing image details, etc.) and/or spatial extent (e.g., angular extent, spatial depth, etc.) for the computer-generated content, and/or decreasing image fidelity and/or spatial extent for representations of the surrounding physical environment (e.g., representation of the location B or the portion of the physical environment in front of the display side of the second display generation component). In some embodiments, the first level of immersion is a pass-through mode where the physical environment (e.g., the location B or the portion of the physical environment in front of the display side of the second display generation component) is fully visible to the first user through the first display generation component (e.g., as a camera view of the physical environment or through a transparent portion of the first display generation component)). In some embodiments, the CGR content presented in the pass-through mode includes the pass-through view of the physical environment with a minimal amount of virtual elements concurrently visible as the view of the physical environment or with only virtual elements that are peripheral (e.g., indicators and controls displayed in the peripheral region of the display) to the user's view of the physical environment. FIG. 7E illustrates an example of the first level of immersion associated with the CGR content 7002, in accordance with some embodiments. For example, a view of the physical environment (e.g., the portion of the physical environment in front of the display side of the second display generation component (e.g., also the portion of the physical environment in front of the first user)) occupies the central and majority region of the field of view provided by the first display generation component, and only a few controls (e.g., the title of the movie, the progress bar, playback control (e.g., play button), etc.) are displayed in the peripheral region of the field of view provided by the first display generation component. In some embodiments, the second level of immersion is a mixed reality mode where the pass-through view of the physical environment is augmented with virtual elements generated by the computing system, where the virtual elements occupy the central and/or majority region of the user's field of view (e.g., the virtual content is integrated with the physical environment in the view of the computer-generated environment). An example of the second-level of immersion associated with the CGR content 7002 is illustrated in FIGS. 7A-7C, in accordance with some embodiments. In some embodiments, the third level of immersion is a virtual reality mode in which that user's view of the physical environment is completely replaced or blocked by the view of virtual content provided by the first display generation component. FIG. 7D illustrates an example of the third level of immersion associated with the CGR content 7002, in accordance with some embodiments.

As shown in FIG. 7D following FIG. 7C, the computing system has switches from displaying the CGR content 7002 in the mixed reality mode to displaying the CGR content 7002 in a virtual reality mode (e.g., the movie X, shown as 7002-*d*) with no representation of the physical environment (e.g., location B including the second user 7204 (e.g., the portion of the physical environment that is in front of the display side of the second display generation component 7102)). In some embodiments, the switching performed by the computing system is in response to a request from the first user (e.g., a gesture input that meets preset criteria for changing the level of immersion of the CGR content (e.g., lifting the hands of the first user away from the HMD)). In conjunction with switching from displaying the CGR content 7002 in the mixed reality mode to displaying the CGR content 7002 in the virtual reality mode via the first display generation component 7100, the computing system changes the status information displayed via the second display generation component 7102. As shown in FIG. 7D, although the one or more graphical elements that indicate the CGR content 7002 (e.g., the title, progress bar 7004 (e.g., shown as 7004-*d* in FIG. 7D), and representation 7008 (e.g., shown as 7008-*d* in FIG. 7D)) are still displayed and continue to be updated in accordance with the changes in the CGR content 7002 (e.g., shown as 7002-*d* in FIG. 7D) shown by the first display generation component 7100, the representation 7006 of the portion of the first user (e.g., the first user's eyes or face) is no longer displayed by the second display generation component 7100. In some embodiments, instead of fully ceasing to display the representation of the portion of the first user, the computing system decreases visibility (e.g., reducing luminance, reducing color resolution, reducing opacity, reducing pixel resolution, etc.) of the representation of the portion of the first user relative to that of other status information (e.g., the representation of the CGR content, representation of metadata related to the CGR content or the user, etc.) on the second display generation component. In some embodiments, the representation 7006 of the portion of the first user is optionally displayed with a reduced visibility (e.g., not visible at all, or with reduced luminance, increased transparency, reduced opacity, reduced color saturation, increased blur level, etc.) relative to its previous appearance to indicate an increase in the level of immersion associated with the CGR content shown by the first display generation component. The other status information (e.g., representation 7008 of the CGR content and the progress bar 7004) is continuously or periodically updated in accordance with the changes in the CGR content 7002 shown by the first display generation component while such other status information remains displayed by the second display generation component 7102 (e.g., without reduction of visibility relative to its previous appearance unless the reduction is due to the change in appearance of the CGR content).

In some embodiments, the switching from the mixed reality mode to the virtual reality mode is triggered by the movement of the second user 7204 exiting the estimated field of view of that first user would have had when the first user's eyes were not blocked by the presence of the first and/or second display generation components. In some embodiments, the switching from the mixed reality mode to the virtual reality mode is triggered by the movement of the second user 7204 exiting the physical environment surrounding the first user (e.g., out of the room occupied by the first user). In some embodiments, the computing system ceases to display the representation of the physical environment (e.g., representation of location B (e.g., representation of the portion of the physical environment in front of the first user), etc.) when there is no other user present in the physical environment. In some embodiments, the movement of the second user 7204 entering into the estimated field of view that the first user would have when the first user's view of the location B were not blocked by the presence of the first and/or second display generation components, and/or into the physical environment surrounding the first user (e.g., into the room occupied by the first user), a predefined gesture performed by the second user (e.g., the second user waving at the first user), the second user moving into a threshold distance range of the first user, etc., are optionally used as conditions for trigging the switching from the virtual reality mode to the mixed reality mode. In some embodiments, in conjunction with switching the display mode from the virtual reality mode to the mixed reality mode, the computing system restores the level of visibility of the representation 7006 of the portion of the first user among the elements of the status information shown by the second display generation component 7102 (e.g., restores display of the representation of the portion of the first user if the representation was not visible, or increases luminance, color saturation, pixel resolution, opacity, and/or color resolution, etc. of the representation of the portion of the user, etc.). Correspondingly, in the mixed reality mode, the first display generation component (e.g., display 7100, the inner display of the HMD, etc.) displays, along with computer-generated virtual content (e.g., movie X), the representation (e.g., representation 7010) of the portion of the physical environment in front of the display side of the second display generation component (and correspondingly, in front of the first user, when the first display generation component and the second display generation component are enclosed back to back in the same housing of an HMD worn by the first user).

As shown in FIG. 7E (e.g., following FIG. 7C or FIG. 7D), the computing system has switched from displaying the CGR content in the mixed reality mode (e.g., as shown in FIGS. 7A-7C) or the virtual reality mode (e.g., as shown in FIG. 7D) to displaying the CGR content (e.g., CGR content 7002) in a complete pass-through mode or reality mode (e.g., the movie X is completed and not shown any more) with only a representation (e.g., shown as 7010-e in FIG. 7E) of the physical environment (e.g., location B including the second user 7204 (e.g., the portion of the physical environment that is in front of the display side of the second display generation component 7102)) and, optionally, with a minimal amount of virtual content (e.g., only indicators (e.g., title of the movie X, a progress bar, a playback control, etc.) and no playback content) on the peripheral region of the display (e.g., upper and lower edge of the display). In some embodiments, the switching of display mode is performed by the computing system in response to termination or pause of the playback of the CGR content, and/or a request from the first user (e.g., a gesture input that meets preset criteria for changing the level of immersion of the CGR content (e.g., putting a hand over the first user's eye brows, pulling down with pinched fingers on the side of the HMD, etc.)). In some embodiments, in conjunction with switching from displaying the CGR content in the mixed reality mode or virtual reality mode to displaying the CGR content in the full pass-through mode or reality mode via the first display generation component 7100, the computing system changes the status information displayed via the second display generation component 7102. As shown in FIG. 7E, the one or more graphical elements that indicate the appearance and state of the CGR content (e.g., the title, progress bar 7004 (e.g., shown as 7004-c in FIG. 7C, and 7004-d in FIG. 7D, etc.), and representation 7008 (e.g., shown as 7008-c in FIG. 7C, and 7008-d in FIG. 7D, etc.)) are no longer displayed by the second display generation component, and the representation 7006 of the portion of the first user (e.g., shown as 7006-e in FIG. 7E) is fully displayed with increased visibility (e.g., becoming visible if not previously visible, or displayed with increased luminance, decreased transparency, increased opacity, increased color saturation, increased pixel resolution, increased color resolution, reduced blur level, etc.) by the second display generation component. In some embodiments, the representation 7006 of the portion of the first user is optionally displayed with an increased visibility relative to its previous appearance to indicate a decrease in the level of immersion associated with the CGR content shown by the first display generation component. In some embodiments, the representation 7006 of the portion of the first user is continuously updated in accordance with the changes in the appearance of the first user 7202 while the representation 7006 of the portion of the first user is displayed by the second display generation component.

In some embodiments, the switching from the mixed reality mode or the virtual reality mode to the complete pass-through mode or reality mode is triggered by the movement of the second user 7204 into the estimated field of view that the first user would have when the first user's eyes were not blocked by the presence of the first and/or second display generation components. In some embodiments, the switching from the mixed reality mode or the virtual reality mode to the complete pass-through mode or reality mode is triggered by movement of the second user 7204 into a personal space within a threshold distance from the first user 7202 (e.g., within arm's length from the first user, within three feet from the first user, etc.). In some embodiments, the computing system entered into the complete pass-through mode or reality mode (e.g., ceasing to display the CGR content and only displays the representation of the physical environment (e.g., location B, the physical environment in front of the first user, etc.) via the first display generation component when a preset condition is met, e.g., when a preset person (e.g., a spouse, a teacher, a teammate, a child, etc.) enters the estimated field of view of the first user 7202. In some embodiments, movement of the second user 7204 exiting the estimated field of view the first user 7202, and/or existing the personal space within a threshold distance from the first user 7202, and/or other conditions are used to trigger automatic switching from the complete pass-through mode or reality mode back to the mixed reality mode or virtual reality mode (e.g., a preset mode or the previous mode). In some embodiments, in conjunction with switching the display mode from the complete pass-through mode to the virtual reality mode or the mixed reality mode, the computing system restores the level of visibility of the representation 7006 of the portion of the first user (e.g., ceasing to display completely or decreasing the visibility thereof without making it completely invisible, etc.) and the representation 7008 of the CGR content (e.g., increasing the visibility thereof) among the elements of the status information shown by the second display generation component 7102.

FIGS. 7C-7E illustrated the transition from the second level of immersion (e.g., mixed reality mode) down to the first level of immersion (e.g., pass-through mode) and up to the third level of immersion (e.g., virtual reality mode), and corresponding changes in information shown by the first display generation component 7100 and the information shown by the second display generation component 7102, in accordance with some embodiments. In some embodiments, direct transitions between any two of the three levels immersion are possible in response to different events that meet the respective criteria for such direct transitions. Correspondingly, the information displayed by the first display generation component and the information displayed by the second display generation component are updated (e.g., changing the visibility of different components of the information (e.g., the CGR content, the representation of the physical environment, the representation of the CGR content, the representation of the portion of the first user, the representation of the static metadata associated with the CGR content, etc.)) to reflect the current level of immersion by which the CGR content is displayed by the first display generation component 7100.

In some embodiments, as shown in FIG. 7E, the representation 7006 of the portion of the first user (e.g., the representation of the first user's face or eyes) is displayed without concurrent display of the representation of the CGR content (e.g., without the overlay of the diffused version of the CGR content, the title or progress bar, etc.) or with an increased visibility relative to the representation of the CGR content (e.g., visibility of the representation 7006 is increased relative to its previous level, the visibility of the representation of the CGR content is decreased relative to its own previous level, and/or some of the graphical elements for representing the CGR content are no longer displayed, etc.), as a result of the computing system switching from displaying the CGR content using the mixed reality mode to displaying the CGR content using the complete pass-through mode or reality mode.

In some embodiments, the representation 7006 of the portion of the first user (e.g., the representation of the first user's face or eyes) are displayed with the representation 7008 of the CGR content (e.g., with the overlay of the diffused version of the CGR content) (e.g., with comparable visibility relative to the representation 7008 of the CGR content (e.g., visibility of the representation 7006 and/or visibility of the representation 7008 increasing or decreasing relative to their respective previous levels)), as a result of the computing system switching from displaying the CGR content using the virtual reality mode or the pass-through mode to displaying the CGR content using the mixed reality mode.

In some embodiments, the representation 7006 of the portion of the first user (e.g., the representation of the first user's face or eyes) not displayed with the representation 7008 of the CGR content (e.g., not displayed with the diffused version of the CGR content) or displayed with a reduced visibility relative to the representation 7008 of the CGR content, when the computing system switches from displaying the CGR content using the mixed reality mode to displaying the CGR content using the virtual reality mode.

In some embodiments, the computing system is capable of displaying the CGR content using other special display modes, such as a private mode, a Do-Not-Disturb (DND) mode (DND mode), a parental control mode, etc. When one or more of these special display modes are turned on, the manner by which the status information is displayed and/or updated on the second display generation component is adjusted from the manner by which the status information is displayed and/or updated on the second display generation component when such special modes are not turned on (e.g., the manners as described above with respect to FIGS. 7A-7E).

For example, a private mode is optionally activated by the computing system or the first user to hide the status information associated with the CGR content that is currently displayed by the first display generation component, and/or status information associated with the first user's attention state. In some embodiments, while the private mode is turned on (e.g., in response to the first user's request), the representation 7006 of the portion of the first user and/or the representation 7008 of the CGR content are no longer updated, cease to be displayed, and/or are replaced with other placeholder content on the second display generation component, so that they no longer reflect the changes that are detected in the appearance of the portion of the first user and/or the changes are detected in the CGR content that is being displayed by the first display generation component. In some embodiments, the private mode is activated in response to a user request (e.g., a preset gesture input by the first user on the HMD, a preset voice command, etc.) that is detected by the computing system (e.g., when the computing system is using the mixed reality mode or the virtual reality mode to display CGR content to the first user, and/or before the CGR content is started, etc.). In some embodiments, the private mode is activated in response to the user accessing certain CGR content that is associated with a preset privacy level that is above a first threshold privacy level (e.g., a default privacy level, a privacy level associated with the first user, etc.). In some embodiments, while the privacy mode is turned on, the representation 7006 of the portion of the first user and/or the representation 7008 of the CGR content are no longer updated, cease to be displayed, and/or are replaced with other placeholder content, such that they no longer reflect the changes in the level of immersion by which the CGR content is displayed by the first display generation component. The private mode allows the first user to enjoy more privacy and share less information regarding his/her own attention state, level of immersion, and the content he/she is viewing using the first display generation component through the content displayed by second display generation component.

In some embodiments, the DND mode is turned on proactively by the first user, and/or automatically by the computing system based on preset conditions, to indicate to the outside environment that the first user does not wish to be interrupted or disturbed by others in the outside environment during his/her engagement with the CGR content. In some embodiments, the DND mode is optionally applicable to other intrusive events occurring within the computing system and/or in the surrounding environment. For example, in some embodiments, in response to activation of the DND mode, the computing system optionally activates noise cancellation to block sounds from the surrounding environment, stops/pauses presentation of notifications and/or alerts on the first display generation component, reduces intrusiveness of the manner by which notifications and/or alerts are presented in the CGR environment shown by the first display generation component (e.g., opting for visual alert rather than audio alert, opting for an short alert sound rather than a voice output, reducing visual prominence of the notification and alert, etc.), automatically transfers calls to voicemail without notifying the first user, and/or displays a do-not-disturb sign on the second display generation component, etc. In some embodiments, one or more ways that the computing system uses to reduce intrusiveness of events to the first user is accompanied by changes to how the representation of the physical environment (e.g., representation 7010, representation of location B, representation of the portion of the physical environment in front of the first user, etc.) is displayed on the first display generation component, and/or changes to how status information is displayed by the second display generation component. In some embodiments, the DND mode is optionally turned on while the computing system is displaying the CGR content using the mixed reality mode, or the virtual reality mode. In some embodiments, in response to the DND mode being turned on, the computing system optionally displays a visual indicator (e.g., text label "DND" on the outer display of the HMD, a red edge is lit around the outer display of the HMD, etc.) via the second display generation component to indicate that the DND mode is active. In some embodiments, while the DND mode is active on the computing system, the representation of the CGR content is optionally updated in accordance with the change in the CGR content displayed by the first display generation component, but the representation of the portion of the first user is no longer updated, is replaced by placeholder content, or ceases to be displayed by the second display generation component (e.g., irrespective of the changes in the appearance of the portion of the first user (e.g., changes in the first user's eyes) and/or changes in the level of immersion by which the CGR content is displayed by the first display generation component).

In some embodiments, the parental mode is turned on to override the normal display of status information by the second display generation component (e.g., as described with respect to FIGS. 7A-7E). The parental mode is turned on such that a parent, teacher, or supervisor is able to see and monitor the CGR content that is presented to the first user and optionally the inputs provided by the first user to change and/or interact with the CGR content. In some embodiments, the parental mode is optionally turned on by the second user (e.g., through a preset gesture input, a touch input on the second display generation component or the housing of the HMD, a voice command, etc.) while CGR content is being presented by the first display generation component. In some embodiments, the parental mode is optionally turned on (e.g., through interaction a user interface presented by the first display generation component, an interaction with a user interface presented by the second display generation component, an interaction with the housing or other input devices of the computing system, etc.) before particular CGR content is started on the first display generation component, and remains turned on while the particular CGR content is displayed by the first display generation component. In some embodiments, while the parental mode is turned on, the computing system displays the same CGR content via both the first display generation component and the second display generation component at the same time, irrespective of the changes in the level of immersion and/or whether private mode is turned on. In some embodiments, the computing system only displays the virtual content portion of the CGR content shown by the first display generation component on the second display generation component. In some embodiments, while the parental mode is turned on, the computing system does not display the representation 7006 of the portion of the first user as part of the status information shown using the second display generation component (e.g., if the parental mode is merely used to monitor the content shown to the first user, and not the first user himself/herself). In some embodiments, while the parental mode is turned on, the computing system displays the representation 7006 of the portion of the user and the CGR content with comparable visibility (e.g., the visibility of the representation 7006 is enhanced as compared to the previous level of visibility it had when the parental mode was not turned on) as the CGR content (e.g., if the parental mode is used to monitor the content shown to the first user, as well as the attention state and appearance of the first user). In some embodiments, whether the representation of the portion of the user is displayed by the second display generation component during the parental mode is determined in accordance with the manner by which the parental mode is activated (e.g., using a first type of input vs. using a second type of input, using a first control vs. using a second control, etc.). In some embodiments, whether the representation of the portion of the user is displayed by the second display generation component during the parental mode is determined in accordance with the whether the private mode is turned on. For example, if the private mode is turned on, the representation of the portion of the user is not displayed with the CGR content by the second display generation component; and if the private is not turned on, the representation of the portion of the user is displayed with the CGR content by the second display generation component. In some embodiments, while the parental mode is turned on, the change in the level of immersion by which the CGR content is displayed by the first display generation component does not alter the information shown by the second display generation component (e.g., the same CGR content is still shown on both the first display generation component and the second display generation component, optionally, with the current visibility level of the representation of the portion of the first user unchanged, or without display of the representation of the first user).

In some embodiments, the visibility and information density of the status information shown by the second display generation component is dynamically adjusted by the computing system in accordance with the distance of the second user present at a position that enables the second user to view the content shown by the second display generation component (e.g., directly or partially in front of the display side of the second display generation component). For example, when the second user moves closer (e.g., moving within a threshold distance, moving into a threshold viewing angle, etc.) to the display side of the second display generation component (e.g., moving closer to the first user and the first display generation component when the first display generation component and the second display generation component are placed back to back in the same housing of an HMD worn by the first user), the computing system changes (e.g., increases) the amount of information details (e.g., details of graphical features, amount of textual characters per unit display area, color resolution, pixel resolution, etc.) provided on the second display generation component to inform the second user of the state of the first user and of the state and metadata of the CGR content. Correspondingly, when the second user moves farther away (e.g., moving beyond a threshold distance, moving outside of a threshold viewing angle, etc.) from the display side of the second display generation component, the computing system changes the amount of information details provided on the second display generation component in the opposite direction (e.g., decreasing the amount of information details).

In some embodiments, the computing system, in response to detecting changes in the surrounding physical environment that meet preset criteria (e.g., people entering the room or getting to within a threshold distance of the first user, other users waving or making a gesture toward the first user, etc.), automatically transitions from displaying the computer-generated experience in a fully immersive mode (e.g., displaying a virtual reality environment, or displaying CGR content with the third level of immersion) to displaying the computer-generated experience in a less immersive mode (e.g., displaying indications of the physical environment (e.g., displaying outlines of people and objects in the physical environment as visual distortions, shadows, etc.) in the virtual reality environment, displaying a pass-through portion (e.g., camera view of the physical environment) in the view of the computer-generated environment, etc.). In some embodiments, in conjunction with automatically changing the level of immersion of the computer-generated environment displayed via the first display generation component, the computing system also changes the status information that is displayed via the second display generation component, including increasing a visibility of the visual representation of the portion of the user of the computing system (e.g., increasing visibility of the visual representation of the user includes switching from not displaying the visual representation of the portion of the user to displaying the visual representation of the portion of the user, or increasing the luminance, clarity, opacity, and/or resolution of the visual representation of the portion of the user). In this way, the visual barrier (e.g., the presence of the display generation components on the face of the first user) that separates the first user and others in the surrounding environment are reduced at the same time to promote more informed interactions between the first user and the surrounding users. In some embodiments, in the event that the computing system decreases the level of immersion for the content shown on the first display generation component in response to the action of the second user (e.g., in response to the second user waving at the first user, and/or in response to the second user moving too close to the first user, etc.), the computing system ceases to display representation of the CGR content or does not display representation of the CGR content, and only displays the representation of the portion of the first user (e.g., the first user's face or eyes) on the second display generation component (e.g., to let the second user know that the first user can see him/her through the first display generation component). In some embodiments, in the event that the computing system increases the level of immersion for the content shown on the first display generation component in response to the action of the second user (e.g., in response to the second user putting on an HMD, and/or in response to the second user walking away from the first user, etc.), the computing system redisplay representation of the CGR content and ceases to display (or reduces luminance, clarity, opacity, color and pixel resolution, etc. of) the representation of the portion of the first user (e.g., the first user's face or eyes) on the second display generation component.

More details regarding the user interfaces and operation modes of the computing system are provided with respect to FIGS. 7F-7Q, and FIGS. 8-13, and accompanying descriptions.

Figure 7F:
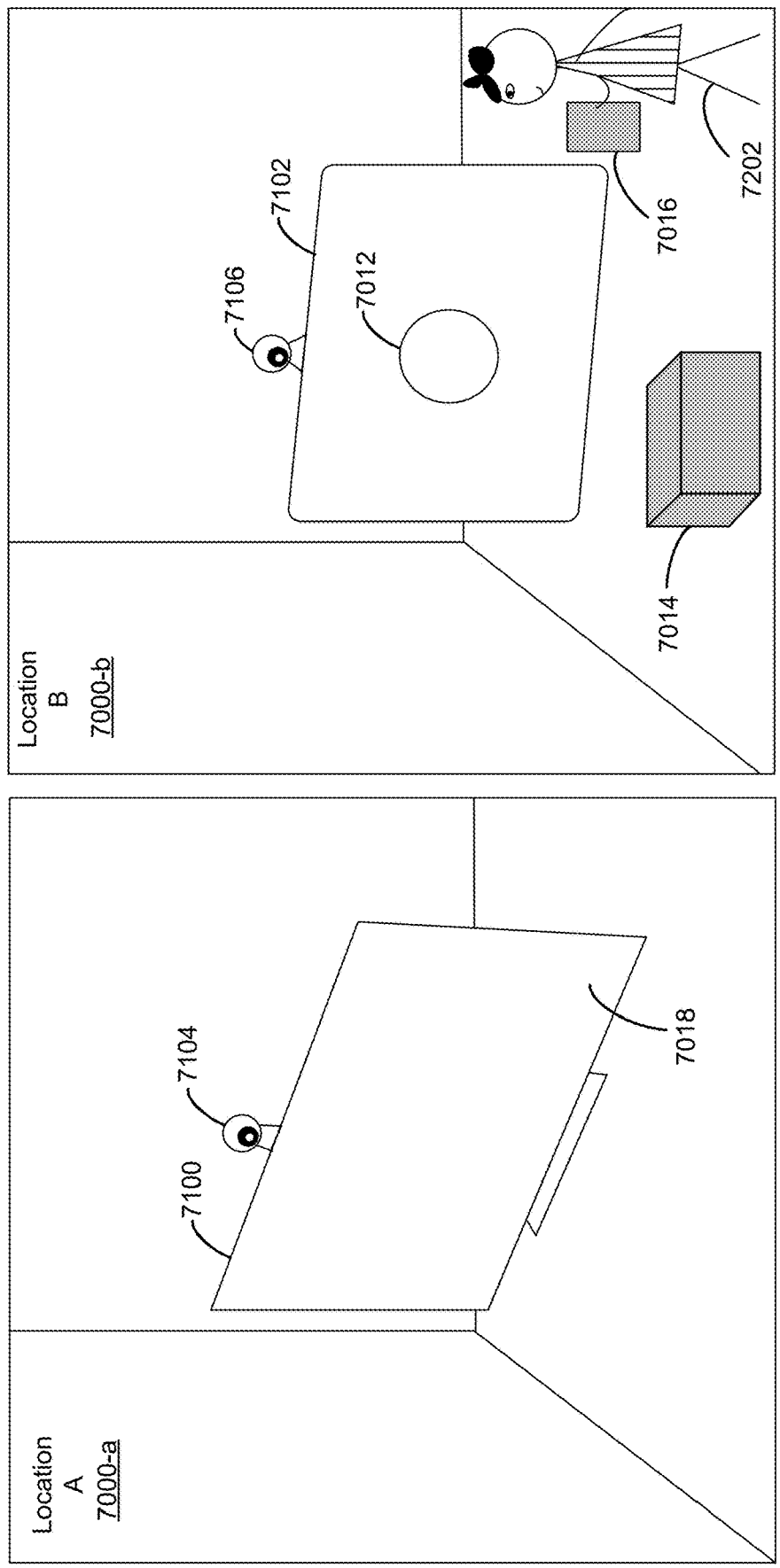
FIGS. 7F-7J illustrate a computing system that includes a first display generation component and a second display generation component (e.g., separate displays facing different directions, displays enclosed in the same housing but facing different directions (e.g., back to back facing opposite directions, facing different angles such that they cannot be viewed by the same user at the same time, etc.)). In some embodiments, the computing system displays indications of different computer-generated experiences via the second display generation component based on contextual information associated with the computing system (e.g., location of the first and second display generation components, identity of the user, current time, etc.), and triggering display of different computer-generated experiences corresponding to the contextual information via the first display generation component in response to a change in spatial relationship (e.g., from not facing the user's eyes to facing the user's eyes, from resting on the table or in a bag to being raise to the user's eye level, etc.) and/or wearing state of the first display generation component relative to a user (e.g., from being support by the user's hand to being supported by the user's head/nose/ears, from not being worn on the user's head/body to being worn on the user's head/body, etc.), in accordance with some embodiments. In some embodiments, the computing system only includes a single display generation component and/or does not display indications of available computer-generated experiences before being placed into the preset configuration relative to the user and starting displaying the different computer-generated experiences based on the wearing state of the display generation component.
Figure 7G:
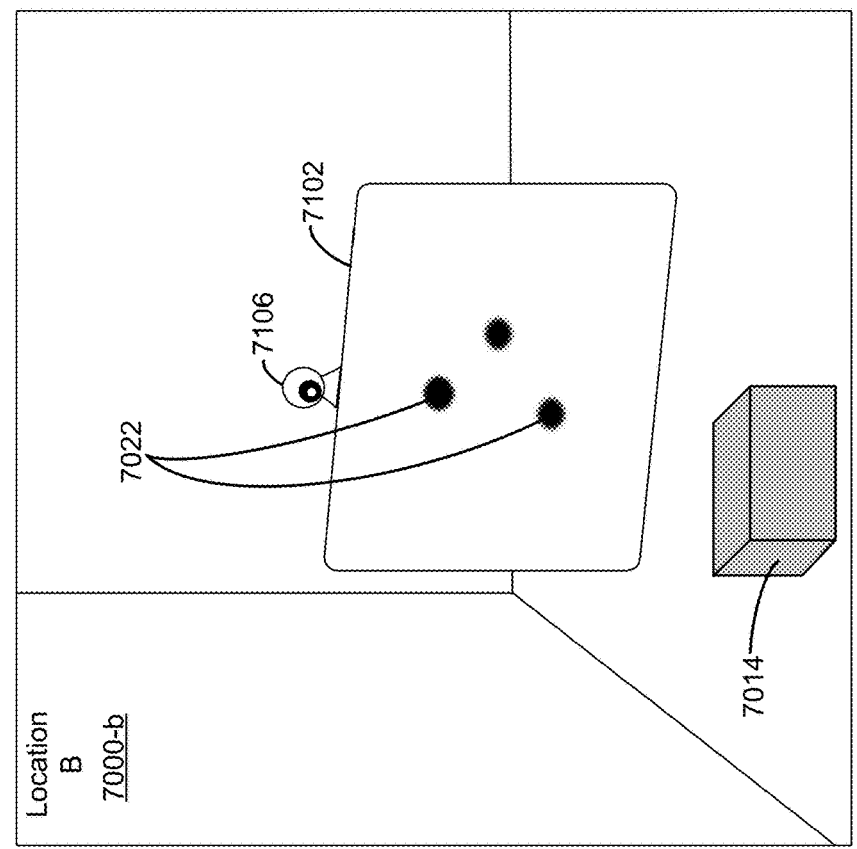
Figure 7G:
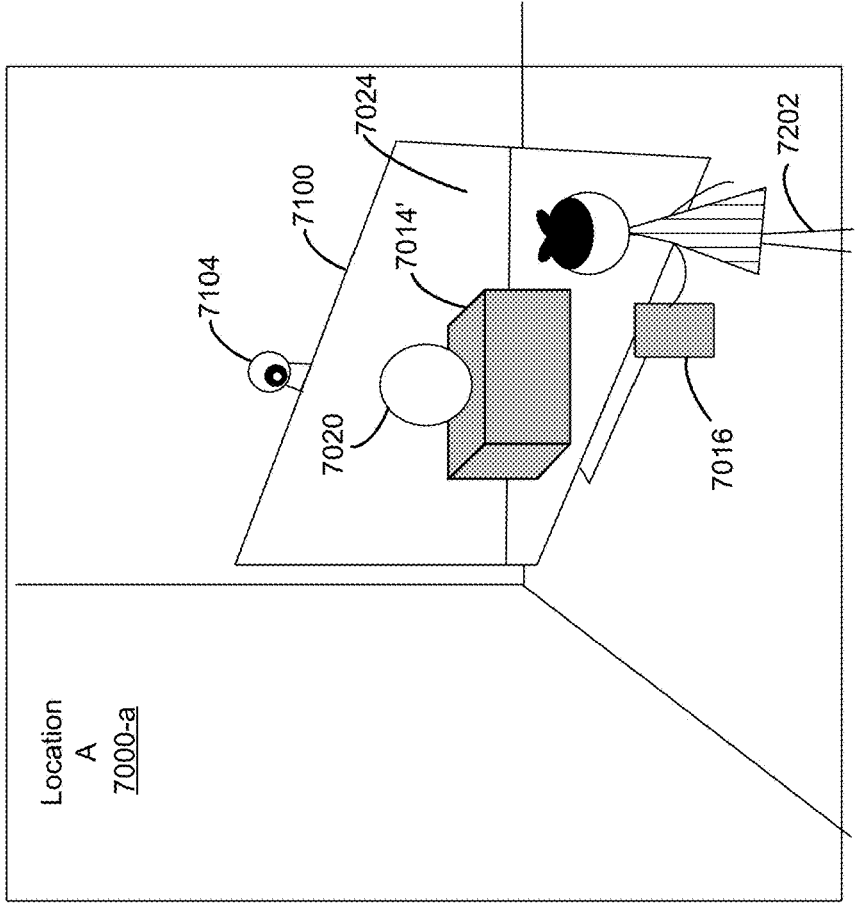
Figure 7H:
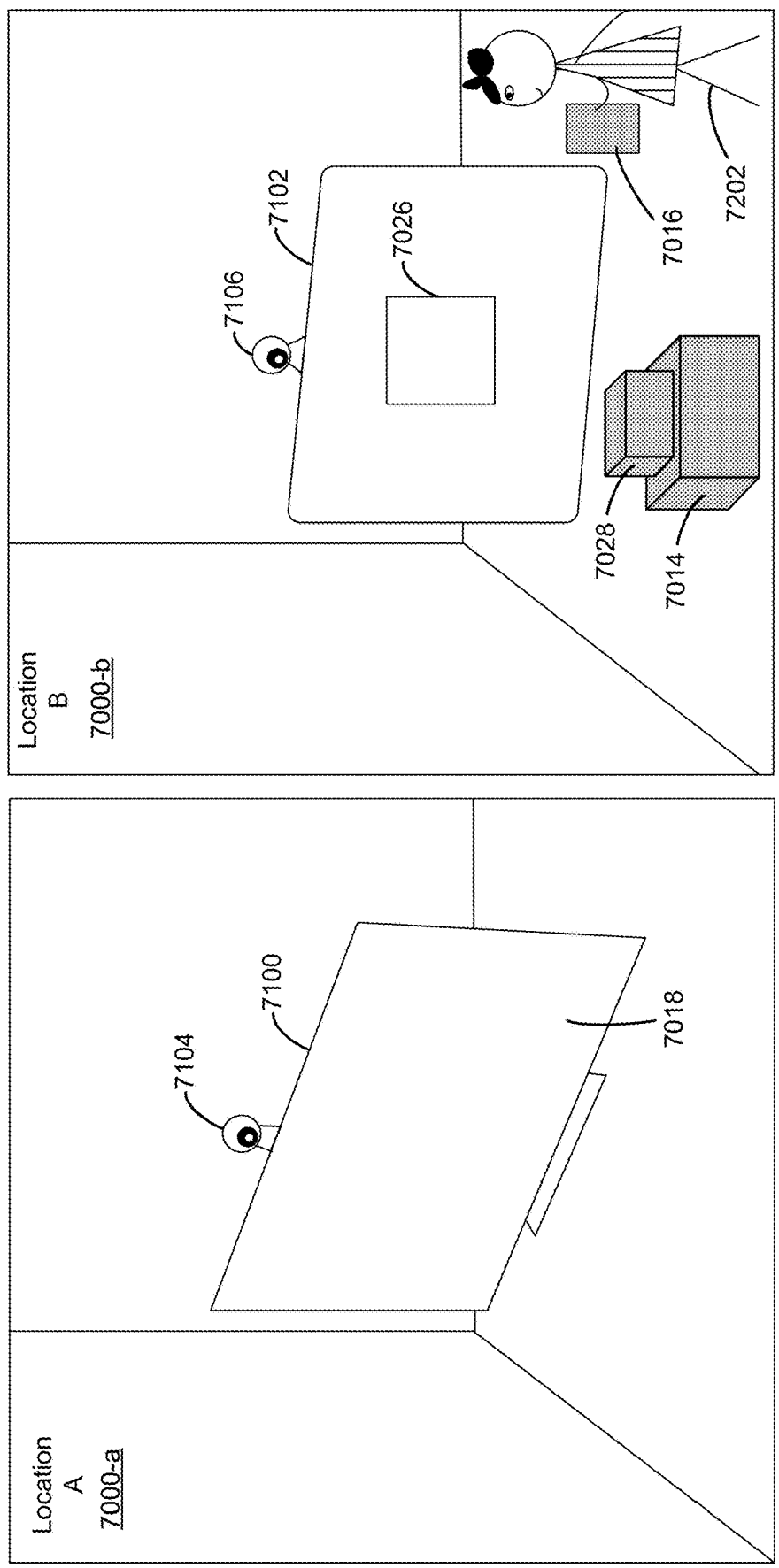
Figure 7I:
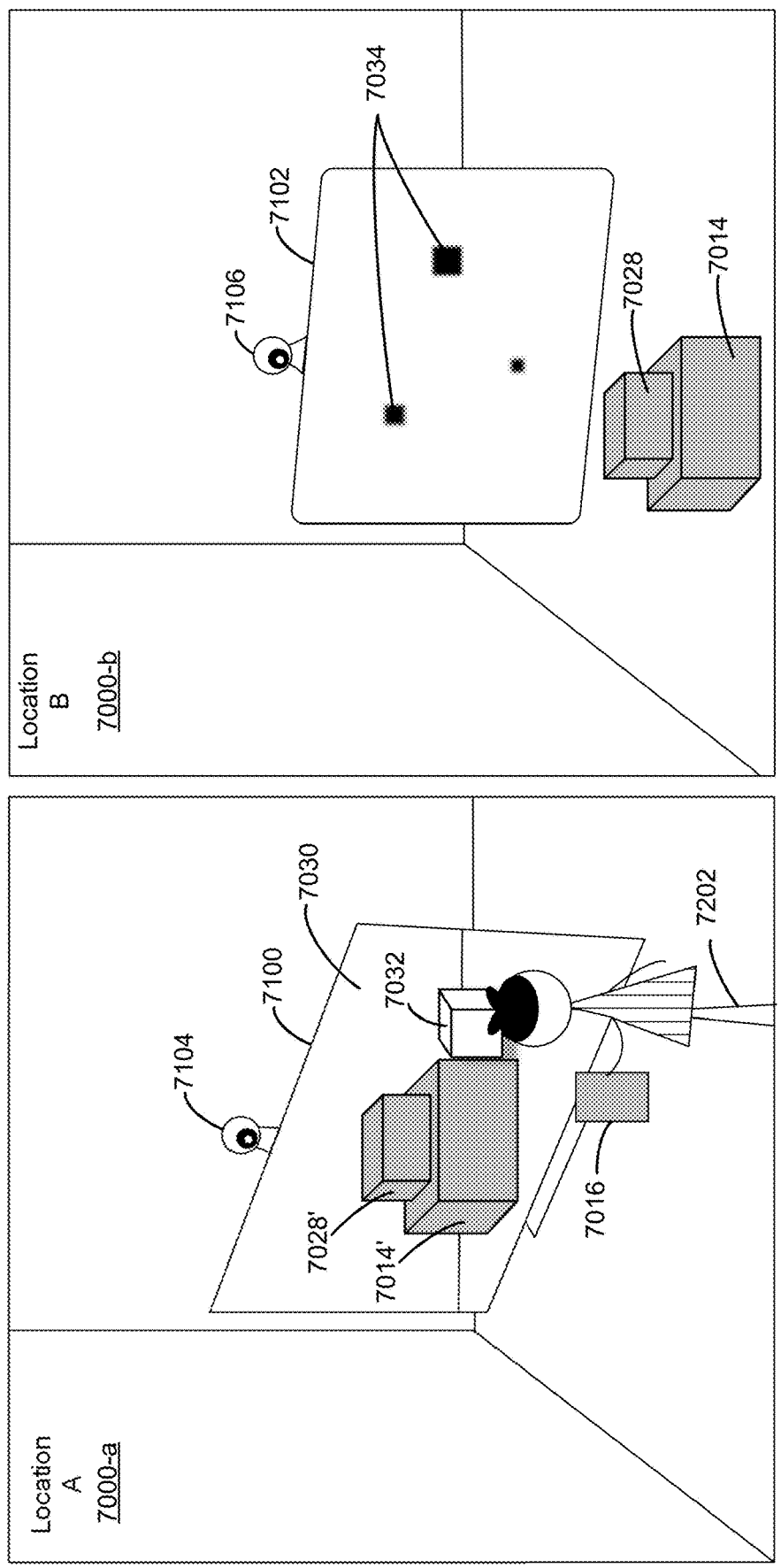

FIGS. 7F-7I illustrate a computing system (e.g., computing system 101 in FIG. 1 or computing system 140 in FIG. 4) that includes at least a first display generation component (e.g., display 7100, an inner display of an HMD, etc.) and a second display generation component (e.g., display 7102, an outer display of the HMD, etc.), where the first display generation component of the computing system is configured to display visual content (e.g., user interfaces, computer-generated experiences, media content, etc.) to a user (e.g., the first user 7202) when the computing system determines that the first display generation component has been placed in a predetermined spatial relationship (e.g., a predetermined orientation (e.g., with the display side facing the first user's face or eyes) relative to the user (e.g., the first user 7202) or a portion of the user (e.g., the first user's face or eyes)). In some embodiments, prior to displaying the visual content to the user via the first display generation component (e.g., display 7100, the inner display of the HMD, etc.), the computing system uses the second display generation component (e.g., display 7102, the outer display of the HMD, etc.) to display one or more user interface elements that prompt the user regarding the visual content (e.g., user interfaces, computer-generated experiences (e.g., AR content, VR content, etc.), media content, etc.) available to be displayed via the first display generation component if the conditions for triggering display of the content are met (e.g., the conditions regarding the spatial relationship between the first display generation component and the user). In some embodiments, the one or more user interface elements include user interface objects that convey contextual information (e.g., the present time, location, external condition, user identity, and/or under the present state of the computing system, or other prompts, notifications, etc.) based on which the available content is now made available for display via the first display generation component. FIGS. 7F-FG, and FIGS. 7H-7I illustrate two parallel examples to illustrate that different computer-generated experiences are displayed by the first display generation components, based on different states of the computing system as reflected by the different user interface objects shown by the second display generation components before the preset spatial relationship between the first display generation component and the user is satisfied.

As show in the respective left portions of FIGS. 7F and 7H, the first display generation component (e.g., display 7100) is present at location A 7000-a, with no user facing the display side of the first display generation component. As a result, the first display generation component is not displaying any CGR content at the moment. As shown in the respective right portions of FIGS. 7F and 7H, the second display generation component (e.g., display 7102) is present at location B 7000-b and displaying one or more user interface elements, respectively including a first user interface element (e.g., circle 7012) corresponding to a first computer-generated experience 7024 available to be displayed via the first display generation component given the current contextual state of the computing system illustrated in FIG. 7F, and a second user interface element (e.g., square 7026) corresponding to a second computer-generated experience 7030 available to be displayed via the first display generation component given the current contextual state of the computing system illustrated in FIG. 7H. The contextual states of the computing system are determined, for example, based on the current time, current location of the first display generation component (which is also the location of the first user and the second display generation component, in some embodiments), the user identity or authorization level of the first user 7202 present in front of display side of the second display generation component, receipt or generation of a notification for a respective application by the computing system, occurrence of preset events on the computing system, and/or other contextual information, etc.

In the example scenario illustrated in FIGS. 7F and 7H, the first user 7202 is shown to be present at location B 7000-b. The spatial relationship between the second display generation component (e.g., display 7102, the outer display of the HMD, etc.) and the first user 7202 is such that the first user 7202 is in a position to view the one or more user interface elements (e.g., the user interface element 7012 and the user interface element 7026, respectively) presented by the second display generation component, in some embodiments. For example, the first user 7202 is facing toward the display side of the second display generation component when the one or more user interface elements are displayed. In some embodiments, the second display generation component is the outer display of an HMD that also includes an inner display (e.g., the first display generation component represented by display 7100) that is configured to present the CGR content corresponding to the user interface elements shown on the outer display of the HMD. In such an embodiment, the spatial relationship represented by the co-presence of the display 7102 and the first user 7202 in the same location B 7000-b corresponds to the first user being in a portion of a physical environment (e.g., the physical environment that is also hosting the second display generation component and the first user 7202) toward which the outer display of the HMD is facing. In some embodiments, the second display generation component is positioned back to back with the first display generation component, such that the portion of the physical environment that is in front of display side of the second display generation component 7102 (e.g., the location B 7000-b that includes the display side of the second display generation component) is also within the pass-through view provided by the first display generation component. For example, the physical object 7014 (or both physical object 7014 and physical object 7028 in FIG. 7H) located in the portion of the physical environment in front of the display side of the second display generation component 7102 would be within a pass-through view provided by the first display generation component, if the first user 7202 moves to the display side of the first display generation component (e.g., moves to the location A 7000-a, and/or faces the display side of the first display generation component, etc.). In some embodiments, the computing system only displays the one or more user interface elements in response to detecting that the first user is in a position to view the content displayed by the second display generation component, and ceases to display the one or more user interface elements using the second display generation component when no user is located at a position relative to the second display generation component that allows the user to view the content presented by the second display generation component. In some embodiments, the computing system displays the one or more user interface elements in response to detecting an event that indicates availability of the first computer-generated experience based on the current state or context of the computing system (e.g., a time-based alert or location-based notification is generated on the computing system, the user took the HMD out of a bag, the user turns on the HMD, the user plug in the HMD on a charging station, etc.). In some embodiments, the computing system only discloses the one or more user interface objects on the second display generation component when the first display generation component is not displaying any CGR content (e.g., the first display generation component is not active, is in a power saving state, etc.). In some embodiments, the illustration in FIGS. 7F and 7H showing the first user 7202 not being co-present at location A with the first display generation component or in a position to view content displayed by the first display generation component corresponds to the first user not putting the inner display of the HMD in front of the user's face or eyes (e.g., either by raising the HMD up with the inner display facing his/her face, or by wearing the HMD on his/her head). In some embodiments, the one or more user interface objects are displayed on the second display generation component irrespective of whether the first user is in a position to view the content shown on the second display generation component.

As shown in FIG. 7G following FIG. 7F, and in FIG. 7I following FIG. 7H, while the computing system is displaying the one or more user interface objects (e.g., the circle 7012, or the square 7026, respectively) using the second display generation component, the computing system detects that the first display generation component (e.g., the display 7100 or the inner display of an HMD) is now in a preset spatial relationship relative to the first user 7202 (e.g., due to the movement of the first user 7202, the movement of the first display generation component, or both). In the example, shown in FIGS. 7F and 7G, the first user 7202 has moved to location A 7000-a in front of the display side of the first display generation component (e.g., display 7100, the inner display of the HMD, etc.); and in response to detecting that the first user has moved to location A 7000-a in front of the display side of the first display generation component, the computing system displays, via the first display generation component, a respective computer-generated experience (e.g., the first computer-generated experience 7024 or the second computer-generated experience 7030, respectively) corresponding to the one or more user interface objects previously shown on the second display generation component (e.g., the circle 7012, or the square 7026, respectively). For example, as shown in FIG. 7G, the computing system displays the first computer-generated experience 7024 in response to an event that indicates that a relative movement of the first display generation component and the first user that has placed the first display generation component and the first user (or the face or eyes of the first user) into the preset spatial relationship or configuration (e.g., the first user is facing the display side of the first display generation component, or the HMD is placed in front of the user's eyes, the HMD is placed on the user's head, etc.) while a first user interface object (e.g., the circle 7012) is displayed by the second display generation component (FIG. 7F). As shown in FIG. 7I, the computing system displays the second computer-generated experience 7030 in response to an event that indicates that a relative movement of the first display generation component and the first user that has placed the first display generation component and the first user (or the face or eyes of the first user) into the preset spatial relationship or configuration (e.g., the first user is facing the display side of the first display generation component, or the HMD is placed in front of the user's eyes, the HMD is placed on the user's head, etc.) while a second user interface object (e.g., the square 7026) is displayed by the second display generation component (FIG. 7H).

As shown in FIG. 7G following FIG. 7F, an example of the first computer-generated experience 7024 is an augmented reality experience showing a portion of the physical environment in front of the display side of the second display generation component (e.g., the portion of the physical environment in front of the outer display of the HMD, which is also the portion of the physical environment in front of the first user wearing the HMD and/or facing the inner display of the HMD). The first computer-generated experience optionally includes a representation 7014' of the physical object 7014, augmented with some virtual content (e.g., a virtual ball 7020 sitting on top of the representation 7014' of the physical object 7014, and/or some other virtual objects). In some embodiments, the first computer-generated experience is a pure virtual experience, and does not include representation of the physical environment surrounding the first display generation component and/or the second display generation component.

As shown in FIG. 7I following FIG. 7H, an example of the second computer-generated experience 7030 is an augmented reality experience showing a portion of the physical environment in front of the display side of the second display generation component (e.g., the portion of the physical environment in front of the outer display of the HMD, which is also the portion of the physical environment in front of the first user wearing the HMD and/or facing the inner display of the HMD). The second computer-generated experience optionally includes the physical object 7014 and the physical object 7028 stacked together, augmented with some virtual content (e.g., a virtual box 7032 sitting next to the representations 7014' and 7028' of the physical objects 7014 and 7028, or some other virtual objects). In some embodiments, the second computer-generated experience is a pure virtual experience, and does not include representation of the physical environment surrounding the first display generation component and/or the second display generation component.

In some embodiments, as set forth earlier in this disclosure, the first display generation component is the inner display of an HMD and the second display generation component is the outer display of the HMD, and the spatial relationship represented by the co-presence of the display 7100 and the first user 7202 in the same location A 7000-a corresponds to the first user wearing or holding the HMD with the inner display of the HMD facing toward the user's eyes or face. In some embodiments, the first display generation component displays a camera view of the physical environment in front of the first user or includes a transparent or semi-transparent portion through which a portion of the physical environment in front of the first user is visible to the first user. In some embodiments, the physical environment that is made visible to the first user through the first display generation component is the portion of the physical environment that is in front of the display side of the second display generation component (e.g., the location B 7000-*b* that includes the region in front of the display side of the second display generation component and the physical object 7014 (and optionally physical object 7028), the region in front of the outer display of the HMD, etc.). In some embodiments, the computing system requires the first display generation component to be moved to a predefined orientation relative to the first user or a respective portion of the first user (e.g., the inner display of the HMD be orientated to face the user's eyes or face, the first user moving to face the display side of the first display generation component, and/or the inner display of the HMD is upright relative to the user's face, etc.) in order to trigger display of the computer-generated experience via the first display generation component. In some embodiments, the respective computer-generated experience is selected according to the current state of the computing system (e.g., one or more states determined based on the contextual information (e.g., time, location, what physical object is present in front of the user, the identity of the user, new notifications or alerts generated on the computing system, etc.) and/or which user interface element(s) (e.g., one or more of user interface elements conveying the identity and characteristics of the selected computer-generated experience and/or user interface elements conveying the contextual information used to selected computer-generated experience, etc.) are displayed by the second display generation component when the movement into preset spatial relationship between the user and the first display generation component is started and/or completed. In the examples shown in FIGS. 7F and 7G, the current state of the computing system is determined based on the current location of the display generation component(s) and/or the physical object(s) that are present in front of the display side of the second display generation component (and optionally also the current location and the physical objects that are present in front of the outer display of the HMD housing both the first display generation component and the second display generation component).

As set forth above with respect to FIGS. 7A-7E, and will be reiterated here, although the first display generation component (e.g., display 7100) and the second display generation component (e.g., display 7102) are shown in FIGS. 7F-7I as being located in two separate and disjoint portions of a physical environment, it is to be understood that the first display generation component and the second display generation component are optionally two display generation components that are contained in the same housing (e.g., a housing of a single HMD) or attached to the same support structure (e.g., attached back to back with each other or on two sides of a single wall or surface), and facing different directions (e.g., facing opposite directions, facing different angles, etc.). The user may move (e.g., rotate, turn, or flip vertically or horizontally) the housing or support structure of the first display generation component and the second display generation component to move the first display generation component into the preset spatial configuration relative to him/herself or his/her face or eyes, in accordance with some embodiments. The user may insert his/her head into the housing of the display generation components, or attach the support structure of the display generation components onto a part of his/her body (e.g., head, shoulders, nose, ears, etc.), to move the first display generation component into the preset spatial configuration relative to him/herself or his/her face or eyes, in accordance with some embodiments. As such, co-presence of the first user and the second display generation component at location B 7000-*b* and co-presence of the first user the first display generation component at location A 7000-*a* respectively represent a first time before the preset spatial relationship between the user and the first display generation component for triggering display of the computer-generated experience is satisfied and the second display generation component is displaying user interface elements showing the available CGR experience, and a second time after the preset spatial relationship is satisfied due to movement of the user and/or the display generation component(s) and when the available CGR experience is displayed via the first display generation component.

In some embodiments, the second display generation component is a low resolution, smaller, simpler, mono-stereoscopic, mono-chromatic, low power, and/or secondary display, while the first display generation component is a higher resolution, bigger, more complex, stereoscopic, full-color, full power, and/or primary display of the computing system. In some embodiments, the second display generation component is used by the computing system to display status information, event information, state information related to the computing system, in particular, notifications and prompts for the user to place the first display generation component into a preset spatial relationship relative to the user's eyes to view additional available content related to the current context. In some embodiments, the second display generation component is used by the computing system when the first display generation component is not placed in front of the user's eyes (or more generally, not in a position for the user to fully enjoy the CGR content displayed on the first display generation component), and/or when the display generation components of the computing system (e.g., as parts of a single HMD) are placed on the desk, in the user's hands, in a container (e.g., a backpack, a holder, a case, etc.), or in a standby state (e.g., plugged in a charging station, set in a low power mode, etc.), etc. In some embodiments, while displaying information using the second display generation component, the computing system continues to monitor the spatial relationship between the user (e.g., the first user, or any user) and the first display generation component (e.g., using sensors (e.g., motion sensors, orientation sensors, image sensors, touch-sensors, etc.) attached to or enclosed in the housing of the first display generation component, and/or external sensors (e.g., motion sensors, orientation sensors, image sensors, etc.)). In some embodiments, in response to detecting relative movement between the first display generation component and the user (e.g., in response to the user picking up the display generation components enclosed in the same housing or attached to the same support structure and turning the display side of the first display generation component toward the user's eyes or face, and/or in response to the user putting the HMD including the first and second display generation components on his/her head, etc.), in accordance with a determination that the preset spatial relationship between the user and the first display generation component is met, the computing system displays the computer-generated experience corresponding to the state of the computing system at the time when the preset spatial relationship is met (e.g., optionally, this is the same state that computing system had at the time when the information (e.g., the one or more user interface objects indicating availability of the computer-generated experience) was being displayed by the second display generation component at the start of the relative movement).

In some embodiments, as shown in FIGS. 7G and 7I, when the computing system is displaying the respective computer-generated experience corresponding to the current context (e.g., the respective states of the computing system as indicated by the user interface objects 7012 and 7026 in FIGS. 7F and 7H) via the first display generation component, the computing system optionally displays the status information (e.g., status information 7022 and 7034, respectively) using the second display generation component. In some embodiments, the displayed status information conveys information regarding the computer-generated content that is displayed via the first display generation component, and optionally, the state of the user (e.g., the appearance of the face or eyes of the user) that is viewing the computer-generated content via the first display generation component. Other aspects and details related to the display of status information using the second display generation component while the computing system is displaying computer-generated content using the first display generation component are described with respect to FIGS. 7A-7E, and accompanying descriptions, as well as the processes described with respect to FIGS. 8-13. In some embodiments, the second display generation component ceases to display any content (e.g., the user interface elements 7012 or 7026, etc.) once the first display generation component starts to display content and/ or once the preset spatial relationship between the user and the first display generation component is met. In some embodiments, the computing system does not display status information or any other content when displaying a computer-generated experience using the first display generation component. In some embodiments, the computing system displays other information (e.g., a digital clock, a weather forecast, a count-down timer based on the duration of the computer-generated experience or the time allotted for the first user to use the first display generation component, etc.) using the second display generation component when displaying the computer-generated experience using the first display generation component.

In some embodiments, the respective computer-generated experience displayed via the first display generation component is a mixed reality experience in which virtual content is concurrently visible with a representations of a physical environment (e.g., the location B, the portion of the physical environment that is in front of the first user, etc.). In some embodiments, the representation of the physical environment includes a camera view of the portion of the physical environment that would be within the first user's field of view if the user's eyes were not blocked by the presence of the first display generation component and the second display generation component (e.g., if the first user were not wearing the HMD or holding the HMD in front of his/her eyes). In the mixed reality mode, CGR content (e.g., a movie, a three-dimensional augmented reality environment, user interfaces, and/or virtual objects, etc.) is displayed to overlay or replace at least a portion of, but not all of, the representation of the physical environment. In some embodiments, the first display generation component includes a transparent portion through which a portion of the physical environment is visible to the first user, and in the mixed reality mode, CGR content (e.g., a movie, a three-dimensional augmented reality environment, user interfaces, virtual objects, etc.) is projected onto the physical surfaces or empty space in the physical environment and is visible through the transparent portion together with the physical environment. In some embodiments, CGR content is displayed on a portion of the display and blocks the view of at least a portion of, but not all of, the physical environment visible through the transparent or semi-transparent portion of the first display generation component. In some embodiments, the first display generation component 7100 does not provide a view of a physical environment, and provides a completely virtual environment (e.g., no camera view or transparent pass-through portion) that is augmented with real-time visual representation(s) (e.g., a stylized representation or segmented camera images) of the physical environment as presently captured by one or more sensors (e.g., cameras, motion sensors, other posture sensors, etc.). In some embodiments, in the mixed-reality mode (e.g., augmented reality based on camera view or transparent display, or augmented virtuality based on virtualized representation of the physical environment), the first user is not fully immersed in the computer-generated environment, and is still provided with sensory information (e.g., visual, audio, etc.) that directly corresponds to the physical environment surrounding the first user and the first display generation component. In some embodiments, while the first display generation component is displaying a completely immersive environment, the second display generation component optionally displays status information without information regarding the state of the user's eyes (e.g., only status information regarding the CGR content) or without displaying any status information at all.

In some embodiments, the computing system optionally has any number of different states that correspond to availability of different computer-generated experiences for display via the first display generation component. Each different state of the computing system optionally has a corresponding set of one or more user interface elements that are displayed by the second display generation component when the computing system enters into and/or remains in that state. Each different state of the computing system is optionally triggered by a corresponding event or set of events and/or satisfaction of a corresponding set of one or more preset criteria. Although only two states of the computing system, two user interface objects corresponding to the two states, and two different computer-generated experiences are shown in the examples described with respect to FIGS. 7F-7I, a third state, a third user interface element, and a third computer-generated experience are optionally implemented by the computing system in a manner analogous to that described with respect to the two states, user interface elements, and computer-generated experiences described in the examples. In some embodiments, any finite number of states, user interface elements, and computer-generated experiences are optionally implemented.

In some embodiments, the computer-generated experiences provided by the first display generation component is an immersive experience (e.g., an AR or VR experience) and takes into account of the actions (e.g., gestures, movement, speech, and/or gaze, etc.) of the first user in the physical environment. For example, when the user's hands moves in the physical environment or when the user moves (e.g., turns or walks) in the physical environment, the user interface and/or the user's view of a computer-generated three-dimensional environment are updated to reflect movement of the user's hand (e.g., pushing open a virtual window in an AR environment, activating a user interface element in a home screen or menu presented in an AR environment, etc.)

or movement of the user (e.g., the user's viewpoint moves relative to the AR environment or a virtual three-dimensional game world, etc.).

In some embodiments, the different computer-generated experiences (e.g., the first computer-generated experience, the second computer-generated experience, etc.) are AR experiences including representations of the same physical environment but different virtual elements selected based on the state of the computing system (e.g., as indicated by the one or more user interface elements displayed by the second display generation component (e.g., the circle 7012, the square 7026, etc.)). For example, in some embodiments, the computer-generated experiences optionally include a view of the same room that the first user is located in. In accordance with a determination that the computing system displayed a respective one of several different event reminders on the second display generation component right before the user placed the display side of the first display generation component in front of his/her eyes, the computing system displays a representation of the room with a respective one of several different themed virtual wallpapers on the representations of the walls of the room while displaying a respective introductory video for an event corresponding to the respective event reminder.

In some embodiments, the different computer-generated experiences are either augmented reality experiences or virtual experiences, depending on the context (e.g., the state of the computing system, as determined based on relevant context information (e.g., location, time, user identity, receipt of notification or alert, etc.) and/or what's shown on the second display generation component). In some embodiments, after a computer-generated experience is started in one mode of the AR and VR modes, the experience may be transitioned into the other mode of the AR and VR modes (e.g., in response to a user request, in response to other preset conditions being met, etc.).

In some embodiments, the computing system is configured to display respective user interfaces and/or user interface objects of various applications using the second display generation component based on the state of the computing system. For example, in some embodiments, the one or more user interface elements displayed on the second display generation component include elements of an electronic calendar (e.g., a social calendar, a work calendar, a daily planner, a weekly planner, a monthly planner, a standard calendar showing dates and weeks by months, etc.) with scheduled events, appointments, holidays, and/or reminders, etc. In some embodiments, the computing system displays different computing generated experiences via the first display generation component when the preset spatial configuration between the first display generation component and the first user (e.g., the first user or his eyes are in facing the display side of the first display generation component, the first user is in a position that enables him/her to view content displayed by the first display generation component, etc.) is satisfied, where the particular computer-generated experience that is displayed is based on what calendar content was shown on the second display generation component right before the movement that put the first display generation component and the first user into the preset spatial configuration is started and/or completed. For example, in accordance with a determination that the one or more user interface elements shown on the second display generation component correspond to a first calendar event (e.g., the user interface elements show the event information, alert, notification, calendar data, notes, etc. for the first calendar event), the computing system displays a first computer-generated experience (e.g., detailed and/or interactive information (e.g., preview, videos, models of venue and attendees, etc.)) corresponding to the first calendar event. In accordance with a determination that the one or more user interface elements shown on the second display generation component correspond to a second calendar event (e.g., the user interface elements show the event information, alert, notification, calendar data, notes, etc. for the second calendar event), the computing system displays a second computer-generated experience (e.g., detailed and/or interactive information (e.g., preview, videos, models of venue and attendees, etc.)) corresponding to the second calendar event. In some embodiments, when a two-sided HMD is not being worn by a user (e.g., is placed on a desk with the outer display facing the user), the outer display of the HMD is used to display a calendar, including the current date, time, weather information, geographic location, and/or a listing of tasks or scheduled appointments for the day or that are coming up in a preset period of time (e.g., in the next two hours, in the next five minutes, etc.). When the user picks up the HMD and put the inner display of the HMD in front of his/her eyes (e.g., by holding the HMD up or by putting the HMD on his/her head, etc.), the inner display of the HMD displays the details of the calendar (e.g., showing a more complete calendar including the current week or the current month, showing all scheduled events of the day, showing more details of the event that is coming up next, etc.). In some embodiments, the one or more user interface elements corresponding to the first calendar event include a notification for the first calendar event, and the user interface elements corresponding to the second calendar event is a notification for the second calendar event.

In some embodiments, the computing system displays media objects, such as photos, and/or video clips with two-dimensional images, using the second display generation component, and uses the first display generation component to display three-dimensional experiences or full-length media content corresponding to the media objects displayed on the second display generation component. For example, the user interface elements shown on the second display generation component optionally include a snapshot or a clip from a long video, a reduced resolution or two-dimensional version of a three-dimensional video, a non-interactive user interface corresponding to an interactive computer environment, etc.; and the first display generation component displays the long video, the three-dimensional video, the interactive computer environment, etc., when the criteria for triggering display of such extended content have been met (e.g., when the first display generation component and the first user have been placed into the preset spatial configuration, and optionally, other conditions (e.g., the user has sat down, there is enough power in the HMD, etc.)). In some embodiments, when the two-sided HMD is not being worn by a user (e.g., is placed on a desk with the outer display facing the user), the outer display of the UND is used to display a visual representation of an available media item that can be displayed via the inner display of the HMD. In some embodiments, the available media item is changed depending on the current location of the HMD, and/or the media item's availability specified by a provider of the media item, etc. When the user picks up the HMD and put the inner display in front of his/her eyes, the first display generation component displays the actual content of the media item (e.g., showing a more complete movie, a more immersive experience, and/or enabling more interactive capabilities of the media item, etc.).

In some embodiments, the computing system uses the second display generation component to display an alert of an incoming communication request (e.g., an incoming telephone call, an audio/video chat request, a video conference request, etc.), and the computing system uses the first display generation component to display a corresponding communication environment once the first display generation component is placed into the preset physical configuration relative to the first user (e.g., by movement of the first user, the first display generation component, or both). In some embodiments, the communication environment displayed via the first display generation component shows a simulated environment in which a virtual avatar or image of each participant is present (e.g., the avatars are sitting around a representation of a table that is in front of the first user, or as talking heads on the table surface in front of the first user, etc.). In some embodiments, the computing system, in response to detecting placement of the first display generation component into the preset physical configuration relative to the first user, accepts the incoming communication request and starts a corresponding communication session (e.g., using the first display generation component and other components of the computing system). In some embodiments, the computing system, in response to detecting placement of the first display generation component into the preset physical configuration relative to the first user, starts an application that corresponds to the incoming communication request and displays (e.g., using the first display generation component) a user interface of the application from which the first user can select to accept the incoming communication request. In some embodiments, when the two-sided HMD is not being worn by a user (e.g., is placed on a desk with the outer display facing the user), the outer display of the HMD is used to display a notification for an incoming communication request when such request is received by the computing system. In some embodiments, the notification provides an indication of the identity of the caller and the type of communication session that is requested. When the user picks up the HMD and put the inner display of the HMD in front of his/her eyes (e.g., by raising the HMD using his/her hand, or by wearing the HMD on his/her head, etc.), the inner display of the HMD displays the communication interface corresponding to the communication request that has been received, and the user can start communicating with the caller using the inner display of the HMD. In some embodiments, the computing system starts different applications (or starts different modes of the same application) depending on the characteristics of the incoming communication request (e.g., identity of the requester, time of day, subject matter of the call, etc.). For example, for an incoming request from a coworker, the computing system displays on the first display generation component a user interface that waits for a preset input from the first user before starting the communication session; and for an incoming request from a family member, the computing system starts the communication session without displaying the user interface and/or requiring the preset input from the first user. In another example, for an incoming request that arrived at the user's home, the computing system starts the communication session with an avatar of the first user in casual attire; and for an incoming request that arrived at the user's office, the computing system starts the communication session with an avatar of the first user in business attire. In another example, for an incoming request for a telephone call, the computing system displays a close-up talking head representation for each participant; and for an incoming request for a video chat, the computing system displays full-body representations of each participant that shows the actual physical motions of the participants. In some embodiments, the one or more user interface elements shown on the second display generation component visually indicate the particular characteristics of the incoming communication requests that are used by the computing system to determine the characteristics of the computer-generated experience (e.g., the characteristics of the user interface or environment of the communication session). In some embodiments, the selected characteristics of the computer-generated experience are also visually represented by the one or more user interface elements shown by the second display generation component, before the computer-generated experience is displayed by the first display generation component. In some embodiments, the computing system modifies the characteristics of the computer-generated experience in accordance with user input (e.g., touch-gestures on the second display generation component, touch gestures on the housing of the first and/or second display generation component, in-air gestures, voice commands, etc.) that is received prior to displaying the computer-generated experience using the first display generation component.

In some embodiments, the computing system modifies the content (e.g., the one or more user interface elements) displayed on the second display generation component depending on various parameters (e.g., distance of the user, identity of the user, gesture of the user, etc.). For example, in accordance with detecting the first user at a first distance away from the second display generation component (e.g., the first distance is smaller than a first threshold distance, but greater than a second threshold distance), the computing system displays a first version of the one or more user interface elements (e.g., large simple icons or text) to indicate availability of a respective computer-generated experience; and in accordance with detecting the first user at a second distance away from the second display generation component (e.g., the second distance is smaller than the second threshold distance), the computing system displays a second version of the one or more user interface elements (e.g., graphics, more details, etc.) to indicate the availability of the respective computer-generated experience (e.g., replacing display of the first version of the one or more user interface elements when the first user moved closer to the second display generation component). In another example, in accordance with detecting a user within a threshold distance of the second display generation component, the computing system displays a generic version of the one or more user interface elements (e.g., large simple icons or text) to indicate availability of a respective computer-generated experience; and in accordance with detecting an identity of the user (e.g., in response to detecting a fingerprint of the user when the picks up the first/second display generation component (e.g., the HMD), or in response to the user moving closer to the second display generation component, etc.), the computing system displays a user-specific version of the one or more user interface elements (e.g., customized based on the user's preferences, usage history, demographics, etc.) corresponding to the user's identity.

In some embodiments, the computing system displays a user interface including selectable options (e.g., the one or more user interface elements, and/or user interface objects other than the one or more user interface elements) prior to detecting the first display generation component being placed into the preset physical configuration relative to the first user, and detects user input selecting one or more of the selectable options, where the selectable options include preferences for customizing the computer-generated experience corresponding to the one or more user interface elements that is available to be displayed via the first display generation component. When the first display generation component is placed into the preset physical configuration relative to the first user, the computing system displays the computer-generated experience that is customized based on the user-selected option(s). In some embodiments, the selectable options correspond to a set of two or more modes of the computing system (e.g., AR mode, VR mode, 2D mode, private mode, parental-control mode, DND mode, etc.) in which the computer-generated experience can be presented via the first display generation component.

In some embodiments, the one or more user interface elements displayed by the second display generation component include a preview of a three-dimensional experience that is available to be displayed by the first display generation component. In some embodiments, the preview provided by the second display generation component is a three-dimensional preview that simulates a viewport into the three-dimensional experience. The user can move his head relative to the second display generation component, and see different portions of the three-dimensional environment represented in the three-dimensional experience. In some embodiments, the preview is started when the user picks up the second display generation component (e.g., picks up the two-sided HMD), and/or puts the second display generation component into a preset spatial configuration relative to the first user (e.g., holds the HMD with the outer display facing toward the user's eyes). In some embodiments, after the preview is started on the first display generation component, in response to detecting the user putting the first display generation component into the preset spatial relationship with the first user (e.g., the user holds the HMD with the inner display facing toward the user's face or eyes, the user puts the HMD on the user's head, etc.), the computing system starts the computer-generated experience on the first display generation component.

Figure 7J:
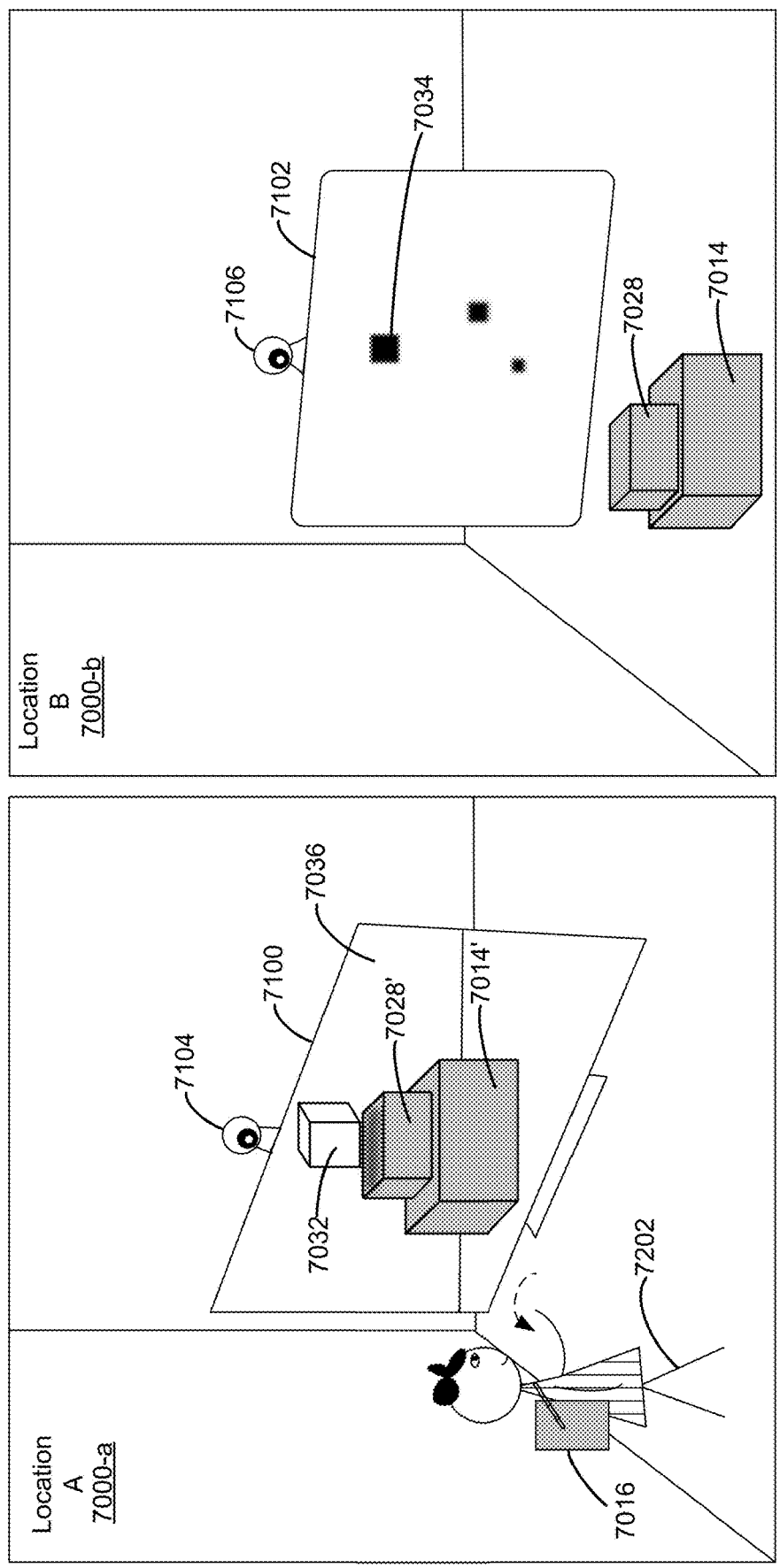
Figure 7K:
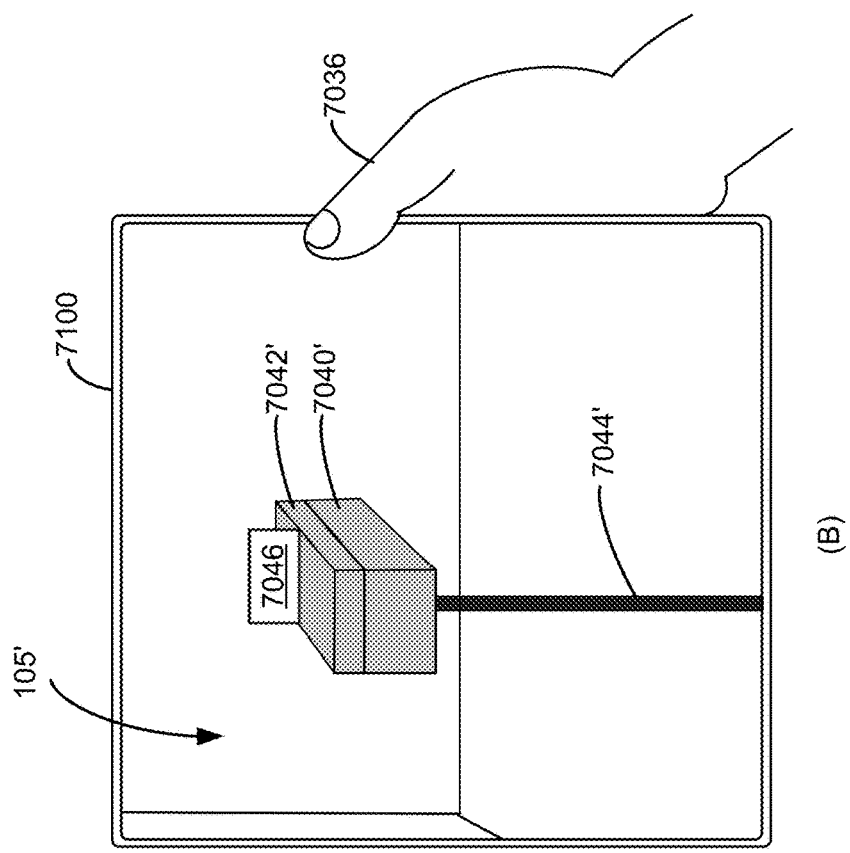
FIGS. 7K-7M illustrate displaying an indication of availability of a computer-generated experience at a position corresponding to a representation of a physical object in a mixed reality environment, and triggering display of the computer-generated experience corresponding to the physical object in response to detecting preset physical interaction with the physical object in the real world, in accordance with some embodiments.
Figure 7K:
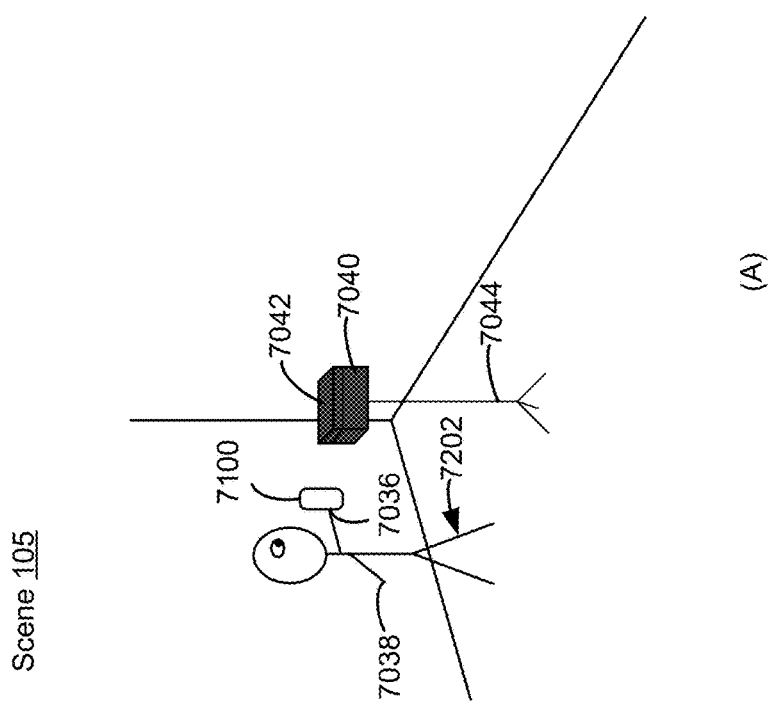
Figure 7L:
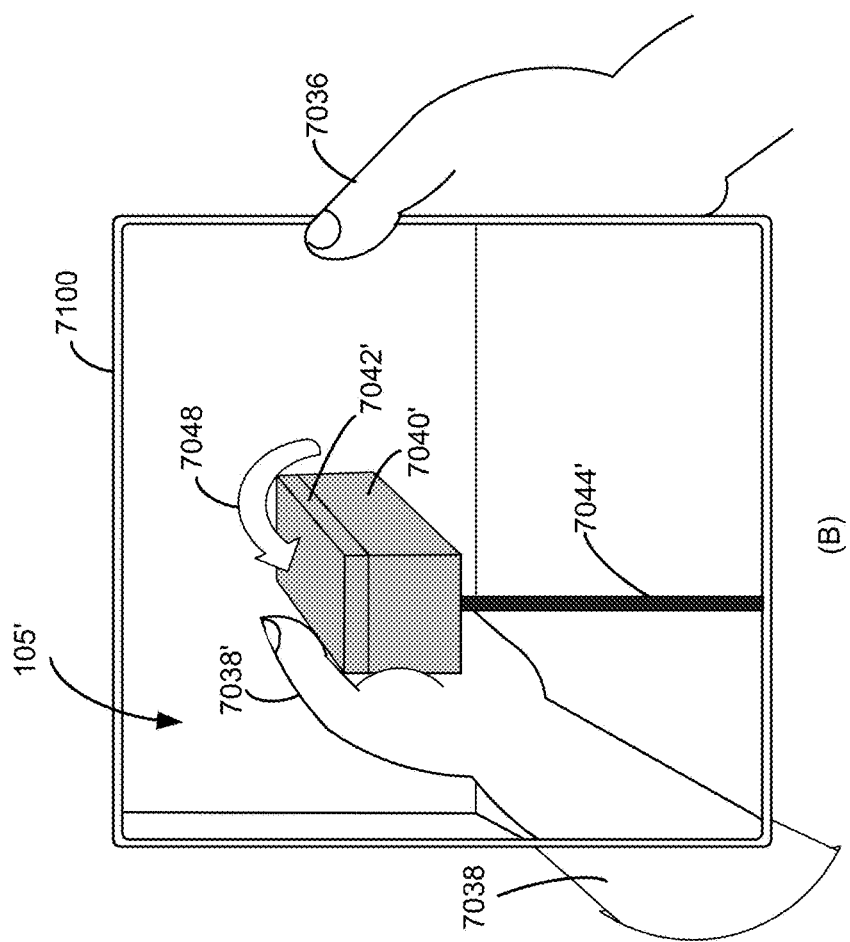
Figure 7L:
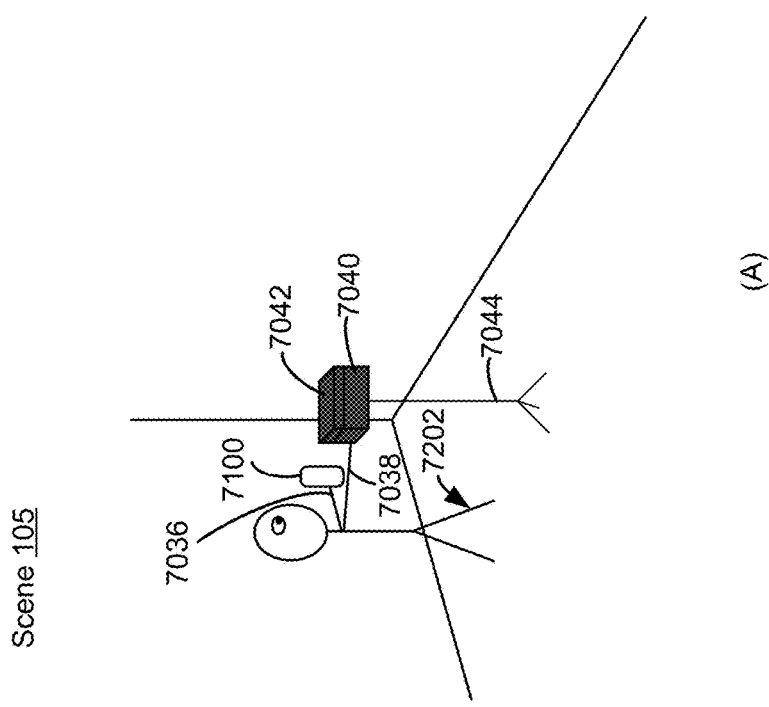
Figure 7M:
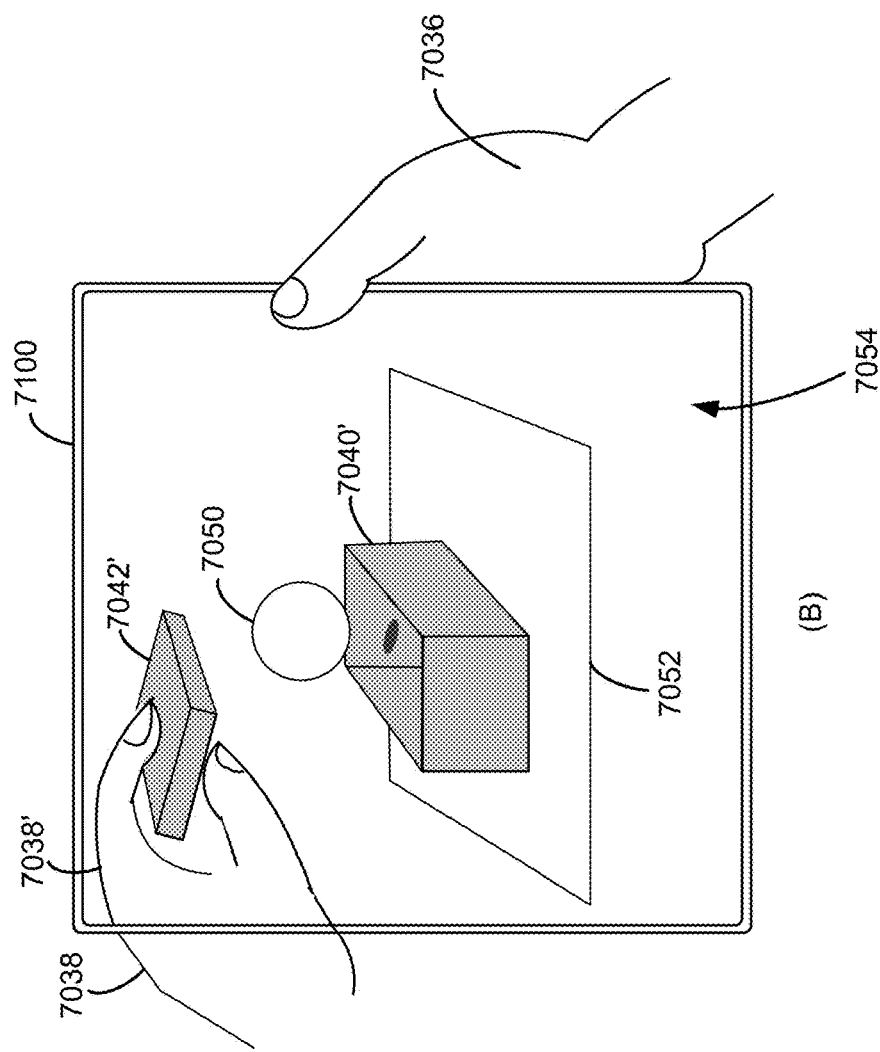
Figure 7M:
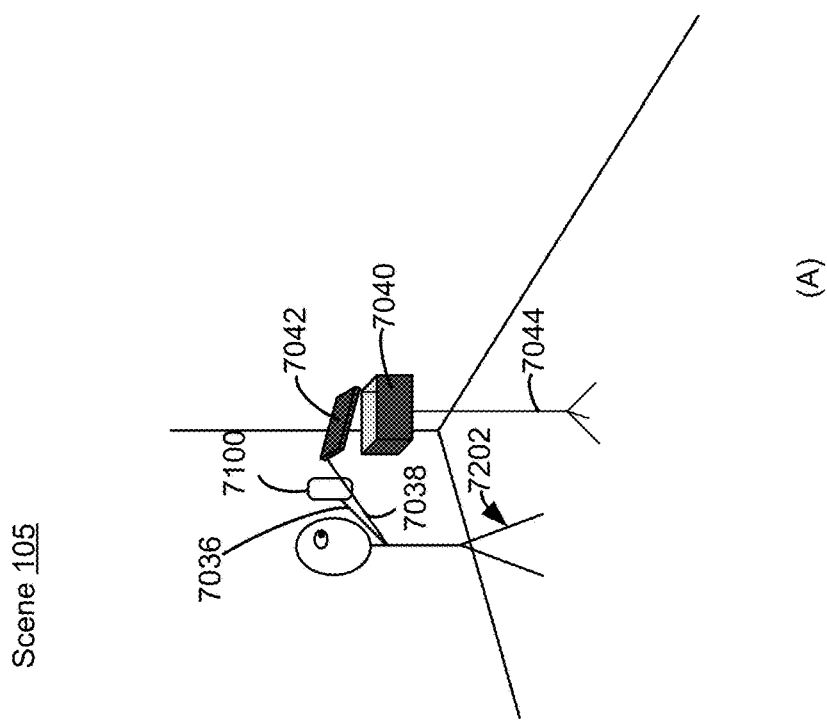

FIGS. 7H-7J illustrate displaying different computer-generated experiences depending on the manner by which the first display generation component is maintained in a preset spatial relationship or configuration relative to the first user during presentation of the computer-generated experiences, in accordance with some embodiments. In some embodiments, the different computer-generated experiences are related to each other. For example, the different computer-generated experiences are respectively a preview of a three-dimensional computer-generated experience and the three-dimensional computer-generated experience itself, or they are respectively a segment or redacted version of a computer-generated experience and a complete version of the computer-generated experience, etc. In some embodiments, the computing system determines that the first display generation component is placed into the preset spatial relationship or configuration relative to the first user when the display side of the first display generation component is facing toward the first user or a preset portion of the first user (e.g., the user's eyes or face), and/or when the user is in a position to view the content shown on the first display generation component (e.g., the user is wearing the HMD, holding the HMD, raised the HMD up by hand, placed the HMD in a preset viewing station, connected the HMD to a preset output device, etc.). In some embodiments, the computing system determines which of the computer-generated experiences to display on the first display generation component based on whether the first display generation component (or optionally, the entire HMD that enclose the first display generation component (and an optional second display generation component)) is being worn by the first user (e.g., strapped on, remaining in front of the user's eyes without support of the user's hand(s)). In some embodiments, the computing system determines whether the first display generation component is being worn by the first user based on the state of a device or sensor other than the first display generation component (e.g., a strap or buckle on the housing of the first display generation component, a touch or position sensor attached to the housing of the first display generation component, etc.). For example, the strap or buckle optionally has an open state and a closed state, and when the first display generation component is being worn by the first user, the strap or buckle is in the closed state; and when the first display generation component is only temporarily placed in front of the user (e.g., raised to eye level by the user's hand) and not being worn by the user, the strap or buckle is in the open state. In some embodiments, the touch or position sensor on the housing of the first display generation component switches to a first state ("YES" state) when the housing of the first display generation component is resting on and supported by the user's nose, ears, head, and/or other parts of the user's body other than the user's hands; and the touch or position sensor switches to a second state ("NO" state) when the housing of the first display generation component is being supported by the user's hand(s). In some embodiments, by distinguishing the manner by which the first display generation component (or by which the HMD including the first display generation component) is maintained in the preset configuration relative the first user for the user to view the computer-generated experience displayed on the first display generation component, the computing system can tailor the interaction model and depth of the content presented to the user more appropriately. For example, the computing system enables a first interaction model that requires movement of the user's hand as input (e.g., in-air gestures, micro-gestures, input provided on a control device separate from the housing of the first display generation component, etc.) only when the first display generation component is not maintained in the preset configuration relative to the first user by the user's hand(s); and while the first display generation component is maintained in the preset configuration relative to the first user by the user's hand(s), the computing system only enables other types of interaction models (e.g., speech interaction, gaze interaction, touch interaction on the housing of the first display generation component, etc.) that do not require the user's hand(s) to move away from housing of the first display generation component.

In FIG. 7I, the first user 7202 is collocated at location A 7000-*a* with the first display generation component (e.g., display 7100, the inner display of the HMD, etc.) and facing the display side of the first display generation component. This is to illustrate an example scenario in which the first display generation component is in the preset configuration relative to the first user or a preset portion of the first user (e.g., the first display generation component is placed in front of the user's face or eyes)), in accordance with some embodiments. In the example scenario shown in FIG. 7I, the first user 7202 is holding a sensor object 7016 in her hand. This position of the sensor object 7016 relative to the user's hand corresponds to a state of the first display generation component when the first display generation component is not worn by the first user 7202. Another example scenario corresponding to the state of the first display generation component when the first display generation component is not worn by the first user is when the first display generation component is a display of an HMD (e.g., the inner display of the HMD, the single display of the HMD, etc.), and the display of the HMD is being held or raised to face toward the first user's eyes by the first user's hand (e.g., as opposed to being supported by the user's head, nose, ears, or other parts of the user that is not the user's hand). In some embodiments, in the scenario when the sensor object 7016 is held in the first user's hand (which also corresponds to the first display generation component being supported by the user's hand or not worn by the first user, when placed in front of the user's face or eyes), the computing system displays the second computer-generated experience 7030 (e.g., the experience that corresponds to the second state of the computing system illustrated in FIG. 7H).

In FIG. 7J, the first user is collocated at location A 7000-*a* with the first display generation component and facing the display side of the first display generation component 7100. This is to illustrate another example scenario in which the first display generation component 7100 is in the preset configuration relative to the first user or a preset portion of the first user (e.g., the first display generation component is placed in front of the user's face or eyes)), in accordance with some embodiments. In the scenario shown in FIG. 7J, the first user 7202 is no longer holding the sensor object 7016 in her hand, but has placed the sensor object on her body (e.g., her back), such that the first user 7202 is now wearing the sensor object 7016. This position of the sensor object 7016 relative to the user's hand and body corresponds to a state of the first display generation component when the first display generation component 7100 is worn by the first user. Another example scenario corresponding the state of the first display generation component when the first display generation component is worn by the first user is when the first display generation component is a display of an HMD (e.g., the inner display of the HMD), and the HMD is worn on the first user's head normally (e.g., strapped on, buckled, resting completely on the user's nose, ears, and/or head, as opposed to being supported by the user's hand(s)). In some embodiments, in the scenario where the sensor object 7016 is worn by the user and not held in the first user's hand (which also corresponds to the first display generation component being worn by the user and not being supported by the user's hand, when placed in front of the user's face or eyes), the computing system displays a third computer-generated experience 7036 (e.g., a different experience that also corresponds to the second state of the computing system illustrated in FIG. 7H (e.g., showing the square 7026), but is different from the second computer-generated experience (e.g., experience 7030 in FIG. 7I) due to the state of the sensor object 7016 (and correspondingly, the wearing state of the first display generation component (e.g., display 7100 or the inner display of an HMD))).

As shown in FIG. 7J, the computing system detects (e.g., using camera 7104 and/or other sensors) the first user 7202 moving her hand in the air to provide an in-air gesture, and moves the virtual object 7032 onto the top of the representation 7028' of the physical object 7028 in response. In some embodiments, the computing system disables at least some of the input devices (e.g., touch-sensitive surfaces, buttons, switches, etc.) provided on the housing of the first display generation component (e.g., display 7100, the inner display of the HMD, the single display of the HMD, etc.) while displaying the third computer-generated experience 7036. In some embodiments, the computing system enables at least one interaction model (e.g., interaction models that support in-air hand gestures, micro-gestures, and/or input detected via input devices separate from the housing of the first display generation component, etc.) that was not enabled when the first display generation component was not worn by the first user 7202 (e.g., as determined based on the state of the sensor object 7016, or other sensors, etc.). In some embodiments, the third computer-generated experience 7036 and the second computer-generated experience 7030 are related experiences, with corresponding content (e.g., the same content, or different versions of the same content) but different interaction models (e.g., different interaction models, or overlapping but different sets of interaction models, etc.).

As shown in FIGS. 7I and 7J, in some embodiments, the computing system optionally includes a second display generation component (e.g., a display included in a different housing from the first display generation component (e.g., display 7102), or a display included in the same housing (e.g., back to back or otherwise facing different directions) as the first display generation component (e.g., an HMD with an inner display and an outer display)). In some embodiments, the second display generation component optionally displays status information related to the content shown via the first display generation component (e.g., altered visual representation of the content), and optionally displays status information related to the state of the first user (e.g., images or representations of the user's face or eyes) and/or the mode of operation of the computing system (e.g., mixed reality mode, virtual reality mode, fully pass-through mode, parental control mode, private mode, DND mode, etc.). In some embodiments, the second display generation component also displays user interface elements that correspond to the computer-generated experiences available for display by the first display generation component. More details of the operations of the second display generation component and corresponding operations of the first display generation component are described with respect to FIGS. 7A-7E and 7F-7I, and the process described with respect to FIGS. 8-13. In some embodiments, the computing system that displays different computer-generated experiences based on whether the first display generation component is being worn by the user when the first display generation component is placed in the preset configuration relative to the user does not have another display generation component other than the first display generation component, and therefore does not display the status information and/or the user interface elements indicating availability of the computer-generated experiences set forth herein.

In some embodiments, depending on whether the first display generation component is being worn by the first user (e.g., whether the HMD is strapped or buckled onto the user's head and can remain in front of the user's eyes without the support of the user's hand(s), or merely being held in front of the user's eyes by the user's hand(s) and will fall away without the support of the user's hand(s)) when the first display generation component is placed into the preset configuration relative to the first user (e.g., the display side of the first display generation component is facing toward the user's eyes or face, and/or the within a threshold distance from the user's face, etc.), the computing system optionally displays different types of user interfaces (e.g., a system user interface (e.g., an application launching user interface, a home screen, a multitasking user interface, a configuration user interface, etc.) vs. an application user interface (e.g., a camera user interface, an infra-red scanner user interface (e.g., showing a heat map of the current physical environment), an augmented reality measuring application (e.g., automatically displaying measurements of physical objects in a camera view), etc.)) using the first display generation component. In some embodiments, the computing system takes a photo or video of the physical environment captured within the camera view in response to a user input detected via an input device disposed on the housing of the first display generation component (e.g., a touch sensor, a contact intensity sensor, a button, a switch, etc.), when the computing system is displaying the application user interface using the first display generation component.

In some embodiments, the computing system prioritizes touch inputs detected on touch-based input devices located on the housing of the first display generation component over micro-gesture inputs and/or in-air gesture inputs detected in front of the first user (e.g., the micro-gesture inputs and in-air gesture inputs are performed by the user's hand that is not holding onto the housing of the first display generation component) when determining a response to a user input that is detected while the user is holding the first display generation component in front of his/her eyes and not wearing the first display generation component. In some embodiments, the computing system prioritizes micro-gesture inputs, and/or in-air gesture inputs detected in front of the first user over touch inputs detected on touch-based input devices located on the housing of the first display generation component when determining a response to a user input detected when the user is wearing the first display generation component (e.g., when the user's hands are not required to support the first display generation component). In some embodiments, in response to detecting multiple types of inputs (e.g., inputs performed by a hand away from the first display generation component, inputs performed by a hand touching the first display generation component or a housing thereof, etc.) at the same time, in accordance with a determination that the first display generation component is being worn by the user (e.g., the HMD including the first display generation component is strapped on the user's head, buckled up, not being supported by a hand of the user, etc.) while being in the preset configuration relative to the user, the computing system enables an interaction with the displayed computer-generated experience based on gestures (e.g., in-air gestures, micro-gestures, etc.) performed by a hand located away from the first display generation component and a housing thereof (e.g., the gesture is captured by a camera on the HMD, a mechanical or touch-sensitive input device, or a sensor worn on the user's hand, etc.). In accordance with a determination that the first display generation component is not being worn by the user (e.g., not strapped on the user's head, not buckled up, being supported by a hand of the user, etc.) while being in the preset configuration relative to the user, the computing system enables an interaction with the displayed computer-generated experience based on gestures (e.g., touch gestures, manipulating of physical controls, etc.) performed by a hand on the first display generation component or the housing thereof (e.g., the gesture is captured by a touch-sensitive surface of the housing of the HMD, a button or switch on the housing of the HMD, etc.).

FIGS. 7K-7M illustrate a computing system (e.g., computing system 101 in FIG. 1 or computing system 140 in FIG. 4) that includes at least a first display generation component (e.g., display 7100, an inner display of an HMD, a single display of an HMD, etc.) and, optionally, a second display generation component (e.g., display 7102, an outer display of an HMD, etc.), where the computing system displays a computer-generated experience (e.g., an augmented reality experience, an augmented virtuality experience, a virtual reality experience, etc.) to a user via the first display generation component (e.g., display 7100, the inner display of the HMD, the single display of the HMD, etc.) in accordance with physical interactions between the user and a physical object (e.g., picking up a musical instrument and playing the musical instrument, picking up a book and opening the book, holding a box and opening the box, etc.) in the physical environment. In some embodiments, only certain physical interactions that meet preset criteria corresponding to the physical object can trigger the display of the computer-generated experience. In some embodiments, different computer-generated experiences are optionally displayed depending on which of multiple sets of criteria are met by the physical interaction with the physical object. In some embodiments, the different computer-generated experiences include different augmented reality experiences corresponding to different modes of operating the physical object (e.g., tapping, strumming, stroking, opening, swinging, etc.). FIGS. 7K-7M are used to illustrate the processes described below, including the processes in FIGS. 8-13.

As shown in FIG. 7K, a user (e.g., user 7202) is present in a scene 105 that includes a physical object (e.g., an object that includes a box lid 7042 and a box body 7040, a book, an instrument, etc.) in a room with walls and a floor. In FIG. 7K, the user is holding a first display generation component (e.g., a display 7100, an HMD, a handheld device, etc.) with his hand 7036. In some embodiments, the first display generation component is not held in the user's hand 7036, but is supported by a housing or support structure resting on the user's body (e.g., head, ears, nose, etc.). In some embodiments, the first display generation component (e.g., a heads-up display, a projector, etc.) is placed in front of the first user's eyes or face and supported by other support structures (e.g., a table top, a TV stand, etc.) that is not part of the user's body.

In some embodiments, as shown in FIG. 7K, the computing system provides, via the first display generation component (e.g., display 7100, a display of an HMD, etc.), an augmented reality view 105' of the physical environment (e.g., the room including the physical object). In the augmented reality view of the physical environment, a view of a portion of the physical environment includes a representation of the physical object (e.g., including representation 7042' for the box lid 7042, and representation 7040' for the box body 7040), and optionally, representations of the surrounding environment (e.g., representation 7044' of a support structure 7044 supporting the physical object, and representations of the walls and floor of the room). In addition to the representations of the physical objects in the environment, the computing system also displays some virtual content (e.g., user interface objects, visual augmentations of physical objects, etc.), including a visual indication (e.g., label 7046, or other visual indications, etc.) that one or more computer-generated experiences corresponding to the physical object (e.g., the box including the lid 7042 and body 7040, another physical object in the environment, etc.) is available for display via the first display generation component. As shown in FIG. 7K(B), in some embodiments, the visual indication (e.g., the label 7046) is displayed in the view of the physical environment at a position that corresponds to a location of the physical object (e.g., at a location of the box lid 7042). For example, the label 7046 appears to sit on top of the box lid 7042 in the view of the physical environment displayed via the first display generation component.

In some embodiments, the visual indication (e.g., the label 7046, or other visual indications, etc.) includes descriptive information (e.g., icons, graphics, text, animations, video clips, images, etc.) about the computer-generated experience that is available to be displayed by the first display generation component. In some embodiments, when the first display generation component or the one or more cameras of the computing system move in the physical environment, and/or when the physical object moves in the physical environment, such that the augmented reality view of the physical environment shown by the first display generation component only includes the representation of less than a threshold portion of the physical object (e.g., less than 50% of the physical object, or without including a key portion of the physical object (e.g., lid 7042 of the box, title text of a book, sound producing portion of an instrument, etc.), etc.), the computing system ceases to display (or forgoes displaying) the visual indication in the view of the augmented reality environment.

In some embodiments, the visual indication includes prompts or guidance information (e.g., animated illustrations, indicators pointing to particular parts of the representation of the physical object, etc.) regarding the physical interaction required to trigger display of the computer-generated experience. In some embodiments, the computing system only displays the prompts or guidance information regarding the physical interaction required to trigger display of the computer-generated experience in response to detecting some user inputs that meet preset first criteria (e.g., criteria used to assess that the user is interested in seeing the computer-generated experience, criteria used for detecting presence of the user, criteria for detecting hand contact of the user on the physical object, etc.). As illustrated in FIG. 7L, in some embodiments, the computing system displays the prompt or guidance information (e.g., animated arrow 7048, or other visual effects or virtual objects, etc.) at a position in the view of the augmented reality environment that corresponds to the location of the box lid 7042 to prompt the user to open the box lid 7042, when the computing system detects that the user is touching the physical object with his/her hand but not performing the required interaction for trigging display of the computer-generated experience (e.g., hand 7038 is touching the box lid 7042 or box body 7040 of the physical object, but not opening the box lid 7042). In some embodiments, the prompt and guidance information are updated (e.g., the direction of the arrow, the sequence of the animation, etc.) depending on the way that the user is interacting with the physical object. In some embodiments, the representation of the user's hand (e.g., representation 7038' of the hand 7038) is shown in the augmented reality view 105' of the physical environment as the user manipulates the physical object in the physical environment using that hand. It is noted that, the prompts and guidance information are different from the actual computer-generated experience that is available for display via the first display generation component once the required physical interaction with the physical object (e.g., opening the lid 7048, other some other interactions (e.g., picking up the box 7040 from the support 7044 after the lid 7048 of taken off), etc.) is detected. In some embodiments, the computing system does not display any prompt or guidance information in response to physical interactions with the physical object that do not meet the criteria for triggering the display of the computer-generated experience (e.g., the computing system does not display the computer-generated experience and does not display the prompt and guidance information, but optionally maintain display of the visual indication (e.g., label 7046) to indicate that the computer-generated experience is available to be displayed).

As shown in FIG. 7M, in some embodiments, when the computing system detects that the user has performed the physical interaction with the physical object that is required to trigger display of the computer-generated experience, the computing system displays the computer-generated experience. For example, in response to detecting the user's hand 7038 lifting the box lid 7042 off of box body 7040, the computing system determines that the required physical interaction with the physical object has met the preset criteria for triggering display of the computer-generated experience, and displays the computer-generated experience using the first display generation component (e.g., display 7100, inner display of an HMD, a single display of an HMD, etc.). In FIG. 7M, the computer-generated experience is an augmented reality experience showing the representation 7038' of the user's hand 7038, the representation 7042' of the box lid 7042, and representation 7040' of the box body 7040 at positions and with orientations corresponding to their physical locations and orientations in the physical environment. In addition, in some embodiments, the augmented reality experience also shows virtual content (e.g., virtual ball 7050 appearing to jump out of the box body 7040, and casting a virtual shadow on the inside of the box body, a virtual platform 7052 replacing the representation of the physical support 7044 under the box 7040, etc.) concurrently with the representation of the physical environment. In addition, in some embodiments, the representations of the walls in the physical environment are replaced with virtual overlays in the augmented reality experience. In some embodiments, as the user continue to interact with the physical object once the computer-generated experience has started, the computing system displays changes in the augmented reality environment in accordance with the user's physical manipulations of the physical object (e.g., box body 7040, box lid 7042, etc.), and optionally in accordance with other inputs (e.g., gesture inputs, touch inputs, gaze inputs, voice inputs, etc.) detected through various input devices of the computing system. In some embodiments, the computer-generated experience progresses in a manner that is determined in accordance with the continued physical interaction with the physical object. For example, in response to detecting the user moving the box lid 7042 in the physical environment, the computing system moves the representation 7042' of the box lid 7042 to push the virtual ball 7050 in the empty space above the representation 7040' of the box body 7040; and in response to detecting the user putting the box lid 7042 back onto the box body 7040, the computing system displays the representation 7042' of the box lid 7042 back onto the representation 7040' of the box body 7040 and ceases to display the virtual ball 7050. In some embodiments, the computing system requires that the user is in physical contact with the physical object when performing the required physical interaction to trigger display of the computer-generated experience; and the computing system ceases to display the computer-generated experience in accordance with a determination that the user has ceased physical contact with the physical object for more than a threshold amount of time. For example, in some embodiments, the computing system ceases to display the computer-generated experience immediately upon detecting the physical object being release from the user's hand. In some embodiments, the computing system ceases to display the computer-generated experience upon detecting that the physical object has landed and come to rest on another physical surface after its release from the user's hand.

In some embodiments, the visual feedback provided in response to detecting the user's physical interaction with the physical object before the criteria for triggering display of the computer-generated experience includes a preview of the computer-generated experience and has visual characteristics that are dynamically updated in accordance with characteristics of the physical interaction as it is detected. For example, an extent (e.g., size, dimensions, angular extent, etc.) of the animation, visual effect, and/or virtual object, an amount of details in the visual feedback, the brightness, color saturation, visual clarity, etc. of the visual feedback, etc.) are optionally adjusted (e.g., dynamically in real-time, periodically, etc.) in accordance with a characteristic value of the interaction with the physical object in the physical environment (e.g., the characteristic value includes a distance of movement, an angular extent of movement, a speed of movement, a type of interaction, a distance to predetermined reference point, etc.). For example, in some embodiments, when the physical object is a book, as the cover of the book is slowly opened by the user in the physical environment, color and light of the computer-generated experience are emerging from the gap between the cover and the first page and become brighter and more saturated as the cover is opened more and more. The full computer-generated experience is optionally started in the three-dimensional environment when the cover of the book is opened beyond a threshold amount and the first criteria are met. In another example, when the user lifts the corner of the box lid 7042 a little bit, virtual light is shown to emerge from the representation 7040' of the box body 7040, and a glimpse of the virtual ball 7050 is shown. As the user lifts the corner of the box lid 7042 higher, more virtual light is shown to emerge from the representation 7040' of the box body 7040, and the virtual ball 7050 begins to stir in the representation 7040' of the box body 7040. When the user finally lifts the box lid 7042 away from the box body 7040, the computer-generated experience is started, the whole three-dimensional environment changes, the representation of the room is replaced with a virtual platform 7052, and the virtual ball 7050 jumps out of the representation 7040' of the box.

In some embodiments, a computer-generated experience is optionally triggered by more than one type of physical interaction. In other words, the criteria for triggering a computer-generated experience associated with a physical object are optionally met by a first way of interacting with the physical object and a second way of interacting with the physical object. For example, a computer-generated experience associated with a book is optionally started in response to a user picking up a book and propping it on a book stand with the book cover upright relative to the user's face, and in response to the user picking up the book and opening the cover in his/her hand. In some embodiments, the computer-generated experience is optionally started from different portions of the computer-generated experience. For example, the criteria for triggering a computer-generated experience associated with a physical object are optionally met in the same way of interacting with the physical object but with different parameter values (e.g., different pages, different speed, different time, etc.). For example, a computer-generated experience associated with a book is optionally started from a first portion of the computer-generated experience in response to the user picking up a book and opening it from the first page; and optionally started from a second, different portion of the computer-generated experience in response to the user picking up the book and opening from a previously book-marked page. In another example, opening the book slowly triggers the computer-generated experience with soothing background music and/or more muted colors, and opening the book fast triggers the computer-generated experience with more lively background music and brighter colors. The book example is merely illustrative. The same principles apply to other computer-generated experiences associated with other types of physical objects and other triggering physical interactions. In some embodiments, different computer-generated experiences are associated with the same physical object, and are triggered by different ways of interacting with the physical object. For example, a box is associated with two different computer-generated experiences, and the first computer-generated experience is triggered when the user opens the lid of the box (e.g., virtual balls pop out of the box for the user to push with the lid), and the second computer-generated experience is triggered when the user flips the box upside down (e.g., a virtual bug emerges from the bottom of the box and chases the user's finger moving on the bottom of the box). In some embodiments, different manners of interacting with the physical object triggers different versions of the computer-generated experience that enable different input modalities. For example, when the book is held by one hand and opened by the other hand, single-hand in-air gestures (e.g., air tap gestures, wave of hand, sign language gestures, etc.) and micro-gestures are enabled for interacting with the computer-generated experience, and touch-gestures are not enabled for interacting with the computer-generated experience. When the book is held open by two hands, in-air gestures are disabled and touch hand gestures on the back, front, and/or side surfaces of the book (e.g., taps, swipes, etc.) are enabled for interacting with the computer-generated experience.

FIGS. 7N-7Q illustrate choosing to perform or not perform an operation in response to an input detected on the housing of a display generation component in accordance with whether one or two hands were detected on the housing at the time of the input, in accordance with some embodiments. In some embodiments, touch inputs as an input modality is disabled when two hands are concurrently detected on the housing of the display generation component (e.g., on the housing of the HMD containing the display generation component, on the frames of the display generation component, etc.). In some embodiments, a computing system would respond to a touch input performed by either hand of the user on the housing of the display generation component (e.g., on a touch-sensitive surface or other touch-sensors disposed on or around the structure of the display generation component), as long as only a single hand (e.g., the hand providing the touch input) is touching the housing of the display generation component; and if the computing detects that an additional hand is also touching the housing of the display generation component at the time that the touch input is detected, the computing system ignores the touch input and forgoes performing an operation that corresponds to the touch input (e.g., activating a control, interacting with a computer-generated experience, etc.). In some embodiments, the computing system detects the presence of both hands using the same sensors and input devices that are used to detect touch inputs provided by a single hand. In some embodiments, cameras are used to capture the locations of the user's hands and the images from the cameras are used by the computing system to determine if both of the user's hands are touching the housing of the display generation component when a touch input is detected by one or more touch sensors present on the housing of the display generation component. In some embodiments, other means for detecting touch inputs and/or whether one or both hands of the user are touching or supporting the housing of the display generation component are implemented. For example, position sensors, proximity sensors, mechanical sensors, etc. can be used to detect the presence and postures of user's hand(s) on the housing of the display generation component, in accordance with various embodiments.

Figure 7N:
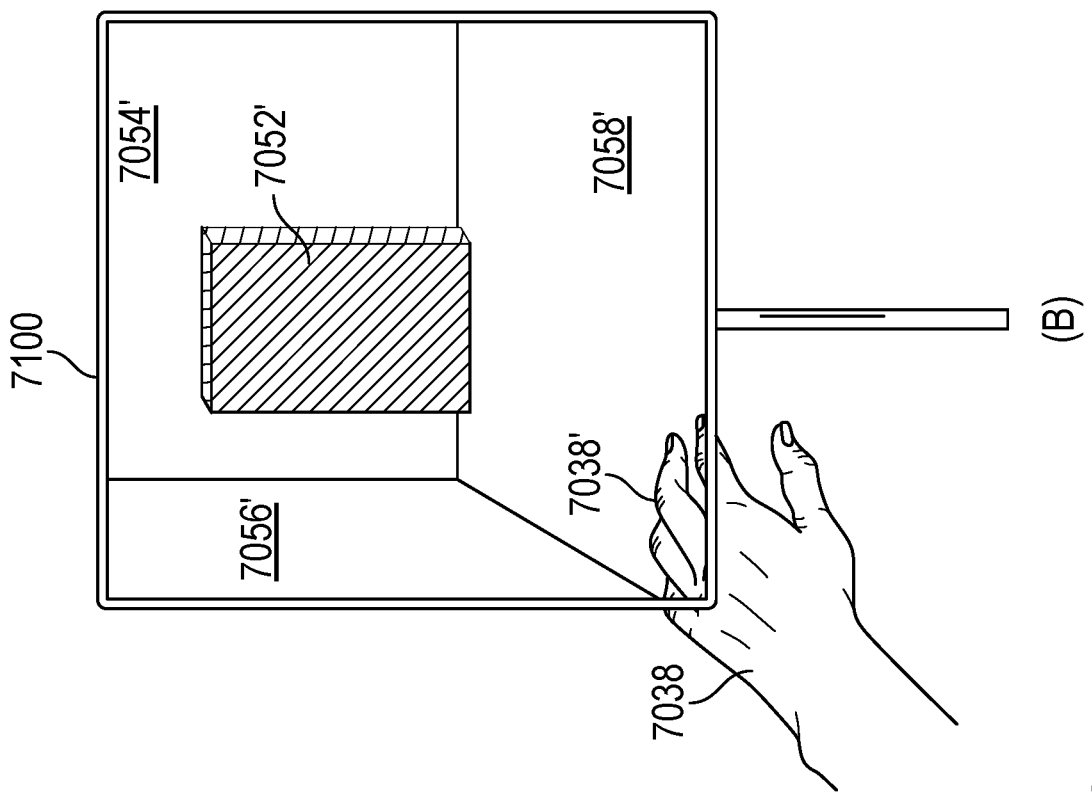
FIGS. 7N-7Q illustrate choosing to perform or not perform an operation in response to an input detected on the housing of a display generation component in accordance with whether one or two hands were detected on the housing at the time the input was detected, in accordance with some embodiments.
Figure 7N:
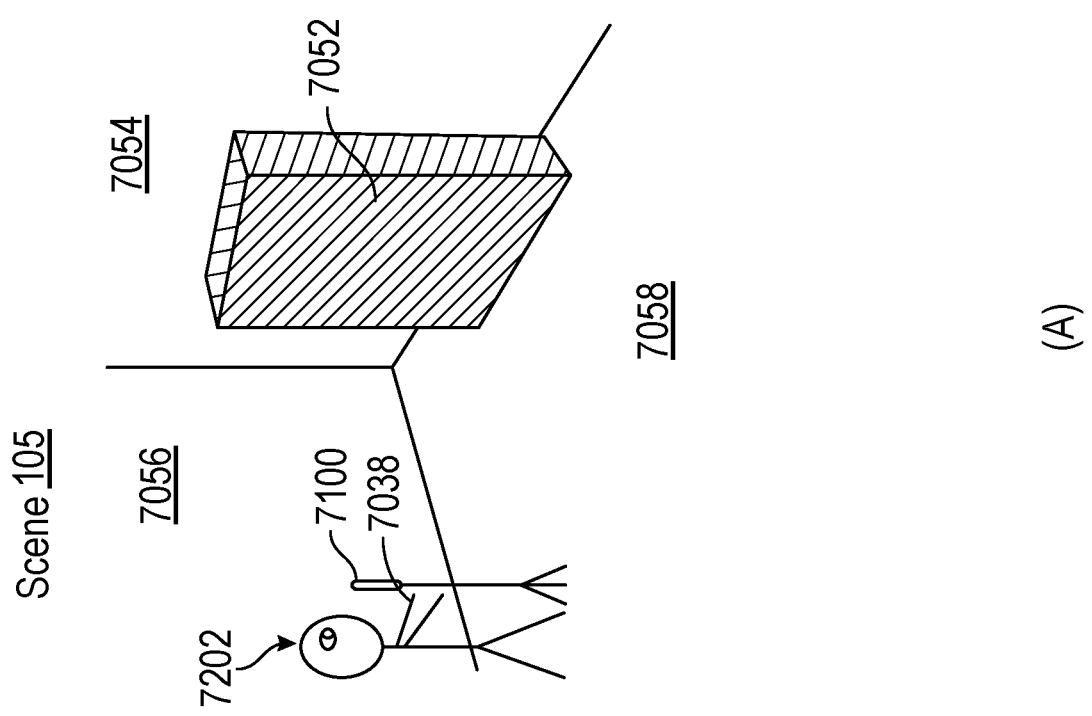

In FIG. 7N, a user (e.g., user 7202) is present in a physical scene 105 that includes a physical object (e.g., box 7052), walls 7054 and 7056, and floor 7058. The user 7202 is standing in front of a display generation component 7100 (e.g., a tablet display device, a projector, an HMD, an inner display of an HMD, a heads-up display, etc.) that is supported by a stand. The display generation component 7100 displays a view of the physical environment 105. For example, in some embodiments, the view of the physical environment is a camera view of the physical environment. In some embodiments, the view of the physical environment is provided through a transparent portion of the display generation component. In some embodiments, the display generation component 7100 displays an augmented reality environment with both a view of the physical environment and virtual objects and content that are displayed overlaid on or replacing a portion of the view of the physical environment. As shown in FIG. 7N, the view of the physical environment includes representation 7052' of the box 7052, representations 7054' and 7056' of the walls 7054 and 7056, and representation 7058' of the floor 7058. In FIG. 7N, the user 7202 is not touching the housing of the display generation component, and the computing system does not detect any touch input on the housing of the display generation component. In some embodiments, the representation 7038' of a hand 7038 of the user is shown via the display generation component 7100 as part of the representation of the physical environment. In some embodiments, the display generation component 7100 displays a virtual environment or not displaying anything before any touch input is detected on its housing.

In some embodiments, in addition to touch inputs, the computing system is optionally configured to detect hover inputs near the housing of the display generation component. In some embodiments, proximity sensors located on the housing of the display generation component are configured to detect the user's fingers or hands approaching the housing of the display generation component, and generate input signals based on the proximity of the fingers or hands relative to the housing of the display generation component (e.g., proximity to portions of the housing that are configured to detect touch inputs, other portions of the housing, etc.). In some embodiments, the computing system is configured to detect respective hover inputs at different locations near the housing of the display generation component (e.g., using proximity sensors located at different portions of the housing of the display generation component) and provide different feedback in accordance with the locations of the hover inputs. In some embodiments, the computing system adjusts the values of various characteristics of the visual feedback based on the hover distances of the hover inputs (e.g., distances of the fingertip(s) from the surface of the housing or touch-sensitive portions of the housing) that are detected.

Figure 7O:
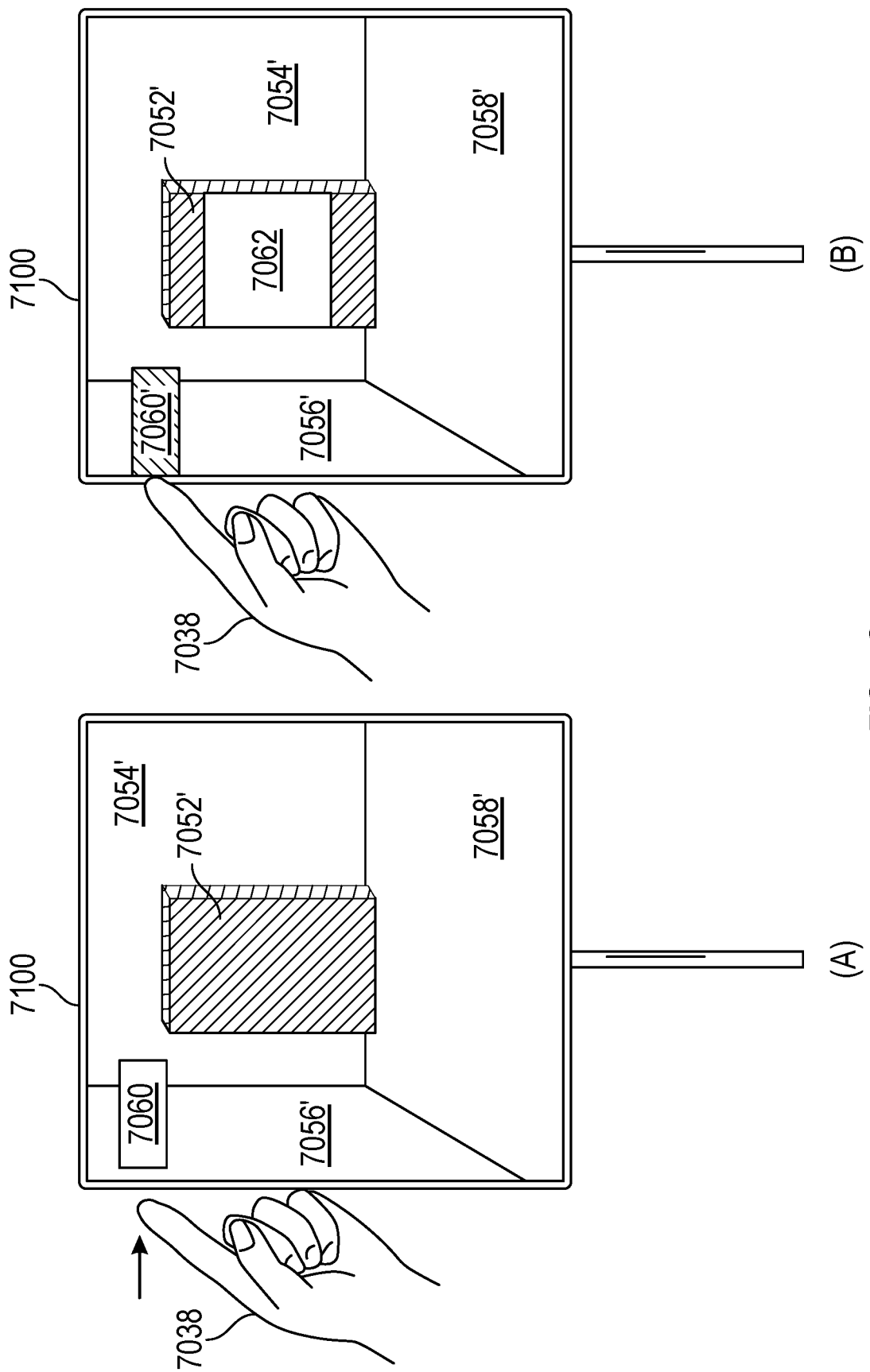

As shown in FIG. 7O, in some embodiments, the computing system detects that a hand 7038 or a portion thereof (e.g., a finger of hand 7038, or two fingers of hand 7038, etc.) has moved within a threshold distance from a first touch-sensitive portion of the housing of the display generation component 7100 (e.g., an upper portion of the left edge of the housing of the display generation component 7100, a left or top edge portion of an HMD, etc.). In response to detecting that the hand 7038 or the portion thereof has moved within the threshold distance from the first touch-sensitive portion of the housing of the display generation component 7100, the computing system optionally displays one or more user interface objects at locations corresponding to the location of the hand 7038 or the portion thereof. For example, a user interface object 7060 is displayed near an upper portion of the left edge of the housing of the display generation component 7100 (or a left or top edge portion of an HMD, etc.), next to the hand 7038 or the raised finger of the hand 7038. In some embodiments, the computing system dynamically updates the locations of the one or more user interface objects (e.g., moves the user interface object 7060 closer or farther away from the left edge of the housing, and/or up and down the left edge of the housing) that are displayed in accordance with changes in the location of the hand 7038 or the portion thereof near the housing of the display generation component (e.g., moving closer/farther away, and/or moving up and down along the left edge, etc.). In some embodiments, the computing system dynamically updates the appearance of the one or more user interface objects (e.g., changes the size, shape, color, opacity, resolution, content, etc.) that are displayed in accordance with changes in the location of the hand or the portion thereof near the housing of the display generation component. In some embodiments, the computing system optionally changes the types of user interface object(s) (e.g., changing from displaying a representation of a first control (e.g., volume control, power control, etc.) to displaying a representation of a second control (e.g., display brightness control, WiFi control, etc.), changing from displaying a first type of affordance (e.g., a scroll bar, a button, etc.) to displaying a second type of affordance (e.g., a scroll wheel, a switch, etc.), etc.) that are displayed near the first touch-sensitive portion of the housing of the display generation component in accordance with a change in posture of the hand 7038 near the housing of the display generation component (e.g., raising two fingers instead of one finger, raising a different finger, etc.). In some embodiments, the one or more user interface objects grow from a mere indication of a control (e.g., a small dot, a faint shadow, etc.) to a more concrete and clear representation of the control (e.g., a button or switch with graphics and/or text on them to indicate a state of the computing system or display generation component), as the hand 7038 moves closer to the first touch-sensitive portion of the housing of the display generation component. In some embodiments, the one or more user interface objects (e.g., the user interface object 7060, or other user interface objects, etc.) are displayed concurrently with the view of the physical environment. In some embodiments, the one or more user interface objects are displayed concurrently with a virtual environment, e.g., if the virtual environment were displayed prior to the detection of the hover input by hand 7038. In some embodiments, the one or more user interface objects are displayed without concurrent display of either the view of the physical environment or any other virtual content, e.g., if the display generation component was not displaying either the view of the physical environment or any other virtual content prior to detecting the hover input.

In some embodiments, as shown in FIG. 7O, the computing system detects a touch input at the first touch-sensitive portion on the housing of the display generation component, e.g., after detecting the hover input near the first touch-sensitive portion on the housing of the display generation component. In some embodiments, in response to detecting the touch input at the first portion of the touch-sensitive portion of the housing of the display generation component, in accordance with a determination that the touch input is detected without another hand being detected on the housing of the display generation component, the computing system performs a first operation corresponding to the touch input. For example, as shown in FIG. 7O, in response to detecting the touch input on the upper portion of the left edge of the housing of the display generation component, the computing system activated an augmented reality experience that includes some virtual content (e.g., virtual overlay 7062) in combination with the view of the physical environment (e.g., the virtual overlay 7062 is displayed at a position that corresponds to the location of the box 7052, such that the overlay 7062 appears to be placed on the front surface of the representation 7052' of the box 7052 in the augmented reality environment). In some embodiments, the initial touch-down of the user's hand 7038 or the portion of the hand only causes the visual feedback that touch is detected on the housing of the display generation component and the touch does not yet meet the criteria for initiating any particular operation on the computing system (e.g., the user interface objects (e.g., user interface object 7060) are displayed in their fully functional state if they had not been displayed or were merely displayed as indications, the user interface objects (e.g., user interface object 7060) change their appearances to indicate that a touch has been detected, etc.). In some embodiments, the computing system evaluate the touch input provided by the hand 7038 against the criteria for detecting one or more valid touch inputs, and in accordance with a determination that the touch input meets the criteria (e.g., criteria for detecting a swipe in an upward direction, a double tap input, a single finger tap, etc.) for triggering a first operation (e.g., turn down the display brightness, turn down the volume, switch to AR mode, etc.) associated with the one or more user interface objects (e.g., the user interface object 7060 or another user interface object displayed in lieu of the user interface object 7060, etc.), the computing system performs the first operation associated with the one or more user interface objects; and in accordance with a determination that the touch input meets the criteria (e.g., criteria for detecting a swipe in a downward direction, a single tap, a two-finger tap, etc.) for triggering a second operation (e.g., turn up the display brightness, turn up the volume, switch to VR mode, etc.) associated with the one or more user interface objects (e.g., the user interface object 7060, or another user interface object displayed in lieu of the user interface object 7060, etc.), the computing system performs the second operation associated with the one or more user interface object.

Figure 7P:
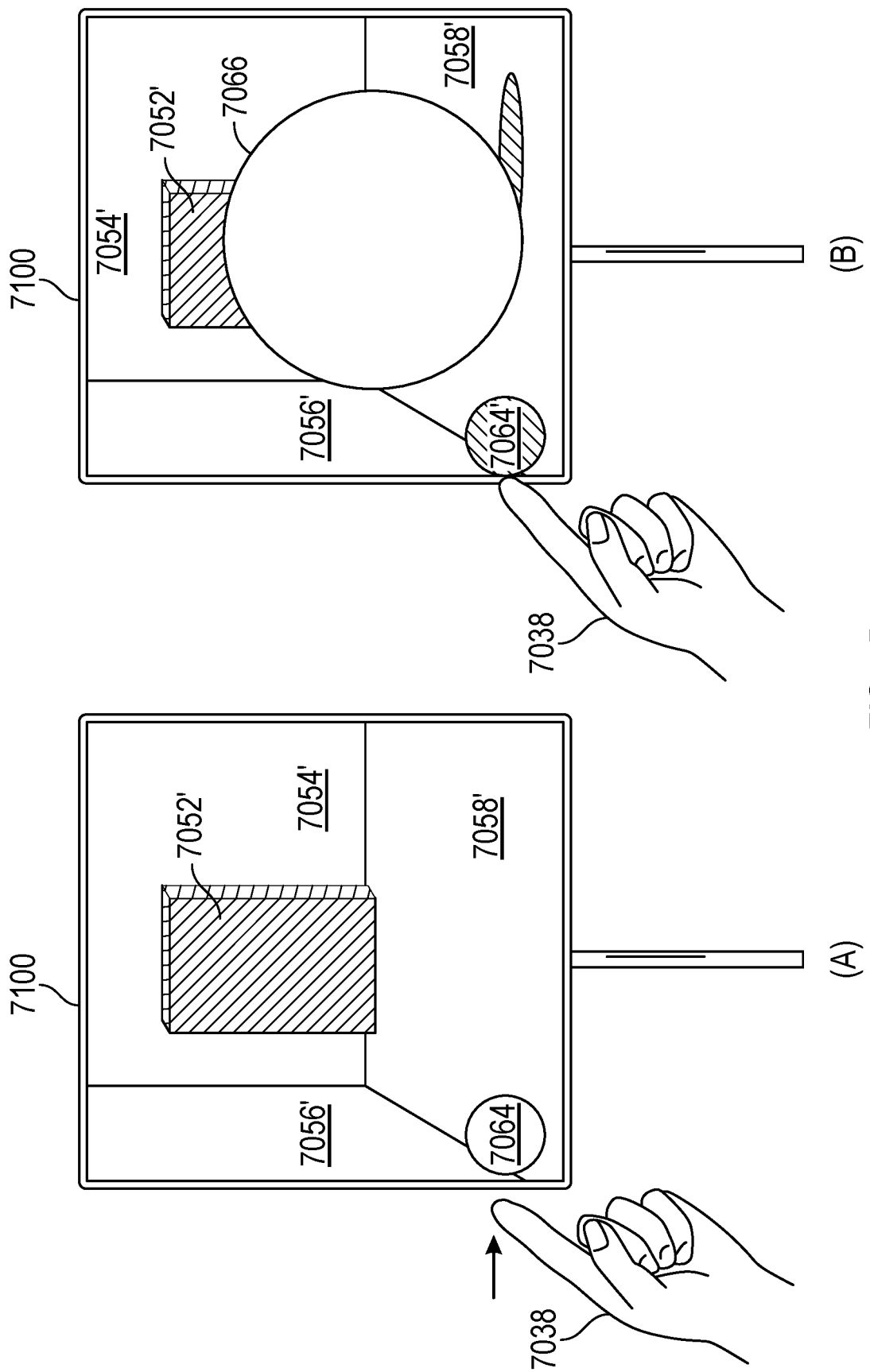
Figure 7Q:
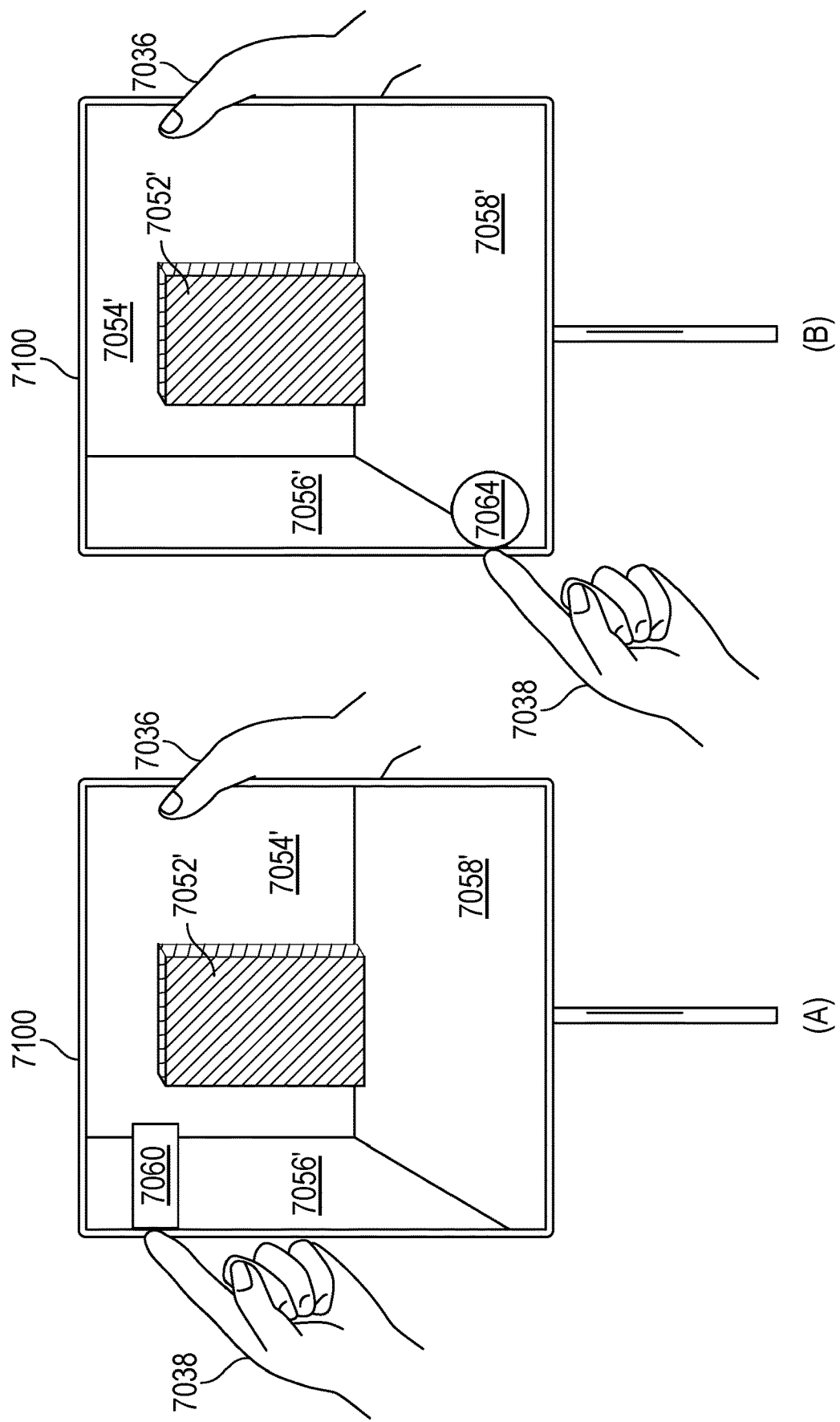

In some embodiments, as shown in FIG. 7P, the computing system detects the user's hand 7038 approaching a second touch-sensitive portion of the housing of the display generation component (e.g., the lower portion of the left edge of the housing of the display generation component, the lower, left edge of the HMD, the top, right edge of the HMD, etc.), and optionally displays one or more user interface objects (e.g., user interface object 7064, or other user interface object) in response. When the computing system detects a touch input on the second touch-sensitive portion of the housing of the display generation component, in accordance with a determination that only a single hand (e.g., the hand 7038) is touching the housing of the display generation component when the touch input is detected, the computing system performs a second operation that corresponds to the touch input performed by the hand 7038 or a portion thereof. In this example, activation of the control 7064 causes an augmented reality experience to be started which included some virtual content (e.g., a virtual ball 7066, other virtual object, etc.) that is displayed in combination with a view of the physical environment (e.g., the virtual ball 7066 is displayed at a location that corresponds to the location of the floor 7058, so that the virtual ball 7066 appears to rest on the surface of the representation 7058' of the floor 7058). Other features related to this example scenario are analogous to those described with respect to FIG. 7O, where the only differences would be due to the hand 7038 being detected near and/or at the first touch-sensitive portion of the housing of the display generation component, and the particular visual feedback and performed operation(s) were corresponding to the touch input detected on or near the first touch-sensitive portion of the housing of the display generation component. In the interest of brevity, the analogous features are not repeatedly described herein.

FIG. 7Q illustrates that, another hand (e.g., hand 7035) is touching (e.g., holding, supporting, otherwise in contact with, etc.) the housing of the display generation component (e.g., display 7100, an HMD, etc.) when a touch input by hand 7038 is detected on the housing of the display generation component. In FIG. 7Q, the hand 7038 is respectively touching the first touch-sensitive portion of the housing and the second touch-sensitive portion of the housing of the display generation component, and providing the same touch inputs as those previously respectively triggered performance of the first operation (e.g., displaying the virtual overlay 7062 in FIG. 7O) and second operation (e.g., displaying the virtual ball 7066 in FIG. 7P). However, in accordance with a determination that the touch inputs are detected while another hand (e.g., hand 7036) is also touching the housing of the display generation component (e.g., in accordance with a determination that another hand is touching an opposing side of the housing from the side on which the touch input is detected, a determination that another hand is touching anywhere on the housing, etc.) at the time that one of the touch inputs by hand 7038 is detected, the computing system forgoes performing the operation corresponding to the touch input that has been detected. For example, as shown in FIG. 7Q, the computing system still optionally displays the user interface objects (e.g., user interface object 7060, user interface object 7064, etc.) near the location of the hand 7038 that provided the valid touch inputs, but does not start the corresponding computer-generated experiences when the other hand 7036 is touching the housing of the display generation component. In some embodiments, the computing system does not display any user interface objects if hover inputs from two hands are concurrently detected near the touch-sensitive portions of the housing of the display generation component, and/or when touch inputs are concurrently detected on two sides of the housing of the display generation component. In some embodiments, when two hands are concurrently detected to approach the display generation component (e.g., an HMD, other types of display generation component, etc.) and/or touch the display generation component, it is more likely that the user wishes to take off the display generation component rather than provide input to the display generation component. Therefore, it is more advantageous to ignore such hover or touch inputs without the user's explicit instructions (e.g., reducing user confusion, saving power, etc.).

In some embodiments, the operation that is performed in accordance with the touch input detected on the housing of the display generation component changes a state of the computing system. For example, in accordance with a determination that the touch input meets first criteria, the computing system switches to a first state; and in accordance with a determination that the touch input meets second criteria different from the first criteria, the computing system switches to a second state that is different from the first state. In some embodiments, the first criteria and the second criteria have different location-based criteria that require the touch input to be detected at different locations on the housing. In some embodiments, the first criteria and the second criteria have different intensity-based criteria that require the touch input to meet different intensity thresholds. In some embodiments, the first criteria and the second criteria have different duration-based criteria that require the touch input to be detected with less than a threshold amount of movement for different threshold amounts of time on the housing. In some embodiments, the first criteria and the second criteria have different distance-based criteria that require the touch input to move by more than different threshold distances. In some embodiments, the first criteria and the second criteria have different touch pattern criteria that require the touch input include different number of contacts and/or movement patterns of contacts. In some embodiments, the first criteria and the second criteria have different movement criteria that require the touch input include movement of contact(s) that meet different speed thresholds and/or directional requirements. In some embodiments, the first criteria and the second criteria have different posture requirements for the hand that provides the touch input. In some embodiments, the first criteria and the second criteria have different combinations of two or more of the above-mentioned criteria (e.g., criteria related to location, intensity, duration, movement, and/or number of contacts, hand posture, etc.).

In some embodiments, the operation that is performed in accordance with the touch input changes the level of immersion associated with the content displayed by the display generation component. For example, the computing system optionally changes from a first state in which the computing system displays a computer-generated experience in a pass-through mode with a view of the physical environment (e.g., mixed reality mode) to a second state in which the computer-system displays the same computer-generated experience in an immersive mode (e.g., virtual reality mode) with no pass-through view of the physical environment, in response to a first touch input that is performed when only a single hand is detected on the housing of the display generation component. In some embodiments, the computing system switches from the second state back to the first state when a second touch input is detected on the housing of the display generation component while only a single hand is touching the housing of the display generation component. In some embodiments, the computing system optionally changes from a third state in which the computing system is not displaying any computer-generated experience (e.g., not displaying anything or displaying a complete pass-through view of the physical environment (e.g., reality mode)) to the first state (e.g., pass-through mode or mixed reality mode) or the second state (e.g., immersive mode or virtual reality mode) in response to detecting a third touch input that is performed when only a single hand is detected on the housing of the display generation component. In some embodiments, when the computing system is displaying computer-generated content in an immersive mode (e.g., virtual reality mode, with no pass-through view of the physical environment, etc.) via the display generation component, if both hands are detected on the housing of the display generation component, the computing system optionally, as a special operation, switches back to a pass-through view or a special mode in which the nearest physical objects are visually indicated in the virtual content. The user may instinctively put both hands on the housing of the HMD when he/she is unsure of his position in the physical environment (e.g., when he fears that he is going to bump into something), and visually indicating the nearest physical object(s) in the virtual content without stopping the virtual content can help the user reorient himself without completely stopping the immersive experience. In some embodiments, the computing system changes the audio function of the display generation component or an audio generation component in accordance with the touch input. For example, in accordance with a first touch input, the computing system changes from a first audio output mode (e.g., audio-pass through mode, or other audio output mode) to a second audio output mode (e.g., audio-immersive mode, or other audio output mode), and/or changes from a first audio blocking mode (e.g., no noise-cancelation mode, or other audio blocking mode) to a second audio blocking mode (e.g., complete noise cancelation mode, or other audio blocking mode). In some embodiments, the audio output mode are changed in conjunction with a change in the level of immersion that is caused by the touch input.

In some embodiments, while displaying the one or more user interface objects (e.g., the user interface objects 7060 and 7064 in FIGS. 7O-7Q) and/or the computer-generated experiences (e.g., the virtual overlay 7062 and the virtual ball 7066 in FIGS. 7O and 7P), the computing system detects that the touch input has ceased to be detected, the computing system optionally ceases to display the user interface objects and/or the computer-generated experiences.

In some embodiments, more than one display generation component are enclosed in the same housing. In addition to a display generation component that is facing the user, another display generation component is optionally included and faces away from the user. In some embodiments, a computing system that includes two display generation components are described with respect to FIGS. 7A-7J, and the second display generation component are optionally used to display status information and/or contextual information related to the state of the first display generation component and the user looking at the display side of the first display generation component. In some embodiments, in response to the touch input, the On/Off state of the privacy mode of the first display generation component is changed, and the computing system adjusts the status information shown on the second display generation component in accordance with the touch input and the change in the privacy mode. In some embodiments, the computing system adjusts the status information shown on the second display generation component in accordance with the changes to the level of immersion associated with the computer-generated experience shown via the first display generation component, when the changes to the level of immersion associated with the computer-generated experience is caused by the touch input detected on the housing of the first display generation component (and optionally, also the housing of the second display generation component). In some embodiments, the status information also includes the state of the user's eyes in front of the display side of the first display generation component, and the representation of the user's eyes is also updated in response to the touch input. Other aspects of the changes made to state of the second display generation component are described with respect to FIGS. 7A-7J, which are provided in conjunction with the changes to the state of the first display generation component as a result of the touch input that is detected on the housing of the first display generation component when only a single hand is detected on the housing of the first display generation component.

In some embodiments, input gestures used in the various examples and embodiments described herein optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computing system (e.g., computing system 101 in FIG. 1 (e.g., a portable electronic device 7100 or an HMD)) that includes a display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7200), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a micro tap input is a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computing system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a micro flick gesture is a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a micro swipe gesture is a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A micro tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computing system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, etc.). In some embodiments, the amount of movement performed by the moving finger (e.g., thumb) and or other movement metrics associated with the movement of the finger (e.g., speed, initial speed, ending speed, duration, direction, movement pattern, etc.) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture, etc.). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

Additional descriptions regarding FIGS. 7A-7Q are provided below in references to methods 8000, 9000, 10000, 11000, 12000, and 13000 described with respect to FIGS. 8-13 below.

FIG. 8 is a flowchart of a method 8000 of displaying a computer-generated environment and status information associated with the computer-generated environment and status information associated with a user in a position to view the computer-generated environment, in accordance with some embodiments.

Method 8000 relates to a computing system that includes a first display generation component and a second display generation component (e.g., separate displays, displays enclosed in the same housing but facing different directions (e.g., back to back facing opposite directions, facing different angles such that they cannot be viewed by the same user at the same time, etc.)). The first display generation component displays a computer-generated environment that provides computer-generated experiences to a user that is in a position to view the content presented via the first display generation component (e.g., the user is facing toward a display side of the display generation component (e.g., the side of the physical environment that is illuminated by a projector, the side of the display that emits light that forms an image on the user's retina, etc.)). The first display generation component optionally provides the computer-generated experience with different levels of immersion corresponding to different amounts of visual and audio information from the surrounding physical environment that are still perceivable via the first display generation component when the computer-generated experience is provided by the first display generation component. During normal operation (e.g., when the user wears the HMD that includes the first display generation component, and/or is facing the display side of the first display generation component), the first display generation component blocks the user's direct view of the surrounding physical environment, and at the same time, blocks others' view of the user's face or eyes when the user is in the position of viewing the content shown via the first display generation component. In some embodiments, the first display generation component is an inner display of an HMD facing the user's eyes when the HMD is placed on the user's head. Conventionally, when the user is in a position to view the content shown via a display generation component, the user has the option to see the physical environment or not see the physical environment by switching between displaying the computer-generated environment with different levels of emersions (e.g., switching between complete pass-through mode, mixed reality mode, or virtual reality mode). However, others in the surrounding environment facing the back side of the display generation component have little or no visual clues as to the attention state of the user, what content is showing on the display generation component, and/or whether the user is able to see the surrounding environment and the people in it. This imbalance of visual information (and optionally, audio information) on the two sides of the display generation component makes social interaction unnatural and inefficient between the user and others in the surrounding environment. Many considerations may benefit from the computing system using a second display generation component to display an appropriate amount of visual information conveying the status information related to the user and/or the content that is displayed to the user via the first display generation component to the people in the surrounding environment. The display of status information by the second display generation component is optionally displayed as long as the first display generation component is in use, or optionally triggered in response to detecting presence of other people in the same physical environment and/or in response to detecting indications that others may want to engage the user in social discourse (e.g., by entering the same room, looking in the user's direction, waving at the user, etc.). In some embodiments, showing the status information on the second display generation component includes displaying a representation of a portion of the user (e.g., the portion of the user that is blocked by the first display generation component when the user is in the position to view the content displayed via the first display generation component) that is dynamically updated in accordance with changes in the appearance of the user (e.g., changes in the portion of the user that is blocked by the first display generation component). In some embodiments, showing the status information also includes displaying graphical elements that provide a visual indication of the content that is currently shown via the first display generation component (e.g., concurrently with showing the representation of the portion of the user). This method and system of using a second display generation component to display updated status information related to the user viewing content shown via a first display generation component and the metadata associated with the state of the content (e.g., title, progress, level of immersion, display mode, etc.) allow others in the surrounding environment of the user to gain helpful insight into the current state of the user while the user is engaged in a computer-generated experience, but without fully revealing the computer-generated experience to the surrounding environment. In some embodiments, the representation of the portion of the user (e.g., the user's eyes or face) blocked by the first display generation component and the graphical elements showing the state of the content displayed via the first display generation component are respectively displayed on different display layers of the second display generation component and updated independently of each other. In some embodiments, the updates to the representation of the portion of the user and the graphical elements showing state of the content on different display layers of the second display generation component provide a more realistic view of the user's state behind a head-mounted display device that houses both the first display generation component and the second display generation component. The status information shown on the second display generation component enables the user to remain socially connected to the people in the surrounding environment when engaging in a computer-generated experience through the first display generation component. The dynamically updated status information on the second display generation component showing the state of the user's eyes and the state of the content shown to the user improves the user's engagement with the computer-generated experience when the user is in a public or semi-public environment, e.g., by encouraging appropriate social interaction when such interactions are desired by the user, reducing unnecessary avoidance of social interactions by others in the surrounding environment due to lack of visual cues for the user's permission to be socially engaged, informing others of a suitable time to interrupt the user's engagement with the computer-generated experience, reducing unwelcome interruptions to the user's engagement experiences due to lack of visual cues for the user's desire to remain undisturbed, etc.

In some embodiments, method 8000 is performed (8002) at a computing system (e.g., computing system 101 in FIG. 1) including a first display generation component (e.g., display 7100 in FIGS. 7A-7Q, an inner display of an HMD, etc.), a second display generation component (e.g., display 7102 in FIGS. 7A-7J, an outer display of the HMD, etc.) and one or more input devices (e.g., cameras, controllers, touch-sensitive surfaces, joysticks, buttons, gloves, watches, motion sensors, orientation sensors, etc.). In some embodiments, the first display generation component and the second display component are each a heads-up display, a head-mounted display (HMD), a display, a touchscreen, a projector, etc. or are separate displays of and/or enclosed in the same housing of a heads-up display, a head-mounted display (HMD), a display, a touchscreen, a projector, etc. In some embodiments, the first display generation component is a display component facing the user and provides a CGR experience to the user, and the second display generation component is a display component facing away from the user and toward an external environment of the user and optionally provides status information related to the first display generation component (e.g., displayed content, operational state, etc.) and/or the user (e.g., movement of the user's eyes, attention state of the user, etc.) to other users in the external environment. In some embodiments, the first display generation component and the second display generation component form a two-sided display device (e.g., a two-sided HMD) that displays a first user interface on a first side corresponding to the first display generation component, and a second user interface on the second side corresponding to the second display generation component. In some embodiments, the computing system is an integrated device with one or more processors and memory enclosed in the same housing as the first and the second display generation components and at least some of the one or more input devices. In some embodiments, the computing system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the display generation components and/or the one or more input devices. In some embodiments, the display generation components and the one or more input devices are integrated and enclosed in the same housing. In some embodiments, the method 8000 is governed by instructions that are stored in a non-transitory computer-readable storage medium and that are executed by one or more processors of a computing system, such as the one or more processors 202 of computing system 101 (e.g., control unit 110 in FIG. 1A). Some operations in method 8000 are, optionally, combined and/or the order of some operations is, optionally, changed.

The computing system displays (8004), via the first display generation component (e.g., displaying using the inner display of the HMD), a first computer-generated environment (e.g., a computer-generated environment that includes at least one of one or more virtual objects and representations of a physical environment surrounding the first display generation component (e.g., displaying a pure virtual environment with only virtual content (e.g., a VR view), displaying a mixed reality environment including both virtual content and representations of the surrounding physical environment (e.g., an AR view of the surrounding environment of the computing system), or displaying representations of the surrounding physical environment without any virtual content (e.g., a complete pass-through view))). While displaying the first computer-generated environment via the first display generation component, the computing system concurrently displays (8006), via the second display generation component: a visual representation (e.g., representation 7006 in FIGS. 7A-7E) of a portion of a user (e.g., first user 7202) of the computing system (e.g., the visual representation is a computer-generated image (e.g., a realistic or stylized image generated based on a camera view of the user's eyes) or a camera view of the user's eyes) who is in a position to view the first computer-generated environment via the first display generation component (e.g., when the user is wearing the HMD, and the user's face or eyes are facing the inner display of the HMD, and the HMD is blocking others' direct view of the user's face or eyes and the user's direct view of the surrounding environment), and one or more graphical elements (e.g., representation 7008, progress bar 7004, title of movie, etc. in FIGS. 7A-7E) (e.g., icons, graphics, text, colors, and/or animated visual changes thereof) that provide a visual indication of content in the first computer-generated environment (e.g., content 7002 in FIGS. 7A-7E). Concurrently displaying the visual representation of the portion of the user and the one or more graphical elements includes: changing the visual representation of the portion of the user (e.g., changing representation 7006 in FIGS. 7A-7E) to represent changes in an appearance of the user (e.g., changes due to movement of the portion of the user relative to the first display generation component) over a respective period of time (e.g., displaying real-time updates to the computer-generated image or camera view of the user's eyes in accordance with the real-time movement of the user's eyes behind the HMD during the respective period of time (e.g., while the user is viewing the first computer-generated environment with a first level of immersion (e.g., the user can see the outside environment through a pass-through view provided via the HMD))); and changing the one or more graphical elements (e.g., changing representation 7008, progress bar 7004, etc. in FIGS. 7A-7E) that provide the visual indication of content in the first computer-generated environment to represent changes in the first computer-generated environment over the respective period of time (e.g., displaying real-time or periodic updates to the one or more graphical elements in accordance with the real-time or periodic changes occurring in the first computer-generated environment during the respective period of time). In some embodiments, the visual representation of the portion of the user is displayed on the outside display of the HMD at a first display depth and the one or more graphical elements are displayed on the outside display of the HMD at a second display depth that is different from the first display depth (e.g., deeper or farther away from an outside viewer of the second display generation component (e.g., the image of the user's eyes are displayed at a first graphic layer behind a second graphical layer that displays the one or more graphical elements that provides visual indication of the content in the first computer-generated environment)). In some embodiments, the first display generation component and the second display component are respectively integrated in the same device (e.g., a head-mounted display, or two-sided display device), with the first display generation component facing the user, and the second display generation component facing the outside environment when the integrated device is placed in a position relative to the user during normal operation (e.g., when the HMD is wore on the user's head and/or placed in front of the user's eyes). This is illustrated in FIGS. 7A-7C, for example, where changes in appearance of the portion of the first user and changes in the computer-generated experience displayed via the first display generation component causes the status information displayed by the second display generation component to change as well.

In some embodiments, changing the visual representation of the portion of the user to represent changes in the appearance of the user over the respective period of time includes: in accordance with movement of the portion of the user in a first direction relative to the first display generation component (e.g., up and down movement of the eye balls or eye lids), displaying movement of the visual representation of the portion of the user in the first direction (e.g., up and down, in substantially the same direction as the movement of the portion of the user) on the second display generation component; and in accordance with movement of the portion of the user in a second direction relative to the first display generation component (e.g., sideways movement of the eye balls), the second direction being substantially perpendicular to the first direction, displaying movement of the visual representation of the portion of the user in a third direction on the second display generation component that is substantially opposite to the second direction. For example, when the eye ball is moving toward the left edge of the display side of the first display generation component, the representation of the eye ball moves toward the right edge of the display side of the second display generation component; and when the eye ball is moving toward the right edge of the display side of the first display generation component, the representation of the eye ball moves toward the left edge of the display side of the second display generation component, provided the that the left edge of the display side of the first display generation component and the right edge of the display side of the second display generation component are on the same side of the housing of the first and second display generation components, and the right edge of the display side of the first display generation component and the left edge of the display side of the second display generation component are on the same side of the housing of the first and second display generation component). For example, the image of the eyes on the second display generation component (e.g., shown on the outside display of the HMD) is not a mirror image of the user's eyes, but a camera feed of the user's eyes as viewed from the outside. In other words, the outside display of the HMD serves to provide a pseudo pass-through view of the user's eyes while physically blocking the outside viewer's direct view of the user's eyes. Displaying movement of the visual representation of the portion of the first user in the first direction in accordance with movement of the portion of the user in the first direction relative to the first display generation component, and displaying movement of the visual representation of the portion of the user in a third direction on the second display generation component that is substantially opposite to the second direction, the second direction being substantially perpendicular to the first direction, in accordance with movement of the portion of the user in the second direction relative to the first display generation component, provides improved visual feedback to the user (e.g., improved visual feedback regarding the movement of the portion of the user in the first or second direction). Providing improved feedback enhances the operability of the device, which, additionally, reduces power usage and improves battery life of the device by enabling the user to use the device more quickly and efficiently.

In some embodiments, concurrently displaying the visual representation of the portion of the user and the one or more graphical elements includes generating the visual representation of the portion of the user in accordance with a predefined characteristic value (e.g., 80% opacity, 30% transparency, 25% reduced saturation, reduced luminance range of [0.2, 0.8], etc.) that is specified for a first display property of the visual representation (e.g., a reduced opacity, reduced color saturation, reduced luminance, increased blur radius, etc., as compared to the one or more graphical elements, or the original raw image of the user's eyes as captured by one or more cameras that serve the basis for generating the visual representation of the user's eyes shown on the inner display of the HMD). Displaying the visual representation of the portion of the user and the one or more graphical elements, including generating the visual representation of the portion of the user in accordance with a predefined characteristic value that is specified for a first display property of the visual representation provides improved visual feedback to the user (e.g., visually distinguishes the visual representation of the portion of the user as compared to the one or more graphical elements). Providing improved feedback enhances the operability of the device, which, additionally, reduces power usage and improves battery life of the device by enabling the user to use the device more quickly and efficiently.

In some embodiments, the predefined characteristic value that is specified for the first display property of the visual representation includes a predefined amount of reduction for an opacity of the visual representation of the portion of the user (this is optionally implemented as an increase in translucency of the visual representation of the portion of the user). In some embodiments, while the visual representation of the portion of the user is displayed with a predefined reduction of opacity, the one or more graphical elements for providing an indication of the content of the first computer-generated environment currently shown on the first display generation component (e.g., the inner display of the HMD) are displayed on the second display generation component (e.g., the outer display of the HMD) without such reduction of opacity. Displaying the visual representation of the portion of the user and the one or more graphical elements, including generating the visual representation of the portion of the user in accordance with a predefined amount of reduction for an opacity of the visual representation of the portion of the user that is specified provides improved visual feedback to the user (e.g., visually distinguishes the visual representation of the portion of the user as compared to the one or more graphical elements). Providing improved feedback enhances the operability of the device, which, additionally, reduces power usage and improves battery life of the device by enabling the user to use the device more quickly and efficiently.

In some embodiments, concurrently displaying the visual representation of the portion of the user and the one or more graphical elements includes applying a predefined visual effect (e.g., a blur filter, a color filter, a luminance filter, etc.) on the visual representation of the portion of the user (e.g., applying a blur filter (e.g., a Gaussian blur filter) to the visual representation of the user's eyes when the visual representation is displayed on the inner display of the HMD). In some embodiments, while the visual representation of the portion of the user is displayed with a predefined visual effect (e.g., a blur filter), the one or more graphical elements for providing an indication of the content of the first computer-generated environment currently shown on the first display generation component (e.g., the inner display of the HMD) are displayed on the second display generation component (e.g., the outer display of the HMD) without such predefined visual effect (e.g., without the blur filter). Applying a predefined visual effect on the visual representation of the portion of the user provides improved visual feedback to the user (e.g., by visually distinguishing the visual representation of the portion of the user as compared to the one or more graphical elements). Providing improved feedback enhances the operability of the device, which, additionally, reduces power usage and improves battery life of the device by enabling the user to use the device more quickly and efficiently.

In some embodiments, concurrently displaying the visual representation of the portion of the user and the one or more graphical elements via the second display generation component includes displaying a diffused colored layer between the visual representation of the portion of the user and the one or more graphical elements that provide the visual indication of the content of the first computer-generated environment. In some embodiments, the visual representation of the portion of the user is displayed on a first graphical layer, the one or more graphical elements are displayed on a second graphical layer, and the diffused colored layer is displayed on a third graphical layer that is between the first graphical layer and the second graphical layer, and optionally, the third graphical layer is closer to the first graphical layer than to the second graphical layer. Displaying a diffused colored layer between the visual representation of the portion of the user and the one or more graphical elements that provide the visual indication of the content of the first computer-generated environment provides improved visual feedback to the user (e.g., by visually distinguishing the visual representation of the portion of the user as compared to the one or more graphical elements). Providing improved feedback enhances the operability of the device, which, additionally, reduces power usage and improves battery life of the device by enabling the user to use the device more quickly and efficiently.

In some embodiments, concurrently displaying the visual representation of the portion of the user and the one or more graphical elements via the second display generation component includes displaying the visual representation of the portion of the user with a first graphical resolution and displaying the one or more graphical elements that provide the visual indication of the content of the first computer-generated environment with a second graphical resolution that is different from (e.g., greater than, or smaller than) the first graphical resolution. In some embodiments, the representation of the user's eyes is displayed with a lower resolution than the one or more graphical elements for providing an indication of the content of the first computer-generated environment. Displaying the visual representation of the portion of the user with a first graphical resolution and displaying the one or more graphical elements that provide the visual indication of the content of the first computer-generated environment with a second graphical resolution that is different from the first graphical resolution provides improved visual feedback to the user (e.g., by visually distinguishing the visual representation of the portion of the user as compared to the one or more graphical elements). Providing improved feedback enhances the operability of the device, which, additionally, reduces power usage and improves battery life of the device by enabling the user to use the device more quickly and efficiently.

In some embodiments, concurrently displaying the visual representation of the portion of the user and the one or more graphical elements includes: in accordance with a determination that a first change in the appearance of the user (e.g., the user's eye balls or eye lids moved by more than a threshold amount of movement relative to the first display generation component while the first display generation component is fixed in position relative to the user's face) is detected (e.g., while the content in the first computer-generated environment remains unchanged in accordance with predefined criteria (e.g., not changed at all, or the level of immersion remains unchanged, or the chapter of the content remains unchanged, etc.)), changing the visual representation of the portion of the user in accordance with the first change in the appearance of the user (e.g., showing real-time movement of the eye balls and blinking of the eyes of the user on the outer display in accordance with actual movement of the eye balls and blinking of the eyes of the user as captured by a camera pointing at the user's eyes behind the HMD) without changing the one or more graphical elements that provide the visual indication of the content in the first computer-generated environment (e.g., displaying real-time updates to the computer-generated image or camera view of the user's eyes in accordance with the real-time movement of the user's eyes behind the HMD (e.g., while the user is viewing the first computer-generated environment with a first level of immersion (e.g., the user can see the outside environment through a pass-through view provided via the HMD) without changing the overlay that provides information to the outside viewers regarding the content and current status of the first computer-generated environment viewed by the user). In some embodiments, the one or more graphical elements that provide the visual indication of the content in the first computer-generated environment is not updated as frequently as the visual representation of the portion of the user, so for some interval of time between the updates are made to the one or more graphical elements, the one or more graphical elements do not change, even though the content in the first computer-generated environment has been changed. For example, the representation of the user's eyes are updated on the outer display in real time in accordance with the movement of the user's eyes behind the HMD, while the graphical elements that provide the visual indication of the content in the first computer-generated environment is updated every 20 seconds, 30 seconds, or in accordance with some predefined trigger events, such as a change of active application, a change in level of engagement or immersion of the first computer-generated environment, etc. Changing the visual representation of the portion of the user in accordance with the first change in the appearance of the user without changing the one or more graphical elements that provide the visual indication of the content in the first computer-generated environment (e.g., improved visual feedback regarding the first change in the appearance of the user). Providing improved feedback enhances the operability of the device, which, additionally, reduces power usage and improves battery life of the device by enabling the user to use the device more quickly and efficiently.

In some embodiments, concurrently displaying the visual representation of the portion of the user and the one or more graphical elements includes: in accordance with a determination that a second change in the content in the first computer-generated environment (e.g., the content in the first computer-generated environment changed in accordance with predefined criteria (e.g., any changed at all, or change in the level of immersion, or change in the chapter of the content being displayed, etc.) is detected while the appearance of the user remains unchanged (e.g., the user's eyes are not moving by more than a threshold amount relative to the first display generation component (e.g., the user is not blinking or moving his eye balls)), changing at least one of the one or more graphical elements that provide the visual indication of the content in the first computer-generated environment in accordance with the second change in the content in the first computer-generated environment (e.g., displaying updates (e.g., showing a progress bar of a movie displayed via the first display component, showing update to an indicator of the immersive level of the content, the user's attention state or engagement level based on a change in the immersive level, the user's attention state or engagement level, etc.) to the overlay that provides information to the outside viewers regarding the content and current status of the first computer-generated environment viewed by the user) without changing the visual representation of the portion of the user (e.g., showing actual stillness of the eye balls and eye lids of the eyes of the user as captured by a camera pointing at the user's eyes behind the HMD). Changing at least one of the one or more graphical elements that provide the visual indication of the content in the first computer-generated environment in accordance with the second change in the content in the first computer-generated environment without changing the visual representation of the portion of the user provides improved visual feedback to the user (e.g., improved visual feedback regarding the second change in the content in the first computer-generated environment). Providing improved feedback enhances the operability of the device, which, additionally, reduces power usage and improves battery life of the device by enabling the user to use the device more quickly and efficiently.

In some embodiments, concurrently displaying the visual representation of the portion of the user and the one or more graphical elements includes: in accordance with a determination that a third change in the appearance of the user (e.g., the user's eye balls or eye lids moved by more than a threshold amount of movement relative to the first display generation component while the first display generation component is fixed in position relative to the user's face) is detected with a fourth change in the content in the first computer-generated environment (e.g., the content in the first computer-generated environment changed in accordance with predefined criteria (e.g., any changed at all, or change in the level of immersion, or change in the chapter of the content being displayed, etc.), changing the visual representation of the portion of the user in accordance with the third change in the appearance of the user (e.g., showing real-time movement of the eye balls and blinking of the eyes of the user on the outer display in accordance with actual movement of the eye balls and blinking of the eyes of the user as captured by a camera pointing at the user's eyes behind the HMD) in conjunction with (e.g., concurrently with, during the same period of time) changing the one or more graphical elements that provide the visual indication of the content in the first computer-generated environment in accordance with the fourth change in the content in the first computer-generated environment (e.g., displaying real-time updates to the computer-generated image or camera view of the user's eyes in accordance with the real-time movement of the user's eyes behind the HMD (e.g., while the user is viewing the first computer-generated environment with a first level of immersion (e.g., the user can see the outside environment through a pass-through view provided via the HMD) while changing the overlay that provides information to the outside viewers regarding the content and current status of the first computer-generated environment viewed by the user). Changing the visual representation of the portion of the user in accordance with the third change in the appearance of the user in conjunction with changing the one or more graphical elements that provide the visual indication of the content in the first computer-generated environment in accordance with the fourth change in the content in the first computer-generated environment provides improved visual feedback to the user (e.g., improved visual feedback regarding the third change in the appearance of the user and the fourth change in the content in the first computer-generated environment).

In some embodiments, concurrently displaying the visual representation of the portion of the user and the one or more graphical elements includes displaying a modified version of the content concurrently with the visual representation of the portion of the user (e.g., displaying a diffused image of the currently displayed content in a display layer above the original or modified version of the image of the user's eyes), wherein the modified version of the content is generated with one or more image filters (e.g., one or more blur filters, one or more filters that reduce the resolution, clarity, brightness, color saturation, of an input image or video, etc.) that, when applied to an image of the content, reduces image fidelity of the image (e.g., such that the image appears more blurred, darkened, muted in color, more grainy due to reduced resolution and/or with a more limited color palette, etc.). In some embodiments, changing the one or more graphical elements that provide the visual indication of content in the first computer-generated environment to represent changes in the first computer-generated environment over the respective period of time includes updating the modified version of the content by applying the one or more image filters to images of the content as the content changes. Displaying a modified version of the content generated with one or more image filters that reduce image fidelity of the image concurrently with the visual representation of the portion of the user, and changing the one or more graphical elements to represent changes in the first computer-generated environment over the respective period of time by applying one or more image filters that reduce image fidelity to images of the content as the content changes, provides improved visual feedback to the user (e.g., by visually distinguishing the visual representation of the portion of the user as compared to the one or more graphical elements). Providing improved feedback enhances the operability of the device, which, additionally, reduces power usage and improves battery life of the device by enabling the user to use the device more quickly and efficiently.

In some embodiments, the visual representation of the portion of the user includes an image of the user's eyes (e.g., a camera view of the user's eyes in front of the first display generation component, a modified (e.g., blurred, diffused, darkened, and/or reduced opacity, etc.) version of the camera view of the user's eyes). Displaying the visual representation of the portion of the user, including an image of the user's eyes, provides improved visual feedback to the user (e.g., by visually distinguishing the visual representation of the portion of the user, by providing improved visual feedback regarding detected movement of the portion of the user (e.g., the user's eyes)). Providing improved feedback enhances the operability of the device, which, additionally, reduces power usage and improves battery life of the device by enabling the user to use the device more quickly and efficiently.

In some embodiments, the visual representation of the portion of the user includes a virtual object (e.g., a pair of virtual eyes that is a plurality of two-dimensional images or a three-dimensional model) that is generated based on one or more images of the user's eyes, wherein an appearance (e.g., color, size, structure, etc.) and movement (e.g., movement of the eye lids, and eye balls, etc.) of the virtual object correspond to an appearance and movement of the user's eyes that are captured by one or more sensors of the computing system (e.g., a cartoon version of the user's eyes is generated based on a camera view of the user's eyes in front of the first display generation component, and the cartoon version of the user's eyes move in accordance with the movement of the user's eyes as captured by the camera pointing toward the user's eyes). Displaying the visual representation of the portion of the user, including a virtual object that is generated based on one or more images of the user's eyes, and wherein an appearance and movement of the virtual object correspond to an appearance and movement of the user's eyes that are captured by one or more sensors, provides improved visual feedback to the user (e.g., by visually distinguishing the visual representation of the portion of the user, by providing improved visual feedback regarding the detected appearance and movement of the user's eyes). Providing improved feedback enhances the operability of the device, which, additionally, reduces power usage and improves battery life of the device by enabling the user to use the device more quickly and efficiently.

In some embodiments, changing the visual representation of the portion of the user to represent changes in the appearance of the user over the respective period of time includes: obtaining eye tracking data (e.g., movement of the user's eye balls and the direction and location of the focus of the user's gaze) corresponding to the user (e.g., eye tracking data is optionally captured by one or more camera pointing at the user's eyes and used as input for determining the user's gaze and interacting with the content displayed via the first display generation component); and updating the visual representation of the portion of the user based on the eye tracking data corresponding to the user (e.g., representing movement of the user's eyes in the visual representation of the portion of the user (e.g., the user's face or area near the eyes) in accordance with the eye tracking data). Changing the visual representation of the portion of the user to represent changes in the appearance of the user over the respective period of time, including obtaining eye tracking data corresponding to the user and updating the visual representation of the portion of the user based on the eye tracking data corresponding to the user, provides improved visual feedback to the user (e.g., provides more accurate visual feedback regarding the appearance and movement of the user's eyes, based on eye tracking data corresponding to the user). Providing improved feedback enhances the operability of the device, which, additionally, reduces power usage and improves battery life of the device by enabling the user to use the device more quickly and efficiently.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, 11000, 12000, and 13000) are also applicable in an analogous manner to method 8000 described above with respect to FIG. 8. For example, the gestures, gaze inputs, physical objects, user interface objects, and/or animations described above with reference to method 8000 optionally have one or more of the characteristics of the gestures, gaze inputs, physical objects, user interface objects, and/or animations described herein with reference to other methods described herein (e.g., methods 9000, 10000, 11000, 12000, and 13000). For brevity, these details are not repeated here.

FIG. 9 is a flowchart of a method 9000 of displaying a computer-generated environment and status information associated with the computer-generated environment and status information associated with a user in a position to view the computer-generated environment, in accordance with some embodiments.

Method 9000 also relates to a computing system with a first display generation component and a second display generation component. As described above, many considerations may benefit from the computing system using the second display generation component to display an appropriate amount of visual information conveying the status information related to the user and the content that is displayed to the user via the first display generation component to other people in the surrounding environment. In some embodiments, the status information is displayed on the second display generation component as long as the first display generation component is in use. In some embodiments, the status information is only displayed in response to detecting presence of other people in the same physical environment and/or in response to detecting some indication that others in the same physical environment may want to engage the user in social discourse (e.g., by entering the same room, looking in the user's direction, waving at the user, etc.). Showing the status information on the second display generation component optionally includes displaying a representation of a portion of the user (e.g., the portion of the user that is blocked by the first display generation component when the user is in the position to view the content displayed via the first display generation component) and displaying graphical elements that provide a visual indication of the content that is currently shown via the first display generation component. Furthermore, in some embodiments, the representation of the portion of the user is updated in conjunction with a change in the level of immersion of the computer-generated experience displayed via the first display generation component. This method and system of using a second display generation component to display status information related to the user viewing content shown via a first display generation component and related to the content viewed by the user and updating the status information, including updating the appearance of the representation of the portion of the user in accordance with a change in the level of immersion associated with provision of the content, allow others in the surrounding environment of the user to gain helpful insight into the current state of the user while the user is engaged in a computer-generated experience without fully revealing the computer-generated experience to the surrounding environment. In some embodiments, the updates to the representation of the portion of the user (e.g., the user's eyes or face) blocked by the first display generation component and the updates to graphical elements showing the state of the content displayed by the first display generation component are shown on different display layers and are update independently of each other. Displaying the representation of the portion of the user and the graphical elements showing the state of the content on different display layers provide a more realistic view of the user's state behind a head-mounted display device that houses both the first display generation component and the second display generation component. In some embodiments, the status information (e.g., including representation of the user and graphical elements showing the state of the content) shown via the second display generation component optionally provides visual indications of many different usage modes of the computing system that correspond to different needs of the user and others in the same physical environment as the user. This enables the user to remain socially connected to the people in the surrounding environment when engaging in a computer-generated experience. The dynamically updated status information on the second display generation component showing the state of the user's eyes and the state of the content shown to the user improves the user's engagement with the computer-generated experience when the user is in a public or semi-public environment, e.g., by encouraging appropriate social interaction when such interactions are desired by the user, reducing unnecessary avoidance of social interactions by others in the surrounding environment due to lack of visual cues for the user's permission to be socially engaged, informing others of a suitable time to interrupt the user's engagement with the computer-generated experience, reducing unwelcome interruptions to the user's engagement experiences due to lack of visual cues for the user's desire to remain undisturbed, etc.

In some embodiments, method 9000 is performed (9002) at a computing system (e.g., computing system 101 in FIG. 1) including a first display generation component (e.g., display 7100, an inner display of an HMD, etc.), a second display generation component (e.g., display 7102, an outer display of the HMD, etc.) (e.g., the first display generation component and the second display component are each a heads-up display, a head-mounted display (HMD), a display, a touchscreen, a projector, etc. or are separate displays of and/or enclosed in the same housing of a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the first display generation component is a display generation component facing the user and provides a CGR experience to the user, and the second display generation component is a display generation component facing away from the user and toward an external environment of the user and provides status information related to the first display generation component (e.g., displayed content, operational state, etc.) and/or the user (e.g., movement of the user's eyes, attention state of the user, etc.) to other users in the external environment. In some embodiments, the first display generation component and the second display generation component form a two-sided display device (e.g., a two-sided HMD) that displays a first user interface on a first side corresponding to the first display generation component, and a second user interface on the second side corresponding to the second display generation component. In some embodiments, the computing system is an integrated device with one or more processors and memory enclosed in the same housing as the first and the second display generation components and at least some of the one or more input devices. In some embodiments, the computing system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the display generation components and/or the one or more input devices. In some embodiments, the display generation component and the one or more input devices are integrated and enclosed in the same housing.

In method 9000, the computing system displays (9004), via the first display generation component (e.g., displaying using the inner display of the HMD, or a first display facing toward the user, etc.), a computer-generated environment (e.g., content 7002 in FIGS. 7A-7E) (e.g., displaying a pure virtual environment with only virtual content (e.g., a VR view), displaying a mixed reality environment including both virtual content and representations of the surrounding physical environment (e.g., an AR view), or displaying representations of the surrounding physical environment without any virtual content (e.g., a complete pass-through view)). While displaying the computer-generated environment via the first display generation component, the computing system displays (7006) status information corresponding to the computing system (e.g., representation 7006, representation 7008, progress bar 7004, etc.) via the second display generation component (e.g., displaying the status information using the outer display of the HMD, or a second display facing toward external environment away from the face of the user), including concurrently displaying: a visual representation (e.g., representation 7006) of a portion of a user (e.g., first user 7202) of the computing system who is in a position to view the computer-generated environment via the first display generation component, and one or more graphical elements (e.g., representation 7008, progress bar 7004, etc.) that provide a visual indication of content in the computer-generated environment. The computing system detects (9008) a respective event (e.g., while displaying the computer-generated environment via the first display generation component and displaying the status information (e.g., including concurrent display of the visual representation and the one or more graphical elements) corresponding to the computing system via the second display generation component (e.g., while the computer-generated environment is provided with a second level of immersion (e.g., mixed reality mode, or temporary pass-through mode provided during virtual reality mode) that is greater than a first level of immersion (e.g., reality mode or pass-through mode) and that is less than a third level of immersion (e.g., virtual reality mode)), the computing system detects a respective event (e.g., an event that triggers a change in immersion of the computer-generated environment)). In response to detecting the respective event (9010) (e.g., detecting natural termination of a computer-generated experience, detecting a notification, detecting a user input that interrupts or terminates a current mode): the computing system changes a level of immersion of the computer-generated environment displayed via the first display generation component (e.g., changing to a more immersive mode or changing to a less immersive mode, or changing to a special mode of one or more special modes); and the computing system changes the status information (e.g., changing the appearance of one or more graphical elements (e.g., increasing or decreasing a visibility of the one or more graphical elements (e.g., decreasing visibility includes ceasing to display), transforming the one or more graphical elements, etc.) or displaying additional graphical elements, etc.) that provide a visual indication of the content in the computer-generated environment) that is displayed via the second display generation component, including changing an appearance of the visual representation of the portion of the user of the computing system (e.g., increasing or decreasing a visibility of the visual representation of the portion of the user (e.g., decreasing visibility of the visual representation of the user includes completely ceasing to display the visual representation of the portion of the user)). This is illustrated in FIGS. 7C-7E, where changing the level of immersion of the computer-generated experience displayed via the first display generation component causes the status information displayed by the second display generation component to change as well.

In some embodiments, the computing system is configured to display the computer-generated environment with at least a first level of immersion, a second level of immersion, and a third level of immersion (e.g., the computing system causes the computer-generated environment displayed via the first display generation component to transition between the different levels of immersion in response to a sequence of one or more events (e.g., natural termination or progression of an application or experience; the start, stop, or pausing of an experience in response to a user input, etc.)). In some embodiments, the first, second, and third levels of immersion correspond to increasing amount of virtual content that is present in the computer-generated environment and/or decreasing amount of representations of the surrounding physical environment present in the computer-generated environment. In some embodiments, first, second, and third levels of immersion correspond to different modes of content display that have increasing image fidelity and/or spatial extent (e.g., angular extent, spatial depth, etc.) for the computer-generated content, and decreasing image fidelity and/or spatial extent for representations of the surrounding physical environment. In some embodiments, the first level of immersion is a pass-through mode where the physical environment is fully visible to the user through the first display generation component (e.g., as a camera view of the physical environment or through a transparent portion of the first display generation component)) and the computer-generated environment includes the pass-through view of the physical environment with a minimal amount of virtual elements concurrently visible as the view of the physical environment or including virtual elements that are peripheral (e.g., indicators and controls displayed in the peripheral region of the display) to the user's view of the physical environment. In some embodiments, the second level of immersion is a mixed reality mode where the pass-through view of the physical environment is augmented with virtual elements generated by the computing system and have positions in the computer-generated environment that correspond to the central portion of the user's view of the physical environment and/or have positions in the computer-generated environment that correspond to locations and objects in the physical environment (e.g., the virtual content is integrated with the physical environment in the view of the computer-generated environment). In some embodiments, the third level of immersion of a virtual reality mode in which that user's view of the physical environment is completely replaced or blocked by the view of virtual content provided by the first display generation component. In some embodiments, there are four different levels of immersion, where the first level of immersion corresponds to the pass-through mode of the first display generation component, the second level of immersion includes two sub-levels A and B that correspond to two separate sub-modes of the first display generation component (e.g., second level—A where a user interface or user interface objects are displaying in the main portion of the user's field of view while the pass-through view of the physical environment is displayed in the background of the user interface or user interface objects; and second level—B where virtual elements are integrated with representations of physical objects in the physical environment in an augmented reality view of the physical environment), and the third level of immersion corresponds to virtual reality mode of the first display generation component. Displaying the computer-generated environment with at least a first level of immersion, a second level of immersion, and a third level of immersion, provides improved visual feedback to the user (e.g., improved visual feedback that the respective event has been detected). Providing improved feedback enhances the operability of the device, which, additionally, reduces power usage and improves battery life of the device by enabling the user to use the device more quickly and efficiently.

In some embodiments, changing the level of immersion of the computer-generated environment displayed via the first display generation component in response to detecting the respective event includes: in accordance with a determination that the respective event is an event that meets first criteria (e.g., the first criteria are met when the computer-generated environment is currently displayed with the second level of immersion, and the respective event includes detecting the user putting both of his hands on the sides of the HMD to pause a mixed reality or augmented reality experience provided by the computing system), switching from displaying the computer-generated environment with the second level of immersion to displaying the computer-generated environment with the first level of immersion (e.g., switching from the mixed reality mode or augmented reality mode to the complete pass-through mode); and in accordance with a determination that the respective event is an event that meets second criteria different from the first criteria (e.g., the second criteria are met when the computer-generated environment is currently displayed with the second level of immersion, and the respective event includes detecting the user input causing virtual reality experience to be started), switching from displaying the computer-generated environment with the second level of immersion (e.g., the sub-mode B of the mixed-reality mode) to displaying the computer-generated environment with the third level of immersion (e.g., a virtual reality mode). In some embodiments, changing the level of immersion of the computer-generated environment displayed via the first display generation component in response to detecting the respective event includes: in accordance with a determination that the respective event is an event that meets third criteria (e.g., the third criteria are met when the computer-generated environment is currently displayed with the third level of immersion, and the respective event includes detecting the user putting both of his hands on the sides of the HMD to pause a virtual experience provided by the computing system or detecting the user input causing the termination of a virtual reality experience (e.g., redisplaying a graphical user interface (e.g., a home screen, an application launching user interface) or user interface objects (e.g., application launch icons, representations of content items and experiences, etc.) in the main portion of the user's field of view, or detecting a user input to return to an augmented reality version of the virtual reality experience; or detecting a user input (e.g., the user putting his hand over the top edge of the HMD in a looking out posture) that temporarily activates a pass-through view of the physical environment while the virtual reality content continues to be displayed with the pass-through view of the physical environment), switching from displaying the computer-generated environment with the third level of immersion (e.g., virtual reality mode) to displaying the computer-generated environment with the second level of immersion (e.g., a mixed reality mode, or a temporary pass-through mode optionally with concurrent display of the virtual reality content). In some embodiments, when the computer-generated environment is currently displayed with the first level of immersion, and the computer system detects the user taking his hands off of the HMD after putting on the HMD and/or sat down with the HMD on his head, before an application or experience provided by the computing system is selected), the computing system switches from displaying the computer-generated environment with the first level of immersion to displaying the computer-generated environment with the second level of immersion (e.g., switching from the complete pass-through mode to the mixed reality mode (e.g., the sub-mode A of the mixed reality mode) or causes display of a graphical user interface (e.g., a home screen, an application launching user interface) or user interface objects (e.g., application launch icons, representations of content items and experiences, etc.) to be displayed in the main portion of the user's field of view. Switching from displaying the computer-generated environment with the second level of immersion to displaying the computer-generated environment with the first level of immersion in accordance with a determination that the respective event is an event that meets first criteria, and switching from displaying the computer-generated environment with the second level of immersion to displaying the computer-generated environment with the third level of immersion in accordance with a determination that the respective event is an event that meets second criteria different from the first criteria, provides additional control options without cluttering the UI with additional displayed controls (e.g., additional displayed controls from switching from the second level of immersion to the first level of immersion, or for switching from the second level of immersion to the third level of immersion). Providing additional control options without cluttering the UI with additional displayed controls enhances the operability of the device, which, additionally, reduces power usage and improves battery life of the device by enabling the user to use the device more quickly and efficiently.

In some embodiments, changing the level of immersion of the computer-generated environment displayed via the first display generation component (e.g., in response to a first event of a sequence of one or more events) includes switching from displaying the computer-generated environment with a second level of immersion (e.g., the second level of immersion corresponds to a mixed reality mode (e.g., sub-mode A of the second level of immersion, sub-mode B of the second level of immersion, an augmented reality view of the physical environment) to displaying the computer-generated environment with a first level of immersion (e.g., the first level of immersion corresponds to a reality mode, or a complete pass-through mode), wherein the computer-generated environment displayed with the first level of immersion provides a view of the physical environment with less than a threshold amount of computer-generated content (e.g., with no virtual content or only virtual controls and status information in the peripheral region of the display). In some embodiments, the computer-generated environment with the second level of immersion provides a view of the physical environment with more than the threshold amount of computer-generated content (e.g., with user interface or user interface objects in the central portion of the display and/or visually integrated with representations of physical surfaces and objects in the physical environment). In some embodiments, changing the status information that is displayed via the second display generation component (e.g., in response to the first event of a sequence of one or more events) includes: in conjunction with switching from displaying the computer-generated environment with the second level of immersion to displaying the computer-generated environment with the first level of immersion (e.g., in conjunction with switching from the mixed reality mode to the reality or pass-through mode), switching from displaying the visual representation of the portion of the user of the computing system with the one or more graphical elements that provide the visual indication of the content in the computer-generated environment to displaying the visual representation of the portion of the user without the one or more graphical elements (e.g., when switching from a mixed reality mode to a reality or complete pass-through mode on the first display generation component, the second display generation component switches from displaying status indicators for the content shown on the first display generation component with the representations of the user's eyes to only displaying the representations of the user's eyes without the status indicators for the content being viewed by the user). Displaying a view of the physical environment with less than a threshold amount of computer-generated content when switching from displaying the computer-generated environment with a second level of immersion to displaying the computer-generated environment with a first level of immersion, and switching from displaying the visual representation of the portion of the user of the computing system with the one or more graphical elements that provide the visual indication of the content to displaying the visual representation of the portion of the user without the one or more graphical elements in conjunction with changing the status information that is displayed, provides improved visual feedback to the user (e.g., improved visual feedback regarding the current level of immersion). Providing improved feedback enhances the operability of the device, which, additionally, reduces power usage and improves battery life of the device by enabling the user to use the device more quickly and efficiently.

In some embodiments, the computing system concurrently displays the visual representation of the portion of the user (e.g., the representation of the user's eyes or of the portion of the face near the eyes) and the one or more graphical elements that provide a visual indication of content in the computer-generated environment (e.g., a virtual overlay that is a diffused version of the content shown via the first display generation component) in accordance with a determination that the computer-generated environment is a mixed reality environment that includes a representation of a physical environment surrounding the first display generation component (and the second display generation component) and at least a threshold amount of virtual objects (e.g., the computing system displays, via the second display generation component (e.g., the outer display of the HMD), a real-time image of the user's eyes with an overlay showing a hint of the content that is being displayed via the first display generation component, when the co-presence of the representation of the physical environment and at least a threshold amount of virtual objects (e.g., when an AR experience is provided via the first display generation component (e.g., the inner display of the HMD)) gives in the computer-generated environment gives rise to a second level of immersion). Concurrently displaying the visual representation of the portion of the user and the one or more graphical elements in accordance with a determination that the computer-generated environment is a mixed reality environment that includes a representation of a physical environment surrounding the first display generation component and at least a threshold amount of virtual objects provides improved visual feedback to the user (e.g., improved visual feedback regarding the physical environment surrounding the first display generation component and the at least a threshold amount of virtual objects). Providing improved feedback enhances the operability of the device, which, additionally, reduces power usage and improves battery life of the device by enabling the user to use the device more quickly and efficiently.

In some embodiments, changing the level of immersion of the computer-generated environment displayed via the first display generation component (e.g., in response to a second event of a sequence of one or more events) includes switching from displaying the computer-generated environment with a second level of immersion (e.g., the second level of immersion corresponds to a mixed reality mode (e.g., sub-mode A of the second level of immersion, sub-mode B of the second level of immersion, an augmented reality view of the physical environment)) to displaying the computer-generated environment with a third level of immersion (e.g., the third level of immersion corresponds to a virtual reality mode), wherein the computer-generated environment displayed with the third level of immersion provides a virtual environment (e.g., a virtual three-dimensional environment) with less than a threshold amount of representation of the physical environment (e.g., with no camera view or a pass-through view of the physical environment, or with only textual information describing the name, location, and/or weather of the physical environment). In some embodiments, the computer-generated environment displayed with the second level of immersion provides a view of the physical environment with more than the threshold amount of computer-generated content (e.g., with user interface or user interface objects in the central portion of the display and/or visually integrated with representations of physical surfaces and objects in the physical environment) and more than the threshold amount of representation of the physical environment (e.g., including a camera view or a view through a transparent pass-through portion of the first display generation component). In some embodiments, changing the status information that is displayed via the second display generation component (e.g., in response to the second event of a sequence of one or more events) includes: in conjunction with switching from displaying the computer-generated environment with the second level of immersion to displaying the computer-generated environment with the third level of immersion (e.g., in conjunction with switching from the mixed reality mode to the virtual reality mode), switching from displaying the visual representation of the portion of the user of the computing system with the one or more graphical elements that provide the visual indication of the content in the computer-generated environment to displaying the one or more graphical elements without the visual representation of the portion of the user (e.g., when switching from a mixed reality mode to a virtual reality mode on the first display generation component, the second display generation component switches from displaying status indicators for the content shown on the first display generation component with the representations of the user's eyes to only displaying the status indicators for the content being viewed by the user without displaying the representations of the user's eyes). Switching from displaying the computer-generated environment with a second level of immersion to displaying the computer-generated environment with a third level of immersion that provides a virtual environment with less than a threshold amount of representation of the physical environment, in conjunction with switching from displaying the visual representation of the portion of the user with the one or more graphical elements to displaying the one or more graphical elements without the visual representation of the portion of the user, provides improved visual feedback to the user (e.g., improved visual feedback regarding the changed level of immersion and the changed status information). Providing improved feedback enhances the operability of the device, which, additionally, reduces power usage and improves battery life of the device by enabling the user to use the device more quickly and efficiently.

In some embodiments, while displaying the computer-generated environment via the first display generation component and displaying the status information corresponding to the computing system via the second display generation component (e.g., while the computer-generated environment is provided with a second level of immersion (e.g., mixed reality mode, or temporary pass-through mode provided during virtual reality mode) that is greater than a first level of immersion (e.g., reality mode or pass-through mode) and that is less than a third level of immersion (e.g., virtual reality mode)), the computing system detects a first user request to activate a privacy mode of the computing device (e.g., detecting a user input that is a downward movement of a hand maintained in a pinch gesture (e.g., as if the user is pulling down a blind on the HMD), or detecting a user input activating a control in the computer-generated environment that corresponds to a request to activate a private mode (e.g., a system request that applies to all applications subsequently displayed on the first display generation component, or an application-specific request that applies to the currently displayed application), or when the user is accessing content that is marked as "private" in the computer-generated environment, etc.), wherein the privacy mode requires that the one or more graphical elements (e.g., the overlay that is generated based on and reflects the content of the computer-generated environment currently shown via the first display generation component) displayed via the second display generation component have less than a first threshold visibility (e.g., less than a threshold resolution, brightness, opacity, and/or clarity; more than a threshold amount of blurring; or not displayed or visible at all). In response to detecting the first user request: in accordance with a determination that the first user request is received while visibility of the one or more graphical elements that provide a visual indication of content in the computer-generated environment exceeds the first threshold visibility corresponding to the privacy mode, the computing system decreases the visibility of the one or more graphical elements on the second display generation component below the first threshold visibility corresponding to the privacy mode (e.g., fading out, further blurring, making more translucent, or ceasing to display the one or more graphical elements that provide the visual indication of the content in the computer-generated environment). In response to detecting the first user request, in accordance with a determination that the first user request is received while the visibility of the one or more graphical elements that provide a visual indication of content in the computer-generated environment does not exceed the first threshold visibility corresponding to the privacy mode, the computing system maintains the visibility of the one or more graphical elements below the first threshold visibility corresponding to the privacy mode (e.g., not displaying the one or more graphical elements or keeping them minimally visible and unchanged). In some embodiments, while the privacy mode is active, the one or more graphical elements are not displayed or goes into a state that display minimal information and remain unchanged on the second display generation component even when the content of the computer-generated environment continue to change on the first display generation component. Decreasing the visibility of the one or more graphical elements on the second display generation component below the first threshold visibility corresponding to the privacy mode in accordance with a determination that the first user request to activate the privacy mode is received while visibility of the one or more graphical elements exceeds the first threshold visibility corresponding to the privacy mode, and maintaining visibility of the one or more graphical elements below the first threshold visibility corresponding to the privacy mode in accordance with a determination that the first user request to activate the privacy mode is received while visibility of the one or more graphical elements does not exceed the first threshold visibility corresponding to the privacy mode, provides additional control options without cluttering the UI with additional displayed controls (e.g., additional displayed controls for decreasing or maintaining the visibility of the one or more graphical elements). Providing additional control options without cluttering the UI with additional displayed controls enhances the operability of the device, which, additionally, reduces power usage and improves battery life of the device by enabling the user to use the device more quickly and efficiently.

In some embodiments, the privacy mode requires that the visual representation of the portion of the user displayed via the second display generation component has less than a second threshold visibility (e.g., less than a threshold resolution, brightness, opacity, and/or clarity; more than a threshold amount of blurring; or not displayed or visible at all). In some embodiments, in response to detecting the first user request: in accordance with a determination that the first user request is received while visibility of the visual representation of the portion of the user exceeds the second threshold visibility corresponding to the privacy mode, the computing system decreases the visibility of the visual representation of the portion of the user on the second display generation component below the second threshold visibility corresponding to the privacy mode (e.g., fading out, further blurring, making more translucent, or ceasing to display the representation of the user's eyes). In some embodiments, in response to detecting the first user request, in accordance with a determination that the first user request is received while the visibility of the visual representation of the portion of the user does not exceed the second threshold visibility corresponding to the privacy mode, maintaining the visibility of the visual representation of the portion of the user below the second threshold visibility corresponding to the privacy mode (e.g., not displaying the representation of the user's eyes or keeping it minimally visible and unchanged). In some embodiments, while the privacy mode is active, the visual representation of the user's eyes are not displayed or goes into a state that is minimally visible and/or remain unchanged on the second display generation component even when the eyes continue to move behind the first display generation component. Decreasing the visibility of the visual representation of the portion of the user on the second display generation component below the second threshold visibility corresponding to the privacy mode in accordance with a determination that the first user request is received while visibility of the visual representation of the portion of the user exceeds the second threshold visibility corresponding to the privacy mode, and maintaining the visibility of the visual representation of the portion of the user below the second threshold visibility corresponding to the privacy mode in accordance with a determination that the first user request is received while the visibility of the visual representation of the portion of the user does not exceed the second threshold visibility corresponding to the privacy mode, provides additional control options without cluttering the UI with additional displayed controls (e.g., additional displayed controls for decreasing or maintaining the visibility of the portion of the user). Providing additional control options without cluttering the UI with additional displayed controls enhances the operability of the device, which, additionally, reduces power usage and improves battery life of the device by enabling the user to use the device more quickly and efficiently.

In some embodiments, while the privacy mode is active on the computing system, detecting a second respective event that changes a level of immersion of the computer-generated environment displayed via the first display generation component (e.g., changing from the second level of immersion to the first level of immersion, from the second level of immersion to the third level of immersion, from the third level of immersion to the second level of immersion, from the third level of immersion to the first level of immersion, from the first level of immersion to the third level of immersion, etc.). In response to detecting the second respective event and the corresponding change in the level of immersion of the computer-generated environment displayed via the first display generation component, the computing system forgoes changing the status information that is displayed via the second display generation component (e.g., forgoing changing the current visibility (e.g., minimal visibility or not visible at all) and appearance of the one or more graphical elements on the second display generation component; and forgoing changing the current visibility (e.g., minimal visibility or not visible at all) and appearance of the visual representation of the user's eyes on the second display generation component). Forgoing changing the status information that is displayed via the second display generation component, in response to detecting the second respective event and the corresponding change in the level of immersion of the computer-generated environment, and while the privacy mode is active on the computing system, reduces the number of inputs needed to forgo changing the status information that is displayed via the second display generation component (e.g., the user does not need to perform additional inputs to prevent or undo changes to the status information that is displayed via the second display generation component while the privacy mode is active). Reducing the number of inputs needed to perform an operation enhances the operability of the device, which, additionally, reduces power usage and improves battery life of the device by enabling the user to use the device more quickly and efficiently.

In some embodiments, while displaying the computer-generated environment via the first display generation component (e.g., while the computer-generated environment is provided with a second level of immersion (e.g., mixed reality mode, or temporary pass-through mode provided during virtual reality mode) or a third level of immersion (e.g., virtual reality mode), and the second display generation component is displaying status information (e.g., visual representation of the user's eyes and graphical elements that indicate the content of the computer-generated environment currently displayed via the first display generation component)), the computing system detects a second user request to activate a Do-Not-Disturb (DND) mode of the computing device (e.g., detecting a user input that is a hand covering the front of the HMD, or detecting a user input activating a control in the computer-generated environment that corresponds to a request to activate a do-not-disturb mode (e.g., a system request that applies to all applications subsequently displayed on the first display generation component, or an application-specific request that applies to the currently displayed application), or when the user is accessing content that has been marked with an "DND" flag, etc.). In some embodiments, in response to detecting the second request to activate the DND mode of the computing device, the computing system optionally reduces interruptions to the computer-generated experience by muting or forgoing displaying notifications generated by the computing system or other applications (e.g., applications that are different from the application corresponding to the currently displayed computer-generate environment, or a selected subset of applications (e.g., non-critical applications that were specified by the user previously, etc.), etc.) or displaying them in a less intrusive manner (e.g., changing from displaying a pop-up notification to displaying a badge or providing a buzz, etc., changing from outputting an audio alert to not outputting the audio alert, etc.). In some embodiments, in response to detecting the second request to activate the DND mode, the computing system automatically turns off audio and/or visual alert for incoming communication requests (e.g., incoming calls, incoming chat requests, etc.), and optionally, responds to the incoming communication request by activating a voicemail system or autoreply feature of the computing system corresponding to the incoming communication request. In some embodiments, in response to detecting the second request to activate the DND mode, the computing system turns on a noise cancellation system or other mechanisms to reduce noise or sound propagating to the first user's ears from the surrounding environment. In some embodiments, in response to detecting the second request to activate the DND mode, the computing system increases the level of immersion by which the computer-generated experience is displayed via the first display generation component. In some embodiments, multiple operations set forth above are performed in response to detecting the second user request. In some embodiments, in response to detecting the second user request (and optionally, in conjunction with performing one or more other operations that are performed to activate the DND mode), the computing system displays a visual indicator (e.g., text label "DND" on the outer display of the HMD, a red edge is lit around the outer display of the HMD, etc.) via the second display generation component to indicate that the DND mode is active. Displaying a visual indicator that indicates that the DND mode is active, in response to detecting the second user request to activate the DND mode of the computing device, provides improved visual feedback to the user (e.g., improved visual feedback that the DND mode is active). Providing improved feedback enhances the operability of the device, which, additionally, reduces power usage and improves battery life of the device by enabling the user to use the device more quickly and efficiently.

In some embodiments, while the DND mode is active on the computing system, the computing system detects a third respective event that changes a level of immersion of the computer-generated environment displayed via the first display generation component (e.g., changing from the second level of immersion to the first level of immersion, from the second level of immersion to the third level of immersion, from the third level of immersion to the second level of immersion, from the third level of immersion to the first level of immersion, from the first level of immersion to the third level of immersion, etc.). In response to detecting the third respective event and the corresponding change in the level of immersion of the computer-generated environment displayed via the first display generation component, the computing system forgoes changing the status information that is displayed via the second display generation component (e.g., forgoing changing the current visibility (e.g., normal visibility, minimal visibility or not visible at all) and appearance of the one or more graphical elements on the second display generation component; and forgoing changing the current visibility (e.g., normal visibility, minimal visibility or not visible at all) and appearance of the visual representation of the user's eyes on the second display generation component). Forgoing changing the status information that is displayed via the second display generation component, in response to detecting the third respective event and the corresponding change in the level of immersion, and while the DND mode is active on the computing system, reduces the number of inputs needed to display the status information via the second display generation component (e.g., the user does not need to perform additional inputs to prevent or undo any changes to the displayed status information while the DND mode is active). Reducing the number of inputs needed to perform an operation enhances the operability of the device, which, additionally, reduces power usage and improves battery life of the device by enabling the user to use the device more quickly and efficiently.

In some embodiments, while displaying the computer-generated environment via the first display generation component (e.g., while the computer-generated environment is provided with a second level of immersion (e.g., mixed reality mode, or temporary pass-through mode provided during virtual reality mode) or a third level of immersion (e.g., virtual reality mode)), the computing system detects a third user request to activate a parental control mode of the computing device (e.g., detecting a user input that is a fingerprint input on the housing of the HMD, or detecting a user input activating a control in the computer-generated environment that corresponds to a request to activate a parental control mode (e.g., a system request that applies to all applications subsequently displayed on the first display generation component, or an application-specific request that applies to the currently displayed application), or when the user is accessing content that is marked as "controlled" in the computer-generated environment, or when a remote request is received from a controlling device (e.g., a mobile device of the parent), etc.). The parental-control mode requires that the one or more graphical elements (e.g., the overlay that is generated based on and reflects the content of the computer-generated environment currently shown via the first display generation component) displayed via the second display generation component have more than a third threshold visibility (e.g., more than a threshold resolution, brightness, opacity, and/or clarity; less than a threshold amount of blurring; or showing identical content as that shown on the first display generation component). In response to detecting the third user request, in accordance with a determination that the third user request is received while visibility of the one or more graphical elements that provide a visual indication of content in the computer-generated environment is less than the third threshold visibility corresponding to the parental control mode, the computing system increases the visibility of the one or more graphical elements on the second display generation component above the third threshold visibility corresponding to the parental-control mode (e.g., increasing fidelity and resolution of the one or more graphical elements that provide the visual indication of the content in the computer-generated environment; or displaying the content of the computer-generated environment in place of the one or more graphical elements). In some embodiments, in response to the third user request, in accordance with a determination that the third user request is received while visibility of the one or more graphical elements that provide a visual indication of content in the computer-generated environment already exceeds the third threshold visibility corresponding to the parental-control mode, the computing system maintains the visibility of the one or more graphical elements above the third threshold visibility corresponding to the parental-control mode. In some embodiments, while the parental-control mode is active, the content of the computer-generated environment are displayed on both the first display generation component and the second display generation component, and continue to change on both the first display generation component and the second display generation component. In some embodiments, the parental control mode is enabled (e.g., either before the computer-generated experience is started or while the computer-generated experience is being displayed) by a person (e.g., a parent, teacher, supervisor, administrator, etc.) other than the user in the position to view the content displayed via the first display generation component. The parental control mode allows parents, teaches, supervisors, administrators to monitor the activities occurring on the first display generation component (e.g., the inner display of an HMD) when the display side of the first display generation component is faced away and/or blocked by the physical hardware of the first display generation component and the content is not visible to the outside viewers. Increasing the visibility of the one or more graphical elements above a third threshold visibility corresponding to the parental-control mode in accordance with a determination that the third user request to activate the parental control mode is received while visibility of the one or more graphical elements is less than the third threshold visibility corresponding to the parental control mode, reduces the number of inputs needed to increase the visibility of the one or more graphical elements above the third threshold visibility (e.g., the user does not need to perform a separate input to activate the parental control mode and a separate input to increase the visibility of the one or more graphical elements). Reducing the number of inputs needed to perform an operation enhances the operability of the device, which, additionally, reduces power usage and improves battery life of the device by enabling the user to use the device more quickly and efficiently.

In some embodiments, while the parental-control mode is active on the computing system, the computing system detects a fourth respective event that changes a level of immersion of the computer-generated environment displayed via the first display generation component (e.g., changing from the second level of immersion to the first level of immersion, from the second level of immersion to the third level of immersion, from the third level of immersion to the second level of immersion, from the third level of immersion to the first level of immersion, from the first level of immersion to the third level of immersion, etc.). In response to detecting the fourth respective event and the corresponding change in the level of immersion of the computer-generated environment displayed via the first display generation component, the computing system forgoes changing the status information that is displayed via the second display generation component (e.g., forgoing changing the current visibility (e.g., maintaining full visibility of the content of the computer-generated environment); and forgoing changing the current visibility (e.g., normal visibility, minimal visibility or not visible at all) and appearance of the visual representation of the user's eyes on the second display generation component). Forgoing changing the status information that is displayed via the second generation component, in response to detecting the fourth respective event and the corresponding change in the level of immersion, and while the parental-control mode is active on the computing system, reduces the number of inputs needed to display the status information via the second display generation component (e.g., the user does not need to perform additional inputs to prevent or undo any changes to the displayed status information while the parental-control mode is active). Reducing the number of inputs needed to perform an operation enhances the operability of the device, which, additionally, reduces power usage and improves battery life of the device by enabling the user to use the device more quickly and efficiently.

In some embodiments, concurrently displaying the visual representation of the portion of the user and the one or more graphical elements includes displaying the visual representation of the portion of the user at a first depth and displaying the one or more graphical elements at a second depth, smaller than the first depth, from an external viewpoint of the status information (e.g., including the visual representation of the portion of the user and the one or more graphical elements) displayed via the second display generation component. For example, when the viewer of the status information moves around the second display generation component, the viewers sees the visual representation of the portion of the user moves relative to the one or more graphical elements due to the different depths of the visual representation of the portion of the user and the one or more graphical elements from the viewer (e.g., a simulated parallax effect). Concurrently displaying the visual representation of the portion of the user and the one or more graphical elements, including displaying the visual representation of the portion of the user at a first depth and displaying the one or more graphical elements at a second depth, smaller than the first depth, from an external viewpoint of the status information, provides improved visual feedback to the user (e.g., by visually distinguishing the portion of the user and the one or more graphical elements by depth). Providing improved feedback enhances the operability of the device, which, additionally, reduces power usage and improves battery life of the device by enabling the user to use the device more quickly and efficiently.

In some embodiments, the one or more graphical elements that provide a visual indication of content in the computer-generated environment includes at least a progress indicator indicating a progress of the content in the computer-generated environment as displayed via the first display generation component. For example, if a media item is being played in the computer-generated environment, the progress indicator optionally displays a progress bar showing the current playback location of the media item relative to the entire duration of the media item (e.g., a progress bar showing the current page/chapter in a book, current playback location in a movie, current chapter or task number in a game, current problem number in a test, etc.). Displaying the one or more graphical elements that provide a visual indication of content in the computer-generated environment, including at least a progress indicator indicating a progress of the content in the computer-generated environment as displayed via the first display generation component, provides improved visual feedback to the user (e.g., regarding the progress of the content in the computer-generated environment). Providing improved feedback enhances the operability of the device, which, additionally, reduces power usage and improves battery life of the device by enabling the user to use the device more quickly and efficiently.

In some embodiments, the one or more graphical elements that provide a visual indication of content in the computer-generated environment have a first display property (e.g., color, brightness, etc.) the value of which is based on (but are different from) a value of a first display property of the content in the computer-generated environment. For example, if the content includes mostly blue colors, the overlay shown via the second display generation component also has mostly blue colors; and if the content changes to mostly pink colors, the overlay also changes to mostly pink colors. In some embodiments, the overlay is generated by using a blur filter with a wide blur radius applied on the image of the content in the computer-generated environment, such that the outline of the objects are not clearly seen, but large patches colors and overall color tones of the content are largely preserved on the overlay shown via the second display generation component. Displaying the one or more graphical elements that provide a visual indication of content in the computer-generated environment with a first display property, the value of which is based on a value of the first display property of the content in the computer-generated environment, provides improved visual feedback to the user (e.g., improved visual feedback regarding the first display property of the content in the computer-generated environment). Providing improved feedback enhances the operability of the device, which, additionally, reduces power usage and improves battery life of the device by enabling the user to use the device more quickly and efficiently.

In some embodiments, the one or more graphical elements that provide a visual indication of content in the computer-generated environment includes one or more sub-portions of the content of the computer-generated environment (e.g., the pieces of an image of the content are scrambled, or one or more sub-portions of the image of the content are shown via the second display generation component). For example, in some embodiments, an image of the content of the computer-generated environment is divided into pieces of a predefined size and/or shape and the pieces are scrambled in accordance with one or more scrambling algorithms, where the size of the pieces are sufficiently large such that different content (e.g., changes in scenes) can result in scrambled images with sufficient differences for the viewer to tell them apart, and are sufficient smaller such that the exact image of the content is not discernable to the viewer. In some embodiments, the visual indication of the content of the computer-generated environment is provided by a small spotlight that moves around the overlay making the content corresponding to the portion of the overlay lit up by the spotlight and become visible to the viewer of the overlay. Displaying the one or more graphical elements that provide a visual indication of content in the computer-generated environment, including one or more sub-portions of the content of the computer-generated environment, provides improved visual feedback to the user (e.g., improved visual feedback regarding the content of the computer-generated environment). Providing improved feedback enhances the operability of the device, which, additionally, reduces power usage and improves battery life of the device by enabling the user to use the device more quickly and efficiently.

In some embodiments, the one or more graphical elements that provide a visual indication of content in the computer-generated environment includes metadata identifying the content of the computer-generated environment. For example, if the content is a movie, the one or more graphical elements optionally includes a title of the movie, a genre of the movie, a year of the movie, etc. If the content is a game, the one or more graphical elements optionally includes a title of the game, a current chapter of the game, a maker of the game, etc. If the content is a test, the metadata includes the subject of the test, the total duration of the test, the test-taker's name, etc. Displaying the one or more graphical elements that provide a visual indication of content in the computer-generated environment, including metadata identifying the content of the computer-generated environment, provides improved visual feedback to the user (e.g., improved visual feedback regarding the metadata identifying the content of the computer-generated environment). Providing improved feedback enhances the operability of the device, which, additionally, reduces power usage and improves battery life of the device by enabling the user to use the device more quickly and efficiently.

In some embodiments, displaying the one or more graphical elements that provide a visual indication of content in the computer-generated environment includes: detecting first movement (e.g., movement toward or away from the user and/or the first display generation component) of a second user who is in a position to view of the status information displayed via the second display generation component relative to the second display generation component; and in response to detecting the first movement of the second user relative to the second display generation component, in accordance with a determination that a distance between the second user and the second display generation component has decreased from above a first threshold distance to below the first threshold distance, updating display of the one or more graphical elements to increase an information density of the visual indication of content in the computer-generated environment that is provided by the one or more graphical elements. In some embodiments, in response to detecting the first movement of the second user relative to the second display generation component: in accordance with a determination that a distance between the second user and the second display generation component has increased from above the first threshold distance to below the first threshold distance, updating display of the one or more graphical elements to decrease the information density of the visual indication of content in the computer-generated environment that is provided by the one or more graphical elements. In some embodiments, three of more levels of information densities are provided by the one or more graphical elements for two or more threshold distances. In some embodiments, when the movement of the second user relative to the second display generation component does not cause the distance between the second user and the second display generation component to cross a respective distance threshold, the information density of the visual indication is not changed as a result of the movement of the second user. In some embodiments, information density is determined based on the number of indicator objects present in the overlay, and a reduction of the number of indicator objects corresponds to a reduction of information density. In some embodiments, the information density is determined based on the amount of information details (e.g., details of graphical features, amount of textual characters per unit display area, etc.) provided by the one or more graphical elements, and a reduction of the amount of information details corresponds to a reduction of information density. In some embodiments, information density is determined based on clarity and resolution of the one or more graphical elements, and a reduction of the clarity and resolution of the one or more graphical elements corresponds to a reduction of information density. Updating display of the one or more graphical elements to increase an information density of the visual indication of content provided by the one or more graphical elements, in response to detecting the first movement of the second user relative to the second display generation component, reduces the number of inputs needed to comfortably display the one or more graphical elements (e.g., the user does not need to perform additional inputs to adjust the information density of the visual indication of content when the second user moves relative to the second display generation component). Reducing the number of inputs needed to perform an operation enhances the operability of the device, which, additionally, reduces power usage and improves battery life of the device by enabling the user to use the device more quickly and efficiently.

In some embodiments, while displaying the computer-generated environment via the first display generation component and displaying the status information corresponding to the computing system via the second display generation component, the computing system detects a fifth respective event that is triggered by a third user (e.g., movement, presence, gesture, etc. of the third user) who is in a position to view the status information displayed via the second display generation component. In response to detecting the fifth respective event (e.g., movement toward or away from the user and/or the first display generation component, presence of the third user in the same room as the user of the computing system, a gesture of the third user, etc.), in accordance with a determination that the fifth respective event meets fourth criteria (e.g., the fourth criteria provides a threshold measure of likelihood that interaction between the user of the computing system and the third user is to occur), wherein the fourth criteria require that a preset measure of interaction has increased from below a preset threshold to above the preset threshold as a result of the fifth respective event and that the computer-generated environment is displayed with a third level of immersion (e.g., virtual reality mode) in order for the fourth criteria to be met: the computing system changes a level of immersion of the computer-generated environment displayed via the first display generation component from the third level of immersion (e.g., a virtual reality mode) to a second level of immersion (e.g., changing to a less immersive mode (e.g., a mixed reality mode), or changing to a temporary pass-through mode with the virtual content continues to progress), wherein the computer-generated environment displayed with the second level of immersion includes an increased amount of representation of the physical environment than the computer-generated environment displayed with the third level of immersion (e.g., a representation of the third user is displayed via the first display generation component in the computer-generated environment displayed with the second level of immersion, and the representation of the third user is not displayed via the first display generation component in the computer-generated environment displayed with the second level of immersion). Changing a level of immersion from the third level of immersion to a second level of immersion that includes an increased amount of representation of the physical environment as compared to the third level of immersion, in response to detecting the fifth respective event and in accordance with a determination that the fifth respective event meets fourth criteria requiring that a preset measure of interaction has increased from below a preset threshold to above the preset threshold as a result of the fifth respective event and that the computer-generated environment is displayed with a third level of immersion, changes the level of immersion when a set of conditions has been met without requiring further user input (e.g., further user input to change the level of immersion, further user input to increase the amount of representations of the physical environment, etc.). Performing an operation when a set of conditions has been met without requiring further user input enhances the operability of the device, which, additionally, reduces power usage and improves battery life of the device by enabling the user to use the device more quickly and efficiently.

In some embodiments, in response to detecting the fifth respective event (e.g., movement toward or away from the user and/or the first display generation component, presence of the third user in the same room as the user of the computing system, a gesture of the third user, etc.), in accordance with a determination that the fifth respective event meets the fourth criteria (e.g., the fourth criteria provides a threshold measure of likelihood that interaction between the user of the computing system and the third user is to occur): in conjunction with changing the level of immersion of the computer-generated environment displayed via the first display generation component from the third level of immersion to the second level of immersion, the computing system changes the status information that is displayed via the second display generation component, including increasing a visibility of the visual representation of the portion of the user of the computing system (e.g., increasing visibility of the visual representation of the user includes switching from not displaying the visual representation of the portion of the user to displaying the visual representation of the portion of the user, or increasing the brightness, clarity, resolution of the visual representation of the portion of the user). Changing the status information that is displayed, including increasing a visibility of the visual representation of the portion of the user of the computing system, in conjunction with changing the level of immersion of the computer-generated environment from the third level of immersion to the second level of immersion, and in response to detecting the fifth respective event that meets fourth criteria, changes the status information that is displayed when a set of conditions has been met without requiring further user input (e.g., further user input to change the status information, further user input to increase visibility of the visual representation of the portion of the user, etc.). Performing an operation when a set of conditions has been met without requiring further user input enhances the operability of the device, which, additionally, reduces power usage and improves battery life of the device by enabling the user to use the device more quickly and efficiently.

In some embodiments, detecting the fifth respective event includes detecting entry of the third user into a predefined region surrounding the user of the computing system. For example, when the third user enters the same room as the user of the computing system, or when the third user moves to within a threshold distance of the user of the computing system, and/or when the third user is approaching the user of the computing system, etc., the computing system changes the level of immersion of the content of the computer-generated environment to allow the user to see a representation of the third user (e.g., as a shadow imposed on the content of the computer-generated environment, or as part of a pass-through view of the physical environment) in the computer-generated environment displayed via the first display generation component. As the same time, the representation of the user's eyes is displayed via the second display generation component, so that the third user is made aware that the user of the computing system can see the third user. Changing the status information that is displayed, including increasing a visibility of the visual representation of the portion of the user of the computing system, in conjunction with changing the level of immersion of the computer-generated environment from the third level of immersion to the second level of immersion, and in response to detecting the fifth respective event that meets fourth criteria and includes detecting entry of the third user into a predefined region surrounding the user of the computer system, changes the status information that is displayed when a set of conditions has been met without requiring further user input (e.g., further user input to change the status information, further user input to increase visibility of the visual representation of the portion of the user, etc.). Performing an operation when a set of conditions has been met without requiring further user input enhances the operability of the device, which, additionally, reduces power usage and improves battery life of the device by enabling the user to use the device more quickly and efficiently.

In some embodiments, detecting the fifth respective event includes detecting the third user performing a predefined gesture (e.g., waving his/her hand, or pointing with an index finger, etc.) toward the user of the computing system. For example, when the third user waves at the user of the computing system (e.g., after he enters the same room as the user of the computing system, or when the third user moves to within a threshold distance of the user of the computing system, and/or when the third user is approaching the user of the computing system, etc.), the computing system changes the level of immersion of the content of the computer-generated environment to allow the user to see a representation of the third user (e.g., as a shadow imposed on the content of the computer-generated environment, or as part of a pass-through view of the physical environment) in the computer-generated environment displayed via the first display generation component. As the same time, the representation of the user's eyes is displayed via the second display generation component, so that the third user is made aware that the user of the computing system can see the third user. Changing the status information that is displayed, including increasing a visibility of the visual representation of the portion of the user of the computing system, in conjunction with changing the level of immersion of the computer-generated environment from the third level of immersion to the second level of immersion, and in response to detecting the fifth respective event that meets fourth criteria and includes detecting the third user performing a predefined gesture toward the user of the computer system, changes the status information that is displayed when a set of conditions has been met without requiring further user input (e.g., further user input to change the status information, further user input to increase visibility of the visual representation of the portion of the user, etc.). Performing an operation when a set of conditions has been met without requiring further user input enhances the operability of the device, which, additionally, reduces power usage and improves battery life of the device by enabling the user to use the device more quickly and efficiently.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 10000, 11000, 12000, and, 13000) are also applicable in an analogous manner to method 9000 described above with respect to FIG. 9. For example, the gestures, gaze inputs, physical objects, user interface objects, and/or animations described above with reference to method 9000 optionally have one or more of the characteristics of the gestures, gaze inputs, physical objects, user interface objects, and/or animations described herein with reference to other methods described herein (e.g., methods 8000, 10000, 11000, 12000, and 13000). For brevity, these details are not repeated here.

FIG. 10 is a flowchart of a method 10000 of providing a computer-generated experience based on contextual information, in accordance with some embodiments. Method 10000 relates to a computing system that includes a first display generation component and a second display generation component facing two different directions (e.g., separate displays, displays enclosed in the same housing but facing different directions (e.g., back to back facing opposite directions, facing different angles such that they cannot be viewed by the same user at the same time, etc.)). The first display generation component displays a computer-generated environment that provides computer-generated experiences to a user when the user comes into a position to view the content presented via the first display generation component (e.g., facing a side of the physical environment that is illuminated by a projector, facing a side of a display that emits light that forms an image on the user's retina, etc.). Before the user places the first display generation component into the position and orientation relative to the user to view the content displayed thereon (e.g., by moving the display generation component, or the user himself, or both), the user may be in a position to see the content presented on the second display generation component. In an example scenario, the first display generation component is an inner display of an HMD facing the user's eyes when the HMD is placed on the user's head, and the second display generation component is an outer display of the HMD that the user can look at when the HMD is on a table or in a user's hand extended away from the user's face, and not placed on the user's head or held close to the user's eyes. As disclosed herein, the computing system utilizes the second display generation component to display an indication of availability of different computer-generated experiences based on contextual information (e.g., location, time, user identity, authorization level of the user, etc.), and triggering display of a selected computer-generated experience in response to detecting the first display generation component being moved into the predetermined position and orientation relative to the user that enable the user to view the content shown via the first display generation component (e.g., the first display generation component faces the user's eyes as a result of the movement). The displayed computer-generated experience is optionally selected based on the state of the second display generation component at a time corresponding to the first display generation component being moved into the predetermined position and orientation relative to the user. Indicating availability of computer-generated experiences on the second display generation component based on contextual information and automatic triggering display of selected computer-generated experiences on the first display generation component based on state of the second display generation component (and of the contextual information) and the change in orientation of the first display generation component relative to the user reduces the time and the number of inputs needed to accomplished a desired outcome (e.g., getting information related to available experiences relevant to the current context and starting a desired computer-generated experience) and reduces user mistakes and time spent on browsing through and starting available computer-generated experiences using a conventional user interface.

In some embodiments, method 10000 is performed (10002) at a computing system including a first display generation component, a second display generation component (e.g., the first display generation component and the second display component are each a heads-up display, a head-mounted display (HMD), a display, a touchscreen, a projector, etc. or are separate displays of and/or enclosed in the same housing of a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the first display generation component is a display component facing the user and provides a CGR experience to the user, and the second display generation component is a display component facing away from the user and toward an external environment of the user and optionally provides status information related to the first display generation component (e.g., displayed content, operational state, etc.) and/or the user (e.g., movement of the user's eyes, attention state of the user, etc.) to other users in the external environment. In some embodiments, the first display generation component and the second display generation component form a two-sided display device (e.g., a two-sided HMD) that displays a first user interface on a first side corresponding to the first display generation component, and a second user interface on the second side corresponding to the second display generation component. In some embodiments, the computing system is an integrated device with one or more processors and memory enclosed in the same housing as the first and the second display generation components and at least some of the one or more input devices. In some embodiments, the computing system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from the display generation components and/or the one or more input devices. In some embodiments, the display generation components and the one or more input devices are integrated and enclosed in the same housing. In method 10000, the computing system displays (10004) one or more user interface elements (e.g., object 7012, object 7026, etc. in FIGS. 7F and 7H) (e.g., the one or more user interface elements correspond to a respective experience that can be provided by the computing system via the first display generation component (e.g., a first display or an inner display of a two-sided HMD)) via the second display generation component (e.g., a second display or an outer display of a two-sided HMD, etc.). While displaying the one or more user interface elements via the second display generation component (e.g., the second display or the outer display of the two-sided HMD, etc.), the computing system detects (10006) that the first display generation component (e.g., the first display or the inner display of the two-sided HMD, etc.) has been moved to a predetermined orientation relative to a respective portion of a user (e.g., an HMD has been placed in front of a face or eyes of the user, with the inner display of the HMD facing the face or eyes of the user) (e.g., as shown in FIGS. 7G, and 7I, where the first user 7202 is facing the display side of the first display generation component). In response to detecting that the first display generation component (e.g., the first display or the inner display of the two-sided HMD, etc.) has been moved to the predetermined orientation relative to the respective portion of the user (e.g., the HMD has been placed in front of the face or eyes of the user, with the inner display of the HMD facing the face or eyes of the user) (e.g., this is distinct from activating the one or more user interface element with a selection and/or activation input, and through a different action (e.g., different from the activation and selection input) putting the first display generation component into the predetermined orientation relative to the respective portion of the user) (10010): in accordance with a determination that, when the first display generation component was moved to the predetermined orientation relative to the respective portion of the user, the computing system was in a first state, wherein the first state corresponds to displaying a first user interface element (e.g., the object 7012 in FIG. 7F) via the second display generation component (e.g., displaying a first application preview or a first icon or avatar corresponding to a first computer-generated experience (e.g., including a first user interface) that is available to be displayed by the computing system via the first display generation component), displaying a first user interface (e.g., experience 7024 in FIG. 7G) via the first display generation component while the first display generation component is in the predetermined orientation relative to the respective portion of the user; and in accordance with a determination that, when the first display generation component was moved to the predetermined orientation relative to the respective portion of the user, the computing system was in a second state, wherein the second state corresponds to displaying a second user interface element (e.g., object 7026 in FIG. 7H) via the second display generation component (e.g., displaying a second application preview or a second icon or avatar corresponding to a second computer-generated experience (e.g., including a second user interface) that is available to be displayed by the computing system via the first display generation component) instead of displaying the first user interface element via the second display generation component, displaying a second user interface (e.g., experience 7030 in FIG. 7I, or experience 7036 in FIG. 7J, etc.) via the first display generation component while the first display generation component is in the predetermined orientation relative to the respective portion of the user, wherein the second user interface is different from the first user interface. This is illustrated, for example, in FIGS. 7F-7I, where depending on the state of the computing system (and the user interface object displayed by the second display generation component) at a time immediately prior to the first display generation component being placed into a preset configuration relative to the first user, the first display generation component displays, in response to the first display generation component being placed into the preset configuration relative to the first user, an experience selected from multiple different experiences corresponding to the state of the computing system (and the display user interface object).

In some embodiments, in response to detecting that the first display generation component (e.g., the first display or the inner display of the two-sided HMD, etc.) has been moved to the predetermined orientation relative to the respective portion of the user (e.g., the HMD has been placed in front of the face or eyes of the user, with the inner display of the HMD facing the face or eyes of the user): in accordance with a determination that, when the first display generation component was moved to the predetermined orientation relative to the respective portion of the user, the computing system was in a third state, wherein the third state corresponds to displaying a third user interface element via the second display generation component (e.g., displaying a third application preview or a third icon or avatar corresponding to a third computer-generated experience (e.g., including a third user interface) that is available to be displayed by the computing system via the first display generation component), the computing system displays a third user interface via the first display generation component while the first display generation component is in the predetermined orientation relative to the respective portion of the user, wherein the third user interface is different from the first user interface and the second user interface. Displaying a third user interface, different from the first user interface and the second user interface, via the first display generation component while the first display generation component is in the predetermined orientation relative to the respective portion of the user, in accordance with a determination that the computing system was in a third state, corresponding to displaying a third user interface element, when the moved to the predetermined orientation relative to the respective portion of the user, provides additional control options without cluttering the UI with additional displayed controls (e.g., additional displayed controls for displaying the first user interface, the second user interface, and/or the third user interface). Providing additional control options without cluttering the UI with additional displayed controls enhances the operability of the device, which, additionally, reduces power usage and improves battery life of the device by enabling the user to use the device more quickly and efficiently.

In some embodiments, the first user interface is a first three-dimensional environment (e.g., AR environment, VR environment, mixed-reality environment, etc.) that includes first virtual content, and the second user interface is a second three-dimensional environment (e.g., AR environment, VR environment, mixed-reality environment, etc.) that includes second virtual content different from the first virtual content. For example, when the user's hands moves in the physical environment or when the user moves (e.g., turns or walks) in the physical environment, the first user interface and the second user interface are updated to reflect movement of the user's hand or movement of the user relative to the first and second three-dimensional environments. Displaying a first three-dimensional environment that includes first virtual content in accordance with a determination that, when the first display generation component was moved to the predetermined orientation relative to the respective portion of the user, the computing system was in a first state, and displaying a second three-dimensional environment that includes second virtual content different from the first virtual content in accordance with a determination that, when the first display generation component was moved to the predetermined orientation relative to the respective portion of the user, the computing system was in a second state, provides additional control options without cluttering the UI with additional displayed controls (e.g., additional displayed controls for displaying the first three-dimensional environment that includes first virtual content and/or the second three-dimensional environment that includes second virtual content different from the first virtual content). Providing additional control options without cluttering the UI with additional displayed controls enhances the operability of the device, which, additionally, reduces power usage and improves battery life of the device by enabling the user to use the device more quickly and efficiently.

In some embodiments, the first user interface is a first three-dimensional environment that includes first virtual content without a representation of a physical environment surrounding the first display generation component (e.g., the first three-dimensional environment is a VR environment), and the second user interface is a second three-dimensional environment, different from the first three-dimensional environment, that includes second virtual content without a representation of the physical environment surrounding the first display generation component (e.g., the second three-dimensional environment is a VR environment). Displaying a first three-dimensional environment that includes first virtual content without a representation of a physical environment surrounding the first display generation component in accordance with a determination that, when the first display generation component was moved to the predetermined orientation relative to the respective portion of the user, the computing system was in a first state, and displaying a second three-dimensional environment, different from the first three-dimensional environment, that includes second virtual content without a representation of the physical environment surrounding the first display generation component in accordance with a determination that, when the first display generation component was moved to the predetermined orientation relative to the respective portion of the user, the computing system was in a second state, provides additional control options without cluttering the UI with additional displayed controls (e.g., additional displayed controls for displaying the first three-dimensional environment that includes first virtual content without a representation of a physical environment surrounding the first display generation component and/or the second three-dimensional environment, different from the first three-dimensional environment, that includes second virtual content without a representation of the physical environment surrounding the first display generation component). Providing additional control options without cluttering the UI with additional displayed controls enhances the operability of the device, which, additionally, reduces power usage and improves battery life of the device by enabling the user to use the device more quickly and efficiently.

In some embodiments, the first user interface is a first three-dimensional environment that includes first virtual content with a representation of a physical environment surrounding the first display generation component (e.g., the first three-dimensional environment is an AR environment), and the second user interface is a second three-dimensional environment, different from the first three-dimensional environment, that includes second virtual content with a representation of the physical environment surrounding the first display generation component (e.g., the second three-dimensional environment is an AR environment). Displaying a first three-dimensional environment that includes first virtual content with a representation of a physical environment surrounding the first display generation component in accordance with a determination that, when the first display generation component was moved to the predetermined orientation relative to the respective portion of the user, the computing system was in a first state, and displaying a second three-dimensional environment, different from the first three-dimensional environment, that includes second virtual content with a representation of the physical environment surrounding the first display generation component in accordance with a determination that, when the first display generation component was moved to the predetermined orientation relative to the respective portion of the user, the computing system was in a second state, provides additional control options without cluttering the UI with additional displayed controls (e.g., additional displayed controls for displaying the first three-dimensional environment that includes first virtual content with a representation of a physical environment surrounding the first display generation component and/or second three-dimensional environment, different from the first three-dimensional environment, that includes second virtual content with a representation of the physical environment surrounding the first display generation component). Providing additional control options without cluttering the UI with additional displayed controls enhances the operability of the device, which, additionally, reduces power usage and improves battery life of the device by enabling the user to use the device more quickly and efficiently.

In some embodiments, the first user interface is a first three-dimensional environment and the second user interface is a second three-dimensional environment, and wherein one of the first three-dimensional environment and the second three-dimensional environment includes first virtual content with a representation of a physical environment surrounding the first display generation component (e.g., one of three-dimensional environments is an AR environment), and one of the first three-dimensional environment and the second three-dimensional environment includes second virtual content without a representation of the physical environment surrounding the first display generation component (e.g., one of the three-dimensional environments is a VR environment). In some embodiments, once an experience is started in one mode of the AR and VR modes, the experience may be transitioned into the other mode of the AR and VR modes. Displaying a first three-dimensional environment in accordance with a determination that, when the first display generation component was moved to the predetermined orientation relative to the respective portion of the user, the computing system was in a first state, and displaying a second three-dimensional environment in accordance with a determination that, when the first display generation component was moved to the predetermined orientation relative to the respective portion of the user, the computing system was in a second state, wherein one of the first three-dimensional environment and the second three-dimensional environment includes first virtual content with a representation of a physical environment surrounding the first display generation component, and one of the first three-dimensional environment and the second three-dimensional environment includes second virtual content without a representation of the physical environment surrounding the first display generation component, provides additional control options without cluttering the UI with additional displayed controls (e.g., additional displayed controls for displaying the first and/or second three-dimensional environment). Providing additional control options without cluttering the UI with additional displayed controls enhances the operability of the device, which, additionally, reduces power usage and improves battery life of the device by enabling the user to use the device more quickly and efficiently.

In some embodiments, displaying the one or more user interface elements includes displaying elements of a calendar (e.g., elements of a calendar (e.g., social calendar, or work calendar, a daily planner, or weekly planner, monthly calendar, standard calendar showing dates and weeks by months, etc.) with scheduled events, appointments, holidays, and reminders, etc.), and the first user interface and the second user interface are respective user interfaces corresponding to the calendar (e.g., the first user interface and the second user interface include event information corresponding to events in a calendar, or notes regarding an event, appointment, reminder, that has triggered a notification to be displayed on the second display generation component, etc.). In some embodiments, when the two-sided HMD is not being worn by a user (e.g., is placed on a desk with the outer display facing the user), the outer display of the HMD is used to display a calendar, including the current date, time, weather information, geographic location, and a listing of tasks or scheduled appointments for the day or that are coming up in a preset period of time (e.g., in the next two hours, etc.). When the user picks up the HMD and put the inner display in front of his/her eyes, the first display generation component displays the details of the calendar (e.g., showing a more complete calendar showing the current week or the current month, showing all scheduled events of the day, showing more details of the event that is coming up next, etc.). Displaying the one or more user interface elements, including displaying element of a calendar, and displaying a first user interface corresponding to the calendar in accordance with a determination that, when the first display generation component was moved to the predetermined orientation relative to the respective portion of the user, the computing system was in a first state, and displaying a second user interface corresponding to the calendar in accordance with a determination that, when the first display generation component was moved to the predetermined orientation relative to the respective portion of the user, the computing system was in a second state, provides additional control options without cluttering the UI with additional displayed controls (e.g., additional displayed controls for displaying the first user interface corresponding to the calendar and/or the second user interface corresponding to the calendar). Providing additional control options without cluttering the UI with additional displayed controls enhances the operability of the device, which, additionally, reduces power usage and improves battery life of the device by enabling the user to use the device more quickly and efficiently.

In some embodiments, the computing system in the first state has detected a first event (e.g., a first notification or reminder) corresponding to the calendar and displays a first notification corresponding to the first event as part of the one or more user interface elements; and the first user interface is a user interface corresponding to the first event that includes more details of the first event than the first notification. Similarly, the computing system in the second state has detected a second event (e.g., a second notification or reminder) corresponding to the calendar and displays a second notification corresponding to the second event as part of the one or more user interface elements; and the second user interface is a user interface corresponding to the second event that includes more details of the second event than the second notification. Detecting a first event corresponding to the calendar, displaying a first notification corresponding to the first event as part of the one or more user interface elements, and displaying the first user interface, including the first event that includes more detail of the first event than the first notification, reduces the number of inputs needed to display additional details of the first event (e.g., the user does not need to perform additional inputs, after moving the first display generation component to the predetermined orientation relative to the respective portion of the user, to display more details of the first event). Reducing the number of inputs needed to perform an operation enhances the operability of the device, which, additionally, reduces power usage and improves battery life of the device by enabling the user to use the device more quickly and efficiently.

In some embodiments, displaying the one or more user interface elements includes displaying a visual representation (e.g., a video clip, a preview, an image, etc.) of a respective media item (e.g., cover art of a music video, a movie, a video-clip, a three-dimensional movie, etc.), and the first user interface and the second user interface play back content of the media item (e.g., the first user interface and the second user interface show the full content (e.g., three-dimensional, animated, interactive, etc.) of the media items. In some embodiments, when the two-sided HMD is not being worn by a user (e.g., is placed on a desk with the outer display facing the user), the outer display of the HMD is used to display a visual representation of an available media item that can be displayed via the inner display of the HMD. In some embodiments, the available media item is changed depending on the current location of the HMD, and/or the item's availability specified by a provider of the media item, etc. When the user picks up the HMD and put the inner display in front of his/her eyes, the first display generation component displays the actual content of the media item (e.g., showing a more complete movie, or more immersive experience, enabling more interactive capabilities of the media item, etc.). Displaying the one or more user interface elements, including a visual representation of a respective media item, and displaying a first user interface that plays back content of the media item in accordance with a determination that, when the first display generation component was moved to the predetermined orientation relative to the respective portion of the user, the computing system was in a first state, and displaying a second user interface that plays back content of the media item in accordance with a determination that, when the first display generation component was moved to the predetermined orientation relative to the respective portion of the user, the computing system was in a second state, provides additional control options without cluttering the UI with additional displayed controls (e.g., additional displayed controls for displaying the first user interface that plays back content of the media item and/or the second user interface that plays back content of the media item). Providing additional control options without cluttering the UI with additional displayed controls enhances the operability of the device, which, additionally, reduces power usage and improves battery life of the device by enabling the user to use the device more quickly and efficiently.

In some embodiments, the computing system in the first state has detected a third event (e.g., a change in location to a location with first available media content) corresponding to availability of a first media item and the computing system displays a first visual representation of the first media item as part of the one or more user interface elements; and the first user interface is a user interface that plays back the first media item. Similarly, the computing system in the second state has detected a fourth event (e.g., a change in location to a location with second available media content) corresponding to availability of a second media item and the computing system displays a second visual representation of the second media item as part of the one or more user interface elements; and the second user interface is a user interface that plays back the second media object. Detecting a third event corresponding to availability of a first media item, displaying a first visual representation of the first media item as part of the one or more user interface elements, and displaying the first user interface that plays back the first media item reduces the number of inputs needed to play back the first media item (e.g., the user does not need to perform additional inputs, after moving the first display generation component to the predetermined orientation relative to the respective portion of the user, to play back the first media item). Reducing the number of inputs needed to perform an operation enhances the operability of the device, which, additionally, reduces power usage and improves battery life of the device by enabling the user to use the device more quickly and efficiently.

In some embodiments, displaying the one or more user interface elements includes displaying a notification of a respective incoming communication request (e.g., a telephone call, an internet call, a video conference call, etc.), and the first user interface and the second user interface are communication interfaces corresponding to the respective incoming communication request (e.g., the first user interface and the second user interface are communication interfaces showing caller's faces or the conference content (e.g., three-dimensional, animated, interactive, etc.) of the communication sessions. In some embodiments, when the two-sided HMD is not being worn by a user (e.g., is placed on a desk with the outer display facing the user), the outer display of the HMD is used to display a notification for an incoming communication request when such request is received by the computing system. In some embodiments, the notification provides an indication of the identity of the caller and the type of communication session that is requested. When the user picks up the HMD and put the inner display in front of his/her eyes, the first display generation component displays the communication interface corresponding to the communication request that has been received, and the user can start communicating with the caller using the first display generation component. Displaying the one or more user interface elements, including a notification of a respective incoming communication request, and displaying a first user interface that is a communication interface corresponding to the respective incoming communication request in accordance with a determination that, when the first display generation component was moved to the predetermined orientation relative to the respective portion of the user, the computing system was in a first state, and displaying a second user interface that is a communication interface corresponding to the respective incoming communication request in accordance with a determination that, when the first display generation component was moved to the predetermined orientation relative to the respective portion of the user, the computing system was in a second state, provides additional control options without cluttering the UI with additional displayed controls (e.g., additional displayed controls for displaying the first user interface that is a communication interface corresponding to the respective incoming communication request and/ or the second user interface that is a communication interface corresponding to the respective incoming communication request). Providing additional control options without cluttering the UI with additional displayed controls enhances the operability of the device, which, additionally, reduces power usage and improves battery life of the device by enabling the user to use the device more quickly and efficiently.

In some embodiments, the computing system in the first state has detected a fifth event (e.g., receipt of a first communication request (e.g., from a first caller, using a first communication protocol, etc.)) corresponding to a first communication request and the computing system displays a first visual representation of the first communication request (e.g., showing an avatar of the caller, and/or identify the type of the communication session that is requested) as part of the one or more user interface elements; and the first user interface is a user interface that provides a first communication session corresponding to the first communication request. Similarly, the computing system in the second state has detected a sixth event (e.g., receipt of a second communication request (e.g., from a second caller, using a second communication protocol, etc.)) corresponding to a second communication request and the computing system displays a second visual representation of the second communication request (e.g., showing an avatar of the caller, and/or identify the type of the communication session that is requested) as part of the one or more user interface elements; and the second user interface is a user interface that provides a second communication session corresponding to the second communication request. Detecting a fifth event corresponding to a first communication request, displaying a first visual representation of the first communication request as part of the one or more user interface elements, and displaying the first user interface that that provides a first communication session corresponding to the first communication request reduces the number of inputs needed to initiate the first communication session corresponding to the first communication request (e.g., the user does not need to perform additional inputs, after moving the first display generation component to the predetermined orientation relative to the respective portion of the user, to initiate the first communication session corresponding to the first communication request). Reducing the number of inputs needed to perform an operation enhances the operability of the device, which, additionally, reduces power usage and improves battery life of the device by enabling the user to use the device more quickly and efficiently.

In some embodiments, displaying the one or more user interface elements includes: in accordance with a determination that the user has a first identity (e.g., based on facial recognition using images of the user captured by the cameras of the computing system, based on fingerprint sensor on the housing of the display generation components, based on other sensor signals (e.g., RFID tags attached to the user), etc.), customizing display of the one or more user interface elements in accordance with a first set of rules corresponding to the first identity; and in accordance with a determination that the user has a second identity different from the first identity (e.g., the first identity and the second identity correspond to different age groups, gender group, persons, authorization levels, security clearance levels, different roles, different assignments, different preferences, etc.), customizing display of the one or more user interface elements in accordance with a second set of rules corresponding to the second identity, the second set of rules being different from the first set of rules (e.g., the rules relate to placing different restrictions on the content, form, amount of information, etc. of the one or more user interface elements based on the different identities of the users). Customizing display of the one or more user interface elements in accordance with a determination the user has a first identity and in accordance with a first set of rules corresponding to the first identity, and customizing display of the one or more user interface elements in accordance with a determination that the user has a second identity, different from the first identity, and in accordance with a second set of rules, different from the first set of rules, corresponding to the second identity, customizes display of the one or more user interface elements when a set of conditions has been met without requiring further user input (e.g., further user input to select the desired customization). Performing an operation when a set of conditions has been met without requiring further user input enhances the operability of the device, which, additionally, reduces power usage and improves battery life of the device by enabling the user to use the device more quickly and efficiently.

In some embodiments, prior to detecting that the first display generation component (e.g., the first display or the inner display of the two-sided HMD, etc.) has been moved to the predetermined orientation relative to the respective portion of the user (e.g., an HMD has been placed in front of a face or eyes of the user, with the inner display of the HMD facing the face or eyes of the user), the computing system displays, via the second display generation component (and concurrently with the one or more user interface elements), selectable options corresponding to a set of two or more modes of the computing system (e.g., AR mode, VR mode, 2D mode, private mode, parental-control mode, DND mode, etc.) in which a respective one of the first user interface and the second user interface are available to be presented via the first display generation component. The computing system detects a user input selecting a respective selectable option corresponding to one of the set of two or more modes of the computing system. In response to detecting the user input: in accordance with a determination that the first display generation component (e.g., the first display or the inner display of the two-sided HMD, etc.) has been moved to the predetermined orientation relative to the respective portion of the user (e.g., the HMD has been placed in front of the face or eyes of the user, with the inner display of the HMD facing the face or eyes of the user), the computing system displays the respective one of the first user interface and the second user interface via the first display generation component in the mode corresponding to the respective selectable option, while the first display generation component is in the predetermined orientation relative to the respective portion of the user. Displaying the respective one of the first user interface and the second user interface in the mode corresponding to the respective selectable option while the first display generation component is in the predetermined orientation relative to the respective portion of the user, in response to detecting the user input selecting the respective selectable option corresponding to one of the set of two or more modes of the computing system, reduces the number of inputs needed to display the first or second user interface in the desired mode (e.g., the user does not need to perform additional inputs to select (or re-select) the desired mode after the first display generation component is moved). Reducing the number of inputs needed to perform an operation enhances the operability of the device, which, additionally, reduces power usage and improves battery life of the device by enabling the user to use the device more quickly and efficiently.

In some embodiments, the one or more user interface elements include a preview of a three-dimensional experience that is available to be displayed via the first display generation component once the first display generation component is moved to the predetermined orientation relative to the respective portion of the user. In some embodiments, the preview is started when the user picks up the second display generation component (e.g., the two-sided HMD with the outer display of the HMD facing the user). In some embodiments, the preview provides a viewport into the three-dimensional experience. Including a preview of a three-dimensional experience that is available to be displayed via the first display generation component once the first display generation component is moved to the predetermined orientation relative to respective portion of the user provides improved feedback to the user (e.g., improved visual feedback regarding available three-dimensional experiences if the first display generation component is moved to the predetermined orientation relative to the respective portion of the user). Providing improved feedback enhances the operability of the device, which, additionally, reduces power usage and improves battery life of the device by enabling the user to use the device more quickly and efficiently.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 11000, 12000, and 13000) are also applicable in an analogous manner to method 10000 described above with respect to FIG. 10. For example, the gestures, gaze inputs, physical objects, user interface objects, and/or animations described above with reference to method 10000 optionally have one or more of the characteristics of the gestures, gaze inputs, physical objects, user interface objects, and/or animations described herein with reference to other methods described herein (e.g., methods 8000, 9000, 11000, 12000, and 13000). For brevity, these details are not repeated here.

FIG. 11 is a flowchart of a method 11000 of providing a computer-generated experience based on a wearing state of a display generation component, in accordance with some embodiments.

In some embodiments, a user may place a first display generation component into the position and orientation relative to the user to view the content displayed thereon in different manners, e.g., an impromptu or temporary manner (e.g., held in front of the user's eyes at a distance or held close to the user's eyes by a hand) or a more formal and established manner (e.g., strapped or otherwise worn on the user's head or face without being supported by the user's hand). Method 11000 relates to a computing system that selectively displays different computer-generated experiences (e.g., different versions of a computer-generated experience, different computer-generated experiences corresponding to different characteristics of the user or contextual properties, preview of an experience vs. the actual experience, etc.) depending on the manner by which the first display generation component is placed into the position and orientation relative to the user that enables the user to view the content displayed on the first display generation component. Selectively displaying different computer-generated experiences in response to a trigger event that corresponds to the first display generation component being placed into a predefined configuration relative to the user (e.g., automatically starting the display of the computer-generated experience via the first display generation component without additional user inputs in a user interface provided by the first display generation component) and in accordance with the manner by which the first display generation component is held in that position and orientation (e.g., with or without the support of the user's hands, with or without the support of another mechanism other than the user's hands, etc.) reduces the time and the number of inputs needed to accomplished a desired outcome (e.g., starting a desired computer-generated experience) and reduces user mistakes and time spent on browsing through and starting available computer-generated experiences using a conventional user interface.

In some embodiments, method 11000 is performed (11000) at a computing system including a first display generation component (e.g., a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the computing system includes a first display generation component and a second display generation component (e.g., the first display generation component is a display facing the user and provides a CGR experience to the user, and the second display generation component is a display facing away from the user and toward an external environment of the user and optionally provides status information related to the first display generation component (e.g., displayed content, operational state, etc.) and/or the user (e.g., movement of the user's eyes, attention state of the user, etc.) to other users in the external environment). In some embodiments, the first display generation component and the second display generation component form a two-sided display device (e.g., a two-sided HMD) that displays a first user interface on a first side corresponding to the first display generation component, and a second user interface on the second side corresponding to the second display generation component. In some embodiments, the computing system is an integrated device with one or more processors and memory enclosed in the same housing as the first display generation component and optionally the second display generation component and at least some of the one or more input devices. In some embodiments, the computing system includes a computing component that includes one or more processors and memory that is separate from the display generation component(s) and/or the one or more input devices. In some embodiments, the display generation component(s) and the one or more input devices are integrated and enclosed in the same housing. In method 11000, the computing system detects (11002) a first trigger event (e.g., based on input from one or more sensors (e.g., cameras, infrared sensors, motion sensors, capacitive sensors, light sensors, etc.) that corresponds to the first display generation component being placed in a first predefined configuration relative to a user (e.g., first user 7202 is facing the display side of the first display generation component in FIGS. 7I and 7J) (e.g., the HMD is placed in front the user's face or eyes, or over the user's nose, etc.). In response to detecting the first trigger event (11004): in accordance with a determination that the computing system including the first display generation component is being worn by the user (e.g., strapped on the user's head, buckled up, not being supported by a hand of the user, etc.) while being in the first predefined configuration relative to the user (e.g., as shown in FIG. 7J, the first user is wearing a sensor object 7016 associated with the first display generation component that corresponds to wearing the first display generation component), the computing system provides, via the first display generation component, a first computer-generated experience (e.g., experience 7036 in FIG. 7J) (e.g., displaying a full AR or VR experience, displaying a home screen user interface, etc.); and in accordance with a determination that the computing system including the first display generation component is not being worn by the user (e.g., not strapped on the user's head, not buckled up, being supported by a hand of the user, etc.) while being in the first predefined configuration relative to the user (e.g., as shown in FIG. 7I, the first user is holding a sensor object 7016 associated with the first display generation component in her hand that corresponds to not wearing the first display generation component), the computing system provides, via the first display generation component, a second computer-generated experience (e.g., experience 7030 in FIG. 7I) (e.g., displaying a preview of a AR or VR experience, displaying a camera user interface, etc.) that is distinct from the first computer-generated experience (e.g., displaying a full AR or VR experience, displaying a home screen user interface, etc.). This is illustrated, for example, in FIGS. 7H-7J, for example, where depending on the wearing state of the first display generation component (e.g., as determined based on the state of a sensor object 7106 associated with the first display generation component) when the first display generation component is placed into a preset configuration relative to the first user 7202, the computing system displays different computer-generated experiences (e.g., experience 7036 or experience 7030, respectively). In some embodiments, the computing system also transitions between displaying the two different experiences when the wearing state of the first display generation component changes after one of the two computer-generated experiences has been started based on the state of the computing system prior to the transition.

In some embodiments, in accordance with a determination that the computing system including the first display generation component is being worn by the user (e.g., strapped on the user's head, buckled up, not being supported by a hand of the user, etc.) while being in the first predefined configuration relative to the user, the computing system provides, for interaction with the first computer-generated experience, at least a first input scheme (e.g., an in-air hand gesture input scheme, a micro-gesture input scheme, a touch-gesture input scheme using touch-sensitive surfaces that are separate from the first display generation component and its housing, etc.) that is based on movement of a hand (or hands) of the user that is not in contact with the first display generation component or a housing thereof (e.g., the computing system allows interaction with the first computer-generated experience through in-air hand gestures or control inputs on other input devices, when the hands of the user are not needed to maintain the position of the HMD in front of the user's eyes); and in accordance with a determination that the computing system including the first display generation component is not being worn by the user (e.g., not strapped on the user's head, not buckled up, being supported by a hand of the user, etc.) while being in the first predefined configuration relative to the user, the computing system does not provide, for interaction with the second computer-generated experience, the first input scheme that is based on movement of the hand of the user that is not in contact with the first display generation component or the housing thereof (e.g., because at least one of the user's hands are needed to maintain the position of the first display component in front of the user's eyes, the computing system disables the input mechanisms that rely on movement of the free hand to interaction with the second computer-generated experience; instead, the user may interact with the second computer-generated experience through control inputs on the first display generation component or its housing, or on other input devices). Providing at least a first input scheme that is based on movement of a hand of the user that is not in contact with the first display generation component or a housing thereof, in accordance with a determination that the computing system is being worn by the user while being in the first predefined configuration relative to the user, and not providing the first input scheme in accordance with a determination that the computer system is not being worn by the user while being in the first predefined configuration, provides an appropriate input scheme when a set of conditions has been met without requiring further user input (e.g., further user input to select a specific input scheme). Performing an operation when a set of conditions has been met without requiring further user input enhances the operability of the device, which, additionally, reduces power usage and improves battery life of the device by enabling the user to use the device more quickly and efficiently.

In some embodiments, in accordance with a determination that the computing system including the first display generation component is not being worn by the user (e.g., not strapped on the user's head, not buckled up, being supported by a hand of the user, etc.) while being in the first predefined configuration relative to the user, the computing system provides, for interaction with the second computer-generated experience, at least a second input scheme (e.g., a touch-gesture input scheme using touch-sensitive surfaces that on the first display generation component or its housing, a physical input on a physical controller (e.g., a switch, a button, etc.) on the first display generation component or its housing, etc.) that is based on movement of at least one of the user's hands that is in contact with (and optionally maintaining the position of) the first display generation component or a housing thereof (e.g., the computing system allows interaction with the second computer-generated experience when the hands of the user are holding the HMD to maintain the position of the HMD in front of the user's eyes). Providing at least a second input scheme that is based on movement of at least one of the user's hands that is in contact with the first display generation component or a housing thereof, in accordance with a determination that the computing system is not being worn by the user while being in the first predefined configuration relative to the user, provides at least the second input scheme when a set of conditions has been met without requiring further user input (e.g., further user input to enable the second input scheme). Performing an operation when a set of conditions has been met without requiring further user input enhances the operability of the device, which, additionally, reduces power usage and improves battery life of the device by enabling the user to use the device more quickly and efficiently.

In some embodiments, in accordance with a determination that the computing system including the first display generation component is being worn by the user (e.g., strapped on the user's head, buckled up, not being supported by a hand of the user, etc.) while being in the first predefined configuration relative to the user, the computing system disables, for interaction with the first computer-generated experience, the second input scheme (e.g., a touch-gesture input scheme using touch-sensitive surfaces that on the first display generation component or its housing, a physical input on a physical controller (e.g., a switch, a button, etc.) on the first display generation component or its housing, etc.) for at least one input device (e.g., touch-sensitive surface, switch, button, etc.) that is disposed on the first display generation component or the housing thereof (e.g., the computing system disables interactions with the first computer-generated experience that are based on inputs on input devices disposed on the HMD, e.g., because the user's hands are not holding onto the HMD during the first computer-generated experience. Disabling the second input scheme for at least one input device that is disposed on the first display generation component or the housing thereof, in accordance with a determination that the computing system is being worn by the user while being in the first predefined configuration, disables the second input scheme for at least one input device without requiring further user input (e.g., further user input to manually disable the second input scheme). Performing an operation when a set of conditions has been met without requiring further user input enhances the operability of the device, which, additionally, reduces power usage and improves battery life of the device by enabling the user to use the device more quickly and efficiently.

In some embodiments, the computing system provides first virtual content in both the first computer-generated experience and the second computer-generated experience; the computing system enables a first interaction scheme (e.g., without enabling a second interaction scheme) with respect to the first virtual content when the first virtual content is provided in the first computer-generated experience; and the computing system enables a second interaction scheme different from the first interaction scheme (e.g., without enabling the first interaction scheme) with respect to the first virtual content when the first virtual content is provided in the second computer-generated experience. For example, in some embodiments, the HMD displays the same AR/VR experience, except that (1) when the AR/VR experience is provided with the HMD strapped on the user's face (and the user's hands are taken off of the HMD), the computing system allows the user to interact with the AR/VR environment using in-air hand gestures, or hand controllers, micro-gestures, and other input mechanisms that do not require the user's hand to touch or manipulate an input device on the HMD (and optionally disables the same interactions being carried out through inputs made through input devices provided on the HMD housing); and (2) when the AR/VR experience is provided while the HMD is held to the user's face by the user's hand without being strapped to the user's head, the computing system allows the user to interact with the AR/VR environment inputs made through input devices provided on the HMD housing (and optionally disables the same interactions being carried out using in-air hand gestures, or hand controllers, micro-gestures, and other input mechanisms that do not require the user's hand to touch or manipulate an input device on the HMD). Enabling a first interaction scheme with respect to the first virtual content provided in the first computer-generated experience and enabling a second interaction scheme, different from the first interaction scheme, with respect to the first virtual content provided in the second computer-generated experience, wherein the computing system provides the first virtual content in both the first computer-generated experience and the second computer-generated experience, enables an appropriate interaction scheme when a set of conditions has been met without requiring further user input (e.g., further user input to enable the first or second interaction scheme). Performing an operation when a set of conditions has been met without requiring further user input enhances the operability of the device, which, additionally, reduces power usage and improves battery life of the device by enabling the user to use the device more quickly and efficiently.

In some embodiments, the first computer-generated experience includes a plurality of user interface objects corresponding to different computer-generated experiences, where each of the plurality of user interface objects, when activated by a user input (e.g., a gaze input, a micro-gesture input, an in-air gesture input, etc.), causes the computing system to start a respective computer-generated experience corresponding to the user interface object; and the second computer-generated experience is a camera user interface for controlling a camera of the computing system (e.g., a camera view of the physical environment and optionally one or more camera controls (e.g., still photo, video, slow-motion, panorama, etc.)). In some embodiments, the computing system takes a photo or video of the physical environment in the camera view in response to a user input detected via an input device disposed on the housing of the first display generation component (e.g., a touch sensor, a contact intensity sensor, a button, a switch, etc.). Providing the first computer-generated experience, including a plurality of user interface objects corresponding to different computer-generated experiences, and providing the second computer-generated experience, including a camera user interface for controlling a camera of the computing system, provides additional control options without cluttering the UI with additional displayed controls (e.g., additional displayed controls for the first computer-generated experience and/or the second computer-generated experience). Providing additional control options without cluttering the UI with additional displayed controls enhances the operability of the device, which, additionally, reduces power usage and improves battery life of the device by enabling the user to use the device more quickly and efficiently.

In some embodiments, in accordance with a determination that the computing system including the first display generation component is being worn by the user (e.g., strapped on the user's head, buckled up, not being supported by a hand of the user, etc.) while being in the first predefined configuration relative to the user, the computing system enables an interaction with the first computer-generated experience based on gestures (e.g., in-air gestures, micro-gestures, etc.) performed by a hand away from the first display generation component and a housing thereof (e.g., the gesture is captured by a camera on the HMD); and in accordance with a determination that the computing system including the first display generation component is not being worn by the user (e.g., not strapped on the user's head, not buckled up, being supported by a hand of the user, etc.)

while being in the first predefined configuration relative to the user, the computing system enables an interaction with the second computer-generated experience based on gestures (e.g., touch gestures, manipulating of physical controls, etc.) performed by a hand on the first display generation component or the housing thereof (e.g., the gesture is captured by a touch-sensitive surface of the housing of the HMD). Enabling an interaction with the first computer-generated experience based on gestures performed by a hand away from the first display generation component and a housing thereof, in accordance with a determination that the computing system is being worn by the user while being in the first predefined configuration relative to the user, and enabling an interaction with the second computer-generated experience based on gestures performed by a hand on the first display generation component or the housing thereof, in accordance with a determination that the computing system is not being worn by the user while being in the first predefined configuration relative to the user, enables interaction with the respective computer-generated experience in an appropriate manner, without requiring further user input (e.g., further user input to specify whether the interactions are based on gestures performed by a hand away from, or on, the first display generation component or the housing thereof). Performing an operation when a set of conditions has been met without requiring further user input enhances the operability of the device, which, additionally, reduces power usage and improves battery life of the device by enabling the user to use the device more quickly and efficiently.

It should be understood that the particular order in which the operations in FIG. 11 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 12000, and 13000) are also applicable in an analogous manner to method 11000 described above with respect to FIG. 11. For example, the gestures, gaze inputs, physical objects, user interface objects, and/or animations described above with reference to method 11000 optionally have one or more of the characteristics of the gestures, gaze inputs, physical objects, user interface objects, and/or animations described herein with reference to other methods described herein (e.g., methods 8000, 9000, 10000, 11000, and 12000). For brevity, these details are not repeated here.

As described with respect to methods 8000, 9000, 10000, and 11000, displaying information on the second display generation component (e.g., status information related to the user's eyes, the state of the content being displayed via the first display generation component, the display mode of the computing system, indication of available computer-generated experiences, etc.) helps to reduce the number of times that the user has to put on and take off the HMD that includes both the first display generation component and the second display generation component and/or activating or stopping a computer-generated experience, e.g., to deal with others in the surrounding physical environment and/or finding a desirable computer-generated experience. This helps to save user's time, reduce power usage, and reduce user mistakes and improves user experience when the user uses the display generation components.

FIG. 12 is a flowchart of a method 12000 of triggering display of a computer-generated experience based on detecting preset physical interaction with a physical object in the real world, in accordance with some embodiments.

Method 12000 relates to using physical interaction with an object to trigger computer-generated experiences related to the object. In some embodiments, preset manners of physical manipulation of a physical object in the real world are detected and used as triggers for launching computer-generated experiences related to the physical object. In some embodiments, prior to launching the computer-generated experiences related to the physical object, visual indication(s) of available computer-generated experiences, and optionally, visual guide (e.g., previews and animations) about how to launch the computer-generated experiences, are displayed at positions in a mixed reality environment that correspond to the position of the representation the physical object in the mixed reality environment. Using preset physical manipulations of a physical object to trigger display of a computer-generated experience associated with the physical object, in addition to displaying visual indication regarding the availability of the computer-generated experience and/or visual guide regarding the physical manipulations needed to trigger the computer-generated experience, allows the user to achieve a desired outcome (e.g., entering a desired computer-generated experience) more intuitively, more quickly, and with fewer inputs. This user interaction heuristic also helps to reduce user mistakes when the user interacts with the physical object, thereby making the human-machine interface more efficient, which saves power on battery-operated computing systems.

In some embodiments, method 12000 is performed (12002) at a computing system including a first display generation component (e.g., a heads-up display, a head-mounted display (HMD), a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the computing system includes a first display generation component and a second display generation component (e.g., the first display generation component is a display facing the user and provides a CGR experience to the user, and the second display generation component is a display facing away from the user and toward an external environment of the user and optionally provides status information related to the first display generation component (e.g., displayed content, operational state, etc.) and/or the user (e.g., movement of the user's eyes, attention state of the user, etc.) to other users in the external environment). In some embodiments, the first display generation component and the second display generation component form a two-sided display device (e.g., a two-sided HMD) that displays a first user interface on a first side corresponding to the first display generation component, and a second user interface on the second side corresponding to the second display generation component. In some embodiments, the computing system is an integrated device with one or more processors and memory enclosed in the same housing as the first display generation component and optionally the second display generation component and at least some of the one or more input devices. In some embodiments, the computing system includes a computing component that includes one or more processors and memory that is separate from the display generation component(s) and/or the one or more input devices. In some embodiments, the display generation component(s) and the one or more input devices are integrated and enclosed in the same housing.

In method 12000, while displaying a representation of a physical object at a position in a three-dimensional environment (e.g., a mixed reality environment, or a view of a physical environment as seen through a transparent portion of the display generation component or a camera view) that corresponds to a location of the physical object in a physical environment, the computing system displays (12004) (e.g., before the user makes contact with the physical object, or otherwise interacts with a representation of the physical object in the three-dimensional environment) a visual indication (e.g., label 7046 in FIG. 7K, or other visual indication, etc.) (e.g., a pop-up label, a visual effect (e.g., a shimmering effect, a spotlight, an outline, etc.) displayed at a position corresponding to the location of the physical object)) that a computer-generated experience (e.g., a virtual reality experience, or an augmented reality experience) corresponding to the physical object (e.g., a box including box lid 7042 and box body 7040 in FIG. 7K) is available for display via the first display generation component (e.g., displaying a pop-up on top of the representation of the physical object in the three-dimensional environment without starting the computer-generated experience (e.g., the pop-up is displayed in response to the representation of the physical object coming into the field of view shown via the first display generation component, or in response to a gaze input being detected on the representation of the physical object)). While displaying the visual indication that a computer-generated experience is available for display via the first display generation component, the computing system detects (12006) an interaction (e.g., interactions shown in FIGS. 7L and 7M) with the physical object in the physical environment (e.g., detecting the user's hand reaching out toward the physical object, making contact with the physical object, and/or picking up the physical object) (e.g., the interaction with the physical object in the physical environment (e.g., through directly touching or moving the physical object) is different from an interaction with a virtual control associated with the physical object or with the representation of the physical object displayed in the three-dimensional environment (e.g., through user's gesture and/or gaze inputs directed to the virtual control or the representation of the physical object in the three-dimensional environment)). In response to detecting the interaction with the physical object in the physical environment (12008): in accordance with a determination that the interaction with the physical object in the physical environment meets first criteria corresponding to the physical object (e.g., as shown in FIG. 7M) (e.g., the physical object is a musical instrument and the first criteria are met when the musical instrument picked up by the user's hand; the physical object is a book and the first criteria are met when the book is opened by the user; the physical object is a tablet computer, and the first criteria are met when the tablet computer is held in front of the user's face, etc.), the computing system displays, via the first display generation component, the computer-generated experience (e.g., experience 7054 in FIG. 7M) corresponding to the physical object (e.g., displaying visual guides for playing the music instrument when the physical object is a music instrument, displaying animated content or video corresponding to the content of the book when the physical object is a book, displaying virtual content overlaying the surface of the tablet computer when the physical object is a tablet computer, etc.); and in accordance with a determination that the interaction with the physical object in the physical environment does not meet the first criteria, the computing system forgoing displaying the computer-generated experience corresponding to the physical object (e.g., as shown in FIG. 7L, experience 7054 is not displayed) (e.g., while maintaining display of the visual indication). In some embodiments, without direct interaction with the physical object in the physical environment that meets the first criteria corresponding to the physical object, the computing system does not start the computer-generated experience, and the first display generation component continues to display the visual indication that a computer-generated experience corresponding to the physical object is available for display via the first display generation component, or the first display generation component displays a visual prompt (e.g., distinct from the visual indication and the actual computer-generated experience) guiding the user about how the computer-generated experience may be started. In some embodiments, the visual prompt is displayed in response to detecting some user interaction with the physical object in the physical environment, but the interaction does not yet meet the first criteria corresponding to the physical object. This is illustrated, for example, in FIGS. 7K-7M, where a computer-generated experience is displayed when preset physical interaction with a physical object is detected, and not displayed when the preset physical interaction has not been detected.

In some embodiments, the computing system changes a view of the three-dimensional environment displayed via the first display generation component (e.g., in response to detecting movement of one or more cameras of the computing system or detecting movement of the display generation component (e.g., heads-up display, HMD, etc.), and/or detecting movement of the user's head or eyes relative to the physical environment), including switching from displaying a representation of a first portion of the physical environment to displaying a representation of a second portion of the physical environment. In response to changing the view of the three-dimensional environment: in accordance with a determination that the first portion of the physical environment includes less than a threshold portion of the physical object (e.g., the physical object is completely or mostly outside of the portion of the physical environment that is visible within the visual field of the first display generation component) and the second portion of the physical environment includes more than the threshold portion of the physical object (e.g., the physical object is completely or mostly inside of the portion of the physical environment that is visible within the visual field of the first display generation component), the computing system displays the visual indication at a position in the view of the three-dimensional environment that corresponds to the location of the physical object in the physical environment (e.g., displaying the visual indication when the physical object comes into the field of view of the user via the first display generation component); and in accordance with a determination that the first portion of the physical environment includes more than the threshold portion of the physical object and the second portion of the physical environment includes less than the threshold portion of the physical object, the computing system ceases to display the visual indication in the view of the three-dimensional environment (e.g., ceasing to display the visual indication when the physical object exits the field of view of the user via the first display generation component). Displaying the visual indication at a position in the three-dimensional environment that corresponds to the location of the physical object in the physical environment, in accordance with a determination that the first portion of the physical environment includes less than a threshold portion of the physical object and the second portion of the physical environment includes more than the threshold portion of the physical object, and ceasing to display the visual indication in the view of the three-dimensional environment in accordance with a determination that the first portion of the physical environment includes more than the threshold portion of the physical object and the second portion of the physical environment includes less than the threshold portion of the physical object, provides improved visual feedback to the user (e.g., improved visual feedback regarding whether the first or second portion of the physical environment includes more or less than the threshold portion of the physical object). Providing improved feedback enhances the operability of the device, which, additionally, reduces power usage and improves battery life of the device by enabling the user to use the device more quickly and efficiently.

In some embodiments, in response to detecting the interaction with the physical object in the physical environment: in accordance with a determination that the interaction with the physical object in the physical environment meets second criteria corresponding to the physical object that are different from the first criteria corresponding to the physical object, the computing system displays, via the first display generation component, visual feedback indicating availability of the computer-generated experience, wherein the visual feedback is different from the visual indication and different from the computer-generated experience. Displaying visual feedback indicating availability of the computer-generated experience that is different from the visual indication and different from the computer-generated experience, in accordance with a determination that the interaction with the physical object meets second criteria different from the first criteria, provides improved visual feedback (e.g., improved visual feedback regarding the availability of the computer-generated experience). Providing improved feedback enhances the operability of the device, which, additionally, reduces power usage and improves battery life of the device by enabling the user to use the device more quickly and efficiently.

In some embodiments, the visual feedback provides guidance on a type of interaction with the physical object that meets the first criteria (e.g., the visual feedback is an animation showing how to interact with the physical object in the physical environment to start the computer-generated experience). For example, when the user has picked up the book, an animated arrow appears near the cover of the book prompting the user to open the cover of the book. In another example, when the user has picked up a string instrument, a shimmering effect is applied to the position corresponding to the strings of the string instrument, prompting the user to touch or pluck the strings of the string instrument with his/her fingers or with a pick or a bow. In another example, when the user has picked up a tablet computer, an animated wireframe image of the tablet computer moves toward the user's face to prompt the user to move the tablet computer to face his/her face. Displaying visual feedback that provides guidance on a type of interaction with the physical object that meets the first criteria provides improved visual feedback to the user (e.g., improved visual feedback to guide the user on how to meet the first criteria). Providing improved feedback enhances the operability of the device, which, additionally, reduces power usage and improves battery life of the device by enabling the user to use the device more quickly and efficiently.

In some embodiments, a position of the visual feedback in the three-dimensional environment is selected based on a current location of the physical object while the physical object moves in response to the interaction with the physical object in the physical environment. For example, after the user has picked up the book, the animated arrow follows the cover of the book in the three-dimensional environment when the unopened book is moved with the user's hand in the physical environment. Similarly, after the user picked up the string instrument, the shimmering effect follows the strings of the string instrument as the string instrument moves as a whole in the physical environment in the user's hands. Similarly, when the user picked up the tablet computer, in each animated sequence presented to the user, the wireframe image of the tablet computer always starts from the current location of the tablet computer, turns to face the user and moves toward the user's face, even when the tablet computer may have different orientations and locations while being held by the user. Displaying visual feedback at a position in the three-dimensional environment selected based on a current location of the physical object while the physical object moves in response to the interaction with the physical object in the physical environment provides improved visual feedback to the user (e.g., improved visual feedback that the physical object is moving, and improved visual feedback regarding the current location of the physical object). Providing improved feedback enhances the operability of the device, which, additionally, reduces power usage and improves battery life of the device by enabling the user to use the device more quickly and efficiently.

In some embodiments, a value of a first characteristic of the visual feedback (e.g., an extent (e.g., size, dimensions, angular extent, etc.) of the animation, visual effect, and/or virtual object, an amount of details in the visual feedback, the brightness, color saturation, visual clarity, etc. of the visual feedback, etc.) is adjusted (e.g., dynamically in real-time) in accordance with a value of a second characteristic of the interaction with the physical object in the physical environment (e.g., distance of movement, angular extent of movement, speed of movement, types of interaction, distance to predetermined reference point, etc.). For example, in some embodiments, the visual feedback shows a preview of a three-dimensional computer-generated experience that is displayed when the cover of the page is slowly opened by the user in the physical environment, and the amount of preview that is displayed is growing but continue to be confined by the gap between the cover and the first page of the book. The preview ceases to be displayed and the full computer-generated experience is started in the three-dimensional environment when the cover is opened beyond a threshold amount and the first criteria are met. In another example, when the user plucks at the strings of the music instrument randomly, the visual feedback shows small amounts of sparkles coming off of the plucked strings; when the user continues to play the music instrument and the rhythms of the user's finger movement become more and more regular and recognizable, the computing system generates music and corresponding visual effects in accordance with the rhythms and locations of the user's finger movement on the musical instrument; and eventually when the first criteria are met because the user's finger movement on the musical instrument are sufficiently regular and rhythmic, the preview of the computer-generated experience is transformed in to a full-on computer-generated experience (e.g., musical accompaniment of other instruments are added, and virtual dancers are added to the three-dimensional environment, etc.). Displaying visual feedback with a value of a first characteristic of the visual feedback that is adjusted in accordance with a value of a second characteristic of the interaction with the physical object in the physical environment provides improved visual feedback to the user (e.g., improved visual feedback regarding the second characteristic of the interaction with the physical object in the physical environment). Providing improved feedback enhances the operability of the device, which, additionally, reduces power usage and improves battery life of the device by enabling the user to use the device more quickly and efficiently.

In some embodiments, a first amount of change in a first characteristic of the interaction with the physical object in the physical environment (e.g., a first amount of change in the movement distance, angular extent of movement, speed of movement, or distance to predetermined reference point, etc.) causes a first amount of change in a value of a second characteristic of the visual feedback (e.g., a first amount of change in an extent (e.g., size, dimensions, angular extent, etc.) of the animation, visual effect, and/or virtual object, in an amount of details in the visual feedback, in the brightness, color saturation, visual clarity, etc. of the visual feedback, etc.); and a second amount of change in the first characteristic of the interaction with the physical object in the physical environment (e.g., a second amount of change in the movement distance, angular extent of movement, speed of movement, or distance to predetermined reference point, etc.) causes a second amount of change in the value of the second characteristic of the visual feedback (e.g., a second amount of change in an extent (e.g., size, dimensions, angular extent, etc.) of the animation, visual effect, and/or virtual object, in an amount of details in the visual feedback, in the brightness, color saturation, visual clarity, etc. of the visual feedback, etc.). For example, the experience gradually appears (e.g., fading in, or occupying increasing amount of space) as the interaction occurs, such as gradually appearing as the book is opened. Changing a value of a second characteristic of the visual feedback by a first amount, in accordance with a first amount of change in a first characteristic of the interaction with the physical object in the physical environment, and changing the value of the second characteristic of the visual feedback in accordance by a second amount, in accordance with a second amount of change in the first characteristic of the interaction with the physical object in the physical environment, provides improved visual feedback to the user (e.g., improved and continuous visual feedback regarding the interaction with the physical object in the physical environment). Providing improved feedback enhances the operability of the device, which, additionally, reduces power usage and improves battery life of the device by enabling the user to use the device more quickly and efficiently.

In some embodiments, displaying, via, the first display generation component, the computer-generated experience corresponding to the physical object includes: in accordance with a determination that the interaction with the physical object corresponds to a first predetermined input modality (e.g., the interaction is picking up the tablet computer and raise it in front of the user's face, the interaction is picking up a musical instrument and put it across the user's body, or the interaction is picking up a book and open the cover, etc.), displaying a first version of the computer-generated experience corresponding to the first predetermined input modality (e.g., the first display generation component displays an enlarged three-dimensional user interface in front of the user's face and the user interface responds to in-air gesture inputs and gaze inputs directed to the three-dimensional user interface; the first display generation component displays strings that correspond to a guitar or a bass and responds to plucking motions of the user's fingers, at a position corresponding to the musical instrument; or the first display generation component displays a preview of each chapter of the book in sequence and responds to an in-air swipe to go to the preview of the next chapter or to an in-air tap to start an CGR corresponding to the currently previewed chapter, etc.); and in accordance with a determination that the interaction with the physical object corresponds to a second predetermined input modality (e.g., the interaction is picking up the tablet computer, rotate it to landscape orientation and put it on the desk in front of the user, the interaction is picking up a musical instrument and put it on the user's lap or on the floor between the users crossed legs, or the interaction is picking up a book and open the book from the middle, etc.), displaying a second version of the computer-generated experience corresponding to the second predetermined input modality (e.g., the first display generation component displays a virtual keyboard at a position corresponding to the location of the tablet computer on the desk, and displays text entered by the user in the three-dimensional environment when the user taps the desk at locations corresponding to the different keys on the virtual keyboard (e.g., the user interface shown on the tablet computer is hidden); the first display generation component displays one or more drum surfaces and generate drum beats in response to tapping of the user's fingers in the air or on the user's lap; or the first display generation component displays a three-dimensional movie corresponding to the portion of the book that is currently opened, etc.). Displaying a first version of the computer-generated experience corresponding to the first predetermined input modality, in accordance with a determination that the interaction with the physical object corresponds to the first predetermined input modality, and displaying the second version of the computer-generated experience corresponding to the second predetermined input modality, in accordance with a determination that the interaction with the physical object corresponds to the second predetermined input modality, displays a first or second version of the computer-generated experience when a set of conditions has been met without requiring further user input (e.g., further user input to select the first or second version of the computer-generated experience). Performing an operation when a set of conditions has been met without requiring further user input enhances the operability of the device, which, additionally, reduces power usage and improves battery life of the device by enabling the user to use the device more quickly and efficiently.

In some embodiments, the computer-generated experience is a virtual reality experience and displaying the computer-generated experience includes ceasing to display the representation (e.g., the realistic rendering, pass-through view, or camera view) of the physical object in the three-dimensional environment (e.g., even though the physical location of the physical object would be within field of view of the user if the user's view of the physical environment were not blocked by the presence of the first display generation component, the representation of the physical object (e.g., the camera view of the physical object or the view of the physical object as seen through a transparent portion of the first display generation component) is no longer displayed or visible via the first display generation component). In some embodiments, an indication of the outline or presence of the physical object (e.g., a shadow, an outline, a virtualized representation, or a stylized rendition of the physical object) is optionally displayed at a position corresponding to the location of the physical object in the physical environment during the computer-generated experience. Displaying the computer-generated experience that is a virtual reality experience, including ceasing to display the representation of the physical object in the three-dimensional environment, in accordance with a determination that the interaction with the physical object in the physical environment meets first criteria corresponding to the physical object, and forgoing displaying the computer-generated experience in accordance with a determination that the interaction with the physical object in the physical environment does not meet first criteria, provides additional control options without cluttering the UI with additional displayed controls (e.g., additional displayed controls for displaying the computer-generated experience that is a virtual reality experience). Providing additional control options without cluttering the UI with additional displayed controls enhances the operability of the device, which, additionally, reduces power usage and improves battery life of the device by enabling the user to use the device more quickly and efficiently.

In some embodiments, the computer-generated experience is an augmented reality experience and displaying the computer-generated experience includes maintaining display of the representation (e.g., the realistic rendering, pass-through view, or camera view) of the physical object in the three-dimensional environment (e.g., when the physical location of the physical object would be within field of view of the user if the user's view of the physical environment were not blocked by the presence of the first display generation component, the representation of the physical object (e.g., the camera view of the physical object or the view of the physical object as seen through a transparent portion of the first display generation component) is displayed or visible via the first display generation component). In some embodiments, virtual overlays are displayed at positions corresponding to the location of the physical object in the physical environment during the computer-generated experience to augment the user's experience with the physical object. Displaying the computer-generated experience that is an augmented reality experience, including maintaining display of the representation of the physical object in the three-dimensional environment, in accordance with a determination that the interaction with the physical object in the physical environment meets first criteria corresponding to the physical object, and forgoing displaying the computer-generated experience in accordance with a determination that the interaction with the physical object in the physical environment does not meet first criteria, provides additional control options without cluttering the UI with additional displayed controls (e.g., additional displayed controls for displaying the computer-generated experience that is a virtual reality experience). Providing additional control options without cluttering the UI with additional displayed controls enhances the operability of the device, which, additionally, reduces power usage and improves battery life of the device by enabling the user to use the device more quickly and efficiently.

It should be understood that the particular order in which the operations in FIG. 12 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, and 13000) are also applicable in an analogous manner to method 12000 described above with respect to FIG. 12. For example, the gestures, gaze inputs, physical objects, user interface objects, and/or animations described above with reference to method 12000 optionally have one or more of the characteristics of the gestures, gaze inputs, physical objects, user interface objects, and/or animations described herein with reference to other methods described herein (e.g., methods 8000, 9000, 10000, 11000, and 11000). For brevity, these details are not repeated here.

FIG. 13 is a flowchart of a method 13000 of performing an operation in response to an input on a housing of a display generation component, in accordance with some embodiments.

In some embodiments, a display generation component is contained in a housing that includes sensors (or otherwise has associated external sensors) for detecting touch or hover inputs near or on various parts of the housing. Touch inputs and/or hover inputs of different types (e.g., based on movement pattern (e.g., tap, swipe, etc.), duration (e.g., long, short, etc.), intensity (e.g., light, deep, etc.), etc.) and at different locations on or near the exterior of the housing are used to trigger different operations associated with the display generation component or the computer-generated environment displayed by the display generation component. An interaction heuristic is used to determine whether the operation should be performed depending on whether a single hand or two hands are detected on the housing at the time that the input is detected. Using the number of hands detected on the housing as an indicator of whether the user intends to provide an input or is simply adjusting the position of the display generation component with his hands helps to reduce inadvertent or unintentional operation of the display generation component and thereby making the human-machine interface more efficient, which saves power on battery-operated computing systems.

In some embodiments, method 13000 is performed (13002) at a computing system including a housing, a first display generation component contained in the housing (e.g., the first display generation component and the housing constitute a heads-up display, a head-mounted display (HMD), a display, a touchscreen, a projector, etc.), and one or more input devices (e.g., cameras, controllers, touch-sensitive surfaces, joysticks, buttons, gloves, watches, motion sensors, orientation sensors, etc.). In some embodiments, the computing system includes a first display generation component and a second display generation component contained in the same housing of a heads-up display, a head-mounted display (HMD), a display, a touchscreen, a projector, etc. (e.g., the first display generation component is a display component facing the user and provides a CGR experience to the user, and the second display generation component is a display component facing away from the user and toward an external environment of the user and optionally provides status information related to the first display generation component (e.g., displayed content, operational state, etc.) and/or the user (e.g., movement of the user's eyes, attention state of the user, etc.) to other users in the external environment). In some embodiments, the first display generation component and the second display generation component form a two-sided display device (e.g., a two-sided HMD) that displays a first user interface on a first side corresponding to the first display generation component, and a second user interface on the second side corresponding to the second display generation component. In some embodiments, the computing system is an integrated device with one or more processors and memory enclosed in the same housing as the first display generation component and optionally the second display generation component and at least some of the one or more input devices. In some embodiments, the computing system includes a computing component that includes one or more processors and memory that is separate from the display generation component(s) and/or the one or more input devices. In some embodiments, the display generation component(s) and the one or more input devices are integrated and enclosed in the same housing.

In method 13000, the computing system detects (13004) a first hand on the housing that contains the first display generation component (e.g., as shown in FIGS. 7O, 7P, and 7Q, respectively). In response to detecting the first hand on the housing that contains the first display generation component (13006): in accordance with a determination that the first hand is detected in conjunction with a second hand being detected on the housing (e.g., as shown in FIG. 7Q), the computing system forgoes performance of an operation associated with the first hand (e.g., an operation that corresponds to an input provided by the first hand on the housing); and in accordance with a determination that the first hand is detected on the housing without detecting another hand on the housing (e.g., as shown in FIGS. 7Q and 7P), the computing system performs an operation associated with the first hand (e.g., the operation that corresponds to the input provided by the first hand on the housing).

In some embodiments, the computing system has multiple operational states, and performing the operation associated with the first hand includes: in accordance with a determination that the first hand on the housing meets first criteria (e.g., first hand touch or gesture criteria), performing a first operation that changes an operational state of the computing system in a first manner that corresponds to the first criteria; and in accordance with a determination that the first hand on the housing meets second criteria (e.g., second hand touch or gesture criteria), wherein the second criteria are different from the first criteria, performing a second operation that changes the operational state of the computing system in a second manner that corresponds to the second criteria, the second manner being different from the first manner. Performing a first operation that changes an operational state of the computing system in a first manner that corresponds to the first criteria, in accordance with a determination that the first hand on the housing meets first criteria, and performing a second operation that changes the operational state of the computing system in a second manner, different from the first manner, that corresponds to the second criteria, in accordance with a determination that the first hand on the housing meets second criteria different from the first criteria, provides additional control options without cluttering the UI with additional displayed controls (e.g., additional displayed controls for performing the first operation and/or performing the second operation). Providing additional control options without cluttering the UI with additional displayed controls enhances the operability of the device, which, additionally, reduces power usage and improves battery life of the device by enabling the user to use the device more quickly and efficiently.

In some embodiments, the first criteria include a first location criterion that requires the first hand to be detected on a first predetermined portion of the housing (e.g., the left side, the top edge, the upper left corner, etc. of the housing) in order for the first location criterion to be met, and the second criteria include a second location criterion that requires the first hand to be detected on a second predetermined portion of the housing (e.g., the right side, the bottom edge, the lower left corner, etc. of the housing)) in order for the second location criterion to be met, the second predetermined portion of the housing being different from the first predetermined portion of the housing. In some embodiments, the housing includes one or more sensors for detecting locations of contacts with the housing (e.g., touch and/or intensity sensors that detect touch locations and optionally contact intensities of hand and/or fingers on the outside of the housing). Performing a first operation that changes an operational state of the computing system in a first manner that corresponds to the first criteria that requiring the first hand to be detected on a first predetermined portion of the housing, and performing a second operation that changes the operational state of the computing system in a second manner, different from the first manner, that corresponds to the second criteria requiring the first hand to be detected on a second predetermined portion of the housing, different from the first predetermined portion of the housing, provides additional control options without cluttering the UI with additional displayed controls (e.g., additional displayed controls for performing the first operation and/or performing the second operation). Providing additional control options without cluttering the UI with additional displayed controls enhances the operability of the device, which, additionally, reduces power usage and improves battery life of the device by enabling the user to use the device more quickly and efficiently.

In some embodiments, the first criteria include a first movement criterion that requires the first hand to make a first movement relative to the housing (e.g., detecting the first movement of the first hand includes detecting movement of one or more contacts by the first hand on the housing in a first predetermined direction (e.g., from top to bottom along an edge of the housing, from front to back along the side of the housing, or clockwise, etc.) and/or following a first predetermined movement pattern (e.g., moving straight, or spiraling outwardly, etc.), and/or forming a first predetermined hand posture (e.g., after the first hand touches down on the housing, four fingers of the first hand extend out with palm facing downward; or after touch-down on the housing, two fingers of the first hand pinches toward each other, etc.) and/or a first spatial relationship relative to the housing (e.g., first hand approaches the housing from above the top edge of the housing, first hand approaches the housing from left of the housing, etc.)) in order for the first criteria to be met, and the second criteria include a second movement criterion that requires the first hand to make a second movement relative to the housing (e.g., detecting the second movement of the first hand includes detecting movement of one or more contacts by the first hand on the housing in a second predetermined direction (e.g., from bottom to top along an edge of the housing, or from back to front along the side of the housing, etc.) and/or following a second predetermined movement pattern (e.g., moving in a zig-zag manner, or spirally inwardly, etc.), and/or forming a second predetermined hand posture (e.g., after the first hand touches down on the housing, two fingers of the first hand pinches the housing with three fingers extended out; or after touch-down on the housing, three fingers of the first hand remain contact with the housing with two fingers extending away from the housing, etc.) and/or a second spatial relationship relative to the housing (e.g., first hand approaches the housing from above the upper right corner of the housing, first hand approaches the housing from the lower left corner of the housing, etc.)) in order for the second criteria to be met, the second movement being different from the first movement. Performing a first operation that changes an operational state of the computing system in a first manner that corresponds to the first criteria requiring the first hand to make a first movement relative to the housing, and performing a second operation that changes the operational state of the computing system in a second manner, different from the first manner, that corresponds to the second criteria requiring the first hand to make a second movement relative to the housing, provides additional control options without cluttering the UI with additional displayed controls (e.g., additional displayed controls for performing the first operation and/or performing the second operation). Providing additional control options without cluttering the UI with additional displayed controls enhances the operability of the device, which, additionally, reduces power usage and improves battery life of the device by enabling the user to use the device more quickly and efficiently.

In some embodiments, the first criteria include a first posture criterion that requires the first hand to be in a first predetermined posture while on the housing (e.g., detecting the first hand in the first predetermined posture includes detecting the first hand with fingers fully extended out and palm facing left side of the housing; or detecting the first hand forming in a fist with palm side facing the left side of the housing, etc.) in order for the first criteria to be met, and the second criteria include a second posture criterion that requires the first hand to be in a second predetermined posture while on the housing (e.g., detecting the first hand in the second predetermined posture includes detecting the first hand with fingers fully extended out and palm facing downward over the top edge of the housing; or detecting the first hand pinching the housing with two or three fingers only, etc.) in order for the second criteria to be met, the second predetermined posture being different from the first predetermined posture. Performing a first operation that changes an operational state of the computing system in a first manner that corresponds to the first criteria requiring the first hand to be in a first predetermined posture while on the housing, and performing a second operation that changes the operational state of the computing system in a second manner, different from the first manner, that corresponds to the second criteria requiring the first hand to be in a second predetermined posture, different from the first predetermined posture, while on the housing, provides additional control options without cluttering the UI with additional displayed controls (e.g., additional displayed controls for performing the first operation and/or performing the second operation). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the first hand on the housing that contains the first display generation component and in accordance with a determination that the first hand is detected on the housing without detecting another hand on the housing, the computing system performs the operation associated with the first hand, including: in accordance with a determination that visual-adjustment criteria (e.g., the first criteria are the visual adjustment criteria for reducing the visual level of immersion of the content displayed via the first display generation component (and for activating and/or increasing the pass-through content provided via the first generation component)) are met, wherein the visual-adjustment criteria include a respective location criterion and a respective posture criterion that are to be met in conjunction with each other by the first hand while the computing system is operating in a first operational state (e.g., an immersive state providing fully immersive content, or semi-immersive content), in order for the visual-adjustment criteria to be met (e.g., wherein the visual-adjustment criteria require that the first hand to be in a first posture while located at a first position relative to the housing containing the first display generation component (e.g., the visual-adjustment criteria require at least the first distal portions (e.g., distal phalanges, up to intermediate phalanges, up to proximal phalanges, or up metacarpals) of at least four fingers of the first hand to be extended over a top portion of the housing with palm side of the first hand facing downward (e.g., as if the user wishes to see a location far away))), changing an operational state of the computing system from the first operational state to a second operational state different from the first operational state, wherein the first display generation component provides an increased view of a physical environment surrounding the first display generation component (e.g., with a wider field of view, with more clarity or transparency, with increased brightness, with sharper focus, with less blur, with less computer-generated visual obfuscation, etc. for the view of the physical environment, or transitioning from no view at all to some amount of view of the physical environment) while the computing system is in the second operational state as compared to when the computing system was in the first operational state. In some embodiments, in response to detecting that the user's hand is in the first posture while located at a first position relative to the housing of the HMD, the computing system executes instructions to transition into a pass-through mode (e.g., from a fully-immersive mode into semi-immersive mode (e.g., a first, semi-pass-through mode) or from a semi-immersive mode to a non-immersive mode (e.g., a second, fully-pass-through mode)) in which the first display generation component facing the user shows a pass-through view of the physical environment surrounding the user (e.g., the camera view of the physical environment is displayed by the first display generation component, or the first display generation component becomes more transparent to allow the user to see through the transparent portion of the first display generation component, with or without concurrently displayed virtual content). In some embodiments, the visual-adjustment criteria are not met when the first hand is detected on the housing with a position and a posture that meet the respective location criterion and the respective posture criterion of the visual-adjustment criteria, but a second hand is concurrently detected on the housing with the first hand; and as a result, the computing system does not transition from the first operational state to the second operational state. In addition, in accordance with a determination the visual-adjustment criteria are not met because the first hand does not meet either of the respective location criterion and the respective posture criterion of the visual-adjustment criteria, the computing system does not transition from the first operational state to the second operational state either. Changing an operational state of the computing system from the first operational state to a second operational state, different from the first operational state, and providing an increased view of a physical environment surrounding the first display generation component while the computing system is in the second operational state, in accordance with a determination that a respective location criterion and a respective posture criterion that are to be met in conjunction with each other by the first hand while the computing system is operating in a first operational state, provides additional control options without cluttering the UI with additional displayed controls (e.g., additional displayed controls for providing an increased view of the physical environment surrounding the first display generation component, additional displayed controls for changing from the first operational state to the second operational state, etc.). Providing additional control options without cluttering the UI with additional displayed controls enhances the operability of the device, which, additionally, reduces power usage and improves battery life of the device by enabling the user to use the device more quickly and efficiently.

In some embodiments, while the computing system is in the second operational state (e.g., the first display generation component is displaying a first or second pass-through view of the surrounding physical environment), the computing system detects that the visual-adjustment criteria are no longer met by the first hand (e.g., due to movement of the first hand that changes the posture and/or location of the first hand relative to the housing); and in response to detecting that the visual-adjustment criteria are no longer met by the first hand, the computing system restores the operational state of the computing system from the second operational state to the first operational state (e.g., while the computing system is in the first operational state, the first display generation component provides a reduced view of the physical environment surrounding the first display generation component (e.g., with a narrower field of view, with less clarity or transparency, with reduced brightness, with softer focus, with more blur, with more computer-generated visual obfuscation, etc. for the view of the physical environment, or transitioning from some amount of the view of the physical environment to no view of the physical environment at all) as compared to when the computing system is in the second operational state.). For example, in response to detecting that the user has moved his/her hand away from the top of the HMD, the computing device ceases to display the pass-through view of the physical environment, and continues to display the immersive virtual content via the first display generation component. Restoring the operational state of the computing system from the second operational state to the first operational state in response to detecting that the visual-adjustment criteria are no longer by the first hand restores the operational state when a set of conditions has been met without requiring further user input (e.g., further user input to restore the operational state of the computing system from the second operational state to the first operational state). Performing an operation when a set of conditions has been met without requiring further user input enhances the operability of the device, which, additionally, reduces power usage and improves battery life of the device by enabling the user to use the device more quickly and efficiently.

In some embodiments, in response to detecting the first hand on the housing that contains the first display generation component and in accordance with a determination that the first hand is detected on the housing without detecting another hand on the housing, the computing system performs the operation associated with the first hand, including: in accordance with a determination that audio-adjustment criteria (e.g., the second criteria are the audio-adjustment criteria for reducing the audio level of immersion of the content provided via a first audio generation component (e.g., speakers or earphones of the HMD) included in the same housing as the first display generation component, and/or for terminating and/or reducing the pass-through audio (e.g., sound from the physical environment) provided via the first audio generation component)) are met, wherein the audio-adjustment criteria include a respective location criterion and a respective posture criterion that are to be met in conjunction with each other by the first hand while the computing system is operating in a third operational state (e.g., an audio-immersive state providing fully immersive audio (e.g., with complete noise-cancelation, and surrounding sound for computer-generated content), or semi-audio immersive state (e.g., without noise cancelation but with normal audio volume on both left and right audio channels for the computer-generated content)), in order for the audio-adjustment criteria to be met (e.g., wherein the audio-adjustment criteria require that the first hand to be in a second posture while located at a second position relative to the housing containing the first display generation component and the first audio generation component (e.g., the audio-adjustment criteria require the first hand to be at least semi-open next to the side of the user's head (e.g., next to the side of the HMD that includes both the first display generation component and the first audio generation component in the same housing), with the palm side of the first hand facing forward (e.g., as if the user wishes to hear something))), changing an operational state of the computing system from the third operational state to a fourth operational state different from the third operational state, wherein a first audio generation component of the computing system (e.g., the first audio generation component is included in the same housing as the first display generation component, or the first audio generation component is separated from the first display generation component by the housing and is placed over or in the user's ear (e.g., the ear on the side of the user's head next to the first hand) during operation of the computing system) provides an increased amount of pass-through sound from a physical environment surrounding the first audio generation component (e.g., with no or reduced active computer-generated noise cancelation provided by the first audio generation component, with reduced volume or muting of the audio accompanying the computer-generated visual content provided via the first display generation component, with reduced audio obfuscation for the sound from the external physical environment, etc.) while the computing system is in the fourth operational state as compared to when the computing system was in the third operational state. In some embodiments, in response to detecting that the user's hand is in the second posture while located at a second position relative to the housing of the HMD, the computing system executes instructions to transition into an audio pass-through mode (e.g., from a fully-immersive mode into semi-immersive mode (e.g., a third, semi-pass-through mode) or from a semi-immersive mode to a non-immersive mode (e.g., a fourth, fully-pass-through mode)) in which the first audio generation component on the side of the user's head next to the first hand or on both sides of the user's head provide increased audio pass-through of the sound from the physical environment surrounding the user (e.g., the computer-generated audio content is reduced in volume or fidelity, and/or the blocking, cancellation, and/or obfuscation of the sounds from the surrounding physical environment by the first audio generation component is reduced, with or without concurrently displayed virtual content). In some embodiments, the audio-adjustment criteria are not met when the first hand is detected on the housing with a position and a posture that meet the respective location criterion and the respective posture criterion of the visual-adjustment criteria, but a second hand is concurrently detected on the housing with the first hand; and as a result, the computing system does not transition from the third operational state to the fourth operational state. In addition, in accordance with a determination the audio-adjustment criteria are not met because the first hand does not meet either of the respective location criterion and the respective posture criterion of the audio-adjustment criteria, the computing system does not transition from the third operational state to the fourth operational state either. Changing an operational state of the computing system from the third operational state to a fourth operational state different from the third operational state, wherein a first audio generation component of the computing system provides an increased amount of pass-through sound from a physical environment surrounding the first audio generation component while the computing system is in the fourth operational state as compared to when the computing system was in the third operational state, and in accordance with a determination that a respective location criterion and a respective posture criterion are met in conjunction with each other by the first hand, provides additional control options without cluttering the UI with additional displayed controls (e.g., additional displayed controls for increasing the amount of pass-through sound from the physical environment surrounding the first audio generation component). Providing additional control options without cluttering the UI with additional displayed controls enhances the operability of the device, which, additionally, reduces power usage and improves battery life of the device by enabling the user to use the device more quickly and efficiently.

In some embodiments, while the computing system is in the fourth operational state (e.g., the first audio generation component is letting outside sound pass through to the user's ear with no or reduced computer-generated interferences and/or obfuscations), the computing system detects that the audio-adjustment criteria are no longer met by the first hand (e.g., due to movement of the first hand that changes the posture and/or location of the first hand relative to the housing). In response to detecting that the audio-adjustment criteria are no longer met by the first hand, the computing system restores the operational state of the computing system from the fourth operational state to the third operational state (e.g., while the computing system is in the third operational state, the first audio generation component provides increased interference and obfuscation of the sound from the physical environment surrounding the first audio generation component (e.g., with a higher volume for the computer-generated content, with stronger noise cancellation effect, with more white noise, or transitioning from no audio blockage, cancellation, or obfuscation for the outside sound to some level of computer-generated audio blockage, cancellation, or obfuscation for the outside sound) as compared to when the computing system is in the fourth operational state.). For example, in response to detecting that the user has moved his/her hand away from the side of the HMD, the computing device ceases to let outside sound to pass through to the user's ear by resuming normal volume of the computer-generated content, and/or by increasing noise cancelation for the outside sound from the physical environment and continues to generate the immersive audio content via the first audio generation component. Restoring the operational state of the computing system from the fourth operational state to the third operational state in response to detecting that the audio-adjustment criteria are no longer met by the first hand restores the operational state when a set of conditions has been met without requiring further user input (e.g., further user input to change the operational state from the fourth operational state to the third operational state). Performing an operation when a set of conditions has been met without requiring further user input enhances the operability of the device, which, additionally, reduces power usage and improves battery life of the device by enabling the user to use the device more quickly and efficiently.

In some embodiments, in response to detecting the first hand on the housing that contains the first display generation component and in accordance with a determination that the first hand is detected on the housing without detecting another hand on the housing, the computing system performs the operation associated with the first hand, including: in accordance with a determination that privacy-adjustment criteria (e.g., the first criteria or the second criteria, or third criteria are the privacy-adjustment criteria for togging between displaying and not displaying status information for the operational state of the computing system on the second display generation component of the computing system (e.g., the second display generation component is included in the same housing as the first display generation component and facing away from the user), wherein the status information is based on the level of immersion of the audio/visual content provided via the first audio/display generation component(s)) are met, wherein the privacy-adjustment criteria include a respective movement criterion and a respective posture criterion that are to be met in conjunction with each other by the first hand in order for the privacy-adjustment criteria to be met (e.g., wherein the privacy-adjustment criteria require that the first hand to be in a third posture while moving in a first direction relative to the housing containing the first display generation component (e.g., the privacy-adjustment criteria require the thumb and index finger of the first hand form a pinch gesture, and require downward or upward movement of the first hand next to the side of the housing while the first hand maintains the pinch gesture (e.g., as if the user is pulling down or pulling up a blind over a window))), changing an operational state of the computing system from a fifth operational state to a sixth operational state different from the fifth operational state, wherein a second display generation component of the computing system (e.g., the second display generation component is included in the same housing as the first display generation component, or the second display generation component is separated from the first display generation component by the housing and is placed back to back with the first display generation component during operation of the computing system) switches between (e.g., switching from, or toggle between) providing a first amount of status information regarding content displayed via the first display generation component and providing a second amount of status information regarding the content displayed via the first display generation component (e.g., in real-time as the first display generation component is displaying the content). In some embodiments, the privacy-adjustment criteria are not met when the first hand is detected on the housing with a movement and a posture that meet the respective movement criterion and the respective posture criterion of the privacy-adjustment criteria, but a second hand is concurrently detected on the housing with the first hand; and as a result, the computing system does not transition from the fifth operational state to the sixth operational state. In addition, in accordance with a determination the privacy-adjustment criteria are not met because the first hand does not meet either of the respective movement criterion and the respective posture criterion of the privacy-adjustment criteria, the computing system does not transition from the fifth operational state to the sixth operational state either. Changing an operational state of the computing system from a fifth operational state to a sixth operational state different from the fifth operational state, wherein the computing system switches between providing a first amount of status information regarding content displayed via the first display generation component and providing a second amount of status information regarding the content displayed via the first display generation component, in accordance with a determination that a respective movement criterion and a respective posture criterion are met in conjunction with each other by the first hand, provides additional control options without cluttering the UI with additional displayed controls (e.g. additional displayed controls for switching between providing the first amount of status information and the second amount of status information, additional displayed controls for changing from the fifth operational state to the sixth operational state, etc.). Providing additional control options without cluttering the UI with additional displayed controls enhances the operability of the device, which, additionally, reduces power usage and improves battery life of the device by enabling the user to use the device more quickly and efficiently.

In some embodiments, the status information also includes a representation of a user's eyes facing a content display side of the first display generation component, and changing the operational state of the computing system from the fifth operational state to the sixth operational state different from the fifth operational state includes switching between displaying the representation of the user's eyes and not displaying the representation of the user's eyes via the first display generation component (e.g., representations of the user's eyes are based on real-time images of the user's eyes while the first display generation component displays computer-generated content to the user). Changing the operational state of the computing system from the fifth operational state to the sixth operational state, wherein, including switching between displaying the representation of the user's eyes and not displaying the representation of the user's eyes, in accordance with a determination that a respective movement criterion and a respective posture criterion are met in conjunction with each other by the first hand, provides additional control options without cluttering the UI with additional displayed controls (e.g. additional displayed controls for switching between providing the first amount of status information and the second amount of status information, additional displayed controls for changing from the fifth operational state to the sixth operational state, etc.). Providing additional control options without cluttering the UI with additional displayed controls enhances the operability of the device, which, additionally, reduces power usage and improves battery life of the device by enabling the user to use the device more quickly and efficiently.

In some embodiments, while the computing system is in the sixth operational state (e.g., the sixth operational state is a low-privacy state with status information displayed by the second display generation component, or the sixth operational state is a high-privacy state without or with reduced status information displayed by the second display generation component), the computing system detects that the privacy-adjustment criteria are no longer met by the first hand (e.g., due to movement of the first hand that changes the posture of the first hand or the first hand moving away from the side of the housing). In response to detecting that the privacy-adjustment criteria are no longer met by the first hand, the computing system maintains the operational state of the computing system in the sixth operational state. Maintaining the operational state of the computing system in the sixth operational state in response to detecting that the privacy-adjustment criteria are no longer met by the first hand reduces the number of inputs needed to maintain the sixth operational state (e.g., the user does not need to perform additional inputs to maintain the sixth operational state, the first hand does not need to continue meeting privacy-adjustment criteria in order to maintain the sixth operational state). Reducing the number of inputs needed to perform an operation enhances the operability of the device, which, additionally, reduces power usage and improves battery life of the device by enabling the user to use the device more quickly and efficiently.

In some embodiments, while the computing system is in the sixth operational state (e.g., the second display generation component is displaying status information corresponding to the computer-generated content provided via the first display generation component (e.g., a low privacy state)), the computing system detects that the privacy-adjustment criteria are met again by the first hand (e.g., the same gesture that meets the respective movement criterion and the respective posture criterion of the privacy-adjustment criteria is detected after the first hand had moved away from the housing of the first display generation component). In response to detecting that the privacy-adjustment criteria are met again while the computing system is in the sixth operational state, the computing system changes the operational state of the computing system from the sixth operational state to the fifth operational state, wherein the second display generation component of the computing system reverses the switching between providing the first amount of status information regarding content displayed via the first display generation component and providing the second amount of status information regarding the content displayed via the first display generation component (e.g., in real-time as the first display generation component is displaying the content) made in response to a last time the privacy-adjustment criteria were met. Changing the operational state of the computing system from the sixth operational state to the fifth operational state, wherein the computing system reverses the switching between providing the first amount of status information regarding content displayed via the first display generation component and providing the second amount of status information regarding the content displayed via the first display generation component made in response to a last time the privacy-adjustment criteria were met, in response to detecting that the privacy-adjustment criteria are met again while the computing system is in the sixth operational state, provides additional control options without cluttering the UI with additional displayed controls (e.g., additional displayed controls for switching between the first and second amount of status information, additional displayed controls for changing from the sixth operational state to the fifth operational state, etc.). Providing additional control options without cluttering the UI with additional displayed controls enhances the operability of the device, which, additionally, reduces power usage and improves battery life of the device by enabling the user to use the device more quickly and efficiently.

In some embodiments, in accordance with the determination that the privacy-adjustment criteria are met, changing the operational state of the computing system from the fifth operational state to the sixth operational state includes: in accordance with a determination that the first hand moves in a first direction (e.g., downward, or upward) while meeting the respective movement criterion and the respective posture criterion of the privacy-adjustment criteria, the second display generation component increases an amount of status information regarding the content displayed via the first display generation component (e.g., switching from displaying the first amount of status information to displaying the second amount of status information, where the first amount is smaller than the second amount; or switching from not displaying any status information to displaying some status information); and in accordance with a determination that the first hand moves in a second direction (e.g., upward, or downward) different from the first direction (e.g., antiparallel to the first direction), the second display generation component decreases the amount of status information regarding the content displayed via the first display generation component (e.g., switching from displaying the second amount of status information to displaying the first amount of status information, where the first amount is smaller than the second amount; or switching from displaying some status information to not displaying any status information). In some embodiments, changing the operational state of the computing system from the fifth operational state to the sixth operational state further includes: in accordance with the determination that the first hand moves in the first direction (e.g., downward, or upward) while meeting the respective movement criterion and the respective posture criterion of the privacy-adjustment criteria, the second display generation component switches from not displaying representation of the user's eyes to displaying representation of the user's eyes while content is displayed via the first display generation component; and in accordance with the determination that the first hand moves in the second direction (e.g., upward, or downward) while meeting the respective movement criterion and the respective posture criterion of the privacy-adjustment criteria, the second display generation component switches from displaying representation of the user's eyes to not displaying representation of the user's eyes while content is displayed via the first display generation component. Increasing an amount of status information regarding the content displayed via the first display generation component, in accordance with a determination that the first hand moves in a first direction while meeting the respective movement criterion and the respective posture criterion of the privacy-adjustment criteria, and decreasing the amount of status information regarding the content displayed via the first display generation component, in accordance with a determination that the first hand moves in a second direction different from the first direction, provides additional control options without cluttering the UI with additional displayed controls (e.g., additional displayed controls for increasing and/or decreasing the amount of status information displayed via the first display generation component.

In some embodiments, in response to detecting the first hand on the housing that contains the first display generation component, the computing system displays, via the first display generation component (e.g., around a peripheral region of the visual field provided by the first display generation component), respective visual representations corresponding to one or more functions of the computing system (e.g., a volume control showing current status of the audio generation component(s) of the computing system, a representation or control of a current privacy mode of the computing system, a representation or control of an immersive state of the first display generation component, a camera shutter control, a camera mode selection control, etc.). In some embodiments, these visual representations are selectively displayed at or near the locations of contacts on the housing of the first display generation component. In some embodiments, different subsets of the visual representations are displayed in accordance with the different hand postures and/or locations of the contacts on the housing of the first display generation component. Displaying respective visual representations corresponding to one or more functions of the computing system in response to detecting the first hand on the housing that contains the first display generation component displays respective visual representation corresponding to one or more functions of the computing system when a set of conditions has been met without requiring further user input (e.g., further user input to display respective virtual representations corresponding to one or more functions of the computing system). Performing an operation when a set of conditions has been met without requiring further user input enhances the operability of the device, which, additionally, reduces power usage and improves battery life of the device by enabling the user to use the device more quickly and efficiently.

In some embodiments, in response to detecting the first hand approaching the housing that contains the first display generation component, the computing system displays, via the first display generation component (e.g., around a peripheral region of the visual field provided by the first display generation component), an animated transition that shows the respective visual representations corresponding to the one or more functions of the computing system emerging from a peripheral region of the visual field provided by the first display generation component (e.g., the visual representations grow in size as the fingers of the first hand moves toward the housing, and the visual representations moves around the peripheral boundary of the visual field provided by the first display generation component based on the current positions of the fingers of the first hand as the first hand approaches the housing of the first display generation component). Displaying an animated transition that shows the respective visual representations emerging from a peripheral region of the visual field provides improved visual feedback to the user (e.g., improved visual feedback that the first hand is approaching the housing that contains the first display generation component). Providing improved feedback enhances the operability of the device, which, additionally, reduces power usage and improves battery life of the device by enabling the user to use the device more quickly and efficiently.

In some embodiments, in accordance with the determination that the first hand is detected in conjunction without detecting another hand on the housing, performing the operation associated with the first hand includes: in accordance with a determination that the first hand makes contact with the housing at a first location corresponding to a first visual representation corresponding to a first function of the computing system, and that the first hand meets respective control activation criteria (e.g., criteria for detecting a tap input, a press input, a touch-hold input, a swipe input, etc.) associated with the first function, activating the first function of the computing system (e.g., taking a snapshot using the camera of the computing system, turning on/off the status information on the first display generation component, etc.); and in accordance with a determination that the first hand makes contact with the housing at a second location corresponding to a second visual representation corresponding to a second function of the computing system, and that the first hand meets respective control activation criteria (e.g., criteria for detecting a tap input, a press input, a touch-hold input, a swipe input, etc.) associated with the second function, activating the second function of the computing system (e.g., starting a video using the camera of the computing system, turning up the volume or turning on noise cancellation for the audio generation component of the computing system, etc.). In some embodiments, controls are displayed next to predetermined positions around the peripheral regions of the visual field provided by the first display generation component, where the positions corresponds to respective physical textures (e.g., bumps, ridges, lines, or/or rough patterns, etc.) formed on the outside of the housing. In some embodiments, the visual representations of different functions are displayed at positions that correspond to different types of surface textures on the housing. For example, the control for adjusting volume is displayed at a first peripheral portion of the visual field provided by the first display generation component that corresponds to the location of a raised ridge on the housing of the first display generation component (e.g., the user can move their finger along the raised ridge to adjust volume of the audio generation component of the computing system), while the control for taking a snapshot using the camera is displayed at a second peripheral portion of the visual field provided by the first display generation component that corresponds to the location of a round bump on the housing of the first display generation component (e.g., the user can press on the round bump to take a snapshot, or press and hold on the round bump to start capturing a video using the camera of the computing system). Activating the first function of the computing system in accordance with a determination that the first hand makes contact with the housing at a first location corresponding to a first visual representation corresponding to a first function of the computing system, and that the first hand meets respective control activation criteria associated with the first function, and activating the second function of the computing system in accordance with a determination that the first hand makes contact with the housing at a second location corresponding to a second visual representation corresponding to a second function of the computing system, and that the first hand meets respective control activation criteria associated with the second function, provides additional control options without cluttering the UI with additional displayed controls (e.g., additional displayed controls for activating the first and/or second functions of the computing system). Providing additional control options without cluttering the UI with additional displayed controls enhances the operability of the device, which, additionally, reduces power usage and improves battery life of the device by enabling the user to use the device more quickly and efficiently.

It should be understood that the particular order in which the operations in FIG. 13 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, and 12000) are also applicable in an analogous manner to method 13000 described above with respect to FIG. 13. For example, the gestures, gaze inputs, physical objects, user interface objects, and/or animations described above with reference to method 13000 optionally have one or more of the characteristics of the gestures, gaze inputs, physical objects, user interface objects, and/or animations described herein with reference to other methods described herein (e.g., methods 8000, 9000, 10000, 11000, and 12000). For brevity, these details are not repeated here.

The operations described above with reference to FIGS. 8, 9, 10, 11, 12 and 13 are, optionally, implemented by components depicted in FIGS. 1-6. In some embodiments, aspects/operations of methods 8000, 9000, 10000, 11000, 12000, and 13000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:
1. A method, comprising:
at a computing system that is in communication with a first display generation component, a second display generation component and one or more input devices, wherein the first display generation component and the second display generation component are enclosed in a first housing:
displaying, via the first display generation component, a first computer-generated environment;
while displaying the first computer-generated environment via the first display generation component, in accordance with a determination that the first computer-generated environment includes a representation of a physical environment that shows a view of a first portion of a first physical environment that is in front of a user who is in a position to view the first computer-generated environment via the first display generation component, concurrently displaying, via the second display generation component that is enclosed in the same first housing as the first display generation component:
a visual representation of a portion of the user who is in a position to view the first computer-generated environment via the first display generation component, and
one or more graphical elements that provide a visual indication of content in the first computer-generated environment, wherein concurrently displaying the visual representation of the portion of the user and the one or more graphical elements includes:
changing the visual representation of the portion of the user to represent changes in an appearance of the user over a respective period of time; and
changing the one or more graphical elements that provide the visual indication of content in the first computer-generated environment to represent changes in the first computer-generated environment over the respective period of time; and
while displaying the first computer-generated environment via the first display generation component, in accordance with a determination that the first computer-generated environment does not include a representation of a physical environment that shows a view of the first portion of the first physical environment that is in front of the user who is in a position to view the first computer-generated environment via the first display generation component, displaying the one or more graphical elements, via the second display generation component that is enclosed in the same first housing as the first display generation component, without displaying the visual representation of the portion of the user who is in a position to view the first computer-generated environment via the first display generation component.

2. The method of claim 1, wherein changing the visual representation of the portion of the user to represent changes in the appearance of the user over the respective period of time includes:
in accordance with movement of the portion of the user in a first direction relative to the first display generation component, displaying movement of the visual representation of the portion of the user in the first direction on the second display generation component; and
in accordance with movement of the portion of the user in a second direction relative to the first display generation component, the second direction being within a threshold angle of a respective direction that is perpendicular to the first direction, displaying movement of the visual representation of the portion of the user in a third direction on the second display generation component, the third direction being within the threshold angle of a respective direction that is opposite to the second direction.

3. The method of claim 1, wherein concurrently displaying the visual representation of the portion of the user and the one or more graphical elements includes generating the visual representation of the portion of the user in accordance with a predefined characteristic value that is specified for a first display property of the visual representation.

4. The method of claim 3, wherein the predefined characteristic value that is specified for the first display property of the visual representation includes a predefined amount of reduction for an opacity of the visual representation of the portion of the user.

5. The method of claim 1, wherein concurrently displaying the visual representation of the portion of the user and the one or more graphical elements includes applying a predefined visual effect on the visual representation of the portion of the user.

6. The method of claim 1, wherein concurrently displaying the visual representation of the portion of the user and the one or more graphical elements via the second display generation component includes displaying a diffused colored layer between the visual representation of the portion of the user and the one or more graphical elements that provide the visual indication of the content of the first computer-generated environment.

7. The method of claim 1, wherein concurrently displaying the visual representation of the portion of the user and the one or more graphical elements via the second display generation component includes displaying the visual representation of the portion of the user with a first graphical resolution and displaying the one or more graphical elements that provide the visual indication of the content of the first computer-generated environment with a second graphical resolution that is different from the first graphical resolution.

8. The method of claim 1, wherein concurrently displaying the visual representation of the portion of the user and the one or more graphical elements includes:
in accordance with a determination that a first change in the appearance of the user is detected, changing the visual representation of the portion of the user in accordance with the first change in the appearance of the user without changing the one or more graphical elements that provide the visual indication of the content in the first computer-generated environment.

9. The method of claim 1, wherein concurrently displaying the visual representation of the portion of the user and the one or more graphical elements includes:
in accordance with a determination that a second change in the content in the first computer-generated environment is detected while the appearance of the user remains unchanged, changing at least one of the one or more graphical elements that provide the visual indication of the content in the first computer-generated environment in accordance with the second change in the content in the first computer-generated environment without changing the visual representation of the portion of the user.

10. The method of claim 1, wherein concurrently displaying the visual representation of the portion of the user and the one or more graphical elements includes:
in accordance with a determination that a third change in the appearance of the user is detected with a fourth change in the content in the first computer-generated environment, changing the visual representation of the portion of the user in accordance with the third change in the appearance of the user in conjunction with changing the one or more graphical elements that provide the visual indication of the content in the first computer-generated environment in accordance with the fourth change in the content in the first computer-generated environment.

11. The method of claim 1, wherein:
concurrently displaying the visual representation of the portion of the user and the one or more graphical elements includes displaying a modified version of the content concurrently with the visual representation of the portion of the user, wherein the modified version of the content is generated with one or more image filters that, when applied to an image of the content, reduces image fidelity of the image; and
changing the one or more graphical elements that provide the visual indication of content in the first computer-generated environment to represent changes in the first computer-generated environment over the respective period of time includes updating the modified version of the content by applying the one or more image filters to images of the content as the content changes.

12. The method of claim 1, wherein the visual representation of the portion of the user includes an image of the user's eyes.

13. The method of claim 1, wherein the visual representation of the portion of the user includes a virtual object that is generated based on one or more images of the user's eyes, wherein an appearance and movement of the virtual object correspond to an appearance and movement of the user's eyes that are captured by one or more sensors of the computing system.

14. The method of claim 1, wherein changing the visual representation of the portion of the user to represent changes in the appearance of the user over the respective period of time includes:
obtaining eye tracking data corresponding to the user; and
updating the visual representation of the portion of the user based on the eye tracking data corresponding to the user.

15. The method of claim 1, wherein:
the first display generation component is a hardware component of the computing system that is visible to the user while the user is located in a respective physical environment; and
the second display generation component is a hardware component of the computing system that is visible to a respective person other than the user while the respective person is in the respective physical environment with the user.

16. A non-transitory computer-readable storage medium storing executable instructions that, when executed by a computing system that includes one or more processors and that is in communication with a first display generation component and a second display generation component, wherein the first display generation component and the second display generation component are enclosed in a first housing, cause the computing system to perform operations comprising:
- displaying, via the first display generation component, a first computer-generated environment;
- while displaying the first computer-generated environment via the first display generation component, in accordance with a determination that the first computer-generated environment includes a representation of a physical environment that shows a view of a first portion of a first physical environment that is in front of a user who is in a position to view the first computer-generated environment via the first display generation component, concurrently displaying, via the second display generation component that is enclosed in the same first housing as the first display generation component:
  - a visual representation of a portion of the user who is in a position to view the first computer-generated environment via the first display generation component, and
  - one or more graphical elements that provide a visual indication of content in the first computer-generated environment, wherein concurrently displaying the visual representation of the portion of the user and the one or more graphical elements includes:
    - changing the visual representation of the portion of the user to represent changes in an appearance of the user over a respective period of time; and
    - changing the one or more graphical elements that provide the visual indication of content in the first computer-generated environment to represent changes in the first computer-generated environment over the respective period of time; and
- while displaying the first computer-generated environment via the first display generation component, in accordance with a determination that the first computer-generated environment does not include a representation of a physical environment that shows a view of the first portion of the first physical environment that is in front of the user who is in a position to view the first computer-generated environment via the first display generation component, displaying the one or more graphical elements, via the second display generation component that is enclosed in the same first housing as the first display generation component, without displaying the visual representation of the portion of the user who is in a position to view the first computer-generated environment via the first display generation component.

17. The non-transitory computer-readable storage medium of claim 16, wherein changing the visual representation of the portion of the user to represent changes in the appearance of the user over the respective period of time includes:
- in accordance with movement of the portion of the user in a first direction relative to the first display generation component, displaying movement of the visual representation of the portion of the user in the first direction on the second display generation component; and
- in accordance with movement of the portion of the user in a second direction relative to the first display generation component, the second direction being within a threshold angle of a respective direction that is perpendicular to the first direction, displaying movement of the visual representation of the portion of the user in a third direction on the second display generation component, the third direction being within the threshold angle of a respective direction that is opposite to the second direction.

18. The non-transitory computer-readable storage medium of claim 16, wherein concurrently displaying the visual representation of the portion of the user and the one or more graphical elements includes generating the visual representation of the portion of the user in accordance with a predefined characteristic value that is specified for a first display property of the visual representation.

19. The non-transitory computer-readable storage medium of claim 18, wherein the predefined characteristic value that is specified for the first display property of the visual representation includes a predefined amount of reduction for an opacity of the visual representation of the portion of the user.

20. The non-transitory computer-readable storage medium of claim 16, wherein concurrently displaying the visual representation of the portion of the user and the one or more graphical elements includes applying a predefined visual effect on the visual representation of the portion of the user.

21. The non-transitory computer-readable storage medium of claim 16, wherein concurrently displaying the visual representation of the portion of the user and the one or more graphical elements via the second display generation component includes displaying a diffused colored layer between the visual representation of the portion of the user and the one or more graphical elements that provide the visual indication of the content of the first computer-generated environment.

22. The non-transitory computer-readable storage medium of claim 16, wherein concurrently displaying the visual representation of the portion of the user and the one or more graphical elements via the second display generation component includes displaying the visual representation of the portion of the user with a first graphical resolution and displaying the one or more graphical elements that provide the visual indication of the content of the first computer-generated environment with a second graphical resolution that is different from the first graphical resolution.

23. The non-transitory computer-readable storage medium of claim 16, wherein concurrently displaying the visual representation of the portion of the user and the one or more graphical elements includes:
- in accordance with a determination that a first change in the appearance of the user is detected, changing the visual representation of the portion of the user in accordance with the first change in the appearance of the user without changing the one or more graphical elements that provide the visual indication of the content in the first computer-generated environment.

24. The non-transitory computer-readable storage medium of claim 16, wherein concurrently displaying the visual representation of the portion of the user and the one or more graphical elements includes:
- in accordance with a determination that a second change in the content in the first computer-generated environment is detected while the appearance of the user remains unchanged, changing at least one of the one or more graphical elements that provide the visual indication of the content in the first computer-generated environment in accordance with the second change in the content in the first computer-generated environment without changing the visual representation of the portion of the user.

25. The non-transitory computer-readable storage medium of claim 16, wherein concurrently displaying the visual representation of the portion of the user and the one or more graphical elements includes:
in accordance with a determination that a third change in the appearance of the user is detected with a fourth change in the content in the first computer-generated environment, changing the visual representation of the portion of the user in accordance with the third change in the appearance of the user in conjunction with changing the one or more graphical elements that provide the visual indication of the content in the first computer-generated environment in accordance with the fourth change in the content in the first computer-generated environment.

26. The non-transitory computer-readable storage medium of claim 16, wherein:
concurrently displaying the visual representation of the portion of the user and the one or more graphical elements includes displaying a modified version of the content concurrently with the visual representation of the portion of the user, wherein the modified version of the content is generated with one or more image filters that, when applied to an image of the content, reduces image fidelity of the image; and
changing the one or more graphical elements that provide the visual indication of content in the first computer-generated environment to represent changes in the first computer-generated environment over the respective period of time includes updating the modified version of the content by applying the one or more image filters to images of the content as the content changes.

27. The non-transitory computer-readable storage medium of claim 16, wherein the visual representation of the portion of the user includes an image of the user's eyes.

28. The non-transitory computer-readable storage medium of claim 16, wherein the visual representation of the portion of the user includes a virtual object that is generated based on one or more images of the user's eyes, wherein an appearance and movement of the virtual object correspond to an appearance and movement of the user's eyes that are captured by one or more sensors of the computing system.

29. The non-transitory computer-readable storage medium of claim 16, wherein changing the visual representation of the portion of the user to represent changes in the appearance of the user over the respective period of time includes:
obtaining eye tracking data corresponding to the user; and
updating the visual representation of the portion of the user based on the eye tracking data corresponding to the user.

30. The non-transitory computer-readable storage medium of claim 16, wherein:
the first display generation component is a hardware component of the computing system that is visible to the user while the user is located in a respective physical environment; and
the second display generation component is a hardware component of the computing system that is visible to a respective person other than the user while the respective person is in the respective physical environment with the user.

31. A computing system, comprising:
one or more processors;
a first display generation component;
a second display generation component, wherein the first display generation component and the second display generation component are enclosed in a first housing; and
memory storing one or more programs that are configured for execution by the one or more processors, the one or more programs including instructions for performing operations comprising:
displaying, via the first display generation component, a first computer-generated environment;
while displaying the first computer-generated environment via the first display generation component, in accordance with a determination that the first computer-generated environment includes a representation of a physical environment that shows a view of a first portion of a first physical environment that is in front of a user who is in a position to view the first computer-generated environment via the first display generation component, concurrently displaying, via the second display generation component that is enclosed in the same first housing as the first display generation component:
a visual representation of a portion of the user who is in a position to view the first computer-generated environment via the first display generation component, and
one or more graphical elements that provide a visual indication of content in the first computer-generated environment, wherein concurrently displaying the visual representation of the portion of the user and the one or more graphical elements includes:
changing the visual representation of the portion of the user to represent changes in an appearance of the user over a respective period of time; and
changing the one or more graphical elements that provide the visual indication of content in the first computer-generated environment to represent changes in the first computer-generated environment over the respective period of time; and
while displaying the first computer-generated environment via the first display generation component, in accordance with a determination that the first computer-generated environment does not include a representation of a physical environment that shows a view of the first portion of the first physical environment that is in front of the user who is in a position to view the first computer-generated environment via the first display generation component, displaying the one or more graphical elements, via the second display generation component that is enclosed in the same first housing as the first display generation component, without displaying the visual representation of the portion of the user who is in a position to view the first computer-generated environment via the first display generation component.

32. The computing system of claim 31, wherein the instructions for changing the visual representation of the portion of the user to represent changes in the appearance of the user over the respective period of time include instructions for:
  in accordance with movement of the portion of the user in a first direction relative to the first display generation component, displaying movement of the visual representation of the portion of the user in the first direction on the second display generation component; and
  in accordance with movement of the portion of the user in a second direction relative to the first display generation component, the second direction being within a threshold angle of a respective direction that is perpendicular to the first direction, displaying movement of the visual representation of the portion of the user in a third direction on the second display generation component, the third direction being within the threshold angle of a respective direction that is opposite to the second direction.

33. The computing system of claim 31, wherein the instructions for concurrently displaying the visual representation of the portion of the user and the one or more graphical elements include instructions for generating the visual representation of the portion of the user in accordance with a predefined characteristic value that is specified for a first display property of the visual representation.

34. The computing system of claim 33, wherein the predefined characteristic value that is specified for the first display property of the visual representation includes a predefined amount of reduction for an opacity of the visual representation of the portion of the user.

35. The computing system of claim 31, wherein the instructions for concurrently displaying the visual representation of the portion of the user and the one or more graphical elements include instructions for applying a predefined visual effect on the visual representation of the portion of the user.

36. The computing system of claim 31, wherein the instructions for concurrently displaying the visual representation of the portion of the user and the one or more graphical elements via the second display generation component include instructions for displaying a diffused colored layer between the visual representation of the portion of the user and the one or more graphical elements that provide the visual indication of the content of the first computer-generated environment.

37. The computing system of claim 31, wherein the instructions for concurrently displaying the visual representation of the portion of the user and the one or more graphical elements via the second display generation component include instructions for displaying the visual representation of the portion of the user with a first graphical resolution and displaying the one or more graphical elements that provide the visual indication of the content of the first computer-generated environment with a second graphical resolution that is different from the first graphical resolution.

38. The computing system of claim 31, wherein the instructions for concurrently displaying the visual representation of the portion of the user and the one or more graphical elements include instructions for:
  in accordance with a determination that a first change in the appearance of the user is detected, changing the visual representation of the portion of the user in accordance with the first change in the appearance of the user without changing the one or more graphical elements that provide the visual indication of the content in the first computer-generated environment.

39. The computing system of claim 31, wherein the instructions for concurrently displaying the visual representation of the portion of the user and the one or more graphical elements include instructions for:
  in accordance with a determination that a second change in the content in the first computer-generated environment is detected while the appearance of the user remains unchanged, changing at least one of the one or more graphical elements that provide the visual indication of the content in the first computer-generated environment in accordance with the second change in the content in the first computer-generated environment without changing the visual representation of the portion of the user.

40. The computing system of claim 31, wherein the instructions for concurrently displaying the visual representation of the portion of the user and the one or more graphical elements include instructions for:
  in accordance with a determination that a third change in the appearance of the user is detected with a fourth change in the content in the first computer-generated environment, changing the visual representation of the portion of the user in accordance with the third change in the appearance of the user in conjunction with changing the one or more graphical elements that provide the visual indication of the content in the first computer-generated environment in accordance with the fourth change in the content in the first computer-generated environment.

41. The computing system of claim 31, wherein:
  the instructions for concurrently displaying the visual representation of the portion of the user and the one or more graphical elements include instructions for displaying a modified version of the content concurrently with the visual representation of the portion of the user, wherein the modified version of the content is generated with one or more image filters that, when applied to an image of the content, reduces image fidelity of the image; and
  the instructions for changing the one or more graphical elements that provide the visual indication of content in the first computer-generated environment to represent changes in the first computer-generated environment over the respective period of time include instructions for updating the modified version of the content by applying the one or more image filters to images of the content as the content changes.

42. The computing system of claim 31, wherein the visual representation of the portion of the user includes an image of the user's eyes.

43. The computing system of claim 31, wherein the visual representation of the portion of the user includes a virtual object that is generated based on one or more images of the user's eyes, wherein an appearance and movement of the virtual object correspond to an appearance and movement of the user's eyes that are captured by one or more sensors of the computing system.

44. The computing system of claim 31, wherein the instructions for changing the visual representation of the portion of the user to represent changes in the appearance of the user over the respective period of time include instructions for:
  obtaining eye tracking data corresponding to the user; and
  updating the visual representation of the portion of the user based on the eye tracking data corresponding to the user.

45. The computing system of claim 31, wherein:
the first display generation component is a hardware component of the computing system that is visible to the user while the user is located in a respective physical environment; and
the second display generation component is a hardware component of the computing system that is visible to a respective person other than the user while the respective person is in the respective physical environment with the user.

* * * * *